United States Patent
De Foy et al.

(10) Patent No.: US 10,117,158 B2
(45) Date of Patent: Oct. 30, 2018

(54) CONNECTIVITY AUGMENTED SERVICES ARCHITECTURE, DISCOVERY AND CONNECTION

(71) Applicant: InterDigital Patent Holdings, Inc., Wilmington, DE (US)

(72) Inventors: Xavier De Foy, Kirkland (CA); Michelle Perras, Montréal (CA); Alexander Reznik, Pennington, NJ (US); Kenneth F. Lynch, Wayne, PA (US); Scott C. Hergenhan, Collegeville, PA (US); Robert G. Gazda, Spring City, PA (US); Sowmini Gundamraju, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 15/022,085

(22) PCT Filed: Sep. 17, 2014

(86) PCT No.: PCT/US2014/056161
§ 371 (c)(1),
(2) Date: Mar. 15, 2016

(87) PCT Pub. No.: WO2015/042189
PCT Pub. Date: Mar. 26, 2015

(65) Prior Publication Data
US 2016/0227471 A1  Aug. 4, 2016

Related U.S. Application Data

(60) Provisional application No. 61/879,112, filed on Sep. 17, 2013, provisional application No. 61/881,377,
(Continued)

(51) Int. Cl.
*H04W 48/16* (2009.01)
*H04W 48/10* (2009.01)
(Continued)

(52) U.S. Cl.
CPC ......... *H04W 48/10* (2013.01); *H04L 12/4633* (2013.01); *H04L 67/16* (2013.01);
(Continued)

(58) Field of Classification Search
CPC ..... H04W 48/10; H04W 48/18; H04W 76/00; H04W 48/16; H04L 12/28; H04L 12/4633; H04L 67/16
See application file for complete search history.

(56) References Cited

U.S. PATENT DOCUMENTS 8,406,180 B2 * 3/2013 Park ................. H04W 74/0866
370/329
2001/0049790 A1 * 12/2001 Faccin ................. H04L 63/104
713/185
(Continued)

FOREIGN PATENT DOCUMENTS

FR  2977420 A1 * 1/2013 ............ H04W 48/18

OTHER PUBLICATIONS

3rd Generation Partnership Project (3GPP), TR 23.861 V1.7.0, "Technical Specification Group Services and System Aspects, Network Based IP Flow Mobility (Release 12)", Nov. 2012, 79 pages.
(Continued)

*Primary Examiner* — Mohamed Kamara
(74) *Attorney, Agent, or Firm* — Condo Roccia Koptiw LLP

(57) ABSTRACT

Methods, systems, and instrumentalities are described to obtain application-based connectivity. A wireless transmit receive unit (WTRU) may, in response to a request to access a connectivity-sponsored application, establish a control
(Continued)

connection over a first access network for contacting an application connectivity coordinator. The establishment of control connection may include sending an attach request, receiving an IP address for a control link to the application connectivity coordinator, and receiving an IP address. Using the control connection, the WTRU may send an access network discovery request to the application connectivity coordinator. The WTRU may receive, from the application connectivity coordinator, a list of access networks. The WTRU may select a second access network from the list of access networks to access the connectivity-sponsored application.

16 Claims, 69 Drawing Sheets

Related U.S. Application Data filed on Sep. 23, 2013, provisional application No. 61/881,778, filed on Sep. 24, 2013.

(51) Int. Cl.

| | |
|---|---|
| *H04W 4/00* | (2018.01) |
| *H04W 48/18* | (2009.01) |
| *H04W 76/00* | (2018.01) |
| *H04L 29/08* | (2006.01) |
| *H04L 12/46* | (2006.01) |
| *H04L 12/28* | (2006.01) |

(52) U.S. Cl.
CPC ........... *H04W 4/001* (2013.01); *H04W 48/18* (2013.01); *H04W 76/00* (2013.01); *H04L 12/28* (2013.01)

(56) References Cited

U.S. PATENT DOCUMENTS

| | | | | |
|---|---|---|---|---|
| 2006/0187858 A1* | 8/2006 | Kenichi | .............. | H04L 12/5692 370/254 |
| 2007/0104160 A1* | 5/2007 | Ho | ........................ | H04W 48/14 370/338 |
| 2010/0124925 A1* | 5/2010 | Kim | ...................... | H04W 48/16 455/435.1 |
| 2012/0317261 A1* | 12/2012 | Ahmavaara | ......... | H04L 63/0815 709/223 |
| 2017/0181076 A1* | 6/2017 | Jeong | .................... | H04W 48/20 |

OTHER PUBLICATIONS

3rd Generation Partnership Project (3GPP), TR 23.862 V0.3.0, "Technical Specification Group Services and System Aspects, EPC Enhancements to Support Interworking with Data Application Providers (MOSAP), Stage 2, (Release 12)", Jul. 2012, 20 pages.

3rd Generation Partnership Project (3GPP), TS 23.203 V12.1.0, "Technical Specification Group Services and System Aspects, Policy and Charging Control Architecture (Release 12)", Jun. 2013, 189 pages.

3rd Generation Partnership Project (3GPP), TS 24.302 V11.0.0, "Technical Specification Group Core Network and Terminals, Access to the 3GPP Evolved Packet Core (EPC) Via Non-3GPP Access Networks, Stage 3 (Release 11)", Sep. 2011, 58 pages.

Afrasiabi et al., "Exploring User-Provided Connectivity—A Simple Model", Proceedings of 7th International Workshop on Advanced Internet Charging and QoS Technology. Paris, France, Aug. 14, 2011, 14 pages.

Bernardos et al., "PMIPv6-Based Distributed Anchoring", DMM Working Group, Draft-Bernardos-DMM-Distributed-Anchoring-01, Sep. 21, 2012, 24 pages.

Bernardos, Carlos J., "Proxy Mobile IPv6 Extensions to Support Flow Mobility", NETEXT Working Group, draft-ietf-netext-pmipv6-flowmob-01, Sep. 7, 2011, 19 pages.

Boingo Wireless, Inc., "Boingo", Available at http://www.boingo.com/, retrieved on Nov. 9, 2017, 4 pages.

GSMA, "GSMA OneAPI", Available at http://oneapi.gsma.com/, Feb. 2013, 6 pages.

Melia et al., "Logical Interface Support for multi-mode IP Hosts", NETEXT WG, draft-ietf-netext-logical-interface-support-06.txt, Oct. 22, 2012, 25 pages.

Sun et al., "Use Case Analysis for Supporting Flow Mobility in DMM", DMM Working Group, draft-sun-dmm-use-case-analysis-flowmob-dmm-00.txt, Jul. 15, 2013, 14 pages.

Wikipedia, "Amazon Kindle", Available at https://en.wikipedia.org/wiki/Amazon_Kindle, retrieved on Nov. 9, 2017, 25 pages.

* cited by examiner

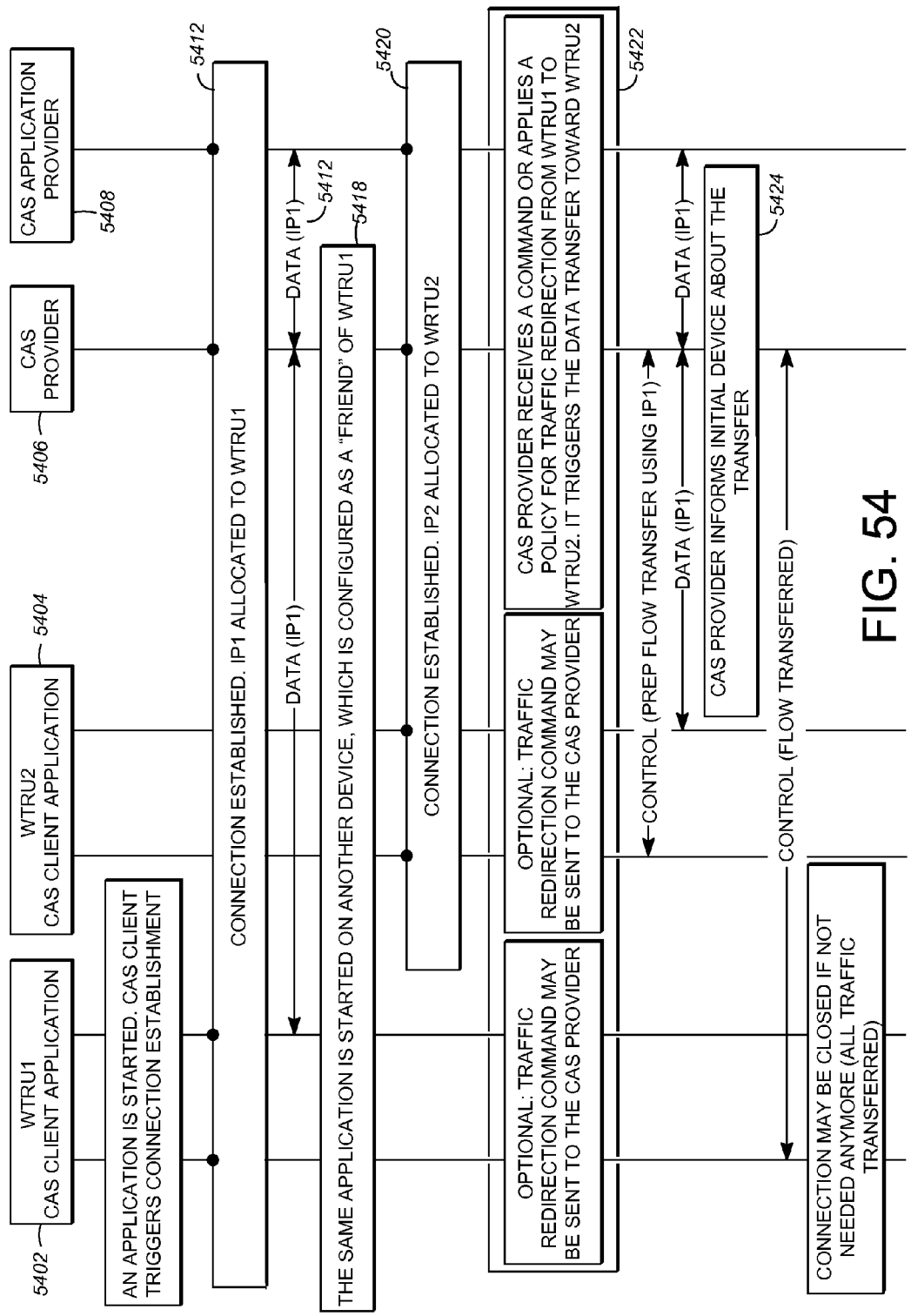

CONNECTIVITY AUGMENTED SERVICES ARCHITECTURE, DISCOVERY AND CONNECTION

CROSS REFERENCE TO RELATED APPLICATIONS

This application is the National Stage Entry under 35 U.S.C. § 371 of Patent Cooperation Treaty Application No. PCT/US2014/056161, filed Sep. 17, 2014, which claims the benefit of U.S. Provisional Patent Application Nos. 61/879,112 filed on Sep. 17, 2013, 61/881,778 filed on Sep. 24, 2013, and 61/881,377 filed on Sep. 23, 2013, the contents of which are hereby incorporated by reference herein.

BACKGROUND

With the invent of small hand held devices, e.g., smart phones, tablets, etc. and increasing availability of higher bandwidths, a number of application services (e.g., delivering on-demand data, e.g., books, newspapers, etc.) may be provided. To access such services, the device used to access such data may be pre-provisioned by an application provider. The device, therefore, may be restricted for usage with that application provider through a pre-determined access network. The access network provider operating the access network may have an agreement with this application provider. The user of such a device may not be allowed to switch access networks in order to access an application. Such an arrangement, therefore, may not be flexible.

SUMMARY

Methods, systems, and instrumentalities are described to obtain application-based connectivity. A Wireless Transmit Receive Unit (WTRU) may receive one or more multiple system information broadcast (SIB) messages. Each of the SIB messages may indicate whether the associated access network supports application-based connectivity. The WTRU may select a first access network. The first access network may be selected based on internal state information. The first access network may be selected on a condition that the first access network provides support for application based network, and the first access network matches one of a list of access networks stored in the WTRU.

In response to a request to access a connectivity-sponsored application, the WTRU may establish a control connection over the first access network for contacting an application connectivity coordinator. The application connectivity coordinator may include connectivity augmented service (CAS) provider. The connectivity-sponsored application may include a CAS application as described herein. The establishment of control connection may include sending an attach request, receiving an IP address for a control link to the application connectivity coordinator, and receiving an IP address. The attach request may be sent using the first access network and may include an application connectivity coordinator identifier and a device identifier receiving a temporary identifier. The application connectivity coordinator identifier and the device identifier may be pre-provisioned or may be received from the application connectivity coordinator. The temporary identifier may include an international mobile subscriber identity (IMSI) and/or a temporary mobile subscriber identity (TMSI). The IP address may be associated with the temporary identifier for a control link to the application connectivity coordinator.

Using the control connection, the WTRU may send an access network discovery request to the application connectivity coordinator. The access network discovery request may include one or more of an application connectivity coordinator identifier, a device identifier, a WTRU location, or application information. The application information may include information including, e.g., an application identifier, an application type, etc.

The WTRU may receive, from the application connectivity coordinator, a list of access networks. The WTRU may select a second access network from the list of access networks to access the connectivity-sponsored application. If the selected second access network is different from the first access network, the WTRU may disconnect from the first access network and connect to the second access network.

BRIEF DESCRIPTION OF THE DRAWINGS

A more detailed understanding may be had from the following description, given by way of example in conjunction with the accompanying drawings.

FIG. 54 illustrates an example of a CAS provider that may be used by two WTRUs as an anchor node.

DETAILED DESCRIPTION

A detailed description of illustrative embodiments may be described with reference to the various figures. Although this description provides a detailed example of possible implementations, it should be noted that the details are intended to be exemplary and in no way limit the scope of the application. In addition, the figures may illustrate message sequence charts, which are meant to be exemplary. Other embodiments may be used. The order of the messages may be varied where appropriate. Messages may be omitted if not needed, and, additional flows may be added.

Figure 1A:
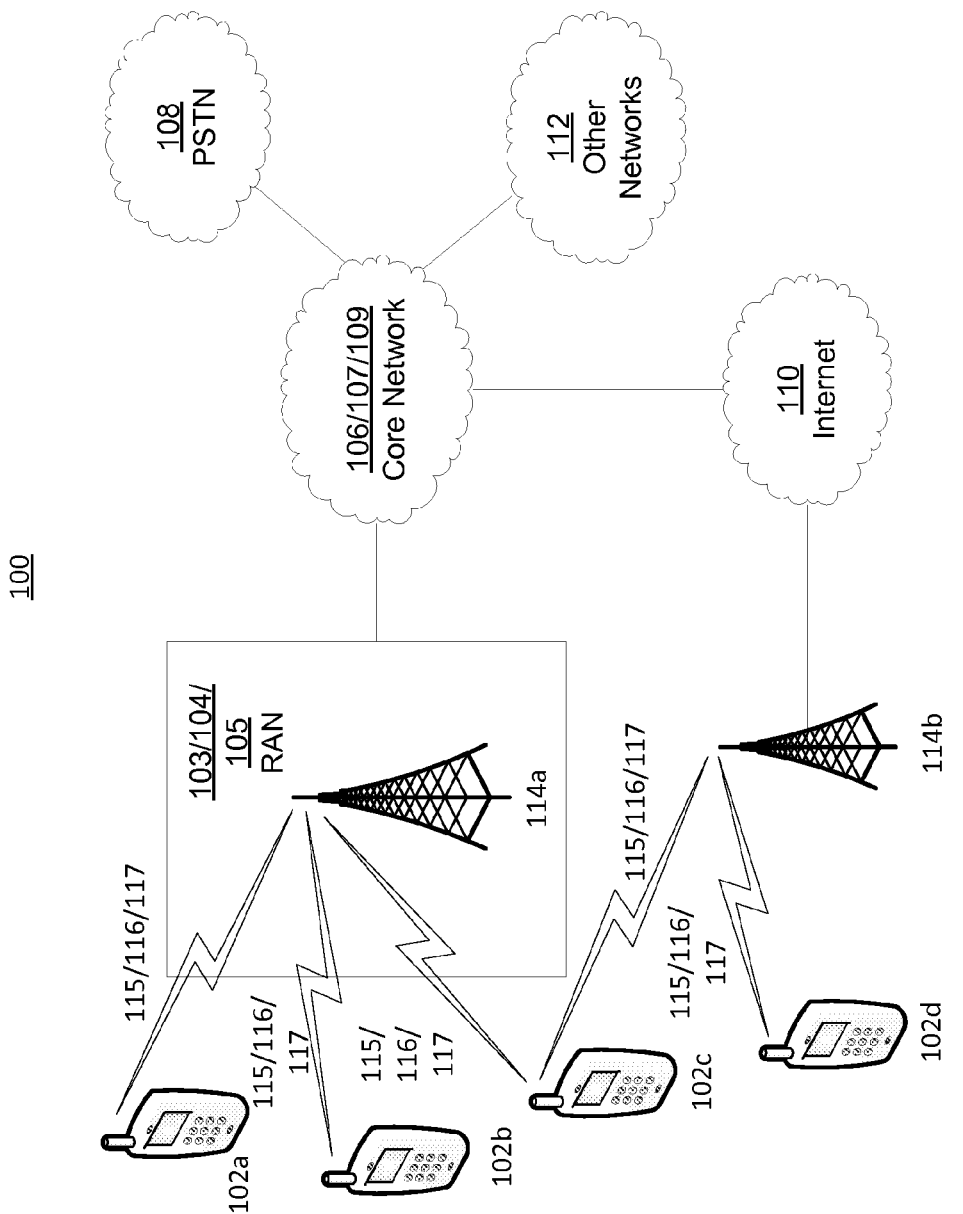
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the internet 110. Thus, the base station 114b may not be required to access the internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the internet 110, and/or other networks 112. The PSTN 108 may include circuit-switched telephone networks that provide plain old telephone service (POTS). The internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
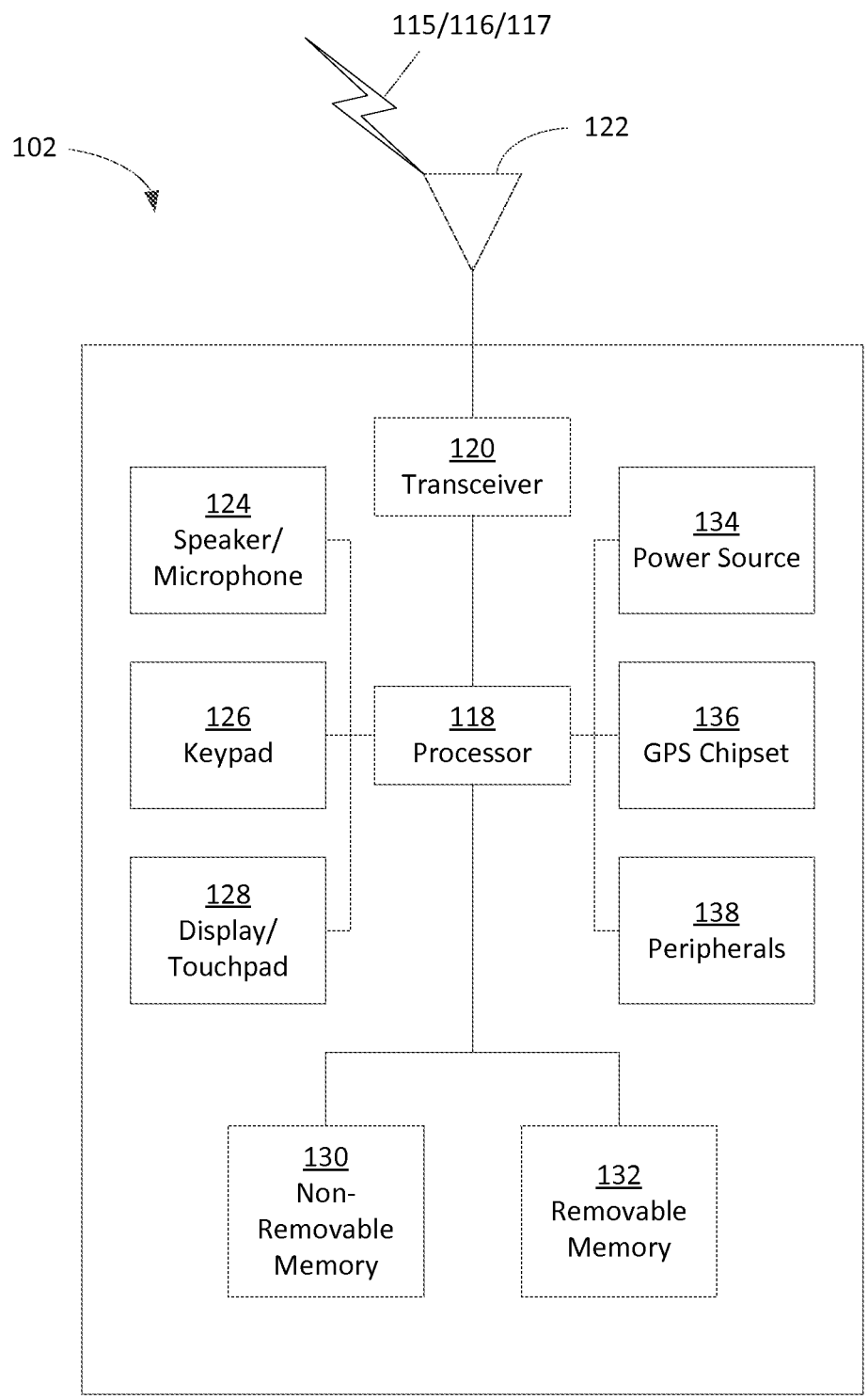
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. It is noted that the components, functions, and features described with respect to the WTRU 102 may also be similarly implemented in a base station.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an internet browser, and the like.

Figure 1C:
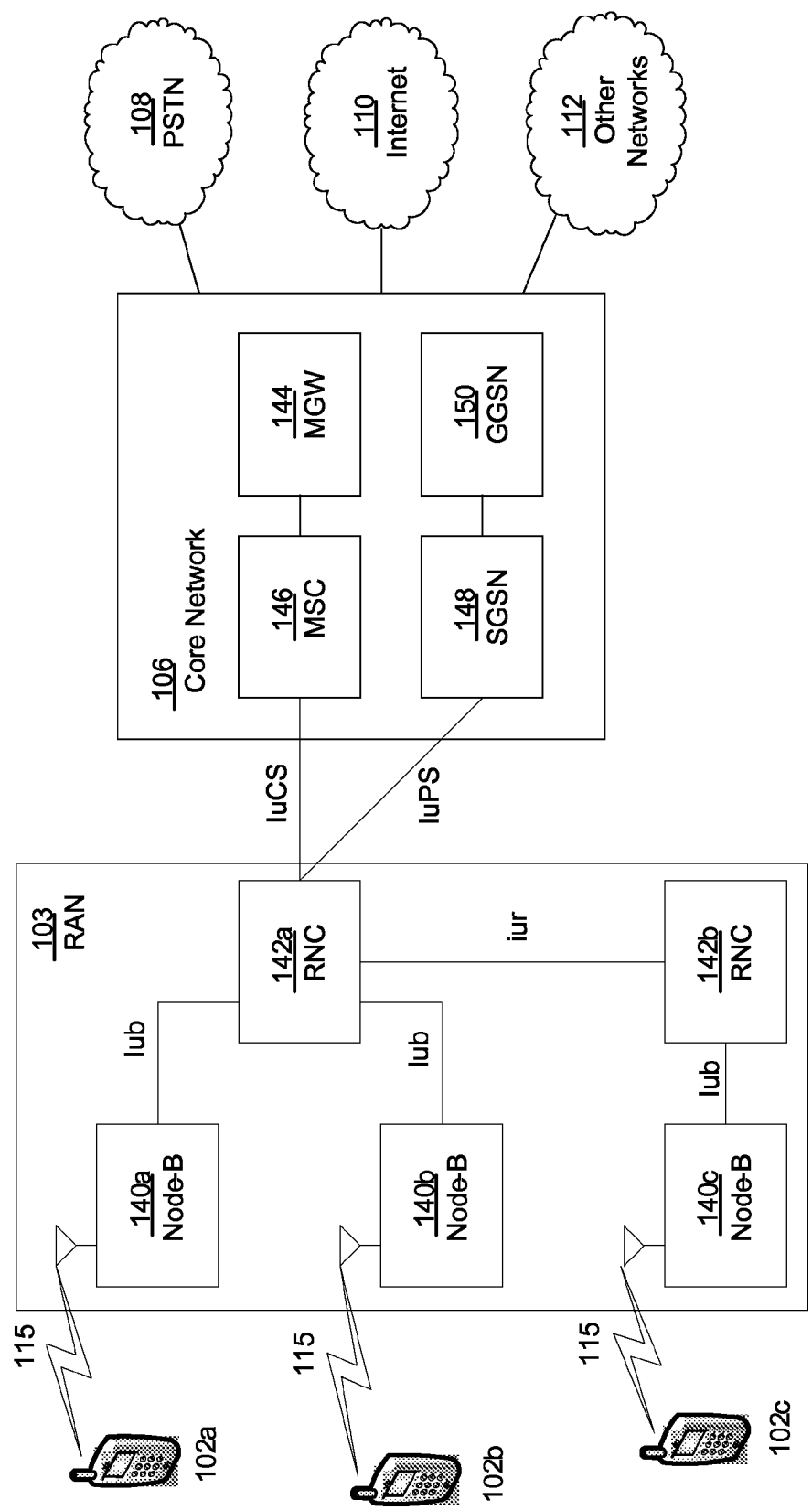
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
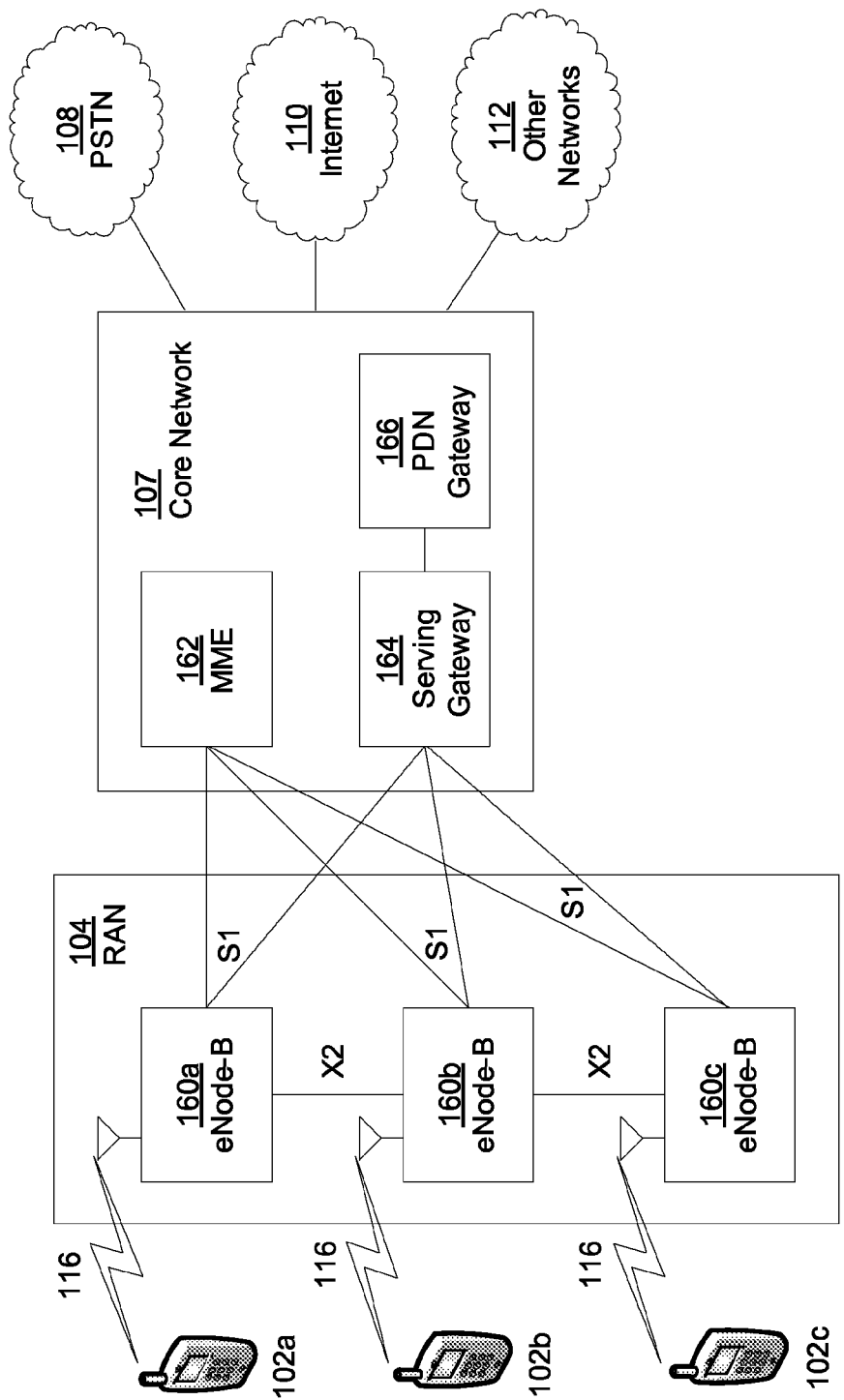
FIG. 1D is a system diagram of another example radio access network and another example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1D, the eNode-Bs 140a, 140b, 140c may communicate with one another over an X2 interface.

The core network 106 shown in FIG. 1D may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the internet 110, to facilitate communications between the WTRUs 102a, 102b. 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
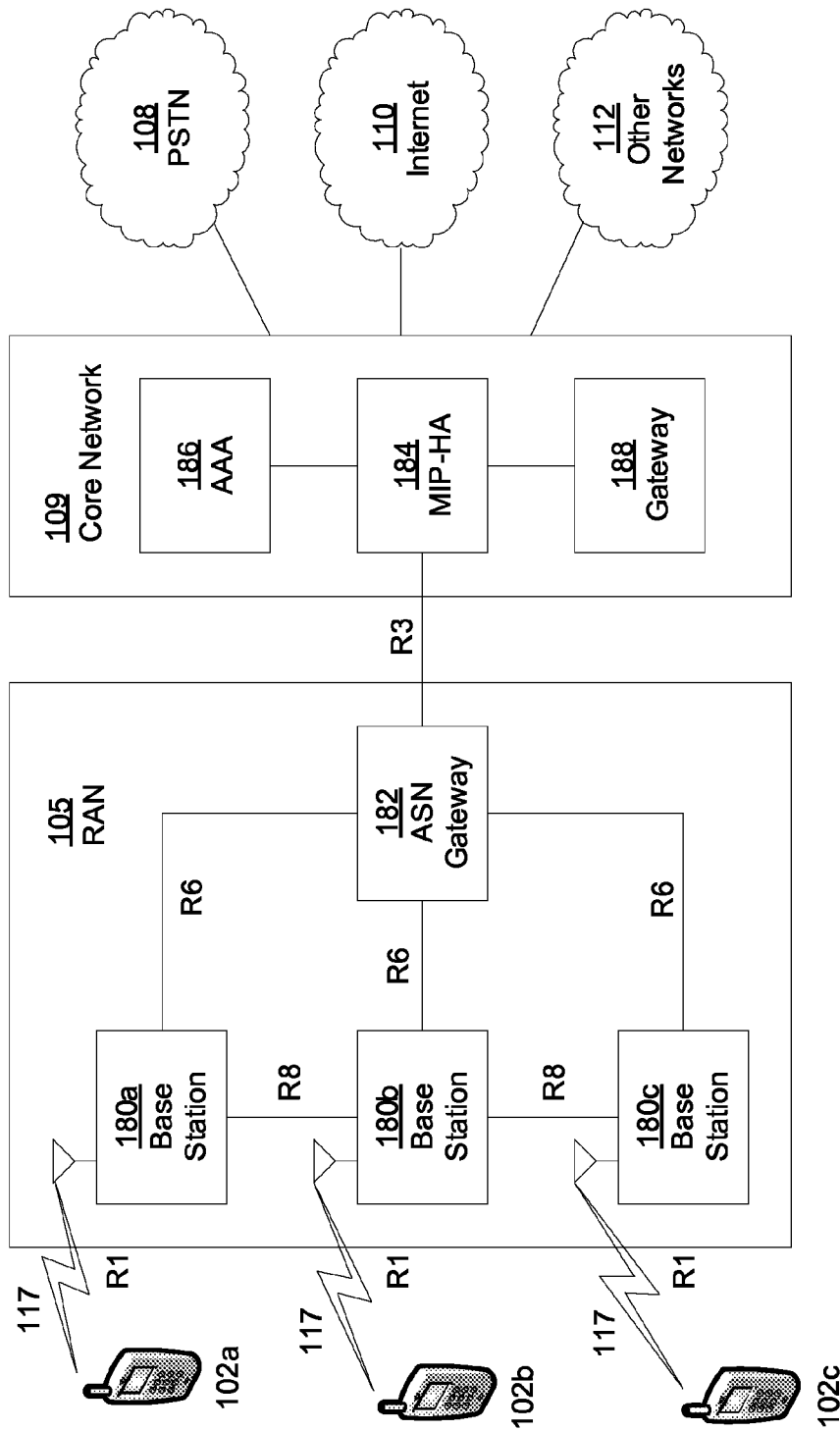
FIG. 1E is a system diagram of another example radio access network and another example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 140a, 140b, 140c, and an ASN gateway 142, though it will be appreciated that the RAN 104 may include any number of base stations and ASN gateways while remaining consistent with an embodiment. The base stations 140a, 140b, 140c may each be associated with a particular cell (not shown) in the RAN 104 and may each include one or more transceivers for communicating with the WTRUs 102a, 102b, 102c over the air interface 116. In one embodiment, the base stations 140a, 140b, 140c may implement MIMO technology. Thus, the base station 140a, for example, may use multiple antennas to transmit wireless signals to, and receive wireless signals from, the WTRU 102a. The base stations 140a, 140b, 140c may also provide mobility management functions, such as handoff triggering, tunnel establishment, radio resource management, traffic classification, quality of service (QoS) policy enforcement, and the like. The ASN gateway 142 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 140a, 140b, 140c may be defined as an R8 reference point that includes protocols for facilitating WTRU handovers and the transfer of data between base stations. The communication link between the base stations 140a, 140b, 140c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 144, an authentication, authorization, accounting (AAA) server 146, and a gateway 148. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 144 may provide the WTRUs 102a, 102b, 102c with access to packet-switched networks, such as the internet 110, to facilitate communications between the WTRUs 102a, 102b, 102c and IP-enabled devices. The AAA server 146 may be responsible for user authentication and for supporting user services. The gateway 148 may facilitate interworking with other networks. For example, the gateway 148 may provide the WTRUs 102a, 102b, 102c with access to circuit-switched networks, such as the PSTN 108, to facilitate communications between the WTRUs 102a, 102b, 102c and traditional land-line communications devices. In addition, the gateway 148 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A 3G enabled device (e.g., a Kindle) may enable free 3G access to a service provided by a service provider (e.g., Amazon's service) or to the web (e.g., Wikipedia) to an end user. The application service provider (e.g., Amazon) may provision the device. The network access from the device may be billed to the service provider and not the end user.

Sponsored data connectivity may be provided. Sponsored data connectivity may enable bundling network access with an application within a cellular network (e.g., assuming the end user has a network plan). Sponsored data connectivity may include a prior agreement between an application provider (e.g., the sponsor) and the cellular network. A WTRU, in case of the sponsored data connectivity, may be a subscriber of the cellular network.

User provided connectivity may be provided. User provided connectivity may enable bundling multiple access networks into one commercial offering for IP connectivity to the internet. A service provider (e.g., Boingo) may be an example of a commercial user provided connectivity solution.

Figure 2:
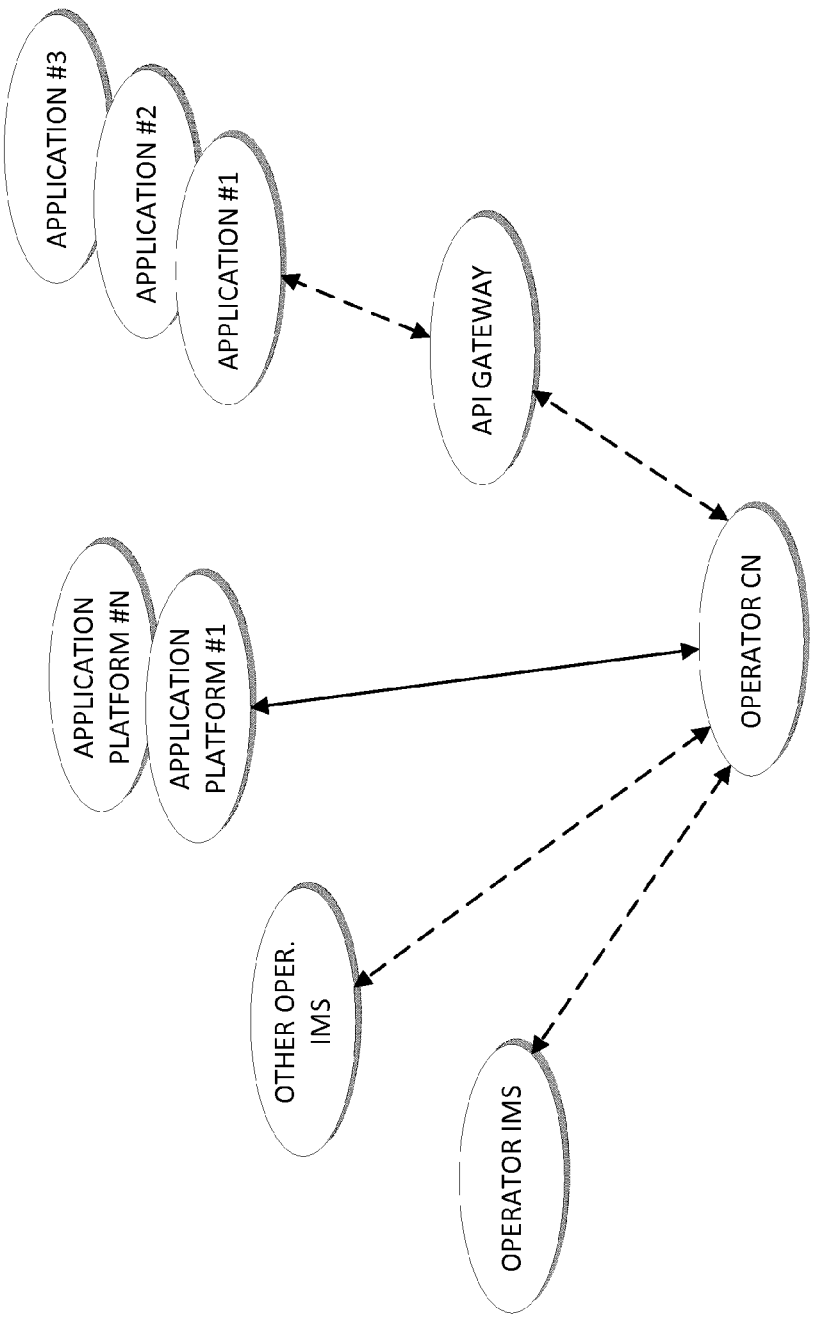
FIG. 2 illustrates one or more forms of interworking between applications and the operator's core network.

Mobile Operators using the evolved packet System and data application providers (MOSAP) and/or OneAPI may enable control of one or more network resources (e.g., for QoS) by an application provider within a cellular network (e.g., assuming that the end user has a network plan). MOSAP may enable the control by opening and adapting one or more internal 3GPP interfaces for use by one or more partner application providers (e.g., application platform providers. OneAPI may enable the control through a gateway offering a network service API to one or more application developers. FIG. 2 illustrates one or more example forms of interworking between one or more applications and an operator's Core Network. Interworking between one or more applications may include one or more of the following IMS, MOSAP and web service APIs (e.g., OneAPI).

Hot-Spot 2.0 (HS2.0) may be provided. HS2.0 may provide a 3G-like end-user experience to Wi-Fi authentication and/or roaming. HS2.0 may provide seamless automatic Wi-Fi authentication. HS2.0 may allow mobile users to roam between networks without requiring additional authentication.

For a Legacy AP, an SSID may be the sole identifier used for Wi-Fi network selection. An 802.11 AP may not provide details about its capabilities, a location it may serve, a type of venue (e.g., coffee shop, airport, etc.) and/or, an identification of a service provider (SP) that may operate the Wi-Fi network. A hotspot may not be able to signal roaming partners and/or provide information about a needed security mechanism (e.g., when connecting to a hotel Wi-Fi, the user may need to manually launch a web page to enter a login and/or password provided by the hotel). HS2.0 may include one or more network selection related parameters available to the WTRU. The one or more network selection related parameters may be provide through an addition to beacon or probe request/response and/or through ANQP (access network Query Protocol). The one or more network selection related parameters may help the WTRU to perform network selection and transparent authentication, with no manual intervention.

Figure 3:
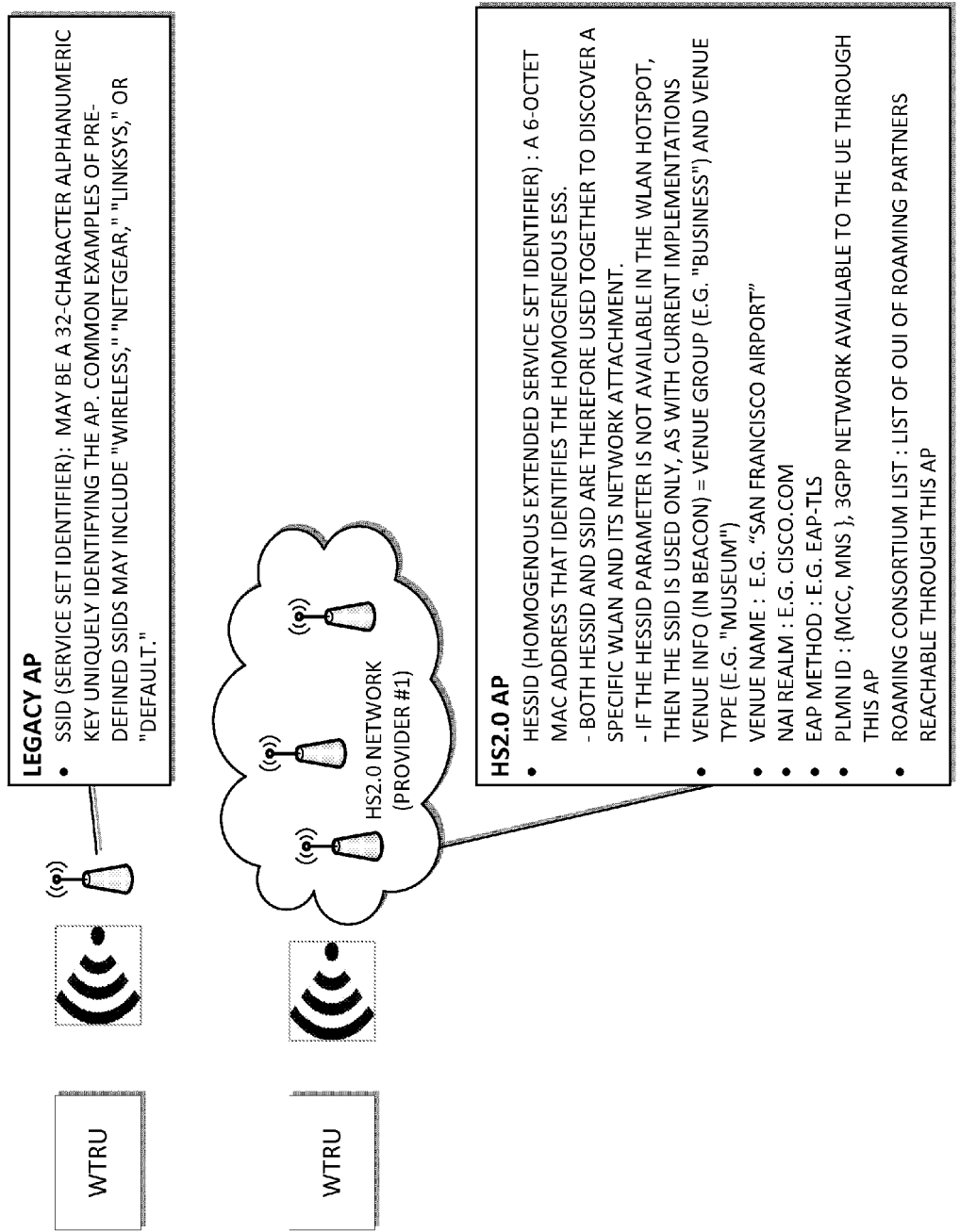
FIG. 3 illustrates an example of one or more parameters (e.g., network selection related parameters) that may be available through a HS2.0 AP as compared to a legacy AP.

FIG. 3 illustrates an example of one or more parameters (e.g., Network Selection related parameters) that may be available through a HS2.0 AP as compared to through a legacy AP. Beacons, probes, and/or ANQP may be used to make the information available to a WTRU (e.g., to perform network selection). As illustrated in FIG. 3, a legacy AP may include an SSID, which may be a 32-character alphanumeric key and may uniquely identify the legacy AP. A HS2.0 AP may provide one or more parameters (e.g., a homogenous extended service set identifier (HESSID), a venue info, a venue name, an NAI realm, an EAP method, an PLMN ID, a roaming consortium list, etc.). For example, the HESSID may be a 6-octet MAC address that may identify a homogenous ESS. HESSID and SSID may be used together to discover a specific WLAN and a network attachment associated with the specific WLAN. The SSID may be used (e.g., if the HESSID parameter is not available in the WLAN hotspot). The venue info parameter may include a venue group (e.g., a business group) and/or a venue type (e.g., a museum). The venue name parameter may indicate a venue (e.g., Philadelphia airport). The NAI realm parameter may indicate a domain (e.g., Interdigital.com). The EAP method parameter may indicate the EAP method used (e.g., EAP-TLS). The PLMN Id parameter may indicate a 3GPP network that may be available to the WTRU via an AP. The roaming consortium list parameter may provide a list of OUI of one or more roaming partners reachable through the AP.

Figure 4:
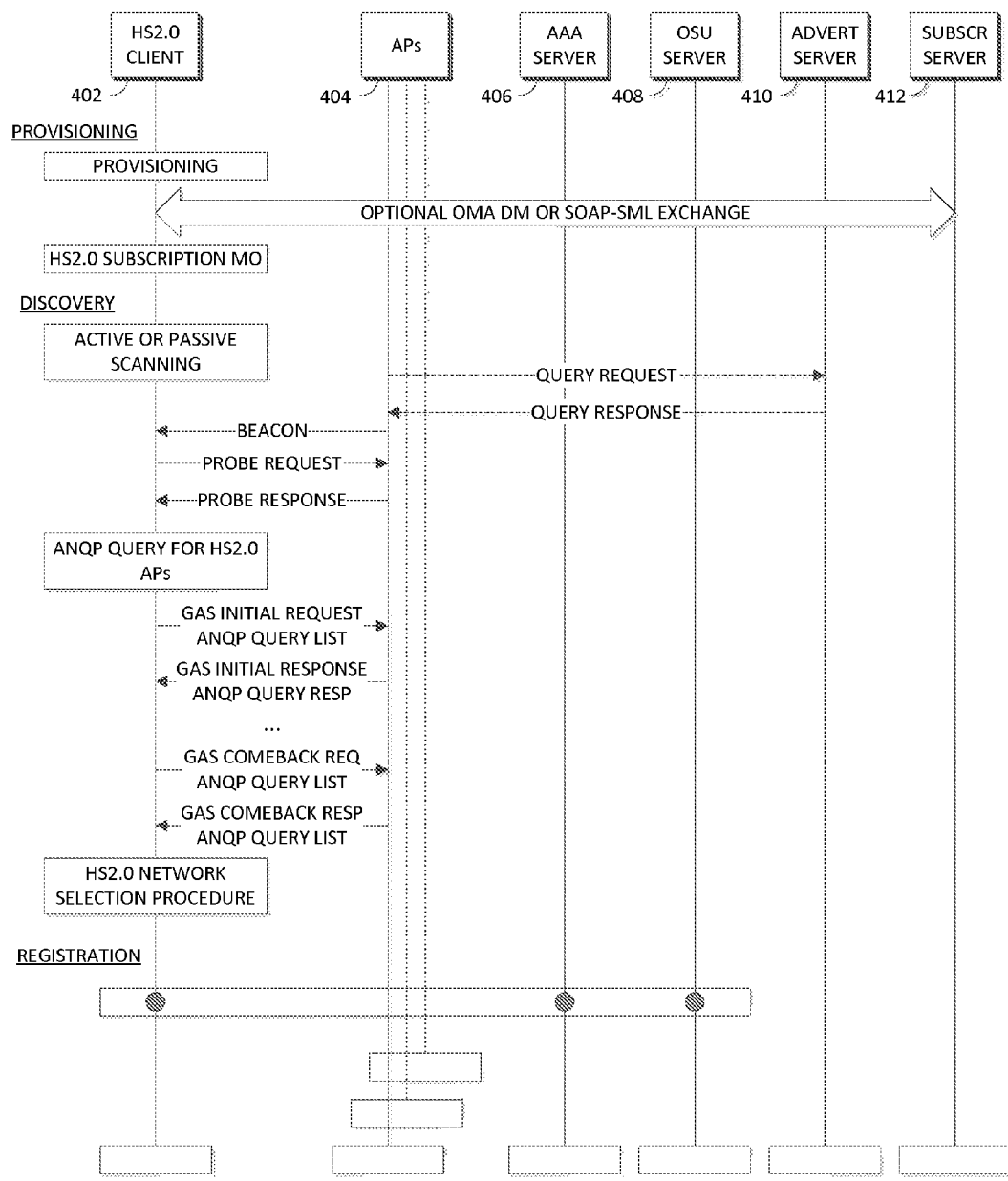
FIG. 4 illustrates the HS 2.0, indicating how a HS2.0 WTRU may connect to a HS2.0 AP

HS2.0 may provide one or more of the following features. For network selection and discovery, HS2.0 may provide IEEE 802.11u (e.g., interworking with external networks). For credentials provisioning, HS2.0 may provide Wi-Fi Alliance's WPA2-Enterprise (e.g., Wi-Fi Protected Access). HS2.0 may provide extensible authentication protocol (EAP) based authentication. FIG. 4 illustrates example HS 2.0 call-flows, indicating how a HS2.0 WTRU may connect to a HS2.0 AP.

Online services (e.g., connectivity augmented services (CAS)) may be provided to end users. Online services may be provided as part of a single commercial offering. The CAS may provide a service (e.g., a streaming service like Netflix®), connectivity associated with the service (e.g., connectivity through a cellular network), and/or an associated Quality of Service (QoS). In some networks, the CAS may be partially enabled. As described herein, for example, such systems with partial CAS enabled may require that an application provider (e.g., the Kindle device provided by Amazon) provision a device. Some systems may offer multi-access network connectivity not related to a particular application (e.g., user provided connectivity). Some systems may need the existence of a network plan with a specific access network provider (e.g., sponsored data connectivity in cellular networks that may be used with MOSAP and/or OneAPI).

A network architecture enabling an enhanced CAS may be provided. The enhanced CAS may enable multiple applications to provide CAS services to a single device (e.g., through one or more out of a set of multiple access networks, without requiring a network plan with an access network provider). An application may include an online game, a program, a media, a store, and/or an office suite. The application may be provided to a WTRU via a cellular network and/or a Wi-Fi network (e.g., an access network).

Figure 5:
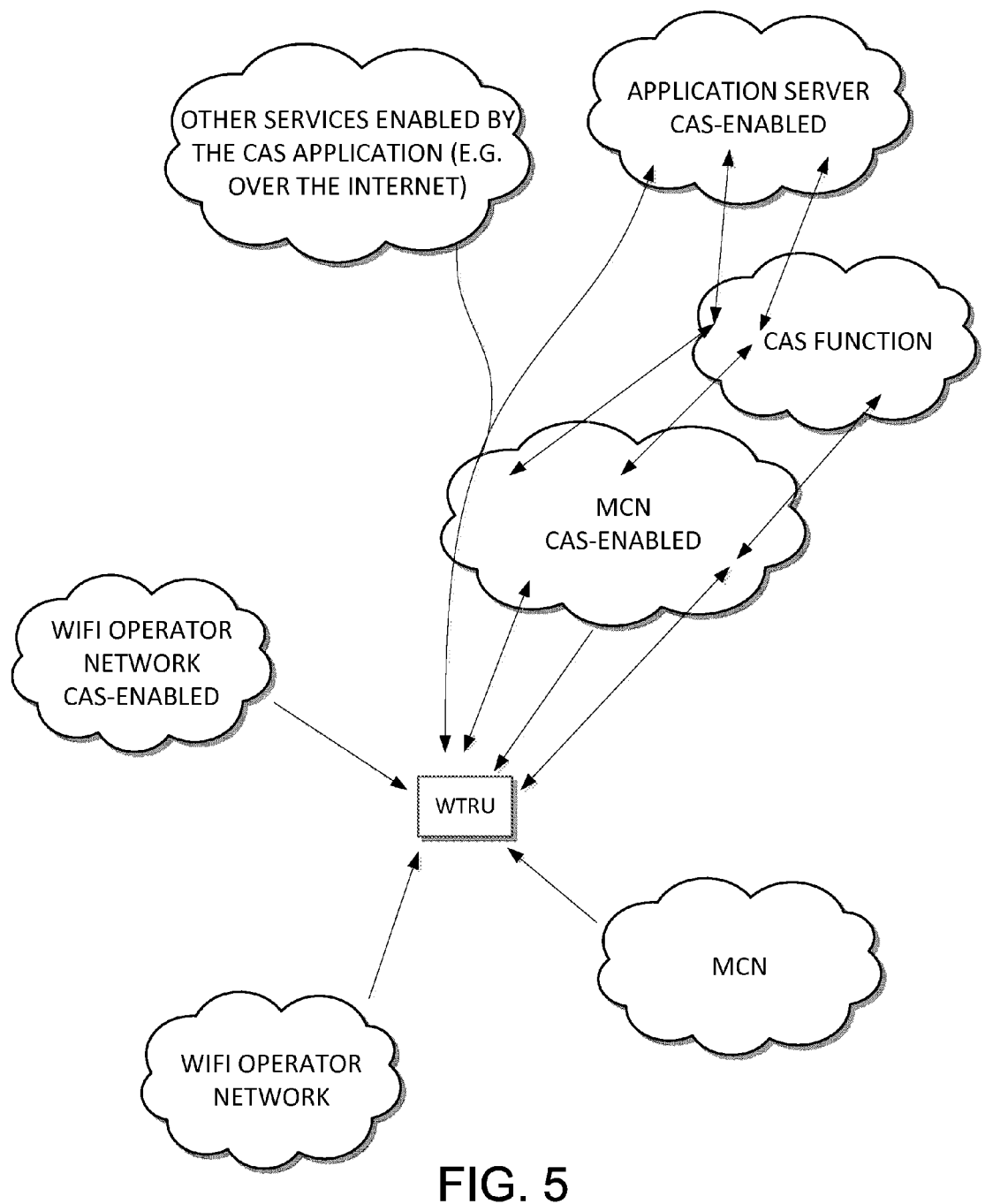
FIG. 5 illustrates an example of connectivity augmented services (CAS).

FIG. 5 illustrates an example connectivity augmented services (CAS) architecture. CAS may be enabled in a single node or distributed across a network. CAS may communicate with an access network, one or more application providers and/or a WTRU to enable one or more of CAS service discovery, CAS access authorization, and/or CAS QoS. As a part of CAS service discovery, the WTRU may scan one or more networks and/or search for networks (e.g., networks supporting 'CAS Netflix'). To the end user, this may be a single step. The end user may not be aware of the CAS provider being used. As a part of the CAS access authorization, the WTRU may obtain access after the end user log in (e.g., successfully) the application. As a part of CAS QoS and/or charging control (e.g., based on the WTRU's application subscription plan), the end user may obtain QoS over supported cellular networks, which may result in compensation to the access networks for this network usage.

As illustrated in FIG. 5, the WTRU may scan for networks. Each of the networks may advertise a network ID and/or other information that may be used for CAS discovery (e.g., CAS provider IDs). The WTRU may use a locally stored CAS policy to scan for networks. The locally stored CAS policy may include frequencies, supported CAS provider IDs, preferred lists of network or CAS provider IDs, and/or the like. CAS may include a form of discovery, where the WTRU may communicate with the access network (e.g., requesting discovery information for a specific CAS service). The CAS-enabled MCN block may include the access network. The CAS provider may be involved in a form of discovery. The CAS Function block, shown in FIG. 5, may include the CAS provider. CAS may include a CAS access process. The WTRU may communicate with the access network and this process may involve CAS provider and application provider (e.g., for authorization). The application server block, shown in FIG. 5, may include the application provider. Control for QoS and charging may be communicated between the application server and the access network (e.g., via the CAS provider). The Control QoS may be performed through direct online control. The Control QoS may be indirectly performed through policies. The dotted arrows may represent an online control path and/or an offline policies exchange. Application traffic may be communicated between the application server and/or other services enabled by the CAS application and the WTRU via the access network.

The CAS may be located in one or more network entities, resulting in the following architectural options. One or more architectures are described herein to describe the architecture models. The various architecture models described herein may apply to each of the architectures. One or more of the each of the access networks, application servers, or WTRUs may be enhanced to enable CAS.

Figure 6:
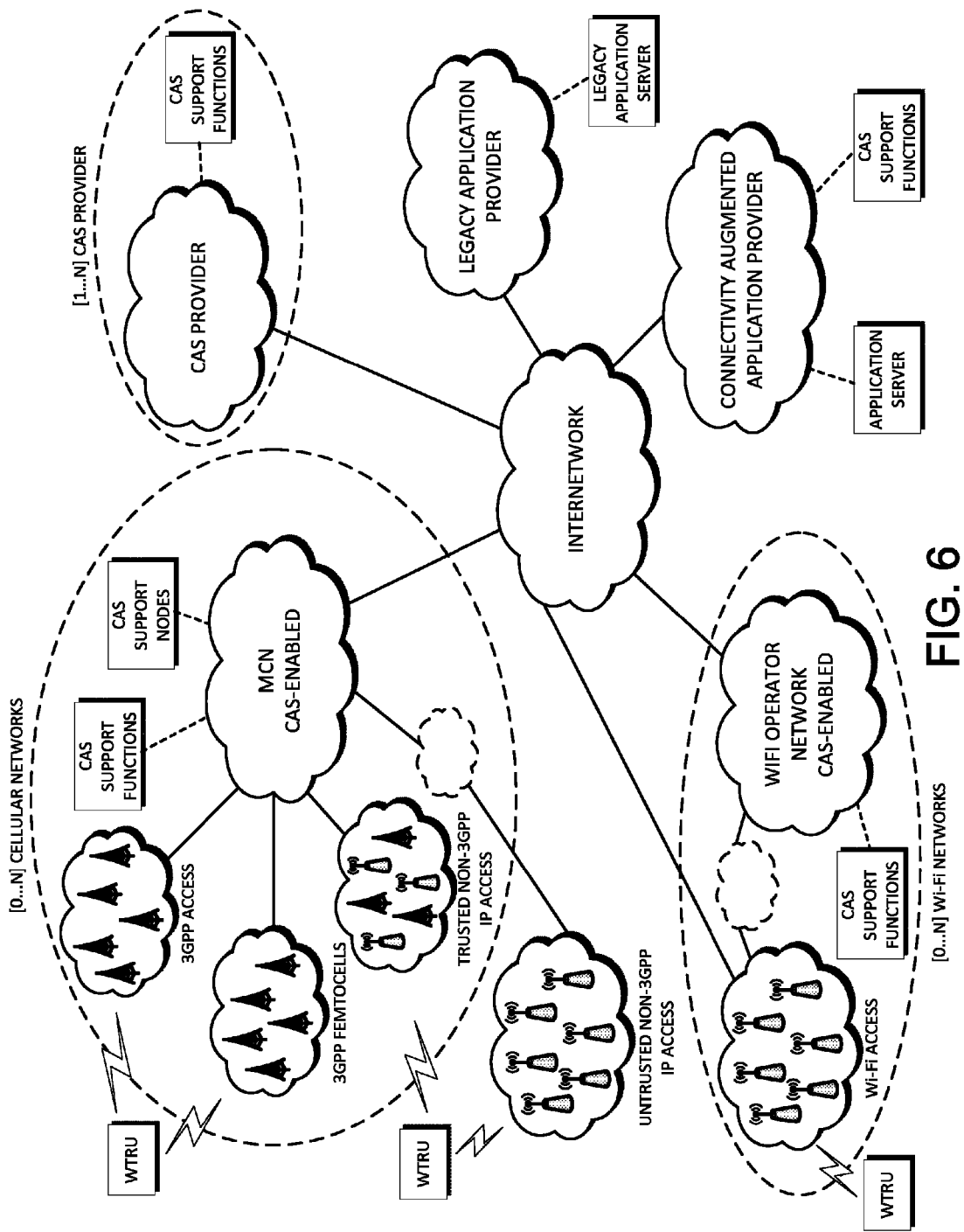
FIG. 6 illustrates an example of CAS entities, e.g., where a CAS provider may be a separate entity.

FIG. 6 illustrates an example of CAS entities where a CAS provider may be a separate entity. As illustrated in FIG. 6, a third party CAS provider may implement the CAS function. As described herein, an application connectivity coordinator may include the CAS provider. The CAS provider may be an intermediary between an access network and an application provider (e.g., enabling scaling up the number of supported applications). An access network provider may know one or more CAS providers. The access network provider may not know an application provider. For example, the application provider may be a game developer, the CAS SP may be Apple®, and the access network may be Verizon®.

Figure 7:
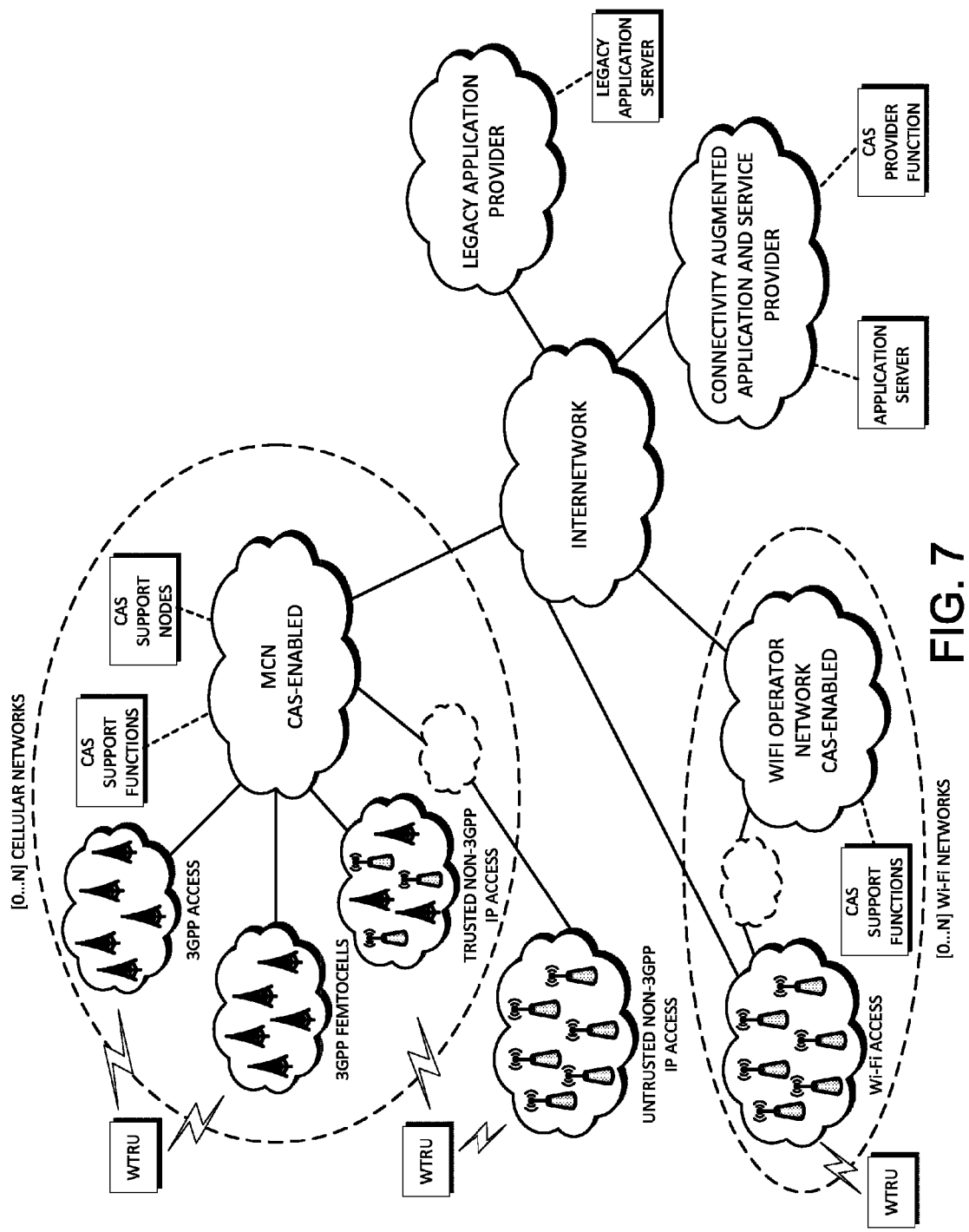
FIG. 7 illustrates an example of CAS entities, e.g., where the application provider may implement the CAS function.

FIG. 7 illustrates an example of CAS entities where an application provider may implement the CAS function. The application provider may be co-located with an application server. As illustrated in FIG. 7, the application provider may serve end users via one or more access networks. The application provider may be large enough to have cooperation agreements with a plurality of access networks. For example, Google may have its own CAS SP for services such as Google Docs.

Figure 8:
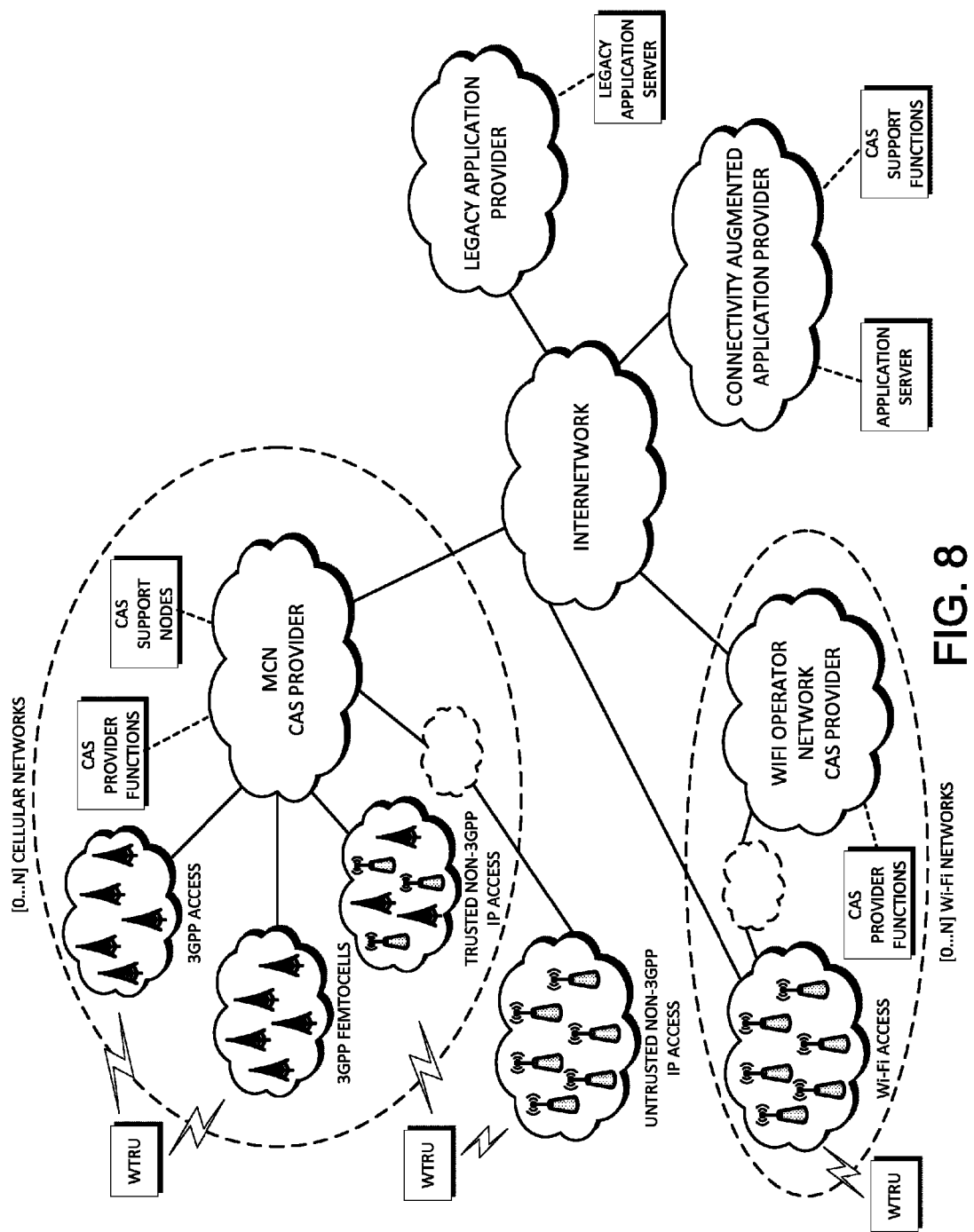
FIG. 8 illustrates an example of CAS entities, e.g., where the access network provider may implement the CAS function.

FIG. 8 illustrates an example of CAS entities where an access network provider may implement the CAS function. The exemplary architecture illustrated in FIG. 8 may enable network operators to develop a partnership with an application provider (e.g., by offering CAS as a value added feature). For example, Verizon® may support CAS applications limited to the Verizon® network.

As illustrated in FIG. 6, the CAS provider may be an access network broker. The CAS provider may enable connectivity through a range of access networks. The CAS provider may sell CAS service support to application providers, and provision WTRUs with an ID and a shared secret, enabling authentication (e.g., for a charge or at no cost). The CAS providers may sell network access plans to end users.

As illustrated in FIG. 7, the CAS provider may be the application provider. The application may include enabling internet access. The internet access application may include providing enhanced QoS (e.g., based on user policy). The CAS for internet access type of service may be used to decouple network access from internet access. Decoupling network access from internet access may enable virtual internet access providers that may not operate their own access network. The CAS for internet access type of service may perform bandwidth management operations such as bandwidth aggregation and/or flow mobility. Bandwidth management operations may require cooperation between access networks.

CAS architecture may be provided to enable CAS as described herein. The CAS architecture provided may be service-based. In a service-based CAS architecture, the CAS components (e.g., an application provider (AP), a CAS service provider (SP), an access network (AN), and/or a WTRU) may communicate with each other using a CAS API. The CAS API may be standalone (e.g., a CAS REST API). The CAS API may be partially or completely implemented as part of an interface (e.g., MOSAP between an SP and an AN, or an application level protocol between a WTRU and an AP). The service-based CAS architecture may be declined as described herein.

Figure 9:
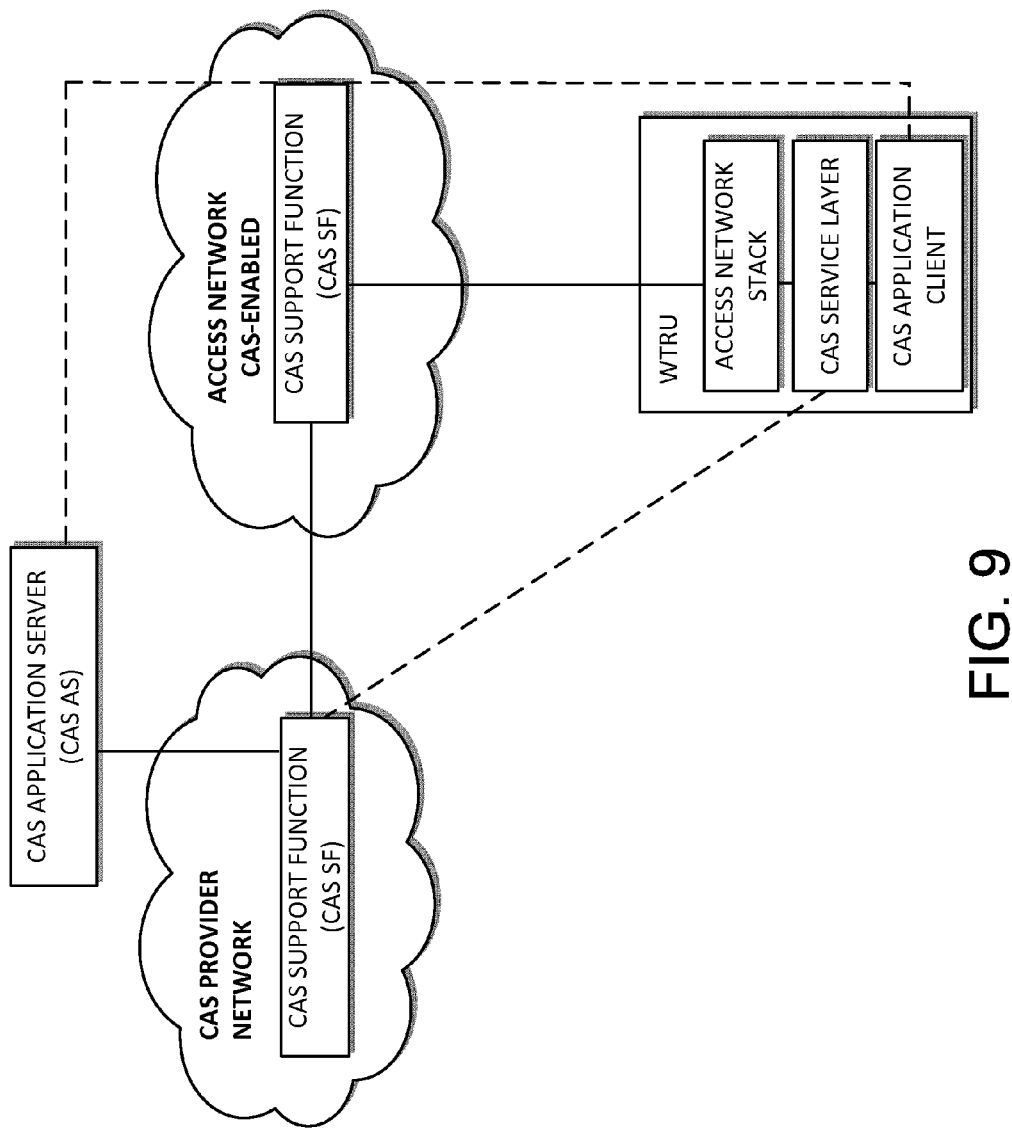
FIG. 9 illustrates an example of a service based architecture, e.g., with the service provider (SP) as third party.

FIG. 9 illustrates an example of a service based architecture with the SP as third party as described in FIG. 6. The CAS architecture illustrated in FIG. 9 may provide CAS service discovery and selection, service access and network resource usage control and reporting, as described herein.

Methods, systems and instrumentalities for Connectivity Augmented Service network function may be provided, where the application providers supply network access as part of an over-the-top service to a WTRU (e.g., through one of a plurality of access networks, without requiring the WTRU to be known a priori by the access networks).

Service based CAS architecture may be provided. A CAS provider may implement one or more APIs that may be used for communication with a CAS support Function in an AN, CAS-enabled application server (AS) in an application provider (AP) network, and/or an CAS service Function in the WTRU. As described herein, one more of these API may be private within an AN and/or an AS. The private APIs may be optimized (e.g., the CAS function may be more tightly coupled within AN or AP's networks. The private API optimization may not change the overall distribution of functions in a network. The CAS provider may provision and/or pre-provision a shared secret within the WTRU, such that the CAS provider may act as an identity provider for the device. The application provider may authenticate the end user. The access networks may advertise the identity of the CAS provider. The WTRU may initiate access to an access network, authenticating with the CAS provider, and/or CAS application provider. The CAS application support may be provided as illustrated in FIG. 9. The CAS application may be referred to as connectivity-sponsored application. The CAS application provider may be referred to as connectivity-sponsored application provider.

As illustrated in FIG. 9, a third party CAS provider may develop a service cooperation agreement with one or more access networks. The CAS provider may offer CAS service support to its customers (e.g., the application providers).

Figure 10:
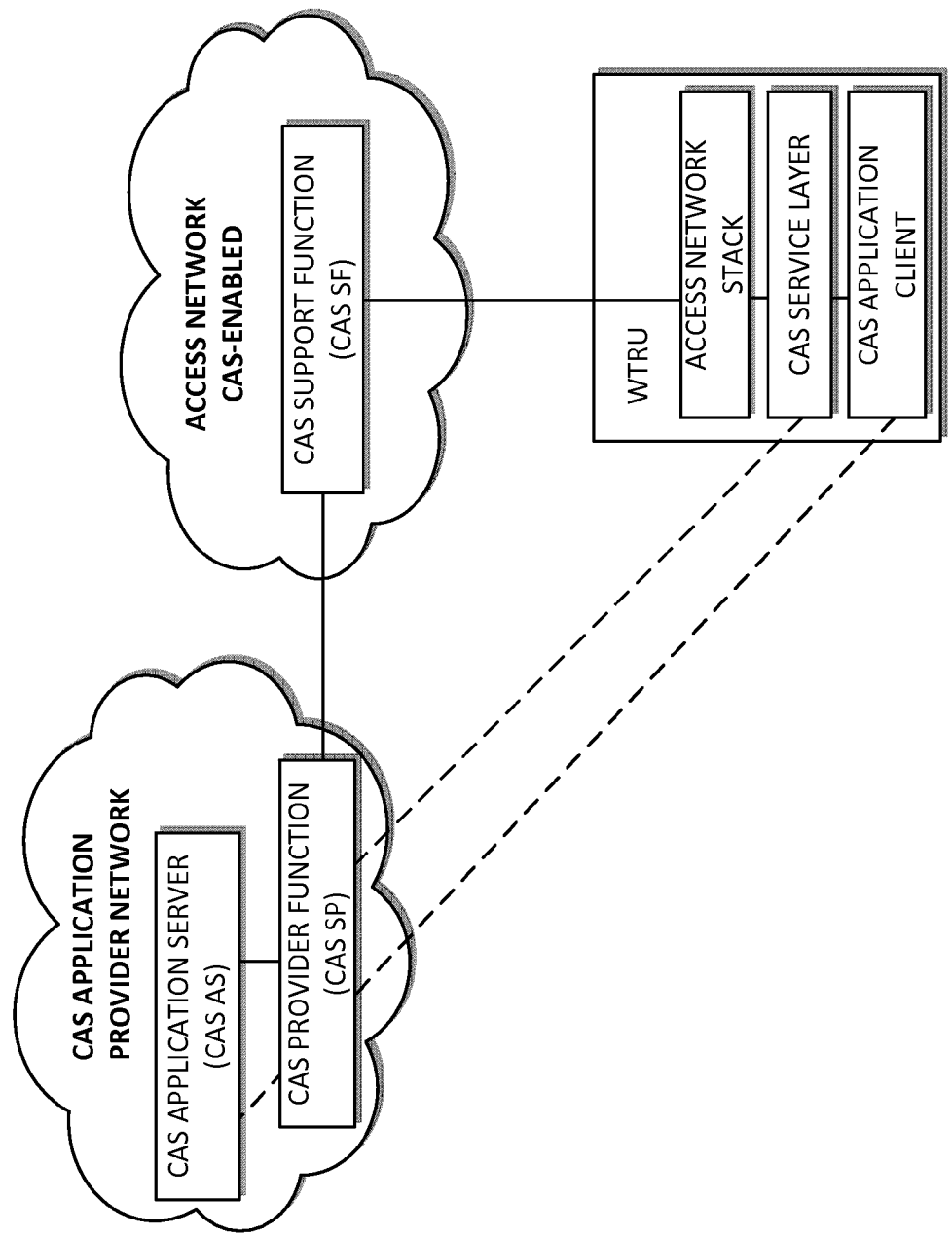
FIG. 10 illustrates an example of a CAS application support with a cellular access network.
Figure 11:
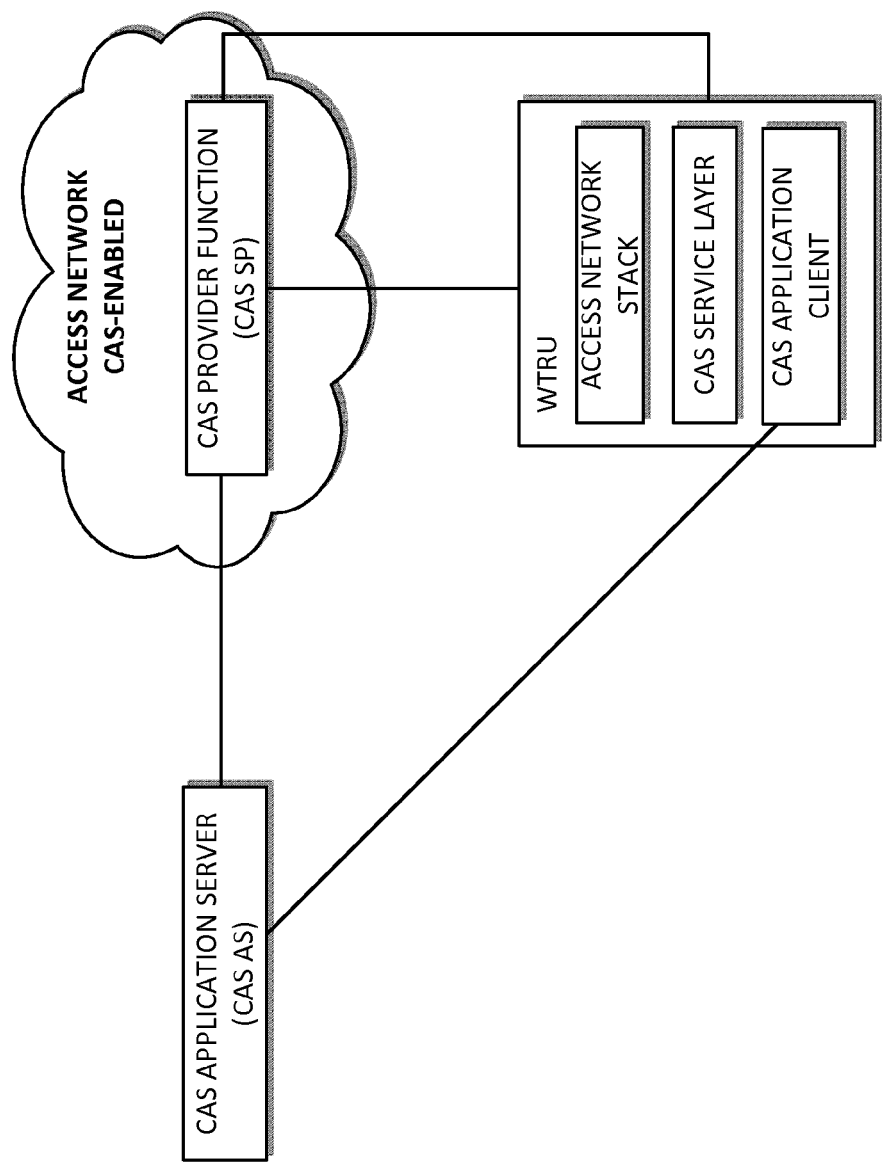
FIG. 11 illustrates an example of CAS application support with a cellular access network.

FIG. 10 illustrates an example of a CAS application support within a cellular access network. As illustrated in FIG. 10, an application provider may serve one or more end users over a single or a small number of access networks. An application provider (e.g., a large application provider) may have a service cooperation agreement with one or more access networks. FIG. 11 illustrates an example of a CAS application support within a cellular access network. As illustrated in FIG. 11, a network provider (e.g., an ISP or an MNO) may enable one or more application providers (e.g., the network provider's customers) to provide CAS services over their network. The network provider may be a large access network provider.

Figure 12:
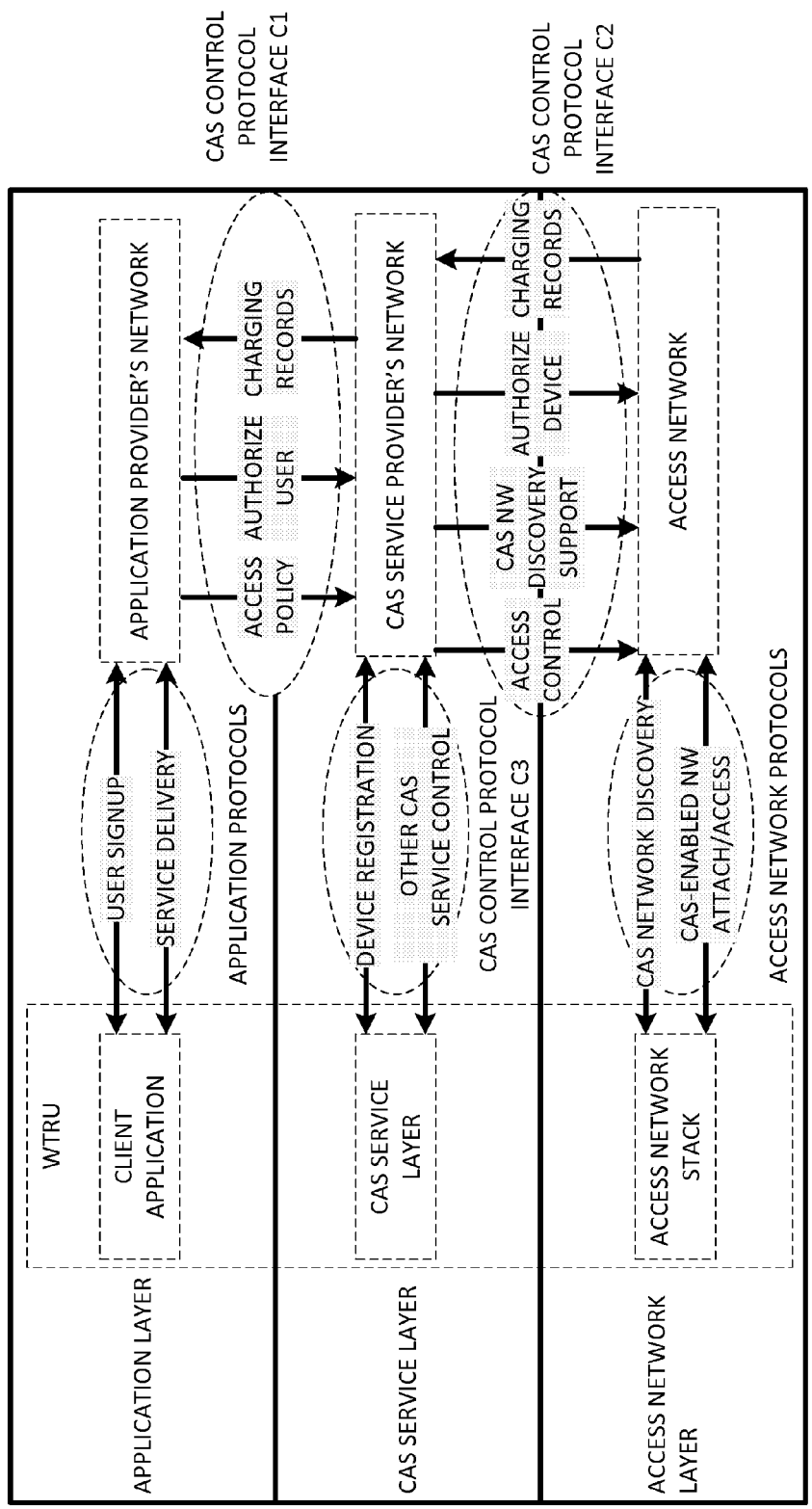
FIG. 12 illustrates an example of one or more layers of the CAS stack, and related interfaces.

FIG. 12 illustrates an example of one or more layers of a CAS stack and associated interfaces. As illustrated in FIG. 12, the CAS stack may include one or more of an access network layer, a CAS service layer, or an application layer.

An application provider's network CAS functions may include one or more of registering users, delivering service, charging users for service, access based on charging information received from CAS providers, define policies (e.g., for access selection, QoS, etc.), or authorizing user access. Exemplary data in application provider's Network may include one or more of the following: application information, application subscriber information, charging system information, or CAS service provider information. The application information may include an application ID, one or more policy rules for QoS, charging, access network selection, and/or etc. The application subscriber Information may include one or more Username(s) (e.g., with credentials), an account information, a session information (e.g., if currently using the service), and/or security information to enable confidentiality of user identity. The charging system information may include charging records associated with the username, a session ID, a CAS service provider ID, and/or etc. The CAS service provider information may include a CAS service provider ID, an AP-SP connectivity establishment information, and/or etc.

A CAS service provider's Network functions may include one or more of the following. New devices may be registered and/or may be configured with proper connectivity parameters (e.g., ciphering keys, X.509 certificate. SSID/password, etc.). The CAS service provider's Network functions may support or may participate (e.g., directly participate) in device authentication to obtain access. Defining policies (e.g., for access selection, QoS, etc.) may be based on and/or may be in addition to policies defined by an AP. The CAS service provider's Network functions may support or may participate (e.g., directly participate) in controlling QoS and charging of devices. Charging the application provider for a CAS service may be based on charging by access networks. The CAS service provider may cooperate with one or more access networks (e.g., to enable CAS network discovery). Exemplary data in the CAS service provider's Network may include one or more of a CAS service provider ID, a Device information, an In charging system, and/or an application provider information.

The CAS service provider ID may include an access network Information (e.g., for each AN with an agreement), an access network ID, and/or a SP-AN connectivity establishment information. The Device information may include each of the devices registered. The Device information may include a Device ID, session information (e.g., if currently using the service), SP-WTRU connectivity establishment information (e.g., credentials), WTRU-AN connectivity establishment information (e.g., ciphering keys), and/or security information to enable confidentiality of device identity. The charging system information may include charging records associated with a device ID, a session ID, an application ID, and/or an access network ID. The application provider information (e.g., for each application provider) may include account information, AP-SP connectivity establishment information, an application ID for each application, and/or policy information for each application for QoS, charging, access network selection, etc.

access network CAS functions may include enabling network access and usage based on a CAS service provider's policy (e.g., authorization. QoS policy). access network CAS functions may include enabling CAS network discovery. access network CAS functions may include charging the CAS service provider for network usage. Exemplary data in an access network may include CAS service provider information (e.g., for each of the providers), device information (e.g., for each device currently or recently connected), and/or charging system information.

The CAS service provider information may include a CAS service provider ID, account information, and/or AP-SP connectivity establishment information. The device information may include one or more internal identifiers (e.g., CAS IMSI, T-IMSI, etc.), a CAS service provider ID, one or more policy rules for QoS, charging, and/or session information. The charging system information may include charging records associated with session IDs (e.g., device IDs) and/or a CAS service provider ID.

WTRU CAS specific functions may include one or more of accessing networks on behalf of applications, discovering and selecting access network, or enabling installing CAS application and registering with CAS providers. Exemplary data in a WTRU may include one or more of CAS service provider information (e.g., for each registered provider), application information (e.g., for each installed CAS application), or policy information configured on the WTRU (e.g., by a user or an OS). The CAS service provider information may include a CAS service provider ID, my device ID with the SP, policy information (e.g., for QoS, access Network selection, etc.), security information to enable confidentiality of device identity, WTRU-SP connectivity establishment information, WTRU-AN connectivity establishment information when using the SP. The application information may include an application ID, one or more username(s), policy information (e.g., for QoS, access network selection, etc.), and/or one or more application specific configurations.

A WTRU-application interface may be provided. The WTRU-application interface may not be CAS specific. The WTRU-application Interface may include one or more of a user signup (e.g., through a process that may involve filling a form and/or performing an email validation), or a service delivery (e.g., through a streaming protocol).

One or more interfaces may be introduced and/or implemented (e.g., using a CAS Control Protocol). The CAS Control Protocol may be a common protocol and/or a suite of different specialized protocols.

A C1 Interface (e.g., a SP-AP) may be provided. The C1 Interface may enable an application provider to authorize a user. The C1 Interface may enable an application provider to control access policy (e.g., QoS policy, preferred RAT). The CAS service provider may send charging records over the C1 Interface. The charging records may be sent offline. The C1 Interface may be replaced by an internal interface having an architecture similar to that illustrated in FIG. 10.

A C2 Interface (e.g., AN-SP) may be provided. The C2 Interface may control access such as downloading to an AN flow definition associated with one or more charging codes and/or one or more QoS policies. The C2 Interface may control access such as control signaling for moving flows between access networks or for aggregating flows. The C2 Interface may include support for CAS network discovery. The C2 Interface may include authorization of a device attachment. The access network may send charging records over the C2 Interface. The charging records may be sent offline. The C2 Interface may be replaced by an internal interface having an architecture similar to that illustrated in FIG. 11. The CAS provider may be co-located with a node (e.g., PGW or SGW)

A C3 Interface (e.g., WTRU-SP) may be provided. The C3 Interface may be used to register a device. The C3 Interface may include support to configure an application specific policy (e.g., preferred RAT, etc.), and/or configure access parameters (e.g., update ciphering keys, update device id alias, etc.).

A C4 Interface (e.g., SP-SP) may be provided. The C4 Interface may be an interface for advanced use cases. The C4 Interface may be used as illustrated in architectures in FIGS. 10 and/or 12. One or more CAS SPs may be involved. For example, a CAS application started on a WTRU may be used over one or more interfaces simultaneously (e.g., a BWM feature). The one or more interfaces may be connected to one or more different CAS SPs. The CAS SP may communicate to authenticate the user and/or validate the identity of the WTRU (e.g., to support BWM features). The C4 Interface may be used for collaboration between CAS providers dealing with the same WTRU for a single application (e.g., coordinate for a BWM feature) or different applications (e.g., sharing a single WTRU-SP connection).

access network layer interfaces and/or protocols may be reused and/or modified to enable CAS. The CAS specific features at the access network layer may include one or more of CAS network discovery, CAS enabled network attach (i.e., initial attach) and access (e.g., actual usage of resource), certain CAS Control Protocol features (e.g., trigger a device registration) may be enabled.

Figure 13:
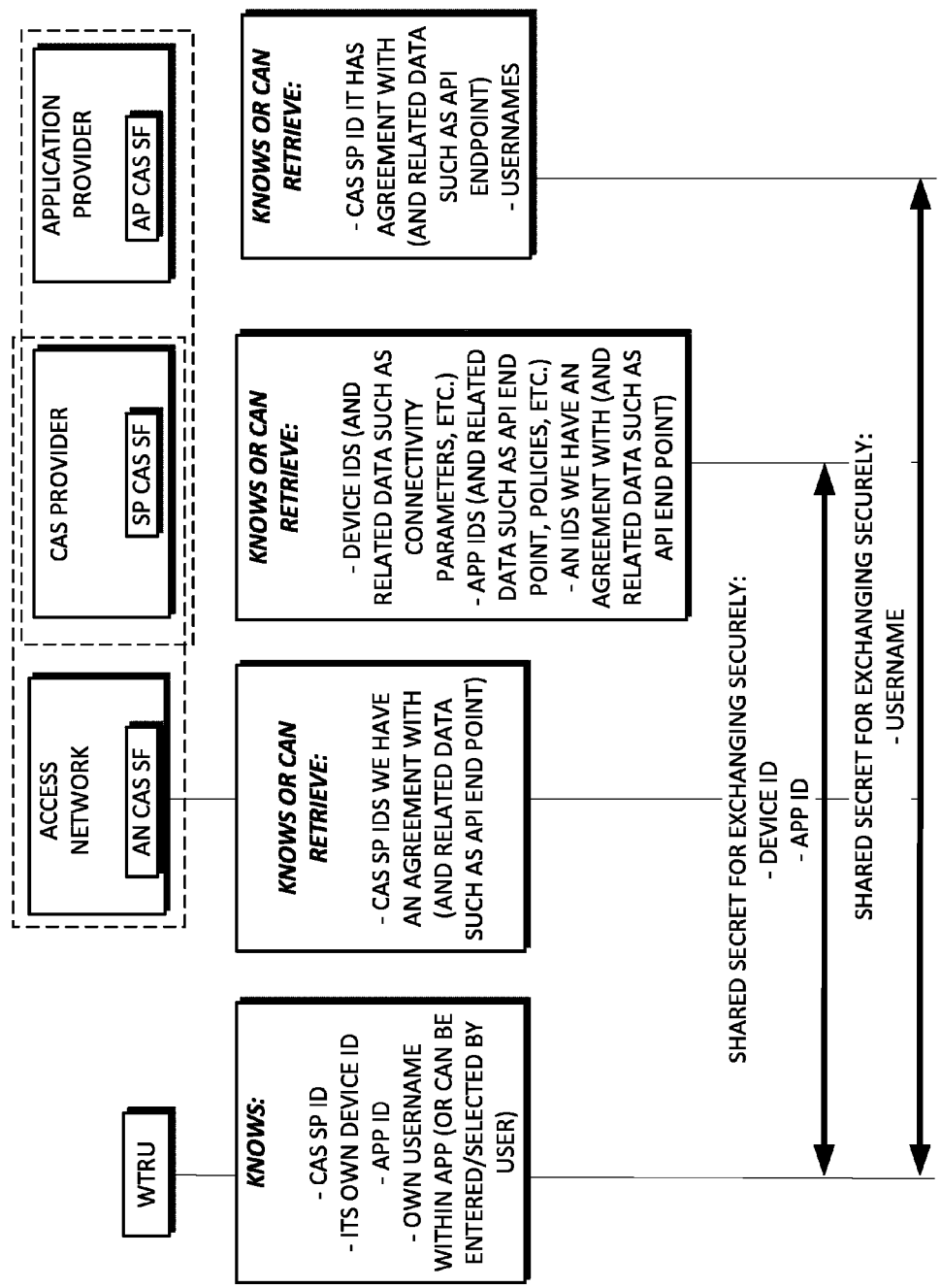
FIG. 13 illustrates an example of CAS related IDs that may be known by one or more entities.

One or more CAS Identities (IDs) may be provided. FIG. 13 illustrates an example of CAS related IDs that may be known by one or more entities. The dotted lines around the Access network, CAS provider and application provider illustrate that the CAS provider may be within the access network, within the application provider network, and/or standalone entity.

Figure 14:
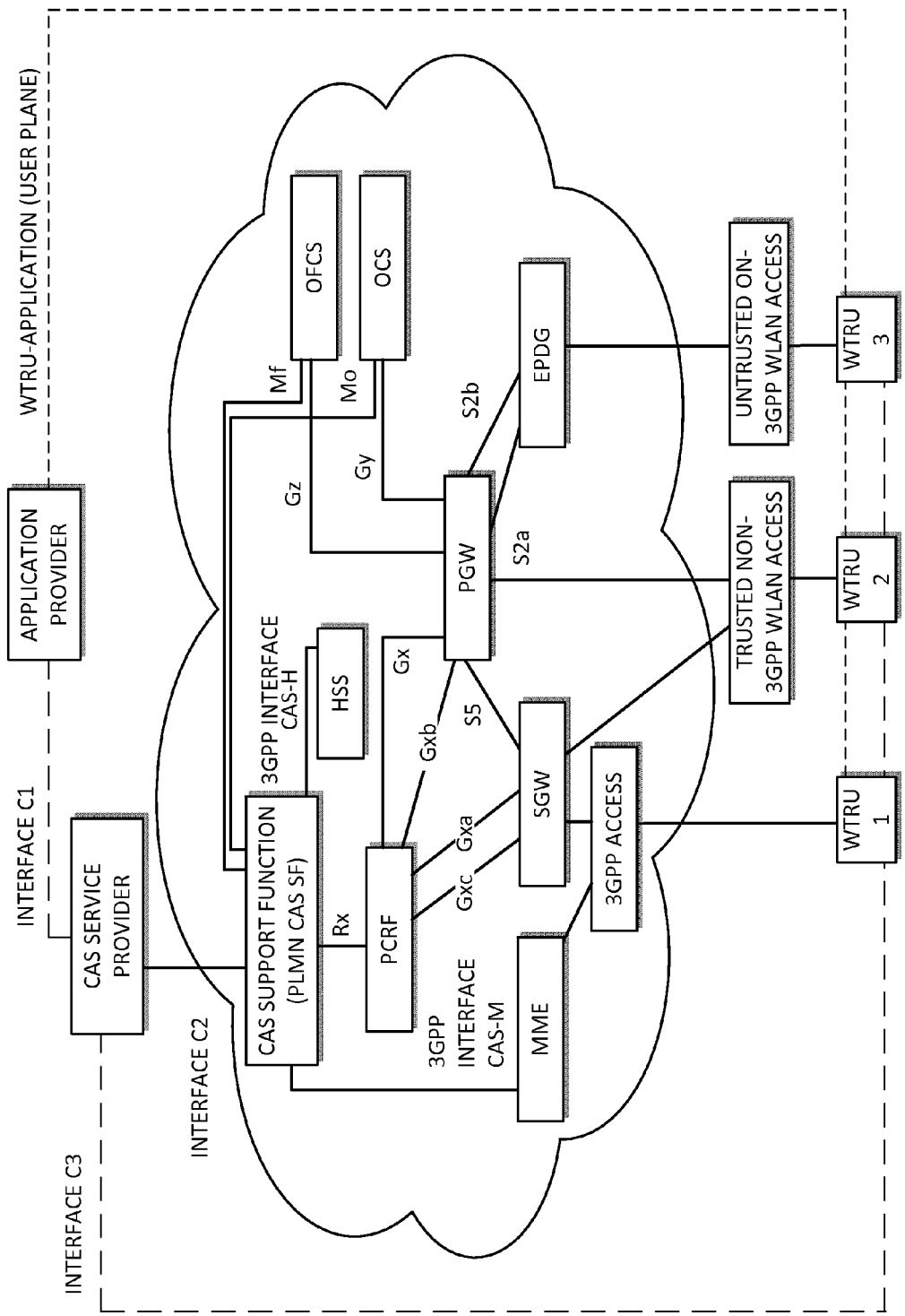
FIG. 14 illustrates example architecture for implementing CAS support within a cellular network.

FIG. 14 illustrates an example architecture for implementing CAS support within a cellular network. As illustrated in FIG. 14, the CAS support architecture building blocks may include blocks based on MOSAP (e.g., how a non-IMS AS may interact with PCRF. HSS and/or charging subsystems) and/or sponsored connectivity (e.g., a sponsor entity may be charged for resource usage).

Interfaces C2 and Interface C3 may be provided as described herein. The following elements may be provided to support CAS in a cellular network. The PLMN CAS support Function may be implemented as a non IMS AS (e.g., using Rx, Mo, and/or Mf interfaces). The Rx interface may be used by PLMN CAS SF (e.g., to control connectivity policy). The Mo and/or Mf interfaces may be used by PLMN CAS SF for direct charging (e.g., to implement per connection charges instead of or in addition to a charge for resource usage). One or more charging related signaling and/or records (e.g., the Mo, Mf, Gz, and/or Gy interfaces) may include sponsoring information (e.g., a CAS service provider identity as the sponsor). The one or more charging related signaling and/or records may include other information or specific charging codes carrying information on devices and users (e.g., in order to enable proper itemization of charging at different levels). For example, a MNO may charge a CAS service provider at a first level and the CAS service provider may charge an application provider at a second level. The PLMN CAS support Function may implement the C2 interface with the CAS service provider. The PLMN CAS support Function may be an intermediary for the C3 interface between a WTRU and the CAS service provider. MOSAP may provide a Mh interface between the non-IMS AS and a HSS. A CAS-h interface may be provided. The CAS-h interface may be provided between the PLMN CAS SF and an HSS. Additional functions may be provided over the CAS-h interface. For example, CAS-h may be used to trigger an assignment of a temporary IMSI to the WTRU. A CAS-m interface may be provided between an MME and a PLMN CAS SF. The CAS-m interface may be used as part of the CAS network attachment. The C2 and/or the C3 interfaces may be implemented over the 3GPP user plane. The C2 interface may pass through a border gateway (e.g., a PGW). The C3 interface may pass through the PLMN CAS SF. When a cellular access network is used a cellular network CAS SF may be implemented as an IMS AS. When a cellular access network is used, the cellular network CAS SF may be co-located in a node (e.g., the PCRF, the PGW, and/or a border gateway).

Figure 15:
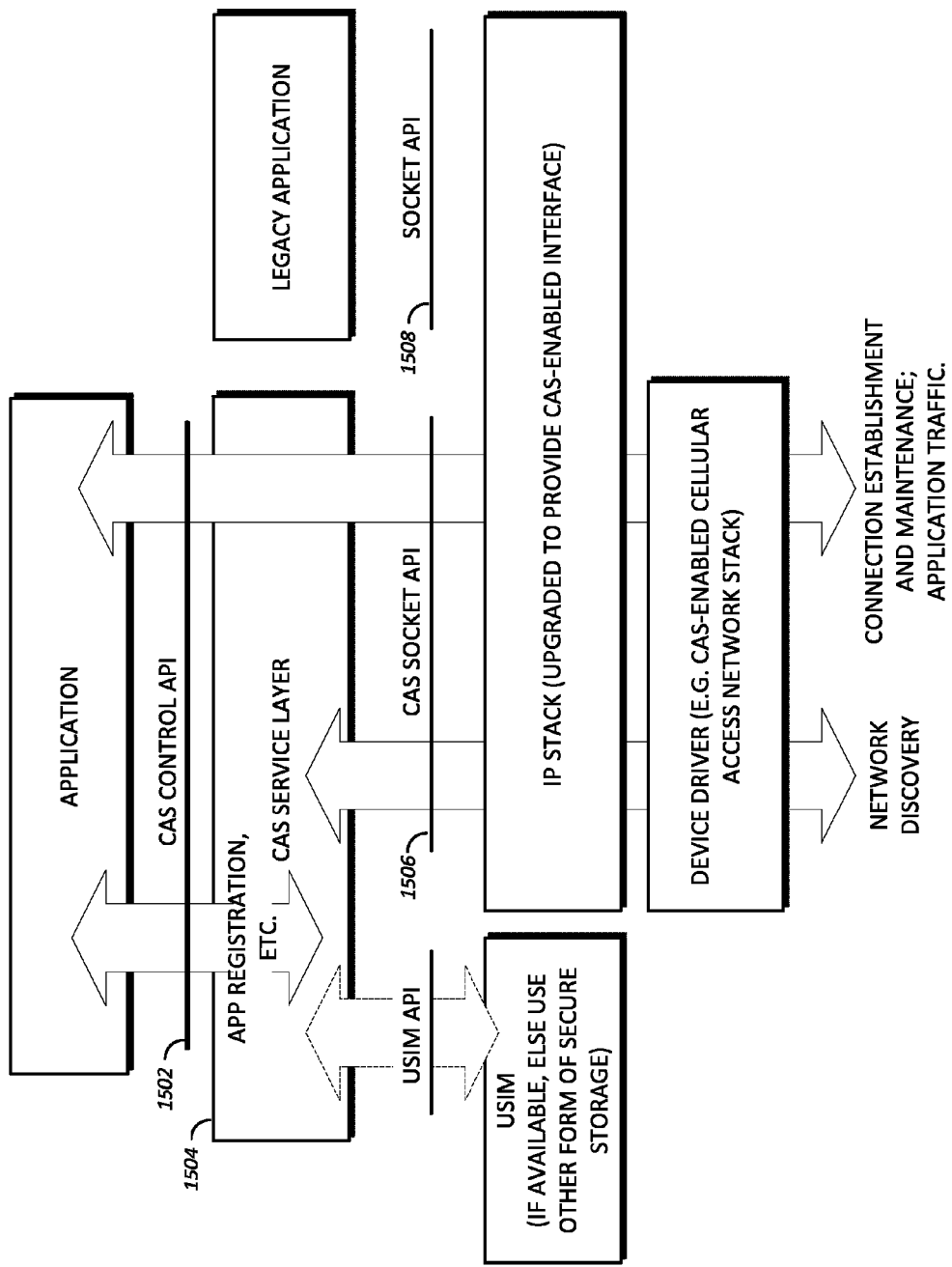
FIG. 15 illustrates an example of a CAS stack in a WTRU of a cellular network.

FIG. 15 illustrates an example CAS stack in a WTRU. The example CAS stack may include a CAS Control API interface 1502 between an application layer and a CAS service layer. The CAS Control API interface 1502 may include one or more of registration, configuration update, and/or un-registration of a CAS application. The CAS Control API interface 1502 may include one or more of registration, configuration update, and/or un-registration of a CAS service provider. The CAS stack in the WTRU may include a CAS service Layer 1504. The CAS service layer 1504 may provide a dynamic library offering a CAS-enabled replacement for a socket interface. A CAS application (e.g., each of the CAS applications) running on the CAS stack in the WTRU may link to a library (e.g., instead of using the socket library provided by the OS). The library may implement a CAS socket API 1506. The library may implement a CAS Control API 1508.

With one or more instances of AN, SP, or AP, one or more use cases may be provided. A single WTRU may be considered in one or more of combinations. The one or more combinations may include single AN, single SP, multiple APs; single AN, multiple SPs, single AP; multiple ANs, single SP, single AP; single AN, multiple SPs, multiple APs; multiple ANs, single SP, multiple APs; multiple ANs, multiple SPs, single AP; or multiple ANs, multiple SPs, multiple APs. In the case of single AN, single SP, multiple APs, one or more APs may have an agreement with a SP. A user may use one or more applications over a single AN.

In the case of single AN, multiple SPs, single AP; an AP may have an agreement with multiple SPs. The multiple SPs may have an agreement with the same AN. A single SP may be selected to access the service. The single AP may be selected based on the application (e.g., through a policy on the WTRU). For example, the multiple SPs may have different coverage, but the different coverages may include some overlap.

In the case of multiple ANs, single SP, single AP; an AP may have an agreement with a SP. The SP may have an agreement with multiple ANs. A WTRU may access the service through an AN. The WTRU may handover to another AN. The WTRU may access the service through multiple ANs (e.g., some flows may pass through one AN and some flows may pass through other ANs). Some form of aggregation may be used (e.g., so a single logical flow may pass through multiple ANs).

In the case of single AN, multiple SPs, multiple APs; multiple APs may be in relation with different SPs. The different SPs may have an agreement with the same AN. For example, the user may be able to access multiple services concurrently over a single AN.

In the case of multiple ANs, single SP, multiple APs; the WTRU may access multiple applications through different ANs. The multiple applications may use the same SP. A single WTRU-SP interconnection may be shared for signaling related to multiple APs. One or multiple applications may use multiple ANs concurrently (e.g., for different flows or using flow aggregation).

In the case of multiple ANs, multiple SPs, single AP; an AP may have an agreement with multiple SPs. The multiple SPs may have an agreement with distinct ANs (e.g., Rogers, Boingo®, etc.). In the case of multiple ANs, multiple SPs, multiple APs; the user may access multiple applications through multiple ANs. The AN/SP/AP chains may be completely distinct. Interaction between the AN/SP/AP chains may not be required (e.g., except that the client applications are competing for resources on the WTRU). One or more applications may use one or more ANs concurrently (e.g., for different flows or using flow aggregation).

One or more cases with multiple WTRUs may be provided. In the case of multiple WTRUs, single-multiple ANs, single-multiple SPs, single AP; a user may access the same service (e.g., using the same username) using multiple devices. For example, a user may have started an application on a device and may start the application on another device which may become available. In another example, a user may have started an application on a device and may want to show and/or share the application with a friend on the friend's device.

One or more other cases with multiple WTRUs may not require special attention. The cases with multiple WTRUs may include cases involving a single WTRU running one or more procedures in parallel. Inter-WTRU session transfer may be provided.

Variations of the one or more use cases described herein may be derived based on one or more variability factors. The one or more variability factors may include an evolution of a first application usage over time. When a user starts a second application, the second application start may not affect the first application. When a user starts a second application, the first application may be migrated to another AN and/or SP. When a user starts a second application, the WTRU and/or user may decide not to start the second application. When a user starts a second application, the WTRU and/or user may decide to stop the first application.

The one or more variability factors may include an evolution of connectivity over time. Changes of connectivity may include losing connectivity. Losing connectivity may lead to moving an application to another AN. A SP may remain the same when the application is moved to another AN. Changes of connectivity may include Idem (e.g., changing to another SP). Connectivity (e.g., new connectivity) may be detected, which may lead to moving the application to another AN (e.g., keeping same SP). Connectivity (e.g., new connectivity) may be detected, which may lead to a connection and a repartition of application traffic over one or more ANs.

Changes of connectivity with multiple applications may be provided. Changes of connectivity (e.g., as described herein) may occur when multiple applications may be in use (e.g., 'multiple APs' cases described herein). Multiple application in use may lead to a decision by the WTRU (e.g., based on application policies). The WTRU may decide to migrate flows, change SPs, stop one or multiple applications, and/or the like.

Figure 16:
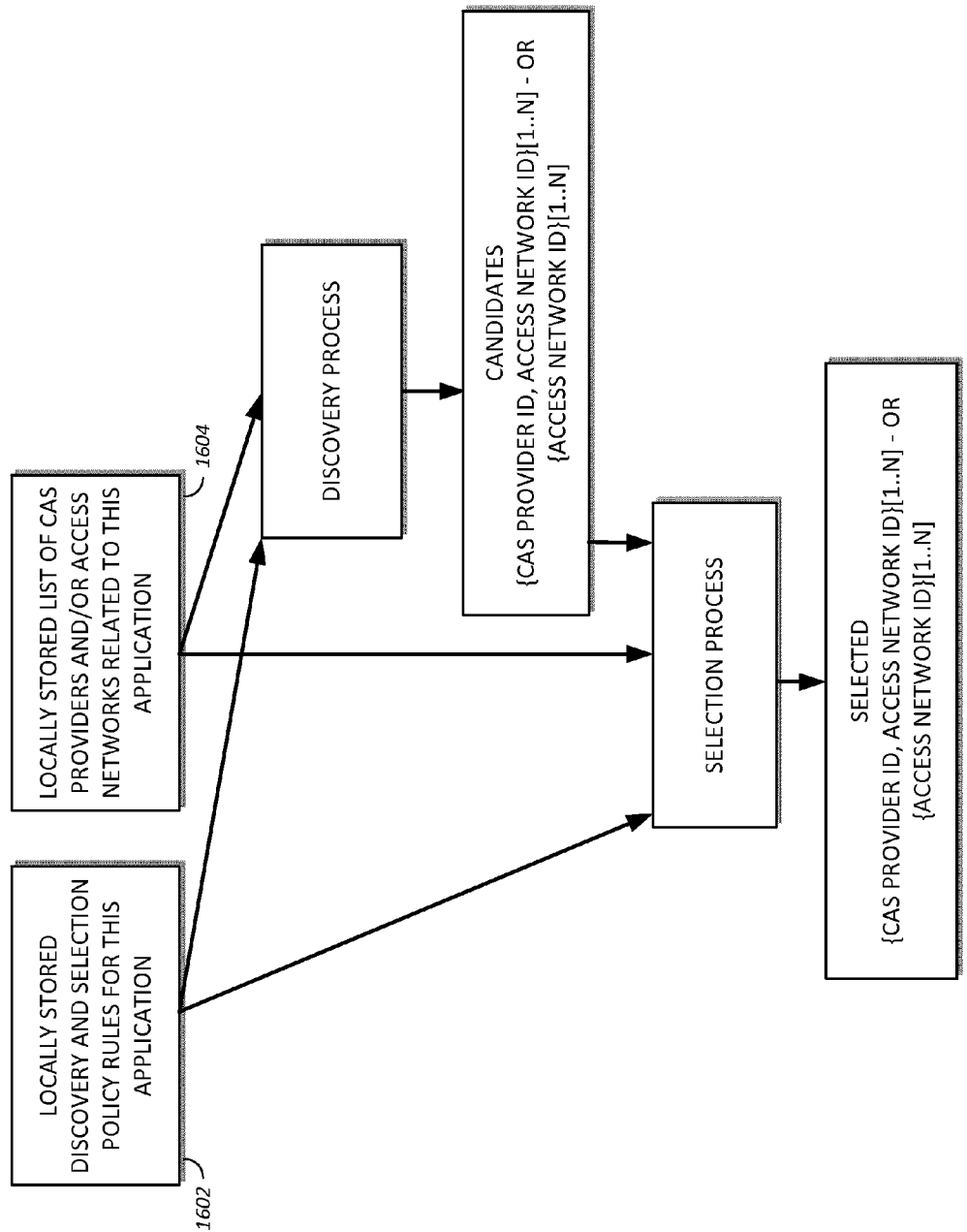
FIG. 16 illustrates an example of how discovery and/or selection may be related to policy information, e.g., locally stored in the WTRU.

Service Discovery and/or selection may be provided. Service discovery may include collecting information from the network (e.g., using access network and CAS providers). The collected information may be used as part of a selection of a CAS provider(s) and an access network(s) suitable for a new application session. FIG. 16 illustrates an example of how discovery and/or selection may be related to policy information. Policy information 1602 may be locally stored in the WTRU. The policy information 1602 may be related to an application. The policy information 1602 may be received from one or more APs, one or more SPs, a WTRU, and/or a user. A list of CAS providers and/or ANs 1604 may be locally stored in the WTRU. The CAS providers and/or ANs on the list 1604 may be related to the application.

Figure 17:
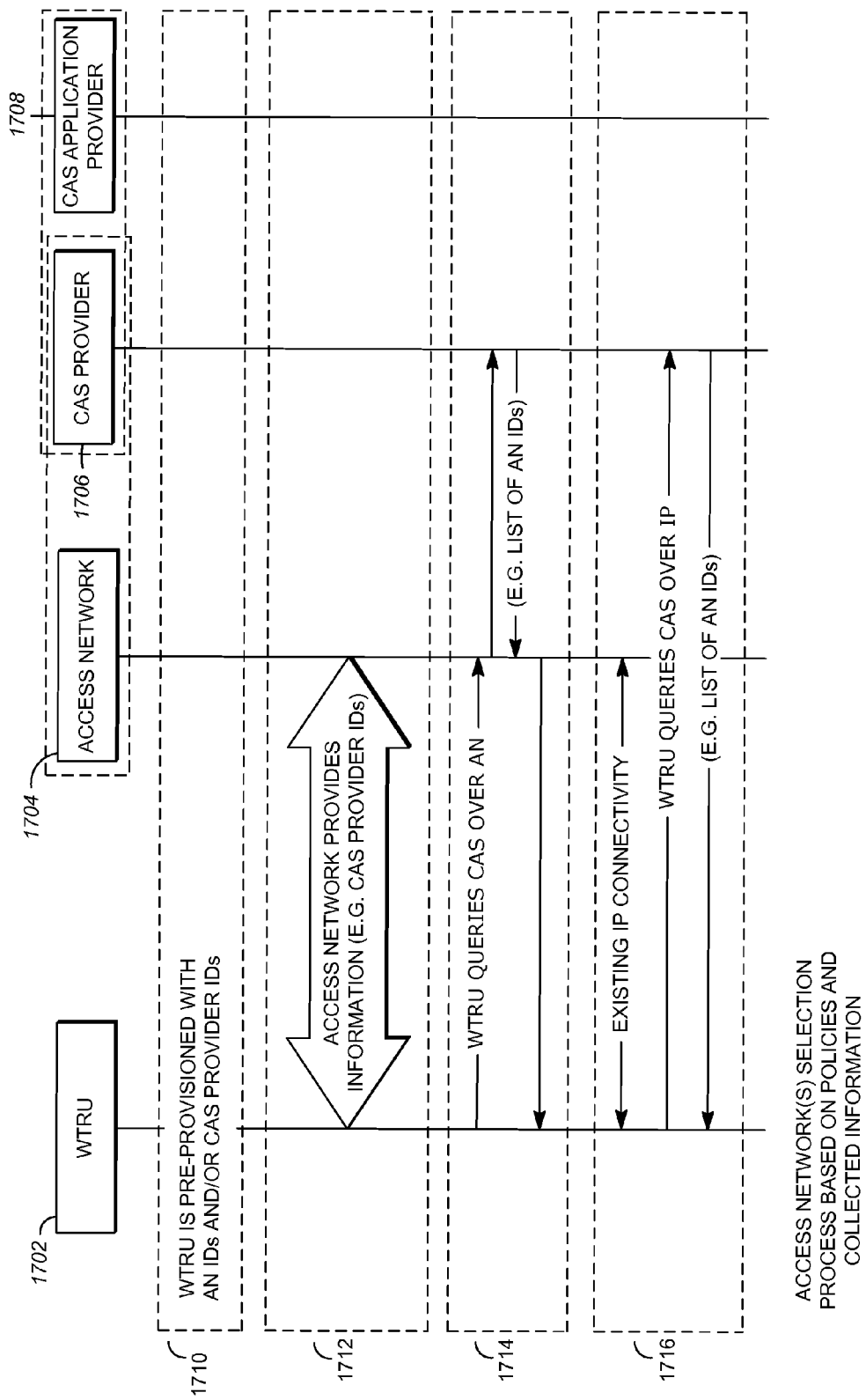
FIG. 17 illustrates an example of one or more Discovery Options.

FIG. 17 illustrates an example discovery options process. The following one or more discovery options may be available for enabling the discovery process. The discover process may include a WTRU 1702, an AN 1704, a CAS provider 1706, and/or a CAS application provider 1708. The discovery process may include one or more of a pre-provisioning 1710, an AN 1704 providing information 1712, a CAS providing information 1714, or a CAS providing information over IP 1716. In pre-provisioning 1710, a list of access networks 1712 which may be used for access to a CAS application may be pre-provisioned on the WTRU 1702. For example, a default application configuration may include one or more CAS provider IDs and a CAS layer on the WTRU 1702 may maintain a list of AN IDs for each CAS provider 1714. The list of AN IDs and/or CAS provider IDs may be refreshed transparently during normal application usage and/or through periodic update connections.

The AN 1704 may provide information 1712 indicating the services it may support. The information may be broadcast or may be queried. The WTRU 1702 may contact each AN 1704 independently. Information provided by the AN 1704 may include CAS capabilities, supported CAS provider IDs or application IDs, a digest of these IDs, and/or the like.

CAS may provide Information 1714, where the application (e.g., the WTRU 1702) may obtain access to remote discovery services maintained by the CAS provider 1706. The access may occur during pre-association. Information obtained from the CAS provider 1706 may include one or more preferred access network(s) and/or one or more preferred CAS service provider IDs. The remote discovery service may be managed by one or more of a CAS provider 1706, a CAS application provider 1708, a third party, or be distributed (e.g., DNS-like).

CAS may provide Information over IP 1716. The WTRU 1702 may obtain IP connectivity and may collect information from a CAS discovery service. CAS provided information 1714 may be used to pre-provision discovery information. IP connectivity may be non-CAS (e.g., a home network or an open network) or CAS. The CAS IP connectivity may include a pre-provisioned bootstrap CAS application (e.g., when an ordinary CAS application is already in use). The AN 1704 may provide IP connectivity (e.g., for the sole purpose of enabling discovery).

For service discovery, pre-provisioning of supporting network IDs in a WTRU and/or one or more advertisements of service IDs by networks may be used. Pre-provisioning may be used when networks do not support advertising of service IDs. An AN may be aware of one or more CAS providers supported (e.g., in case of service advertisement). The one or more CAS providers may be available to the WTRU (e.g., through passive advertisements and/or active communication between the WTRU and the AN). The one or more CAS providers may be involved more directly in the process. Other methods may be available when the WTRU includes an IP connectivity (e.g., for another CAS application).

Cellular access networks SIBs may be upgraded. An upgraded cellular access network SIB may include information such as a service NAI and/or an authentication method (e.g., adapted from 802.11u ANQP IE). Cellular access networks may implement an ANQP or a part of an ANQP (e.g., as the number of support NAIs may be longer). A WTRU may use a NAS message to request detailed service support from the network (e.g., for a service NAI). The network may include (e.g., temporarily include) the service in the SIB (e.g., in response to the request from the WTRU). Cellular access networks may store one or more CAS policies within an ANDSF function. The one or more CAS policies may be grouped per CAS provider. The WTRUs connected through the access network may download and/or update their policies.

A Wi-Fi network (e.g., supporting 802.11u ANQP) may include a CAS provider NAI and/or authentication methods in a list of NAI advertised through ANQP. The Wi-Fi network may include a CAS application provider NAI and/or authentication methods in the list of NAI advertised through ANQP.

Pre-provisioned discovery and/or selection may be enabled (e.g., by leveraging a policy distribution such as the ANDSF). The ANDSF may provide information (e.g., Managed Objects, MOs, or the like) that may be provisioned and/or updated on a WTRU. The WTRU may use such information to choose an access network (e.g., a Wi-Fi based network vs. a 4G based network). ANDSF may be used to retain CAS related information.

Figure 18:
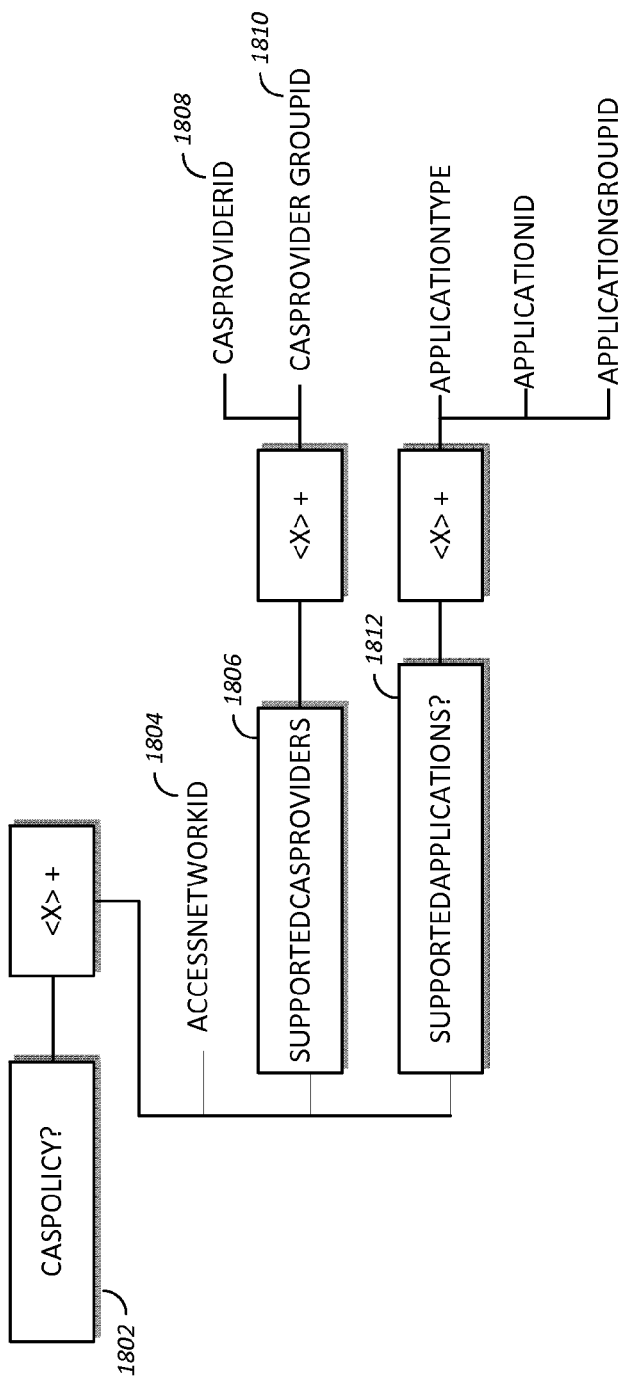
FIG. 18 illustrates an example of a Managed Objects that may be used to provision the WTRU with CAS Discovery information.

FIG. 18 illustrates an example of a Managed Objects that may be used to provision a WTRU with CAS Discovery information. As illustrated in FIG. 18, a CASPolicy 1802 may appear under a root ANDSF Managed Object. CASPolicy 1802 may be indicated as 0 or 1 occurrence (e.g., like policy, discovery information, etc.). CASPolicy 1802 may be present in a CAS-aware system. The CASPolicy 1802 may be included in a CAS-aware network supporting ANDSF-based CAS Discovery. As illustrated in FIG. 18. AccessNetworkID 1804 may include an identifier of an access network. SupportedCASProviders 1806 may contain one or more information elements. SupportedCASProviders 1806 may include one or more nodes. Each of the one or more nodes may represent a CAS provider or a group of CAS providers. CASProviderID 1808 may include the ID of a CAS provider that may have an agreement with the access network. CASProviderGroupID 1810 may provide support for a plurality of CAS providers. One or more of the CAS providers may be grouped together. The mapping between the grouped CAS providers and the CASProviderGroupID 1810 may be known and/or defined in a separate ANDSF Managed Object. CASPolicy 1802 may be specialized for an application type, a specific application, or a group of applications. The SupportedApplications container node 1812 may be used to indicate supported application information.

Pre-provisioning may provide one or more information elements that may be provisioned by the application provider when a CAS application is installed on a WTRU. The provisioning of the one or more information elements may be complementary to the ANDSF managed object described herein. The one or more information elements may be used in other use cases (e.g., an AN providing information, a CAS providing information, and/or a CAS providing information over IP, as described herein). The application configuration (e.g., the one or more information elements) may include an Application ID. The application configuration may include one or more Locator(s) (e.g., URIs). The one or more locator(s) may enable login and service access. The application configuration may include one or more CAS provider ID(s) (e.g., a list of CAS providers that may have a CAS agreement with the CAS application provider).

Figure 19:
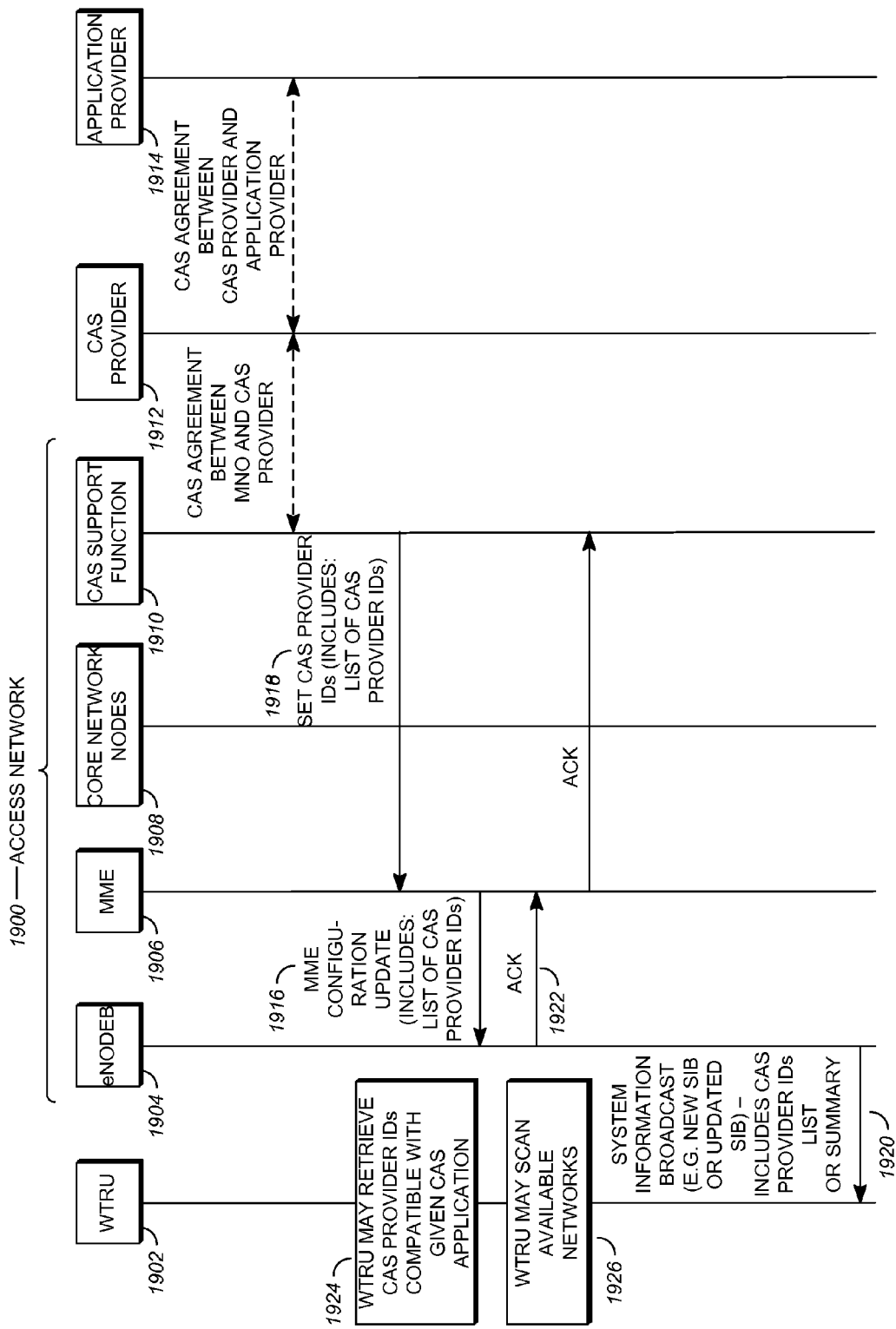
FIG. 19 illustrates an example of CAS service discovery, e.g., based on advertisement by the access network including support CAS provider IDs.

An architecture (e.g., based on 3GPP) may provide support for CAS as shown in FIG. 14. FIG. 19 illustrates an example of CAS service discovery. CAS service discovery may be based on an advertisement by an access network 1900. The access network 1900 may support CAS provider IDs. A 3GPP-based network (e.g., an LTE network) may support broadcasting of System Information (e.g., a Master Information Block, MIB and/or a System Information Blocks, SIBs) to a WTRU 1902. The system information may include cell bandwidth, PLMN ID, cell ID, and/or etc. The WTRU may select a network and may synchronize itself with the network based on the system information. An eNodeB 1904 may broadcast system information and may obtain the information from the MME 1906 in a MME Configuration Update message 1916.

As illustrated in FIG. 19, the CAS support function 1910 may have a list of each of the CAS provider IDs that may have a CAS agreement with the access network (e.g., the list is configured by the MNO). The CAS support function 1910 may provide 1918 the list to the MME 1906 (e.g., in a Set CAS provider IDs message). The MME 1906 may send this information to the eNodeB 1904 (e.g., the list of supported CAS provider IDs may be included in an enhanced MME Configuration Update message). The eNodeB 1904 may broadcast 1920 (e.g., broadcast periodically) the CAS provider ID information. The eNodeB 1904 may send an acknowledgement 1922. The acknowledgement 1922 may complete the communication. A user may start a CAS application. The WTRU 1902 may retrieve 1924 from its internal state the list of CAS provider IDs that may enable connectivity for the CAS Application. The WTRU 1902 may start scanning 1926 for available networks. An available network may be a represented cellular network. The represented cellular network may broadcast CAS provider information as part of the System Information for the cellular network. For example, a SIB (e.g., a new SIB) may be defined for CAS. The defined SIB may be broadcasted (e.g., broadcasted periodically) as other SIBs. The defined SIB may need additional changes to SIB1 to inform the WTRU 1902 about the scheduling of the defined SIB. A SIB may be modified to include CAS provider information. The CAS provider information may include a list of CAS provider IDs. The CAS provider information may include a summary of CAS provider IDs (e.g., a Bloom Filter encoding several supported CAS provider IDs). The CAS provider information may include a list of CAS provider IDs (e.g., the preferred partners and/or a rotating portion of the whole list) and a summary of other CAS provider IDs which are not in the list (e.g., if there is not enough room in the SIB for each of the CAS provider IDs).

Figure 20A:
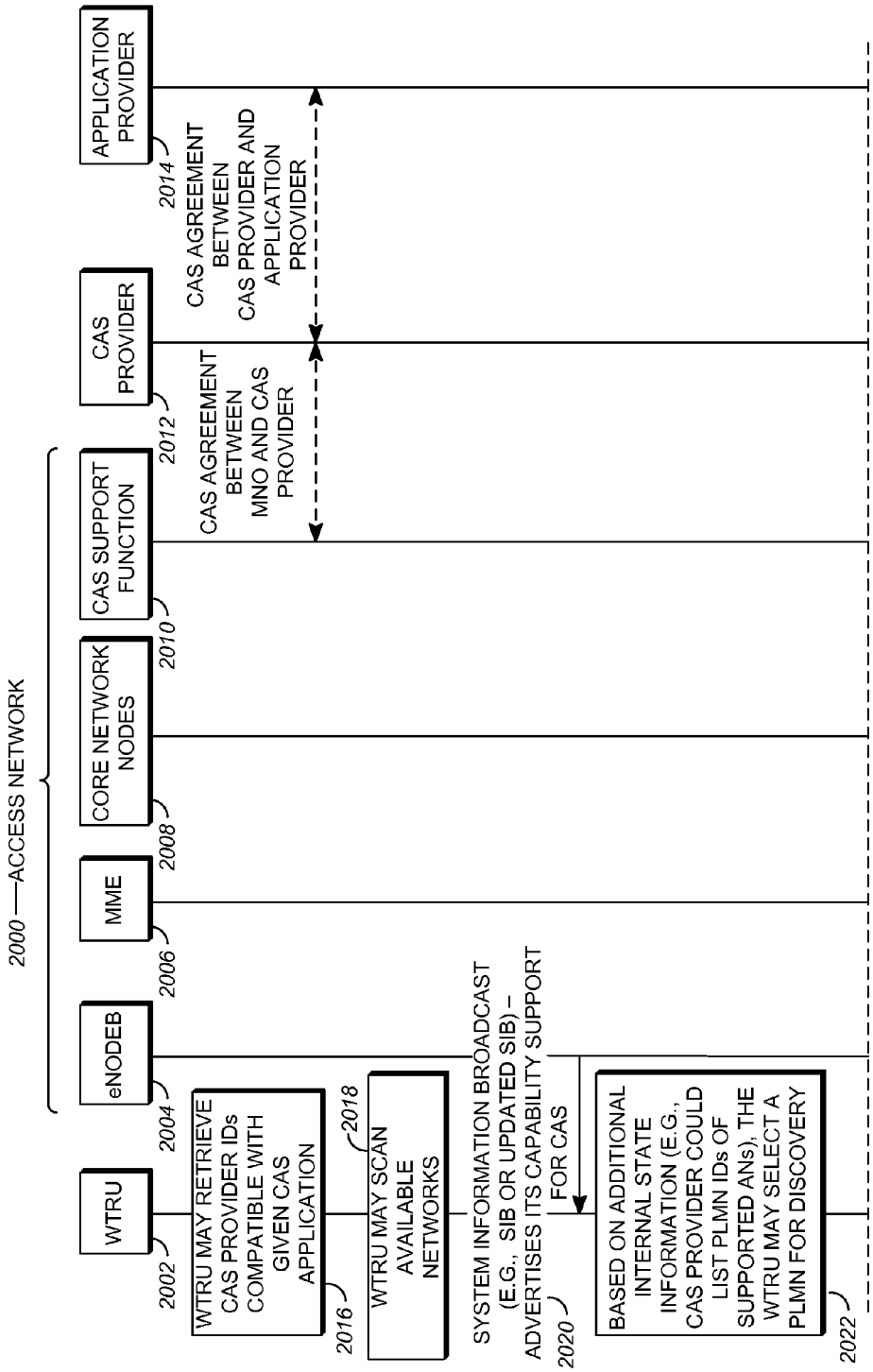
FIG. 20 (FIG. 20A and FIG. 20B) illustrates an example of CAS service discovery dynamically involving the CAS provider.
Figure 20B:
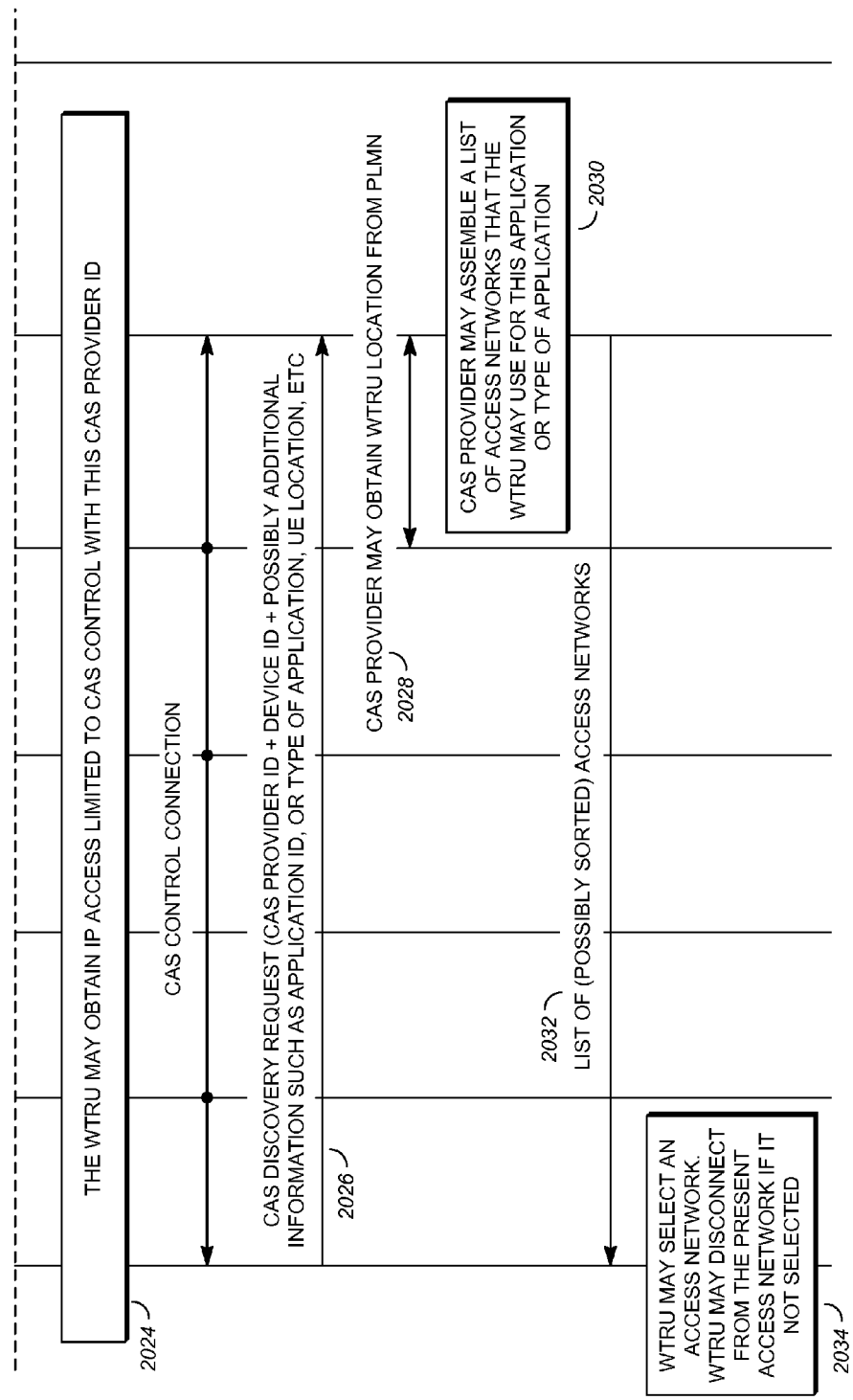

FIG. 20 illustrates an example of CAS service discovery that may dynamically involve the CAS provider 2012. For example, the C2 interface may be used to exchange discovery information between an AN and a CAS SP during the discovery process. The CAS provider 2012 may cover a cost of discovery. A WTRU 2002 may indicate a CAS provider ID in an initial discovery message to the access network 2000. the AN 2000 may include an eNodeB 2004, a MME 2006, one or more core network nodes 2008, and/or a CAS support function 2010. The AN 2000 may reject a discovery attempt. The AN 2000 may reject the discovery attempt if the CAS provider ID is unknown or does not cover the cost. The CAS provider 2012 may dynamically select an AN 2000 for the WTRU 2002. The WTRU 2002 may include application related information in a query (e.g., an App ID, or a general type of application such as streaming). The application related information may provide more information for the CAS provider 2012 to select an appropriate (e.g., a most appropriate) response.

As illustrated in FIG. 20, a user may start a CAS application. A WTRU 2002 may retrieve 2016, from its internal state, a list of CAS provider IDs that may enable connectivity for the CAS application. The WTRU 2002 may start scanning 2018 for available networks. An available network may advertise or may broadcast 2020 support for CAS (e.g., include a flag in a cellular network's System Information). The WTRU 2002 may decide to use the available network for an active discovery procedure. The WTRU 2002 may select 2022 a CAS provider ID among the list of CAS provider IDs that may support the desired CAS application. The WTRU 2002 may include a list of access networks that may be supported by the selected CAS provider ID. The WTRU 2002 may check that an AN 2000 is included on the list of ANs that support the selected CAS provider ID. The WTRU 2002 may obtain restricted IP access 2024 to the CAS provider 2012, for example, as described herein. The CAS provider 2012 may pay to enable the WTRU 2002 to access a CAS provider control function. The WTRU 2002 may send a CAS Discovery Request message 2026 to the CAS provider 2012 (e.g., the CAS support Function 2010 of the AN 2000 may act as a proxy for sending the CAS discovery request message 2026). For example, the request 2026 may include an application ID, a class of application (e.g., streaming), one or more location(s), capabilities, and/or user preferences. User preferences may include the AN(s) that may be used for a streaming application while visiting a geographical area. The CAS provider 2012 may obtain 2028 a current location of the WTRU 2002 from the AN 2000. The CAS provider 2012 may build 2030 and/or may return 2032 a list to the WTRU 2002. The WTRU 2002 may use the list to connect 2034 to one or more ANs for CAS.

A WTRU may communicate with a CAS SP (e.g., over IP). When the WTRU communicates with a CAS SP over IP, a communication link may be used for discovery of additional access networks. For example, a mobile WTRU may collect discovery information for neighboring hot spots. If the WTRU-CAS provider communication is not yet established (e.g., a pre-existing connection may be a regular non-CAS IP connection), a CAS provider discovery function IP address may be obtained through DNS. The WTRU may have FQDN of the function pre-provisioned. The WTRU may know the CAS SP domain name. The CAS provider discovery function may perform a DNS-based service discovery procedure for the CAS SP domain.

Figure 21:
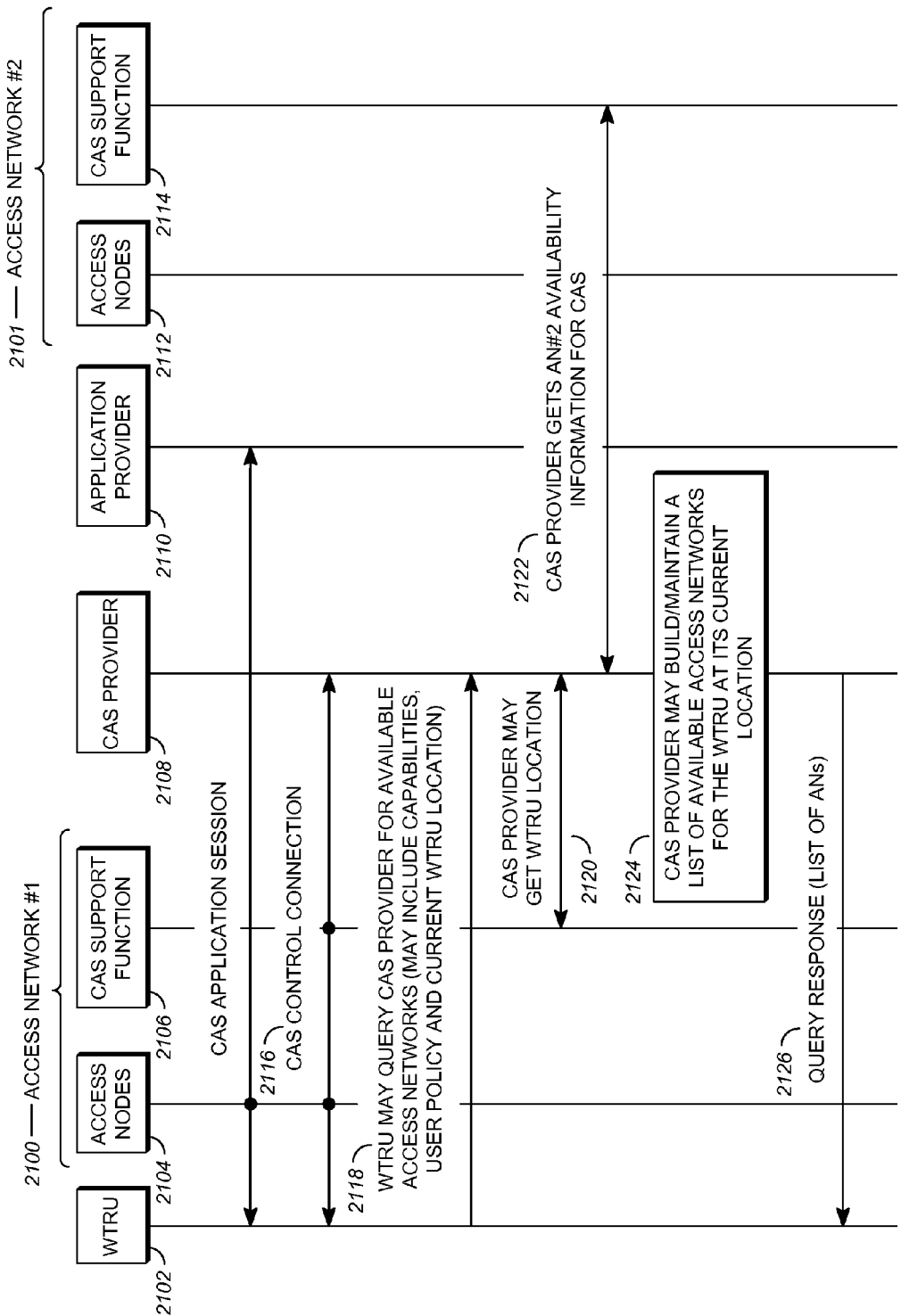
FIG. 21 illustrates an example of a WTRU querying a CAS provider over an IP communication channel.

FIG. 21 illustrates an example of a WTRU 2102 querying a CAS provider 2108 over an IP communication channel. The IP communication channel may include an existing communications channel. The example of a WTRU 2102 querying a CAS provider 2108 over an IP communication channel may include a first access network 2100, an application provider 2110, and/or a second access network 2101. The first access network 2100 may include one or more access nodes 2104 and/or a first CAS support function 2106. The second access network 2101 may include one or more access nodes 2112 and/or a second CAS support function 2114. As illustrated in FIG. 21, a pre-existing IP connection may enable communication with the CAS provider 2108. The pre-existing connection may be a CAS connection 2116. The CAS connection may be through the same CAS provider 2108. The WTRU 2102 may send 2118 a query message to the CAS provider 2108. The query message may include a current location of the WTRU 2102, one or more capabilities of the WTRU 2102, and/or user preferences (e.g., only for Wi-Fi access networks). Some of the information (e.g., capabilities) included in the query message may be known to the CAS provider 2108. The CAS provider 2108 may obtain other information (e.g., a current location) through other means.

The CAS provider may obtain 2120 a location information of the WTRU 2102 from an access network (e.g., the first AN 2100). The CAS provider 2108 may receive 2122 availability information from a second AN 2101 (e.g., one or more of the access networks). The CAS provider 2108 may receive the availability information periodically. A last cached response may be used. The availability information may indicate that an AN (e.g., the second AN 2101) may not accept CAS connections. The CAS provider 2108 may assemble 2124 a list of ANs available for CAS for the WTRU 2102 (e.g., the WTRU 2102 and the CAS provider 2108). When assembling 2124 the list available ANs, the CAS provider 2108 may take into account a location of the WTRU 2102, capability, and/or user preference. The assembled information may be provided 2126 to the WTRU 2102.

As illustrated in FIG. 16, the input of the selection process may include a set of rules from an application provider, a CAS provider, a WTRU, and/or a user. The input of the selection process may include a locally stored list of CAS providers and access networks. The input of the selection process may include one or more Candidate(s) CAS providers and access networks from the discovery process. For example, the set of rules may include an application provider that may prefer WLAN over cellular for all traffic. As another example, the set of rules may include an application provider that may prefer WLAN over cellular for streaming and cellular for signaling. A CAS provider may express similar rules that may have a lower or higher priority than the application provider's rules. The end user may prefer to use a home network when available. The WTRU configuration may include an association (e.g., express affinity) with a particular PLMN when available.

Figure 22:
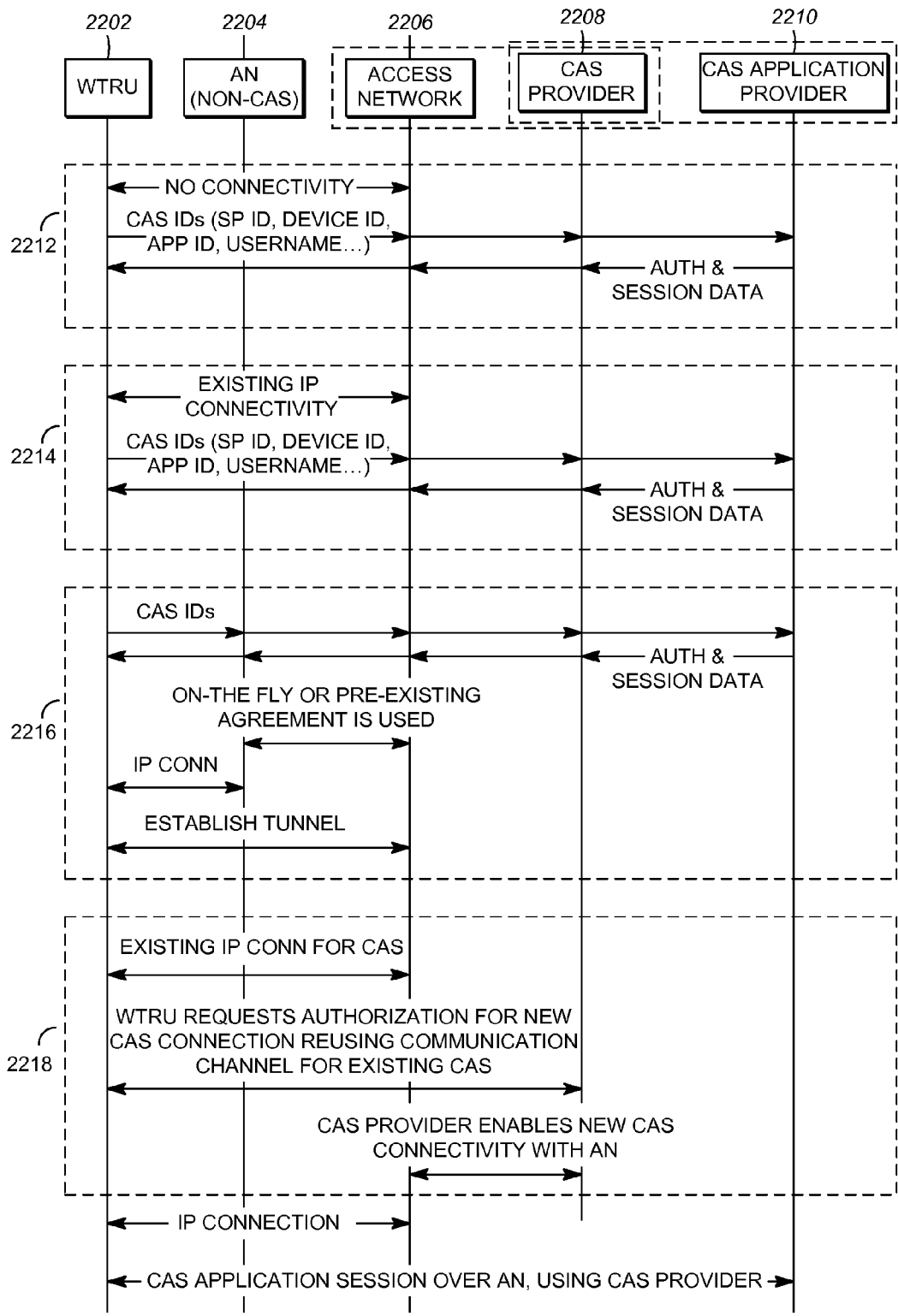
FIG. 22 illustrates an example of one or more Connections Options.

Service Access may be provided. FIG. 22 illustrates example mechanisms to enable a CAS connection. The example mechanisms may be implemented in an architecture that includes a WTRU 2202, a first AN 2204, a second AN 2206, a CAS provider 2208, and/or a CAS application provider 2210. The first AN 2204 may be a non-CAS enabled AN. The second AN 2206 may be CAS enabled. The mechanisms may include one or more of Network attachment that may be CAS aware 2212, CAS connection over IP 2214, WTRU 2202 connected 2216 with Tunneling to CAS-enabled AN 2206, and/or a connection Reuse 2218.

The WTRU 2202 may provide CAS information as part of the attachment (e.g., NAS signaling). The WTRU 2202 may provided CAS information via an attachment and/or authorization request with application IDs. The WTRU 2202 may provide CAS information in one or more (e.g., two) steps. A first step may include a request for authorization and/or credentials. A second step may attach to the network using the requested credentials. A CAS provider and an application provider may be involved in the authorization process. One or more identities (e.g., new identities) may be involved in the authorization process. The one or more identities may include an application ID and/or a CAS provider ID. In a 3GPP case, the handling of WTRU identity (e.g., IMSI) may be solved (e.g., temporary IMSI may be allocated or the WTRU 2202 may be provided with an IMSI but there may be no single home network). The process may be simplified if the credentials are provisioned or cached on the WTRU 2202. A simplified form may be used as a form of caching. The simplified form may be used for prototyping. One or more credentials may be obtained (e.g., using IP connectivity).

In the case of CAS connection over IP 2214, a WTRU 2202 may obtain IP connectivity. The WTRU 2202 may use IP connectivity to seek authorization for CAS network usage. The CAS provider 2208 and the CAS application provider 2210 may be involved in the authorization process. The WTRU 2202 may have full (e.g., non-CAS) IP connectivity and may start a CAS application. The WTRU 2202 with full IP connectivity may be close to a regular MOSAP (e.g., using Sponsored Connectivity).

In the case where the WTRU 2202 may be connected 2216 with Tunneling to the second AN 2206 (e.g., a CAS-enabled AN), the WTRU 2202 may be connected in a non-CAS fashion. For example, the WTRU 2202 may be connected to a home network or an open Wi-Fi AP. When a CAS application is started, the traffic may be tunneled towards the second AN 2206. The second AN 2206 may include a CAS-enabled access network (e.g., a MCN). A non-open non-CAS AN (e.g., the first AN 2204) may implement support to enable the connection (e.g., get the WTRU 2202 authorized). An intermediate AN may be used. QoS and/or charging support may be provided.

In the case of connection reuse 2218, the WTRU 2202 may be connected for a different CAS application. For a desired (e.g., new) CAS application, the WTRU 2202 may decide to share one or more access network(s) and/or CAS service provider(s). One or more connections (e.g., a network attachment, a C3 interface between the WTRU 2202 and SP, etc.) may be reused and/or shared (e.g., rather than establishing parallel connections and waste resources).

In the case of same AN and/or same SP, the SP may download QoS and/or charging rules (e.g., new QoS/charging rules). The C3 interface may enable communication of different applications. In the case of same AN and/or different SP, the WTRU 2202 may provide information (e.g., enough information) to the SP (e.g., new SP) to enable sharing AN resources between SPs (e.g., the SPs may communicate with each other). In the case of different AN and/or Same SP, the existing C3 connection between the WTRU 2202 and the SP may be reused for a second application.

For access, a service based access authorization process may be provided. For Wi-Fi access networks, a WTRU may use EAP based authentication. The EAP based authentication may be based on information obtained from ANQP during the discovery phase. For 3GPP standard compliant access networks, an enhancement to the access procedure may enable service based authorization (e.g., using EAP). The authorization process may involve a CAS provider and/or an application provider. One or more methods may be available when the WTRU already has IP connectivity.

A cellular access network may allocate a temporary IMSI from a pool. The cellular access network may transmit the temporary IMSI to a WTRU. For example, the temporary IMSI may be included in an authentication response or in a separate message, when the cellular access network receives the authorization from the service (e.g., a CAS provider or an application provider). The cellular access network may not allocate the temporary IMSI from a pool if a CAS provider provisions the WTRU with an IMSI. The WTRU may include the IMSI in a message sent to the access network.

CAS-Aware Attachment to a cellular access network using a temporary IMSI may be provided. The WTRU may determine which CAS SP to contact. The WTRU may be provisioned with a device ID. For example, the device ID may be obtained from the CAS SP. One or more credentials and/or a shared secret may be obtained from the CAS SP. The one or more credentials and/or the shared secret may enable authentication of the WTRU with the CAS SP.

The WTRU may attach to the cellular network (e.g., using a modified attach message). The WTRU may attach to the cellular network when there is no cellular WTRU identifier (e.g., IMSI, P-TMSI+RAI, GUTI, or a null value). The modified attach message may include a CAS provider ID and/or a device ID (e.g., a WTRU ID) for the CAS provider. The CAS provider ID and/or Device ID may be considered as a form (e.g., a new form) of WTRU identity. The device ID field of a message may be extended to support the WTRU identity format.

When a WTRU is not known by a cellular network, the cellular network may be assisted by the CAS provider to authenticate the WTRU. When the WTRU is authenticated with the support of the CAS provider, the cellular network may proceed with providing access and/or charge the access to the CAS provider.

To provide access without requiring changes in cellular network signaling, a temporary IMSI may be allocated by the cellular network to a WTRU (e.g., a newly authenticated WTRU). For example, at the end of the authentication procedure, the temporary IMSI and/or other related ID such as P-TMSI may be provided to the WTRU. The temporary IMSI may be allocated from a temporary IMSI pool reserved for one or more CAS subscribers.

The WTRU may be provisioned with a shared secret by a CAS provider before an access attempt. The WTRU may be provisioned with a shared secret during an initial USIM provisioning, or when the WTRU is online (e.g., through a non-CAS connection or through another CAS provider). The cellular network operator may retrieve a network part of the shared secret from a CAS provider (e.g., instead of from a subscriber profile in the HSS). When IP access is granted, the WTRU may establish a communication link with the CAS provider. The communication link may be established directly over IP or through a CAS support Function as a proxy. The CAS support Function may be used as a proxy and the CAS support function may make decisions on behalf of the CAS provider. Use of the CAS support function as a proxy may reduce the control signaling load and/or may enable connection to a CAS application, as described herein.

Figure 23A:
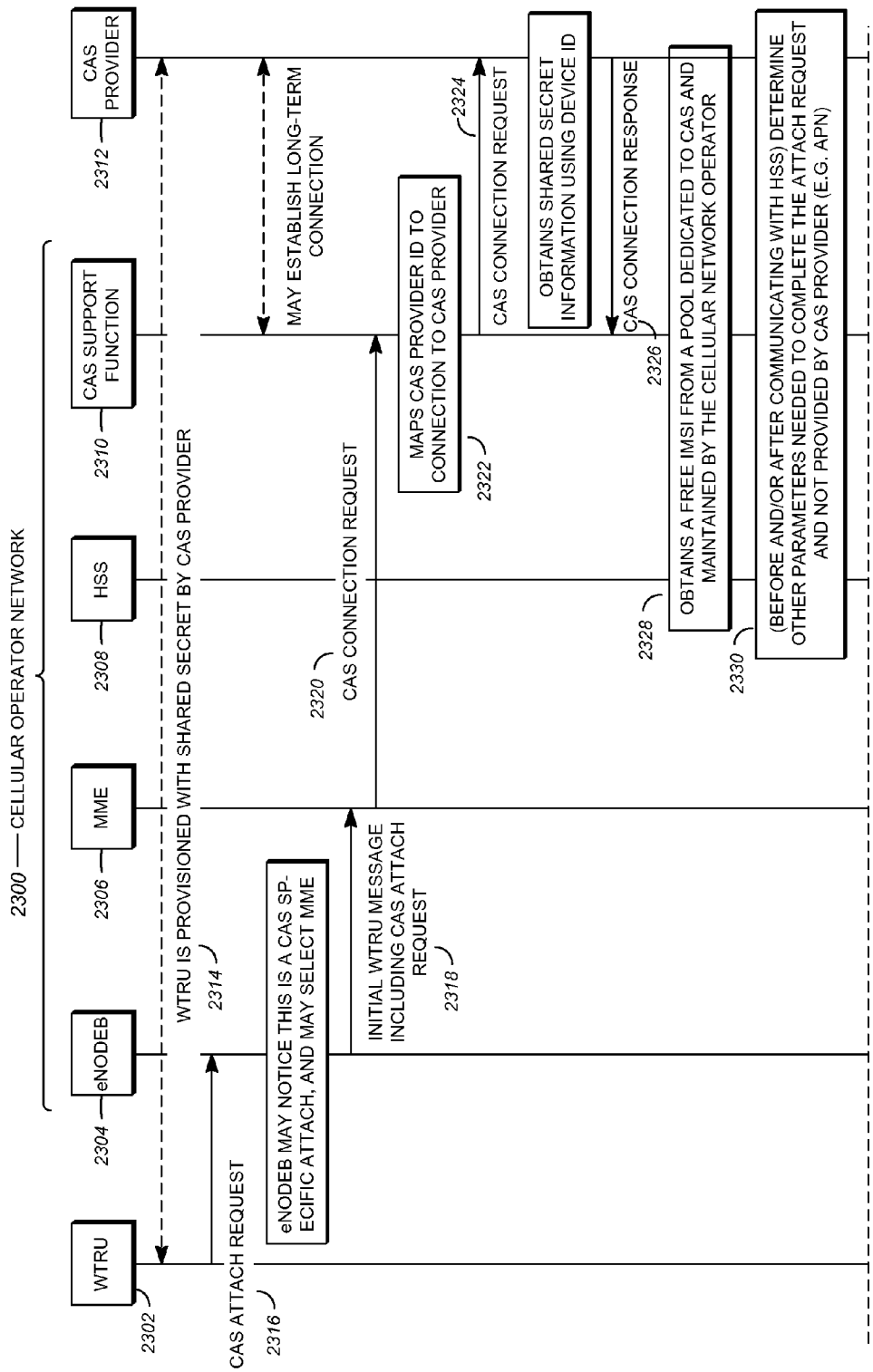
FIG. 23 (FIG. 23A and FIG. 23B) illustrates an example of CAS-aware attachment to a cellular network.
Figure 23B:
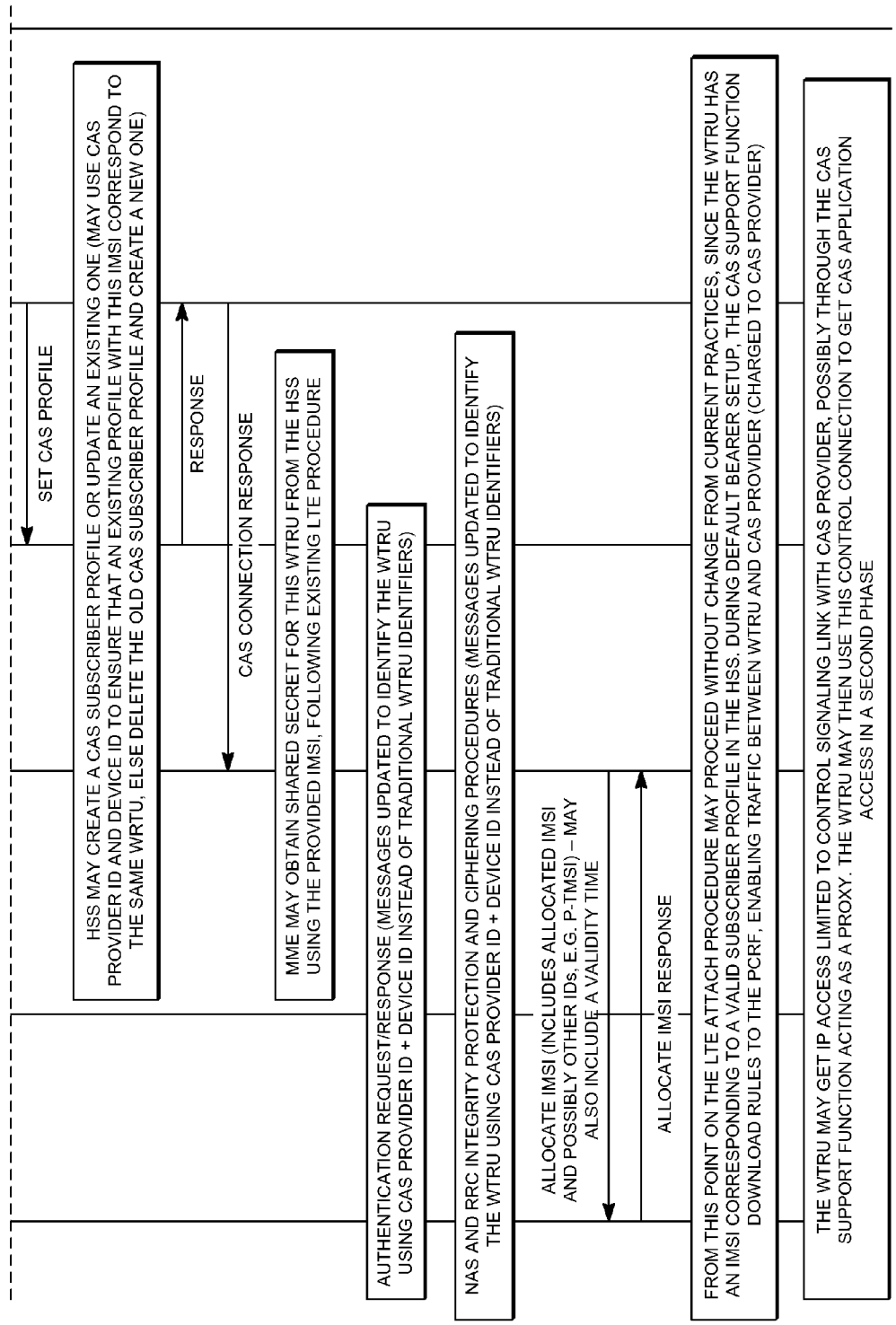

FIG. 23 illustrates an example CAS-aware attachment to a cellular operator network 2300. As illustrated in FIG. 23, one or more messages exchanged before an IMSI allocation may be modified to support a CAS provider ID and/or a Device ID (e.g., instead of an IMSI, a P-TMSI, and/or a GUID) to identify the WTRU 2302. As illustrated in FIG. 23, a shared secret may be provisioned 2314 by a CAS provider 2312. The shared secret may enable authentication by a cellular network 2300. Provisioning the shared secret may include pre-provisioning a SIM card. One or more shared secrets may be provisioned 2314 to enable authentication by one or more cellular technologies. The WTRU 2302 may receive a Device ID via the CAS provider 2312. The WTRU 2302 may be provisioned with the CAS provider ID.

As illustrated in FIG. 23, The WTRU 2302 may send a CAS Attach request 2316. The WTRU ID may be replaced with a CAS provider ID and/or a Device ID. A flag and/or a message number may be used to identify the CAS Attach request message. The eNodeB 2304 may select an MME 2306. One or more MMEs may be CAS-aware. The eNodeB 2304 may send 2318 the attach request message to the MME 2306. The MME 2306 may send 2320 a CAS connection request message to the CAS support Function 2310. The CAS connection request message may indicate a CAS provider ID and/or a device ID. The CAS support function 2310 may map 2322 the CAS provider ID to a connection to a CAS provider 2312. For example, a CAS provider's configuration may include one or more mappings between CAS provider IDs and CAS provider service URIs. The connection to the CAS provider 2312 may be a pre-existing and/or a long term connection. The CAS support function 2310 may forward 2324 the CAS connection request to the CAS provider 2312. The CAS provider 2312 may use the device ID to retrieve a device profile of the WTRU 2302. The device profile may be retrieved from a database. The device profile may include a shared secret for authentication. The CAS provider 2312 may send 2326 a CAS connection response to the cellular operator network 2300. The CAS connection response may include the shared secret and other parameters (e.g., useful for the CAS connection). The cellular operator network 2300 may include an APN, one or more quotas of traffic usage, and/or the like. The CAS support function 2310 may receive 2328 an IMSI from a pool of one or more free IMSIs. The HSS may receive an IMSI from a pool of one or more free IMSIs. The CAS support function 2310 may determine 2330 other parameters that may be needed for establishing the connection (e.g., APN connection). The CAS support function 2310 may send a message to the HSS 2308 to trigger a creation of a temporary profile (e.g., using the IMSI and/or WTRU information from the CAS provider 2312). The HSS 2308 may create a temporary subscriber profile. The temporary subscriber profile may include one or more fields (e.g., new fields) including a CAS provider ID field and/or a CAS Device ID field (e.g., to help detect conflicts). The temporary subscriber profile may include an existing temporary subscriber profile. The HSS 2308 may send a response back to indicate success/failure. The CAS support function 2312 may send a CAS connection response back to MME 2306 WTRU IMSI and/or other parameters. The MME 2306 may proceed with some steps from the unmodified attach request. For example, the MME 2306 may obtain subscriber data from the HSS 2308 using the provided IMSI. The attach request procedure may include (e.g., continue with) authentication, integrity, protection, and/or ciphering. A CAS provider ID and/or a Device ID may be used in messages reaching the WTRU 2302. Ciphering may be enabled and the MME 2306 may communicate one or more temporary ID(s) (e.g., IMSI and/or P-TMSI) to the WTRU 2302. The WTRU 2302 may be considered a non-CAS WTRU (e.g., since it may have IMSI and/or P-TMSI that may relate to a valid subscriber profile in the network. The cellular network operator 2300 may disallow certain operations to CAS-enabled WTRUs, may impose capacities, and/or the like. The WTRU 2302 may get IP access for a control link to the CAS provider 2312. A default bearer setup (e.g., not detailed) may be provided. A default bearer may be associated with one or more IP filters. The one or more IP filters may limit the IP traffic (e.g., to a minimum necessary to connect to the CAS provider 2312. For example, IP traffic may be limited to WTRU-CAS support Function traffic. The CAS support function 2310 may proxy traffic to and/or from one or more CAS providers.

An HSS 2308 may initiate a CAS communication. The MME 2306 may not communicate with the CAS support function 2310. Instead of sending a CAS connection request, the MME 2306 may request a subscriber profile from the HSS 2308 using a CAS provider ID and/or a Device ID instead of an IMSI. The HSS 2308 may send a message (e.g., a CAS connection request) to the CAS support Function 2310. As illustrated in FIG. 23 the HSS 2308 may send back the subscriber profile to the MME 2306.

An external IMSI pool may be provided. The CAS provider 2312 may include (e.g., hold) a set of temporary IMSIs and/or may provide the temporary IMSI of a given WTRU 2302 in the CAS connection Response message. The WTRU may be provided with a temporary ID such as a P-TMSI. The temporary IMSI may be replaced with the temporary ID. The HSS 2308 may maintain a pool of allocable IMSI numbers. Determination of parameters needed to complete the attaché request may take place in the HSS 2308 (e.g., after setting the CAS profile). The IMSI may be sent back by the HSS 2308 to the CAS support function 2310. The MME 2306 may include (e.g., hold) the CAS support Function 2310. An operator may have one or more (e.g., a limited number of) MMEs supporting CAS. The eNodeB 2304 may be configured to use the one or more MMEs for CAS attach requests.

An IMSI and/or other IDs may be provided to the WTRU 2302 using one or more messages. The WTRU 2302 may cache an allocated IMSI for future use. The WTRU 2302 may cache the allocated IMSI for the duration of the validity time as provided by the network 2300. For example, the next day the WTRU 2302 may use the same network 2300 with the same CAS provider 2312. The WTRU 2302 may use a normal attach request (e.g., including IMSI or P-TMSI or GUTI, etc.). If the network 2300 has the same subscriber entry in the HSS 2308 for the WTRU 2302 and the IMSI, an authentication may succeed. The authentication may fail (e.g., because the IMSI was unused or the IMSI was used for another WTRU). The WTRU 2302 may re-try connecting with a CAS Attach Request.

CAS-Aware attachment to a cellular network using an IMSI from a CAS provider may be provided. The WTRU may be provisioned with an IMSI and one or more security keys by the CAS provider. The cellular network operator may be made aware of a block of IMSI numbers managed by the CAS provider. When the IMSI is recognized as being managed by a given CAS provider, the cellular network operator may retrieve a shared secret and/or other profile information from the CAS provider using the IMSI (e.g., as a security key).

Figure 24:
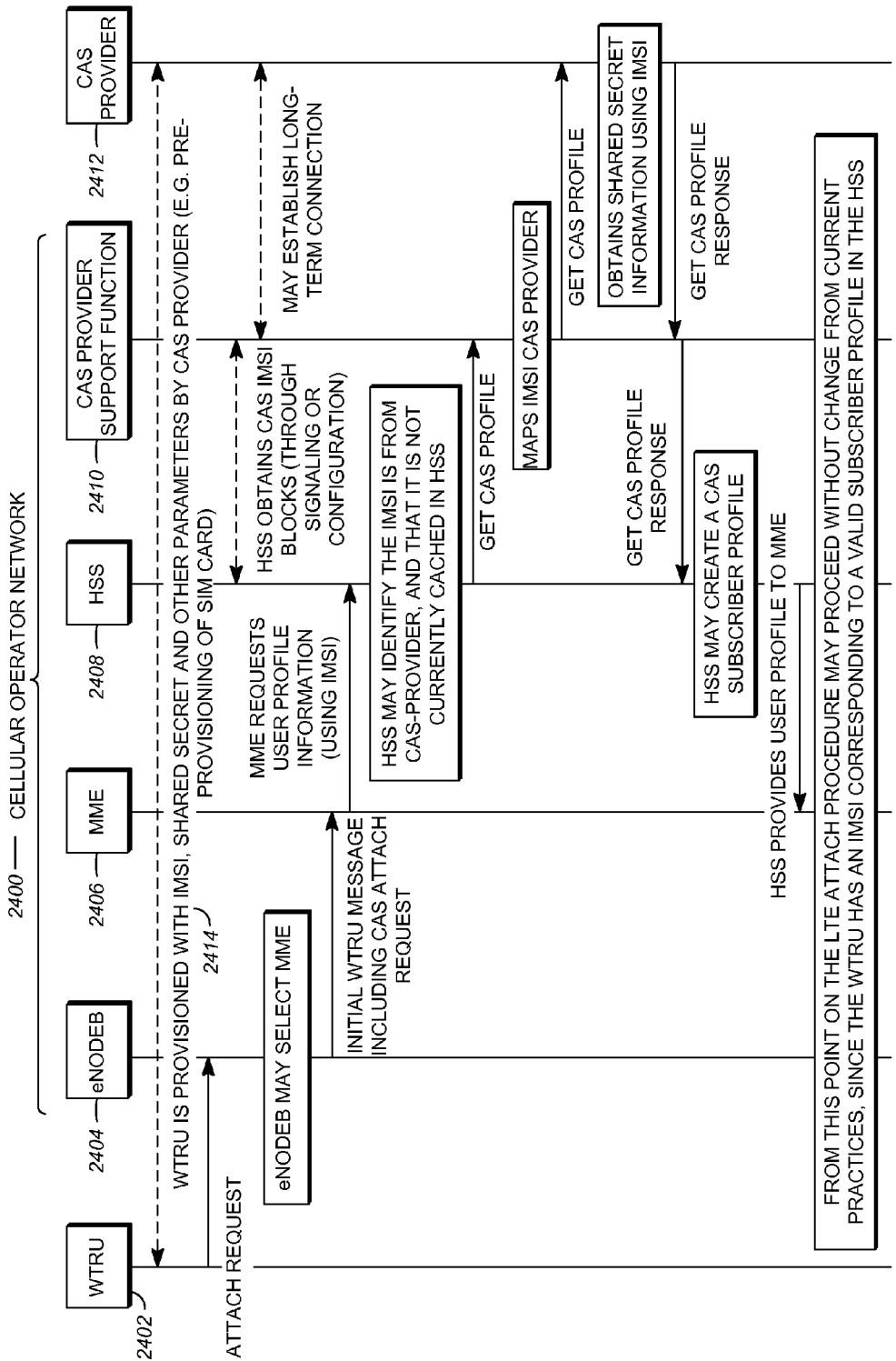
FIG. 24 illustrates an example of a CAS-aware attachment to cellular network with CAS provider IMSI.

FIG. 24 illustrates an example CAS-aware attachment to a cellular network 2400 with a CAS provider IMSI. The example CAS-aware attachment may include a WTRU 2402, a cellular operator network 2400, and/or a CAS provider 2412. The cellular operator network 2400 may include an eNodeB 2404, a MME 2406, a HSS 2408, and/or a CAS provider support function 2410. The CAS provider 2412 may provision 2414 an USIM with an IMSI and/or other parameters (e.g., shared secrets enabling authentication by a cellular network 2400). The WTRU 2402 may decide to attach to the cellular network 2400 for a CAS application, using the IMSI. If the WTRU 2402 previously used the cellular network 2400, the WTRU 2402 may have a P-TMSI and/or a GUTI to use (e.g., instead of the IMSI). The attachment of the WTRU 2402 to the cellular network 2400 may proceed (e.g., as in current cellular systems), until the MME 2406 may decide to fetch information from a subscriber profile on the HSS 2408 (e.g., using its IMSI). In an initial attach, the MME 2406 may not cache the subscriber profile. The HSS 2408 may not have a subscriber profile for the IMSI. The HSS 2408 may identify an IMSI as a CAS-Provider IMSI (e.g., because the HSS 2408 was configured with CAS-Provider IMSI blocks). The HSS 2408 may send a Get CAS Profile message to the CAS support Function 2410. The Get CAS Profile message may identify the CAS provider 2412 (e.g., by provisioning an IMSI block-CAS provider mapping made when the CAS agreement was put in place between the network operator and the CAS provider 2412). The Get CAS Profile message may be forwarded to the CAS provider 2412. The CAS provider 2412 may retrieve the information and/or send it to the CAS support function 2410. The CAS support function 2410 may forward the information back to the HSS 2408. The HSS 2408 may create a CAS subscriber profile from the received response. The CAS subscriber profile may be long-lived (e.g., unlimited or timed out at some point, possibly as per a validity time provided in the Get CAS Profile Response by the CAS provider 2412). One or more cellular procedures may be provided for the CAS connection. The one or more cellular procedures may include a future attachment, an intra-domain mobility, and/or the like. The HSS 2408 may reply to the MME's request. The WTRU 2402 may be considered as a subscriber of the cellular network 2400 (e.g., because the WTRU 2402 may have a valid profile in the HSS 2408). Intra-domain mobility procedures may be performed based on un-modified cellular networking processes. As described herein, the WTRU 2402 may obtain a limited access and may communicate with the CAS provider 2412 to obtain a full service access.

The MME 2406 may initiate a CAS communication. The MME 2406 may identify that an IMSI belongs to a CAS IMSI block. The MME 2406 may contact the CAS support function 2410. The CAS support function 2410 may communicate with the CAS provider 2412 and may receive subscriber profile information (e.g., unless this information is still valid in the HSS 2408, which the CAS support function 2410 may know from an internal state or by contacting the HSS 2408).

A CAS connection over IP may be provided. A WTRU may have a regular IP connection (e.g., the WTRU may be a subscriber of a cellular network). The WTRU may start a CAS application. The regular IP connection may be used for communication between the WTRU and a CAS SP (e.g., to get authorized for a sponsored connection for a CAS application). A combination of MOSAP and Sponsored Data Connectivity may be provided. A CAS support function may include a MOSAP application server. The MOSAP application server may be deployed by the cellular network operator.

Support for a WTRU connected with tunneling to a CAS-enabled AN may be provided. Access technology (e.g., WLAN) may be provided. The base protocol provided may be EAP. For example, instead of including IMSI@realm, the initial EAP may use a CAS specific ID (e.g., device_id@CAS_PROVIDER_REALM). The CAS specific ID may be built from the CAS provider ID and/or a device ID allocated by the CAS provider to the WTRU. One or more EAP messages may be forwarded to an AAA server of the CAS provider. The AAA server of the CAS provider may authenticate the WTRU and may communicate with the cellular network (e.g., to provide a shared secret and/or an IMSI). The cellular network may select a temporary IMSI from a pool. The CAS provider may supply a temporary IMSI.

Figure 25A:
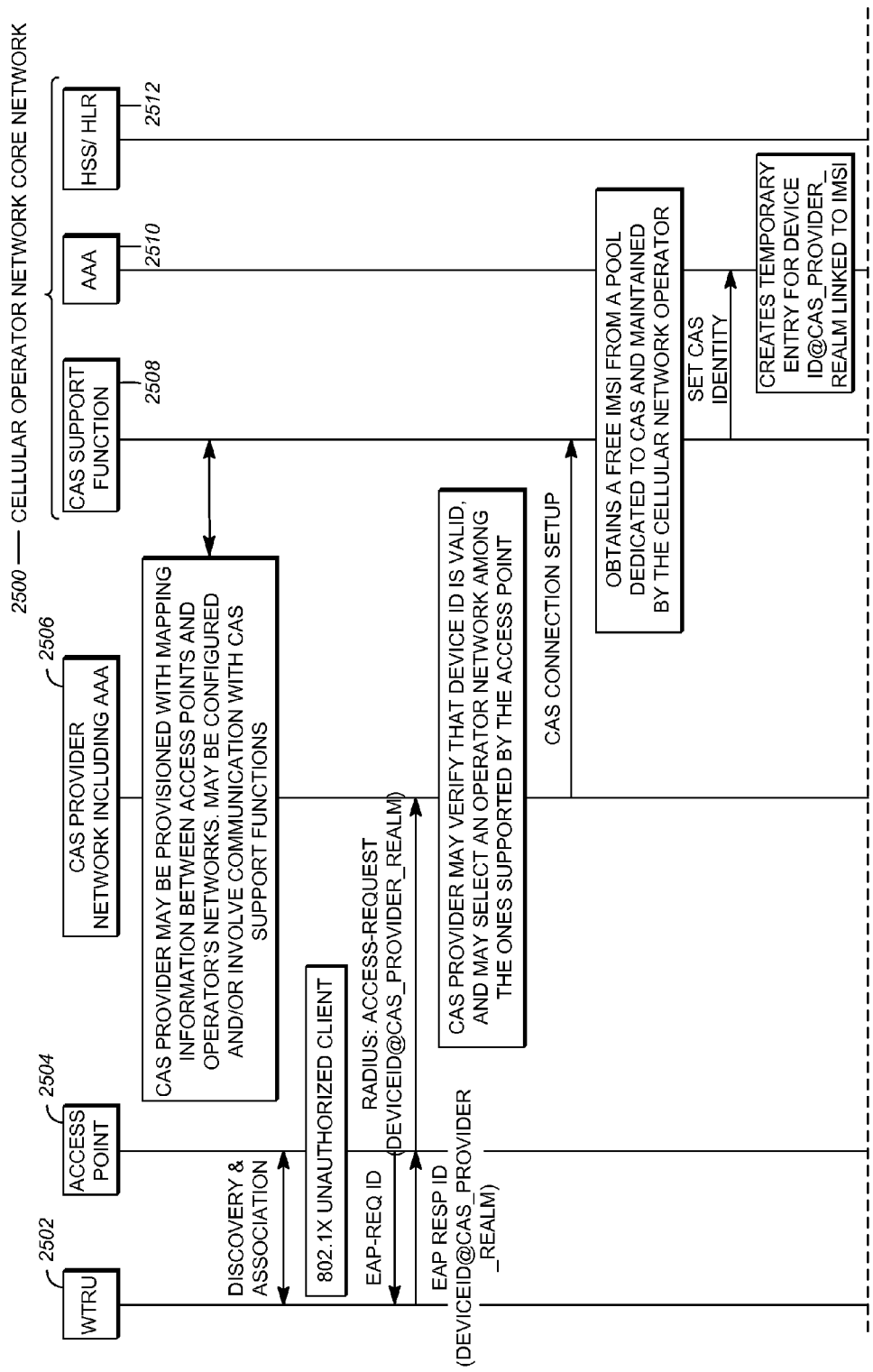
FIG. 25 (FIG. 25A, FIG. 25B, and FIG. 25C) illustrates an example of CAS connection to cellular network, e.g., over WLAN Access Point.
Figure 25B:
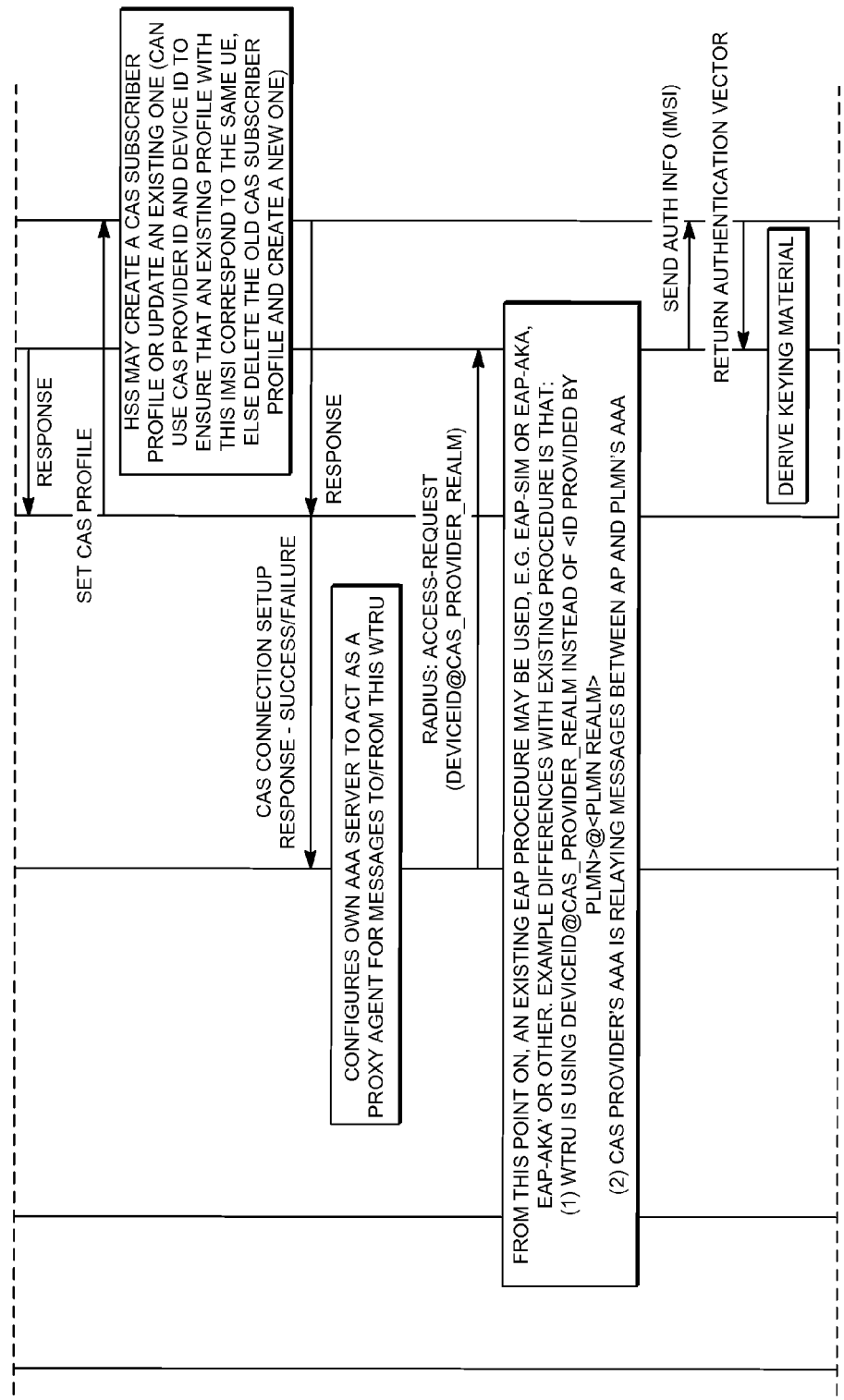
Figure 25C:
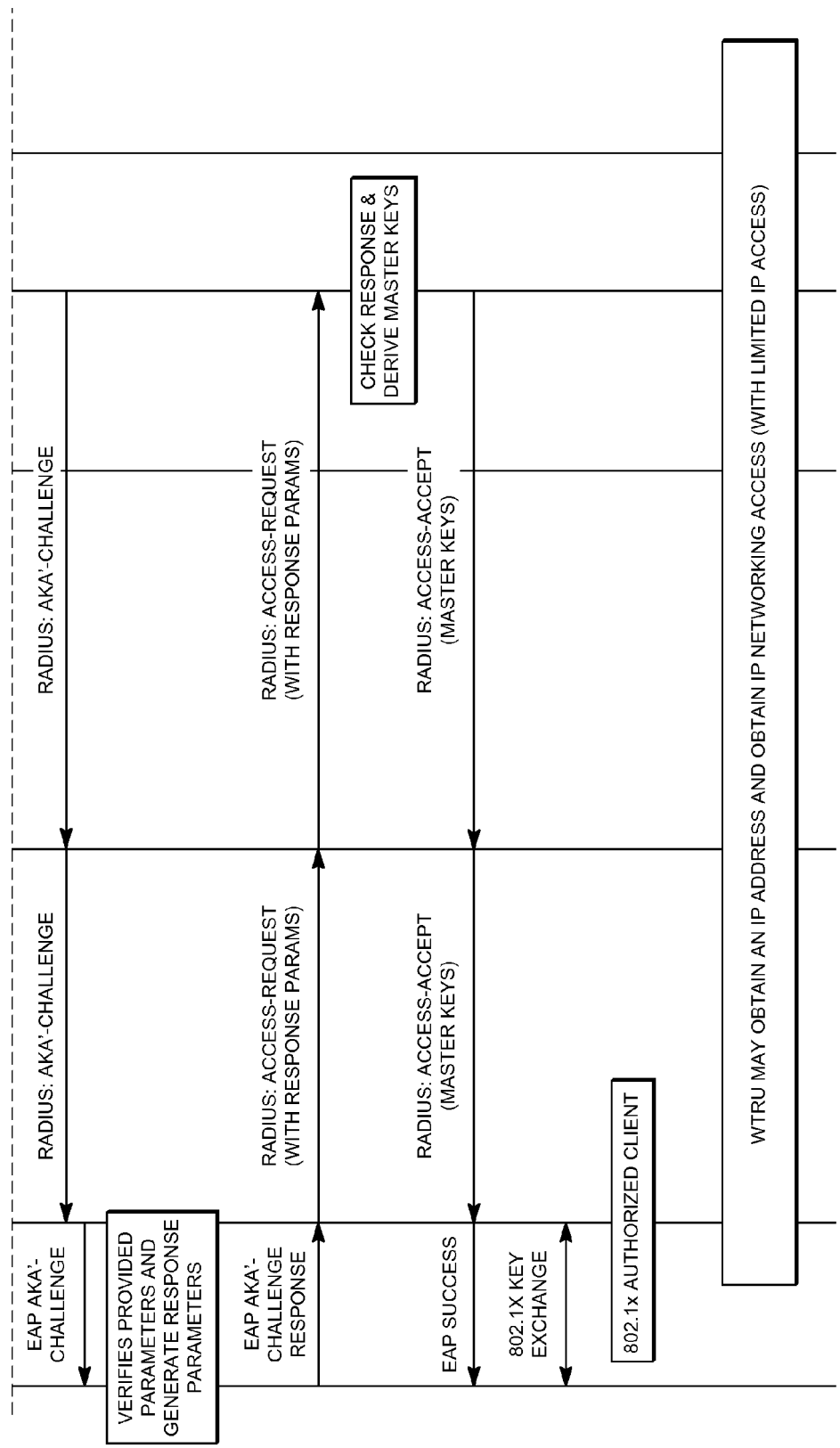

FIG. 25 illustrates an example CAS connection to a cellular network. The example CAS connection may include a WTRU 2502, an access point 2504, a CAS provider network 2506, and/or a cellular operator network 2500. The cellular operator network 2500 may include a CAS support function 2508, an AAA server 2510, and/or a HSS/HLR. The example CAS connection may be via a WLAN Access Point 2504. The CAS provider 2506 may be provisioned with information enabling mapping between a request through a particular Access Point 2504 and one or more cellular operators. For example, one or several cellular operators may have an agreement with a WLAN operator (e.g., the AP may be operated by a cellular network operator). The CAS provider 2506 may be provided with a list of APs that may be used to provide CAS service for an operator (e.g., as part of CAS agreement with a cellular operator). The list of APs may be provided and/or updated by the CAS support function 2508. The WTRU 2502 may start an authorization process with an access point 2504. For example, an identity used may be <DeviceID>@(<CASProviderRealm>. The AP 2504 may query an AAA Server 2510. The AAA server 2510 may be responsible for the realm and/or may be the AAA Server of the CAS provider 2506. The CAS provider 2506 may verify a Device ID. The CAS provider 2506 may select a cellular operator among those supported by the AP 2504. The CAS provider 2506 may request (e.g., ask) the cellular network 2500 to create a temporary identity for the WTRU 2502. The CAS provider 2506 may include information used to establish the temporary identity. The information may include a CAS provider ID, a device ID, and/or a shared secret). The information may enable authentication of the WTRU 2502 with the cellular network 2500. The CAS support function 2508 in the cellular network 2500 may verify the existence of temporary records (e.g., proper temporary records) in the HSS/HLR 2512 and/or the AAA servers 2510 of the cellular core network 2500. The CAS provider 2506 may configure an AAA server to act as a proxy. The proxy AAA server may relay one or more authentication messages for the WTRU 2502 between the cellular network 2500 and the AP 2504. The proxy AAA server may relay a pending access-request message to the PLMN's AAA server 2510. Other EAP procedures may be used (e.g., EAP-SIM, EAP-AKA, etc.). The WTRU 2502 may obtain IP access through the AP 2504.

The CAS provider 2506 may include a set of temporary IMSIs. The CAS provider 2506 may provide the set of temporary IMSIs in a CAS connection Setup message. The communication between the CAS support Function 2508, the AAA server 2510 and the HSS/HLR 2512 may follow different steps (e.g., instead of having the CAS support function 2508 successively communicate with the AAA server 2510 and the HSS 2512). The CAS support function 2508 may communicate with the HSS 2512. The HSS 2512 may communicate with the AAA server 2510. The HSS 2512 may maintain a pool of allocable IMSI numbers. The IMSI and/or a derived identity (e.g., a P-TMSI) may be provided to the WTRU 2502. For example, the IMSI may be provided over IP when the WTRU 2502 has IP access. The WTRU 2502 may connect to the CAS support Function 2508 and may request an identity. The IMSI and/or the identity may be used by the WTRU 2502 to perform operations with the cellular network 2500. The operations may include connecting using a cellular air interface, a new bearer establishment, and/or the like.

An initial AAA server may be the cellular network. An initial EAP-Request ID from the WTRU 2502 may include a DeviceID-CASProviderID@PLMN_REALM, which may be forwarded by the Access Point 2504 to the AAA Server 2510 of the Cellular Network 2500. The cellular network 2500 may request (e.g., pull) the subscriber information from the CAS provider 2506. For example, the cellular network's AAA server 2510 may know the DeviceID-CASProviderID user but may notice that that the Device ID includes a known CASProviderID. The AAA server 2510 may request the subscriber profile information from the CAS support Function 2508. The CAS support function 2508 may forward the subscriber profile information request to the CAS provider 2506.

Connection reuse may be provided. As described herein (e.g., in FIG. 23) at the end of the selection process, the WTRU may determine which CAS SP may be contacted. The WTRU may be provisioned with a device ID obtained from the determined CAS SP, one or more credentials, and/or a shared secret. The device ID, the one or more credentials, and/or the shared secret may enable authentication of the WTRU with the CAS SP.

The WTRU may include an IP connection using CAS through a first access network. The first access network may be for another CAS application. The WTRU may have a control connection with a CAS support function of the first access network. The WTRU may have a control connection with a CAS service provider. The WTRU may send an access request message to the CAS SP over the first access network. The access request message may indicate a second access network it may wish to use for a connection (e.g., a new connection). The CAS SP may communicate with the second access network to authorize (e.g., pre-authorize) the connection. The CAS SP may send back information to the WTRU. During pre-authorization, the second access network may provide a shared secret to the CAS SP (e.g., CAS provider). The CAS SP, may forward the shared secret to the WTRU. The WTRU may connect to the second access network using the shared secret. If the second access network is in use for an application Session, the CAS provider may authorize a session with the second AN.

Figure 26A:
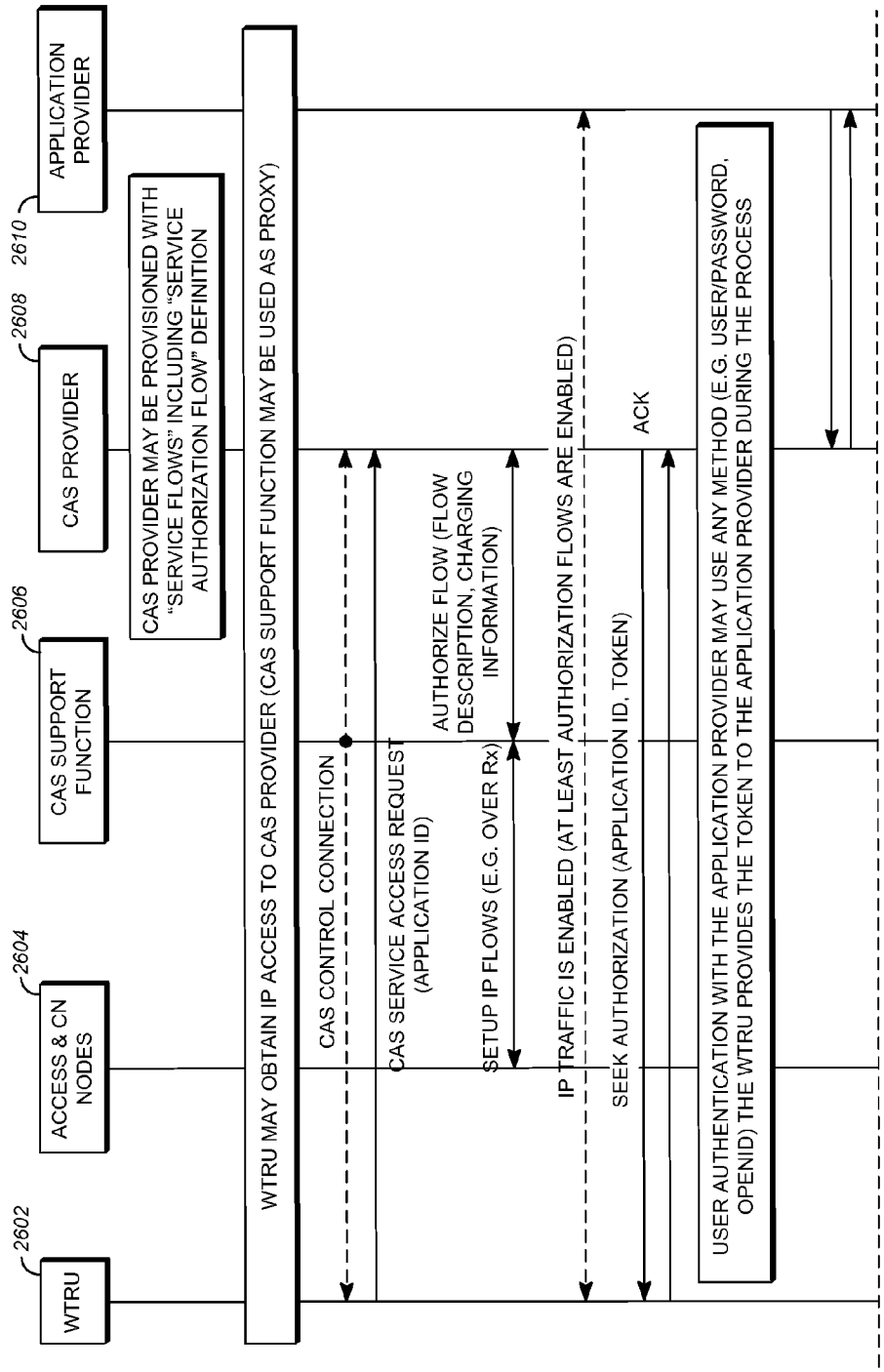
FIG. 26 (FIGS. 26A and 26B) illustrates an example of a phase of service access, e.g., where the user is authorized by the application.
Figure 26B:
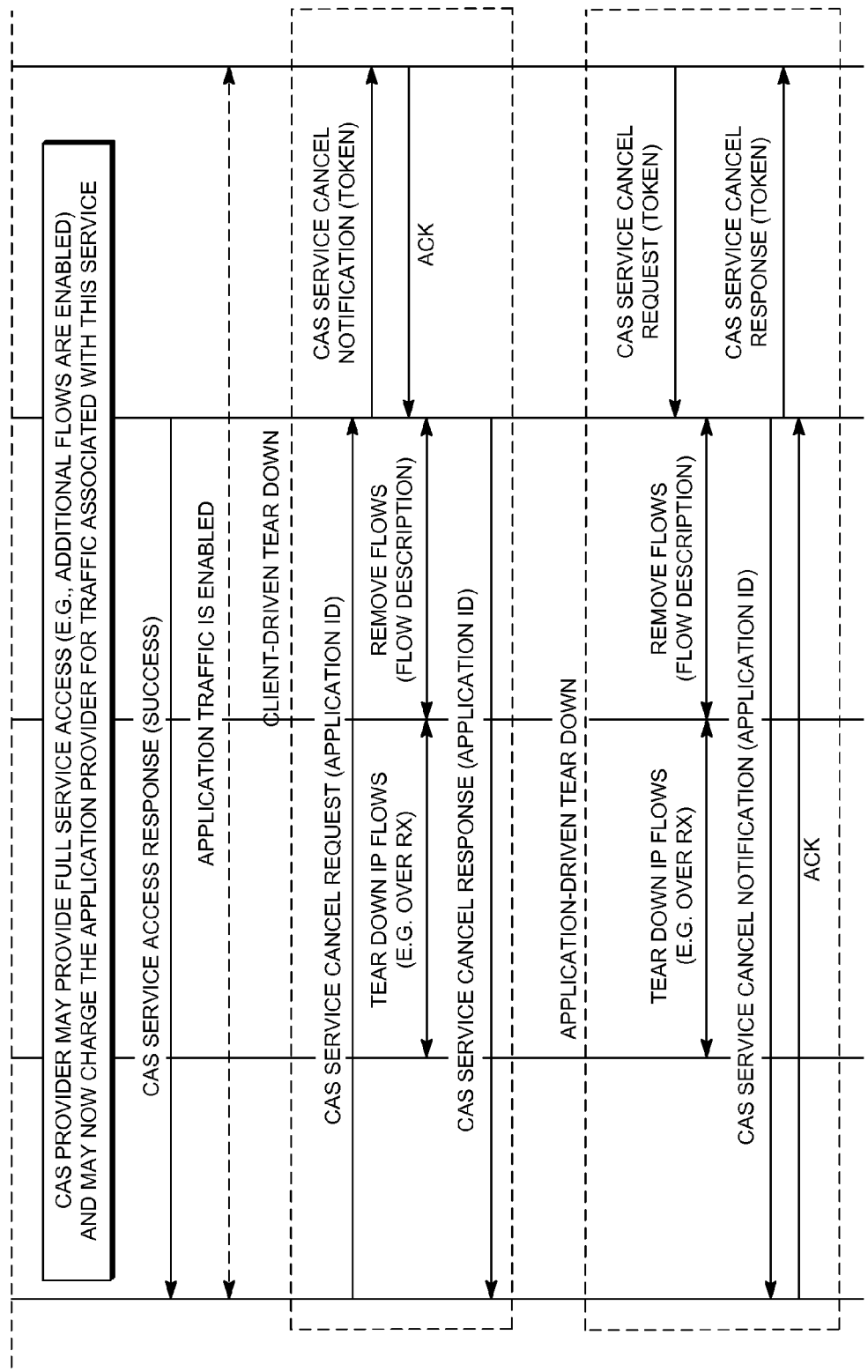

A second phase of service access may be provided. FIG. 26 illustrates an example phase of service access. The example phase of service access may include a WTRU 2602, one or more access & CN nodes 2604, a CAS support function 2606, a CAS provider 2608, and/or an application provider 2610. In the example phase of service access, the application may authorize the application. As illustrated in FIG. 26, the WTRU 2602 may have limited connectivity. The WTRU 2602 may use the limited connectivity to request a service access to the CAS provider 2608. The application provider 2610 may include one or more (e.g., two) options for granularity. For example, the application provider 2610 may authorize the CAS provider 2608 to provide service access in bulk (e.g., to each of the devices requesting it). The application provider 2610 may authorize each access individually, as illustrated in FIG. 26. The access in bulk may be deduced from an individual access (e.g., in the service access in bulk case, the CAS provider 2608 may directly enable service flows upon request by the WTRU 2602). There may be no communication between the CAS provider 2608 and the application provider 2610.

As illustrated in FIG. 26, The CAS provider 2608 may include an agreement with the application provider 2610. As part of the agreement, a set of flows may be defined as application flows. The set of flows may include each of the flows to the DNS domain of the application provider 2610. A restricted set of flows may be defined for user login (e.g., service authorization flows or login flows). Defining the restricted set of flows may limit network resource usage by unauthorized WTRUs (e.g., at the cost of the CAS provider 2608). The WTRU 2602 may obtain limited IP connectivity, as described herein. The WTRU 2602 may have connectivity to the CAS provider 2608 and/or the CAS support Function 2606. As illustrated in FIG. 26, a control connection may be between the WTRU 2602 and the CAS provider 2608. The control connection may pass through the CAS support Function 2606 (e.g., as a proxy or relay). The control connection may be between the WTRU 2602 and the CAS support Function 2606. The CAS support Function 2606 may take decisions on behalf of the CAS provider 2608.

The WTRU 2602 may send a CAS service Access Request to the CAS provider 2608 and/or the CAS support Function 2606, as described herein. The CAS service access request may include an application ID. The CAS provider 2608 may authorize one or more service authorization flows (e.g., a service login). The CAS provider 2608 may authorize one or more full service flows. The CAS provider 2608 may send a message describing the flows (e.g., with 5-tuple), charging information (e.g., charging code or session ID), and/or QoS (e.g., for login best effort). Upon reception, the CAS service provider 2608 may use one or more procedures (e.g., existing procedures) over Rx to authorize the one or more service authorization and/or full service flow(s).

To enable granular authorization and accounting, the application provider 2610, the WTRU 2602, and/or the CAS provider 2608 may agree on a common identity for a session. The CAS provider 2608 may generate a token (e.g., a random string). The CAS provider 2608 may send the token to the WTRU 2602. The CAS provider 2608 may inform the WTRU 2602 that it may initiate user authentication with the application service. The token may be omitted. The token may be omitted if the CAS provider 2608 and the application provider 2610 share a unique ID for the user (e.g., if the username is known to the CAS provider 2608). The WTRU 2602 may perform a user authentication and/or authorization procedure with the application provider 2610. The WTRU 2602 may send the token in the authentication and/or authorization procedure. A method of authentication may be used. For example, the WTRU 2602 may login using username@token as the username or the WTRU 2602 may access a login page with http://URL#token. The application provider 2610 may notify the CAS provider 2608 that the authorization is granted. The token may be passed as an identifier. As described herein, the token may be replaced by a shared ID (e.g., a username). The CAS provider 2608 may authorize one or more application flows. The message flow may be similar to the one or more service authorization flows (e.g., only change is actual flow description) as described herein. The CAS provider 2608 may start charging (e.g., internally) the application provider 2610. The CAS provider 2608 may update an internal state with one or more charging records associating traffic over the application flows with a token and an application ID. The CAS provider 2608 may send a CAS service Access Response to the WTRU 2602. The CAS service access response may indicate that access to the application is granted and/or the application session may proceed. The WTRU 2602 and/or the application may cancel the session (e.g., after the user logs out of the service). A CAS service Cancel Request (e.g., a new CAS service Cancel Request) control message may be sent by the WTRU 2602 and/or the application to the CAS provider ID. The CAS provider 2608 may send a Remove Flows message to the CAS support Function 2606. The CAS support function 2606 may remove one or more flows based on the remove flows message.

The WTRU 2602 may have access to the CAS provider 2608 and/or the CAS support Function 2606 for control (e.g., even after a last flow from a last CAS application is terminated). The WTRU 2602 may request termination of the CAS connection to the CAS provider 2608 and/or the CAS support Function 2606. For example, the WTRU 2602 may send a Terminate CAS connection Request message to the CAS provider 2608 and/or the CAS support Function 2606. If the connection is not shared with another CAS provider, the CAS support Function 2606 may send a Terminate CAS connection message to an MME. The MME may initiate a network-initiated Detach.

The WTRU 2602 may initiate a WTRU-initiated Detach. The MME may send a CAS connection Terminated message to the CAS support Function 2606. Upon reception of the message, the CAS support Function 2606 may communicate the CAS connection termination to the CAS provider 2608.

Network resource usage control and/or reporting may be provided. An application provider may charge an end user for connectivity. The application provider may enable one or more entities (e.g., an, a SP, an AP) to charge each other. The access network may measure usage. The measured usage may be associated with an ability to provide one or more levels of service (e.g., differentiated levels of service).

One or more reasons for charging may be provided. The one or more reasons may include a network usage for CAS, a discovery, and/or one or more connection attempts. In network usage for CAS, a charging chain may include from an to a SP, from a SP to an AP, and/or from an AP to an end user. Charging may start when a user is authorized by an application. The information for charging may be communicated at or before an authorization grant. The charging information may include one or more charging codes, one or more parts of charging codes, class of service, and/or the like.

An access network may transport a discovery request and/or a discovery response between a WTRU and a CAS provider. The AN may charge the CAS provider for the discovery request and/or the discovery response. An access network may charge the CAS provider for a failed connection attempt.

Discovery and/or connection attempts charging may be implemented (e.g., by counting and reporting events or bytes to the CAS provider). In the network usage charging use case, tracking and charging may be enabled through one or more streams of information.

Figure 27:
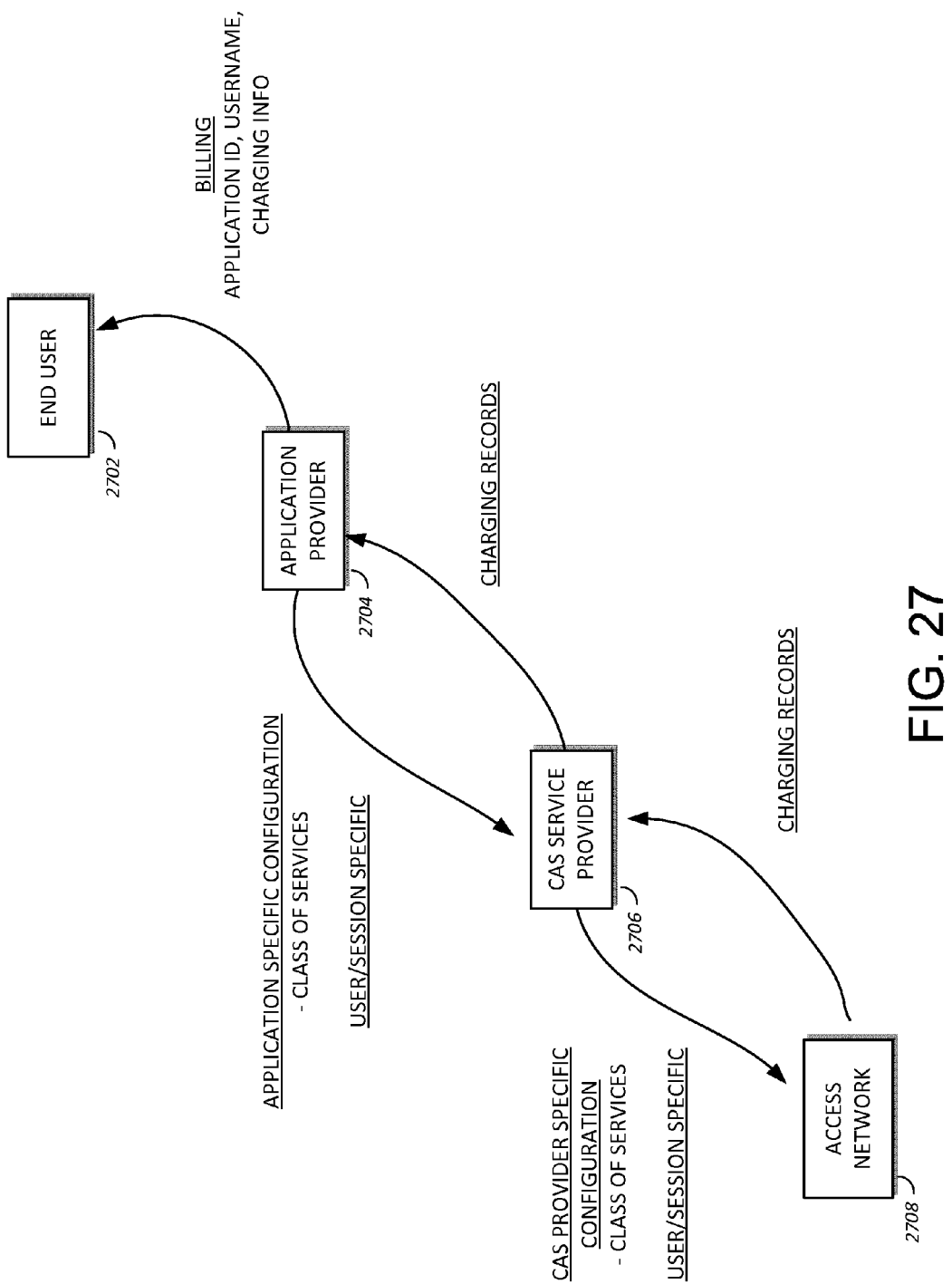
FIG. 27 illustrates an example of flows of policies and charging records.

FIG. 27 illustrates example flows of policies and charging records. For example, a stream may go from an application provider 2704 to a CAS provider 2706 to an access network 2708. The application provider 2704 may send billing information to an end user 2702. The information carried by the stream may depend on a desired granularity of the charging records. The information provided by the AP 2704 to the CAS SP 2706 may be a higher level than information provided by the CAS SP 2706 to the AN 2708. The higher level information may include examples of application specific configuration and/or examples of user and session specific information. The examples of application specific configuration may include a class of services definition. The class of services definition may include a class of service ID, a flows identification, an associated level of services, one or more charging codes, and/or one or more related policies. The examples of user and session specific information may include an identification of the type and/or level of service for the end user 2702 (e.g., a class of service ID), charging related information (e.g., one or more charging codes specific to that user), and/or other information (e.g., limitations and/or quotas).

A second stream may go from the AN 2708 to the CAS SP 2706 to the AP 2704. The second stream may transmit charging records. The second stream may be carried online (e.g., over one or more defined interfaces between the AN 2708 and the CAS SP 2706, and/or between the CAS SP 2706 and the AP 2704). The second stream may be sent over another type of interface. Reporting may be real time or periodic. A system may be defined where information elements are known to one or more entities. The information elements may include one or more usernames, one or more application IDs, and/or one or more device IDs. The end user 2702, the AP 2704, and/or the CAS SP 2706 may have an interest in limiting a spread of the information elements. To limit the spread of the information elements, one or more communicating entities may agree on using one or more temporary IDs specific to a session. The one or more temporary IDs may include charging codes specific to the session. The user or device specific information (e.g., the information elements) may be sent (e.g., passed downward) in association with a specific session.

Aggregated reporting and/or charging may be provided (e.g., to report granularity). An application may charge one or more end users for a service usage (e.g., a fixed amount, per-volume, per-time, etc.). The application may consider an access cost to be a part of a service cost. The CAS service provider may report aggregated charging records to an AP. The AN may report aggregated charging records to the CAS provider. Aggregated reporting and/or charging may not enable itemized billing for access costs.

Itemized reporting and/or charging may be provided (e.g., to report granularity). An application may itemize user billing. For example, one or more classes of service supported by the application may be presented separately on a bill. Individual sessions may be itemized. The itemized individual sessions may include information on the device used, information on the access network(s) used, and/or other parameters such as Quality of Experience measurements. The itemized individual session information may be useful for analyzing and/or optimizing network usage. Reporting and/or charging records may refer to individual users, individual sessions, individual class of service, and/or other parameters enabling detailed itemization to the end user. As described herein, some reporting and/or charging records information may be sensitive and may be replaced by a temporary ID (e.g., handle) agreed between parties SP-AP and AN-SP.

When the WTRU is authorized for access, a network resource usage control may be enabled through a policy obtained by the AN from the CAS provider. The CAS provider and/or the application provider may control resource allocation online.

Figure 28A:
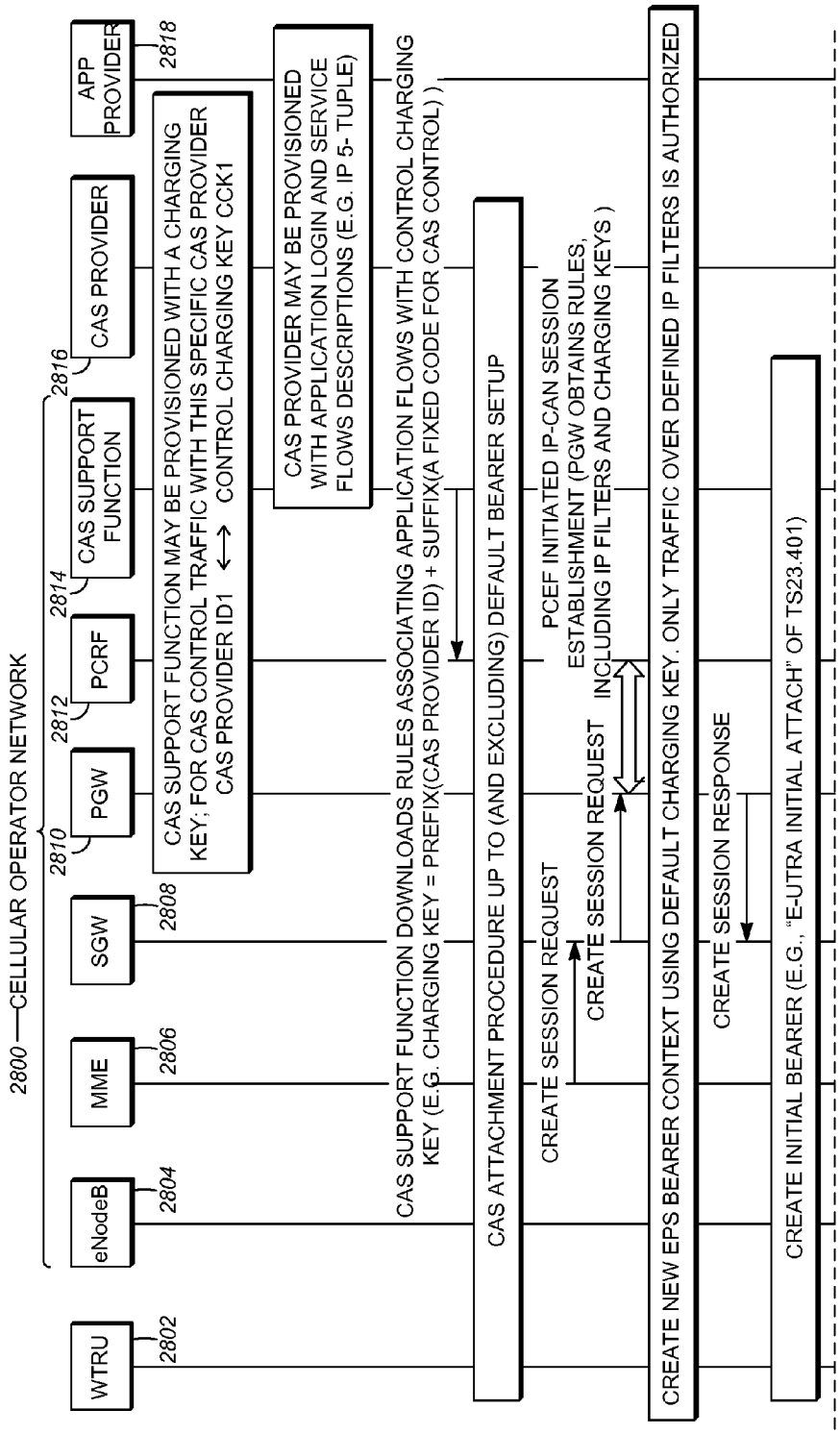
FIG. 28 (FIG. 28A and FIG. 28B) illustrates an example of how itemized charging (e.g., T2) may be enabled in a CAS-aware cellular network.
Figure 28B:
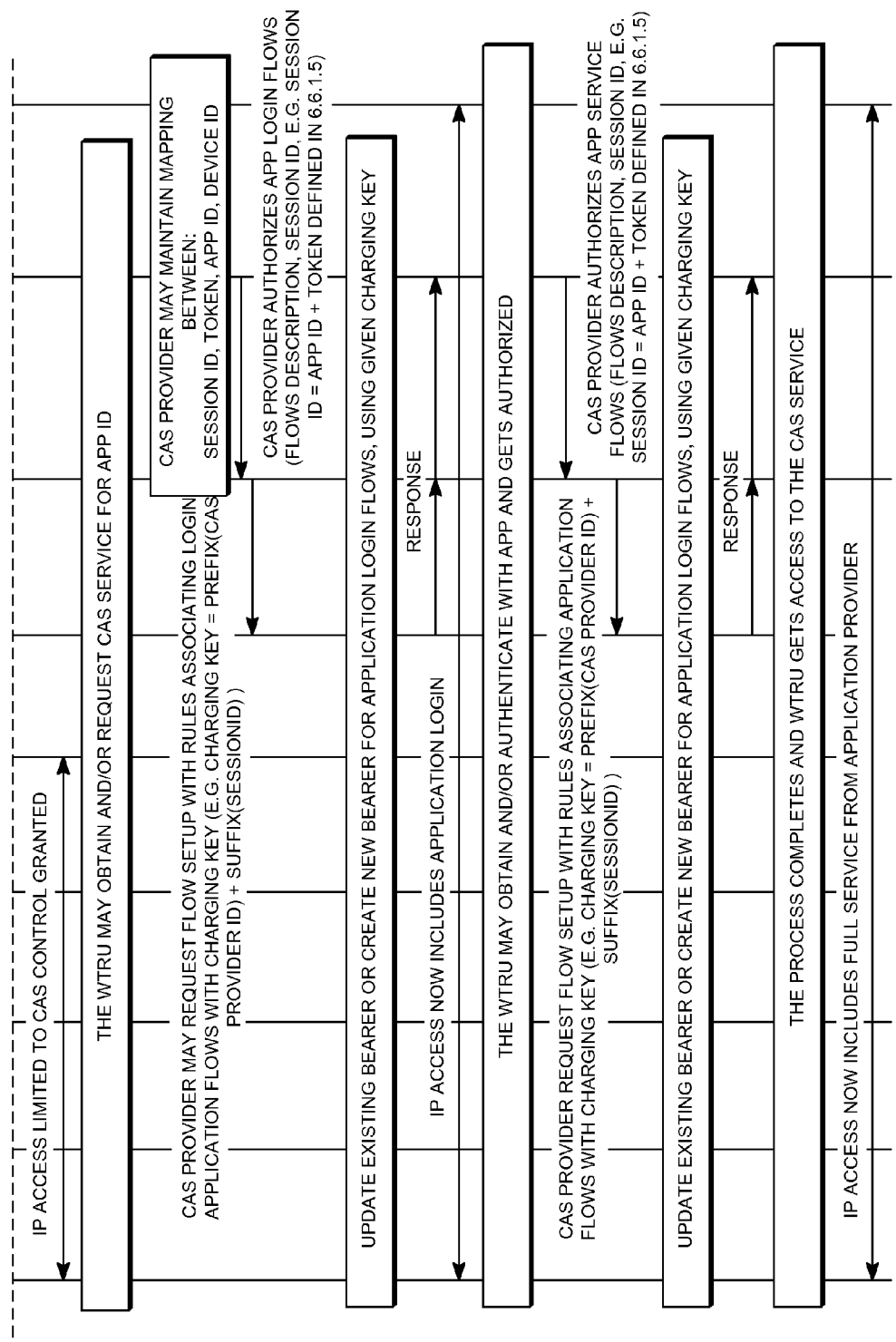

FIG. 28 illustrates an example of enabling itemized charging in a CAS-aware cellular network 2800. The example of enabling itemized charging may include a WTRU 2802, a cellular operator network 2800, a CAS provider 2816, and an application provider 2818. The cellular operator network 2800 may include an eNodeB 2804, a MME 2806, a SGW 2808, a PGW 2810, a PCRF 2812, and a CAS support function 2814. As illustrated in FIG. 28, the cellular operator network 2800 (e.g., MNO) may have a CAS agreement with a CAS provider 2816. The cellular operator network 2800 may create a charging key. The charging key may be used to control traffic for the CAS provider 2816. The charging key may include a prefix obtained from the CAS provider ID concatenated with a suffix that may be a fixed code meaning Control Traffic. The prefix may include the CAS provider ID. The CAS control traffic to and/or from the WTRU 2802 may be aggregated. The CAS control traffic may be itemized. Itemizing the CAS control traffic may include appending a Device ID or another ID to the charging key.

The CAS provider 2816 may include a description of an application login and/or one or more service flows. The description may be provided and/or updated by an application provider time. The application provider 2818 may send a WTRU specific service flow definition. The WTRU specific service flow definition may be sent dynamically after login. The CAS support Function 2814 may configure the PCRF 2812 with one or more rules enabling CAS control. The WTRU 2802 may attach to the cellular operator network 2800 as described herein. The MME 2806 may send a Create Session Request. The Create Session Request may reach the SGW 2808 and/or the PGW 2810. The PGW 2810 may initiate an IP-CAN session establishment. The PGW 2810 may obtain one or more IP filters and/or the CAS Control charging key described herein.

For non-CAS cellular networks, one or more default bearers may be associated with a traffic flow template (TFT) (e.g., depending on subscriber data). The default bearers may include a TFT (e.g., to support CAS). As illustrated in FIG. 28, the TFT may include one or more filters that may enable an initial connection to the CAS support Function 2814 and/or the CAS provider 2816. The TFT may be updated to enable connection to the application. Temporary subscription information may be created in a HSS and may be configured to associate one or more packet filters to the default bearer. An initial bearer may be created as described herein. The WTRU 2802 may have an IP access limited to a CAS Control. CAS control traffic may be charged to the CAS provider 2816. The CAS provider 2816 may not charge (e.g., may not directly charge) the application provider 2818 for the CAS control traffic.

The WTRU 2802 may request a CAS service for an application, as described herein. The CAS provider 2816 may generate a token. The token may describe (e.g., uniquely describe) a session between the WTRU 2802 and the application. The CAS provider 2816 may maintain mapping information (e.g., to enable charging of application login traffic to the application). The mapping information may include a token-application ID. The CAS provider 2816 may determine that the login traffic is control traffic and may not charge the application provider 2818 for the login traffic. A second charging key may be used for login traffic.

The CAS provider 2816 may include a session ID and/or an App login flow(s) description in a message authorizing App login. The session ID may be mapped to the device ID, the App ID, and/or the token. The session ID may be configured as a function of device ID/App ID/token, as a counter, randomly, and/or the like. For example, the session ID may be a concatenation of the App ID and the token. The CAS support Function 2814 may set up a flow (e.g., a new flow) with the PCRF 2812. The flow may be over an Rx interface. A bearer update or creation may be performed as described herein. The WTRU 2802 may access an application login interface. The WTRU 2802 may perform authentication and/or authorization with the application, as described herein. The CAS provider 2816 may add one or more flows (e.g., new flows) to enable full service access to the application. The WTRU 2802 may then access the service.

Figure 29:
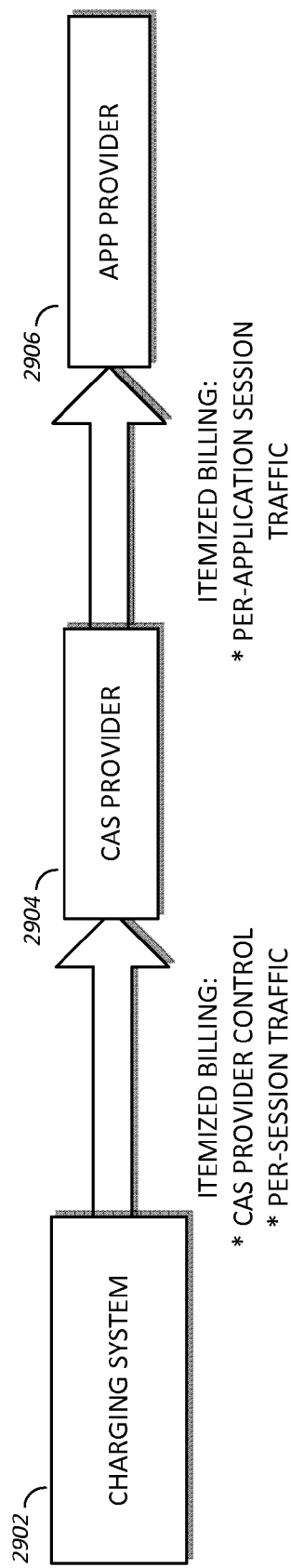
FIG. 29 illustrates an example of itemized billing.

FIG. 29 illustrates an example of itemized billing. As described herein, Flow Based Charging (FBC) may be used by cellular networks to itemize charging on a per-flow basis rather than on a per-bearer basis. FBC may include a charging system 2902, a CAS provider 2904, and an application provider 2906. The charging system 2902 may include an MNO charging system, a PLMN charging system, or the like. The charging system 2902 may send CAS provider control information and/or per-session traffic information to the CAS provider 2904. The CAS provider 2904 may send per-application session traffic information to the application provider 2906. A charging per-bearer basis may still be used. For example, when a single or a small number of CAS applications running at the same time, different bearers may be allocated to flows related to an application. As the number of concurrent applications grows and the number of different QoS for different flows of a given application grows, FBC may be more efficient than a charging per-bearer. Different bearers may be used for different QoS and/or PDN connections. A bearer may carry traffic to and/or from different CAS applications.

A charging Key may be mapped in OCS and/or OCFS. One or more charging keys may be generated without using a CAS provider ID, an App ID. A mapping of the one or more charging keys may be maintained. For example, an interface between a CAS support Function and a PLMN charging system (e.g., an OCS and/or an OFCS) may be used by the CAS support Function to send mapping information between a charging key and the CAS provider ID and/or Session ID (e.g., a token) provided by the CAS provider.

Sponsored Data Connectivity may be provided. A CAS provider ID may be registered as a sponsor. The CAS support Function may mention the CAS provider as sponsor in Rx messages when setting up or modifying flows. The sponsor information may be propagated to PGW and/or into charging records (e.g., as per the Sponsored Data Connectivity feature). The CAS provider ID may be transported in a separate information element (e.g., not part of the charging key).

Pre-Provisioning (e.g., bootstrapping) may be provided. As described herein, data may be present on the WTRU to enable CAS connectivity. The data may include data at the application layer (e.g., a URL of the service, a username, etc.). The data may include data at the CAS layer (e.g., a device ID, a shared secret enabling connectivity through access networks, one or more scanning frequencies, one or more network IDs, etc.). Different strategies may be available for provisioning of the data. The strategies may be used concurrently with different applications and/or CAS providers for a given WTRU.

Pre-provisioning of CAS provider and application data may be provided. CAS provider Data may be provided in a controlled setting. CAS provider Data may be provisioned on a WTRU, a SIM, and/or in the CAS provider's network. The CAS provider data may be updated during a connection. The CAS provider may be known ahead of time. CAS provider data may be used for single CAS provider devices.

Storage of an USIM may follow various patterns. Several providers may own the USIM or several USIMs. A single provider may own the USIM. The WTRU may be restricted to a single CAS provider. A USIM owner (e.g., a CAS provider, a cellular network operator, etc.) may secure an access to the USIM to other CAS providers.

CAS application Data may be provided. An application may be installed on a WTRU in a controlled setting. Initial signup data may be generated and installed on the WTRU. Initial signup data may be used for an initial login of the end user. Initial signup data may remain hidden from the end user (e.g., Apple® may install a CAS App Store application, which may be free to use). Each of the installed applications may be known ahead of time. CAS application data may be used for single purpose devices or to enable a central functionality such as an application store.

Dynamic provisioning of a CAS provider and application data may be provided. A procedure may be executed between a WTRU and a CAS provider. During the procedure, CAS provider data may be generated and provisioned on the WTRU and/or the CAS provider. Dynamic provisioning of CAS provider data may be used in an open model with one or more potential CAS providers. Dynamic provisioning of CAS provider data may be triggered when an application (e.g., a new application) is installed, run the first time, and/or run in a context where other (e.g., known) CAS providers may not be used. The dynamic provisioning of CAS provider data may occur over a pre-existing connection (e.g., either CAS or non-CAS). A dedicated connection may be used for the dynamic provisioning of CAS provider data. The dedicated connection may establish an initial secure connection through an access network (e.g., may require an identification of the device such as IMEI in signaling, since there is no device ID yet). Over-the-air update of USIM data with the CAS provider data or CAS application data may be enabled through a service provider that owns the USIM. The SP may have control over WTRU usage. The SP may be an identity provider (e.g., as opposed to a CAS provider).

After the device purchase, the end user may install a CAS application (e.g., a new CAS application). As described herein, the initial signup may occur over another CAS-enabled or non-CAS-enabled connectivity (e.g., using an App Store connectivity or using a legacy network plan). The initial signup may occur through a CAS connection (e.g., a new CAS connection) dedicated to the application.

As part of the smart connectivity and mobility service (SCMS), application based connectivity (ABC) may enable an application to use a library and/or an API to enable connectivity for the application through a Wi-Fi network (e.g., an exclusive Wi-Fi network). There may be a first component in the network and a second component on the client device. The first component and the second component may take the form of a service or may be more tightly integrated with the mobile application, application based connectivity (ABC) support may include an application that may provide a user and/or application with transparent access to one or more networks (e.g., exclusive networks, such as a private Wi-Fi network). ABC support may include a library that may encapsulate services to manage one or more network connections for the application (e.g., scanning, connecting, authentication, maintaining App QoE, etc.).

Figure 30:
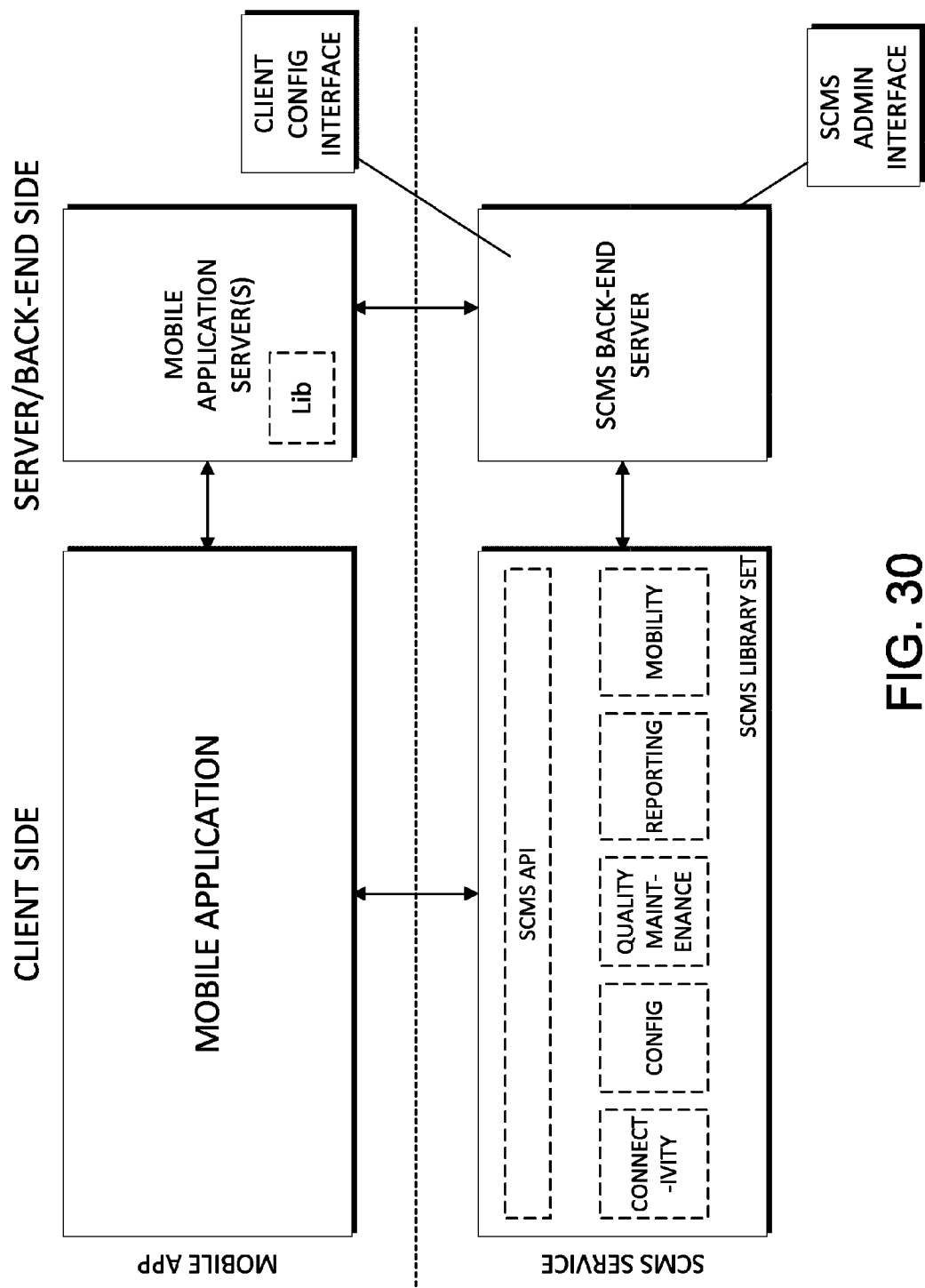
FIG. 30 illustrates an example of deployment model as a service.

FIG. 30 illustrates an example deployment model option as a service. SCMS may improve an application based connectivity (ABC) and/or an application based mobility (ABM). ABC support may include providing a user and/or application with transparent access to networks (e.g., a private Wi-Fi). ABC support may include providing logic to ensure that a selected application (e.g., only the selected application) may access the network. ABC support may include providing logic to ensure that a connection is established when an application is started and/or disconnected when the application is stopped.

Figure 31:
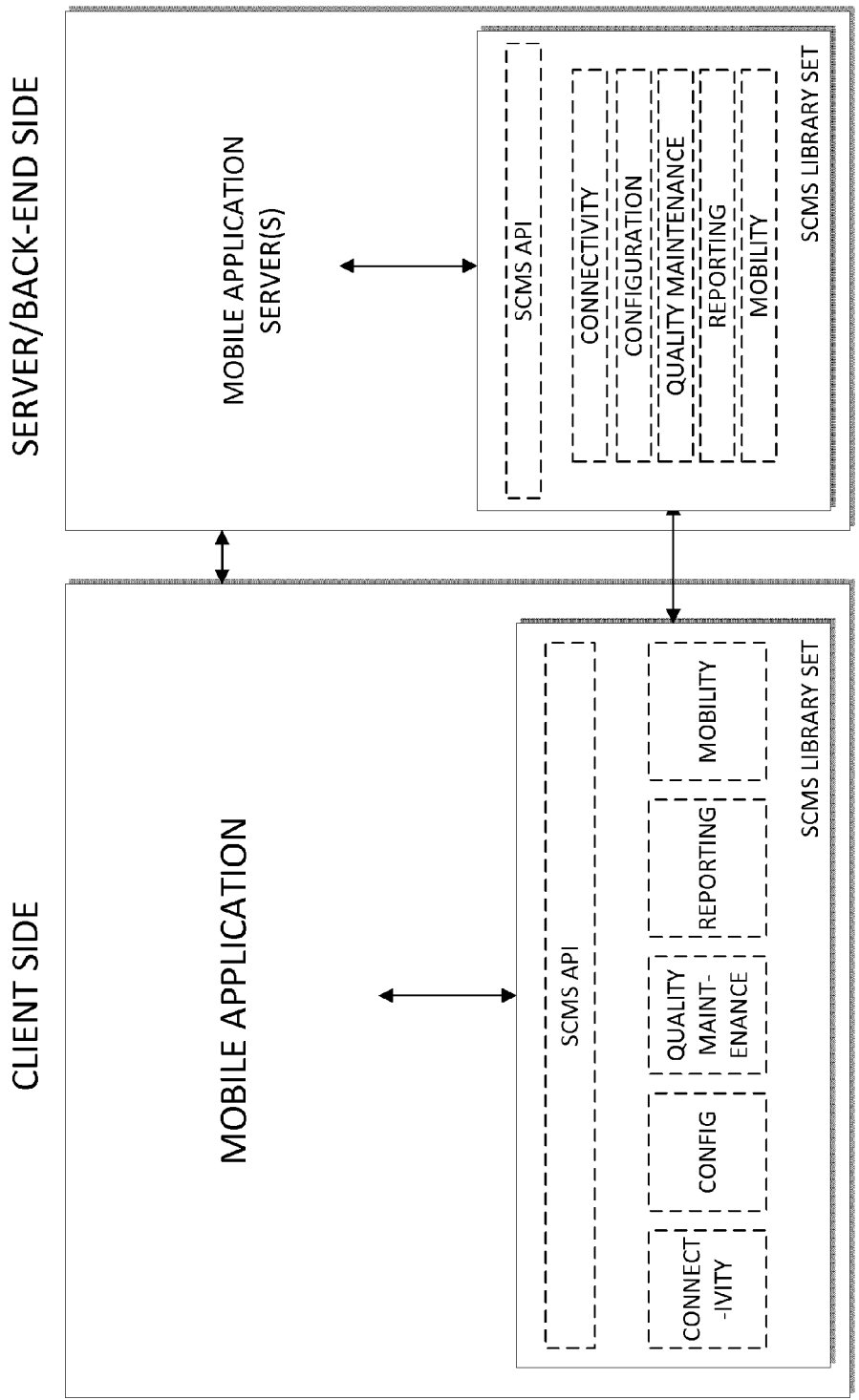
FIG. 31 illustrates an example of deployment model as a library.

FIG. 31 illustrates an example deployment model option as a library. An SCMS Library Set may include one or more services to manage network connections for the application (e.g., scanning, connecting, authentication, maintaining app QoE, and/or other criteria). An SCMS Library Set may include one or more procedures to prevent a background application from gaining network access.

With reference to FIGS. 5 and 6, with SCMS, network support may not be required (e.g., not include middle anchor points). An SCMS ABC Service Maps architecture may provide that a SCMS Service and a CAS service are equivalent (e.g., SCMS may include a particular implementation of the CAS concept when the application provider acts as its own CAS provider). An interface between a service and an application in SCMS may correspond to a CAS Control Protocol Interface C1 in the network, as described herein. An interface between a service and an application in SCMS may correspond to a CAS Control API in the WTRU, as described herein. A socket interface for SCMS may correspond to a CAS Control Protocol Interface C2 in the network, as described herein. A socket interface for SCMS may correspond to a CAS socket API in the WTRU, as described herein. A CAS client may include ABC functionality, as described herein.

With ABC, the support for connectivity using a form of secure shared secret (e.g., cellular networks) may not be enabled. If the application is installed, the end user may get access to the network. A mechanism for end users to be authorized by the application provider may require network attachment. Other applications may use network resources as long as the ABC application is running. Discovery may be based on one or more network IDs such as SSIDs preconfigured on the device. Expanding the support to other networks (e.g., new networks) may require updating some information on the device.

Figure 32:
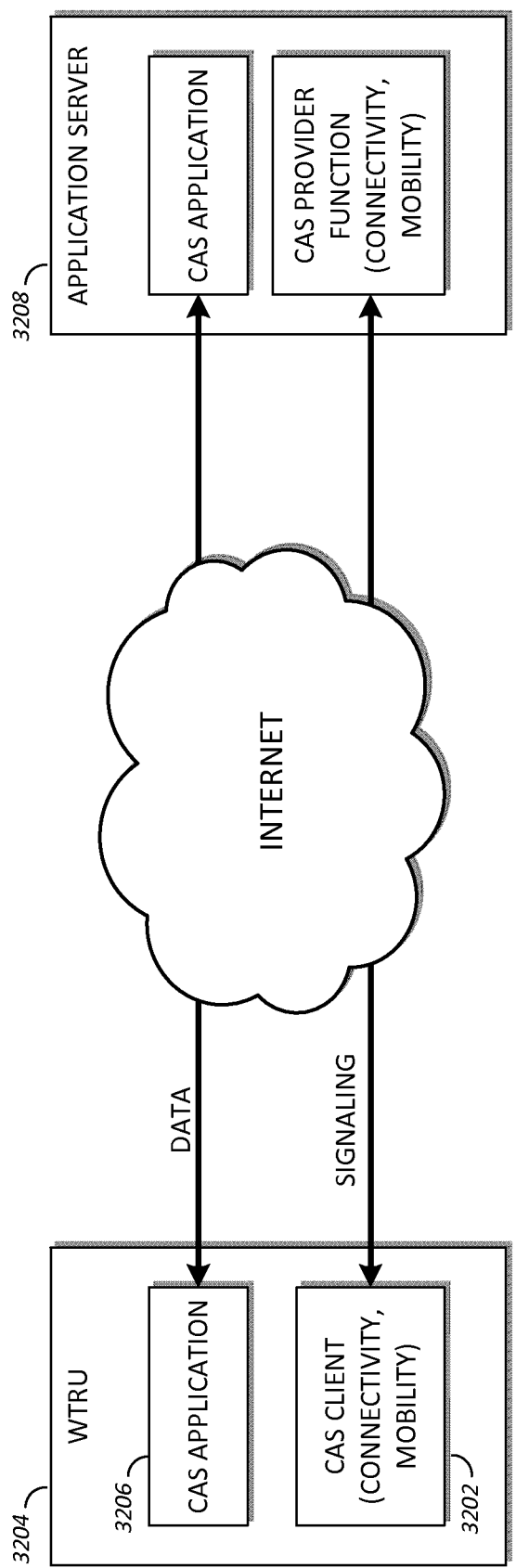
FIG. 32 is a diagram illustrating an example of a system for a connectivity augmented service (CAS) application.

FIG. 32 is a diagram illustrating an example of a system for a CAS application. The system illustrated in FIG. 32 may be used for handover (HO), IP flow mobility and seamless offload (IFOM), and/or bandwidth aggregation (BWA). The system of FIG. 32 may be used for traffic redirection and/or mobility features, e.g., inter-unit transfer (IUT). Bandwidth Management (BWM) functionality may be handled at the application level. Such bandwidth management may be referred to as application based mobility (ABM). The application may be CAS-facilitated, e.g., connectivity services in the network may be handled by a CAS provider. The CAS provider may have agreement(s) with access network providers and application providers.

As illustrated in FIG. 32, a CAS client 3202 may be installed on a WTRU 3204. For example, the CAS client 3202 may be installed within the CAS application 3206 or as a separate service as described herein. The application on the WTRU 3204 may exchange data with the remote CAS application server 3208, e.g., as described herein. As illustrated, the connectivity and/or the mobility may be handled at the CAS layer.

The support of BWM may be handled at the application level (e.g., using application-based mobility). Such application based BWM may be illustrated, for example, using an SCMS that may be extended by adding the support of ABM). Context-aware algorithms that may be used to handle BWM may be provided. IUT support at the application level may be enabled.

BWM may be handled at the application level. For example, a CAS service in an application server running in a network may handle the BWM in concert with the CAS service in the application. The application may be running on the WTRU. The application may use one or more access networks. For example, the application may use the one or more access networks simultaneously. The multiple connections may be created between the WTRU and the application server, e.g., using different access networks.

BWM may be handled by selecting the source IP address on the WTRU (e.g., in the uplink (UL) direction) and the destination IP address on the application server (e.g., in the downlink (DL) direction). Since BWM is handled at the application level, no anchor point may be needed in the network. It may be assumed that a different and/or same IP address may be obtained on each interface of a WTRU. Multiple IP addresses may be obtained on the same interface of a WTRU.

A need for an additional connection for an application may be detected and/or evaluated on the network side or on the WTRU side. A mobility functionality running on a WTRU and in the application server may communicate using messages that may be sent with the data packets, e.g., using specific control messages over the same and/or different connections or piggybacked with data packets. The application may not implement such mobility handling functionality, since the CAS client & CAS provider may implement the mobility handling functionality.

For example, congestion may be detected on the connection so that an additional connection (e.g., a new connection) may be established and the traffic may be split over two connections (e.g., IFOM or BWA techniques may be applied). The CAS client may initiate establishment of the connection. The CAS client may receive a request from the CAS provider or may determine by itself that a new connection is needed. The CAS client and CAS provider may exchange one or more messages, e.g., to trigger the termination of a connection, to configure BWM rules, or to get and/or send measurements and/or information related to a specific connection. Examples of messages that may be exchanged may include one or more of configuration messages, measurement reports, new connection establishment request messages, or terminate connection request messages. Configuration messages may include one or more of BWM handler (e.g., network and/or WTRU side) messages, BWM feature to apply, (e.g., HO. IFOM, BWA) messages, BWM rules messages (e.g., uplink following downlink (for IFOM), ratio per connection (for BWA)), or measurement reports messages (link monitoring), e.g., on/off, interval)). The new connection establishment request may include messages from network side to WTRU. The terminate connection request may include messages from network side to WTRU.

Data packets in UL and/or DL directions may be sent using one or more of the available connections for an application. The same distribution rules may be used on either sides or different ones may be used. The client and server sides may agree on the BWM rules to be applied by exchanging configuration messages or by pushing the rules in some way to the other side (e.g., via an external policy handler like ANDSF server, PCRF).

On the WTRU side, the CAS client may decide the connection on which each IP packet may be sent, e.g., sent based on the BWM rules. The source IP address and the outgoing interface may be selected for each packet. BWM rules may be applied by the CAS provider on the application server for each IP packet. In this case, the destination IP address may be selected.

Figure 33:
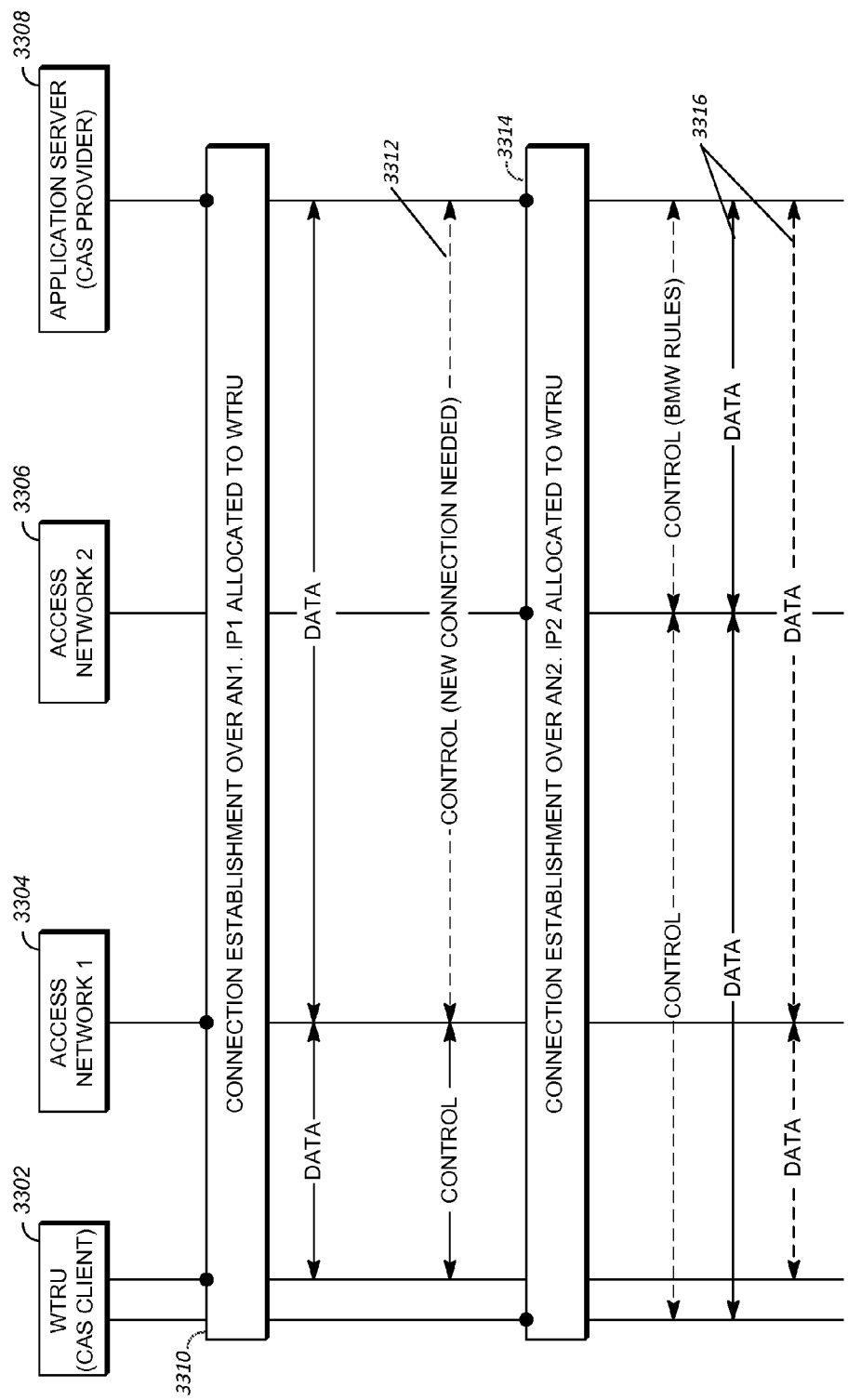
FIG. 33 illustrates an example of applying bandwidth management (BWM) at the application level.

FIG. 33 illustrates an example of applying BWM at the application level. As illustrated in FIG. 33, a CAS-enabled application may be started on WTRU 3302. The WTRU may perform access network discovery. The WTRU 3302 may select the first access network 3304. At 3310, the WTRU may establish a connection with the application server 3308.

The WTRU 3302 may exchange application data with the application server 3308. Over time, for example, based on a condition, it may be determined that a new connection may be needed. For example, it may be determined that a new connection should be established because more bandwidth is needed, the link conditions are degrading, and/or or congestion is experienced in the existing connection. At 3312, the CAS client and CAS provider may exchange control messaging to trigger the establishment of a new connection.

As illustrated in FIG. 33, at 3314, the WTRU 3302 may initiate establishment of a new connection. The WTRU 3302 may perform access network discovery. This time, an access network other than AN1 3304 (e.g., AN2 3306) may be selected. The second connection may be established between the WTRU 3302 and the application server 3308.

BWM is applied on the WTRU side and/or the network side. One or more rules may be configured on the WTRU and/or the network side, e.g., using control messages. These control messages may be exchanged using either connection via AN1 3304 and/or AN2 3306. The WTRU 3302 may be the controller. The WTRU 3302 may configure one or more rules on the application server 3308. The application server 3308 may configure one or more rules on the WTRU 3302. Rules may be pre-configured or shared using other ways. At 3316 data traffic may be sent over the access networks AN2 3306 and/or AN1 3304. For example, the BWM may have triggered HO, IFOM or BWA feature.

Figure 34:
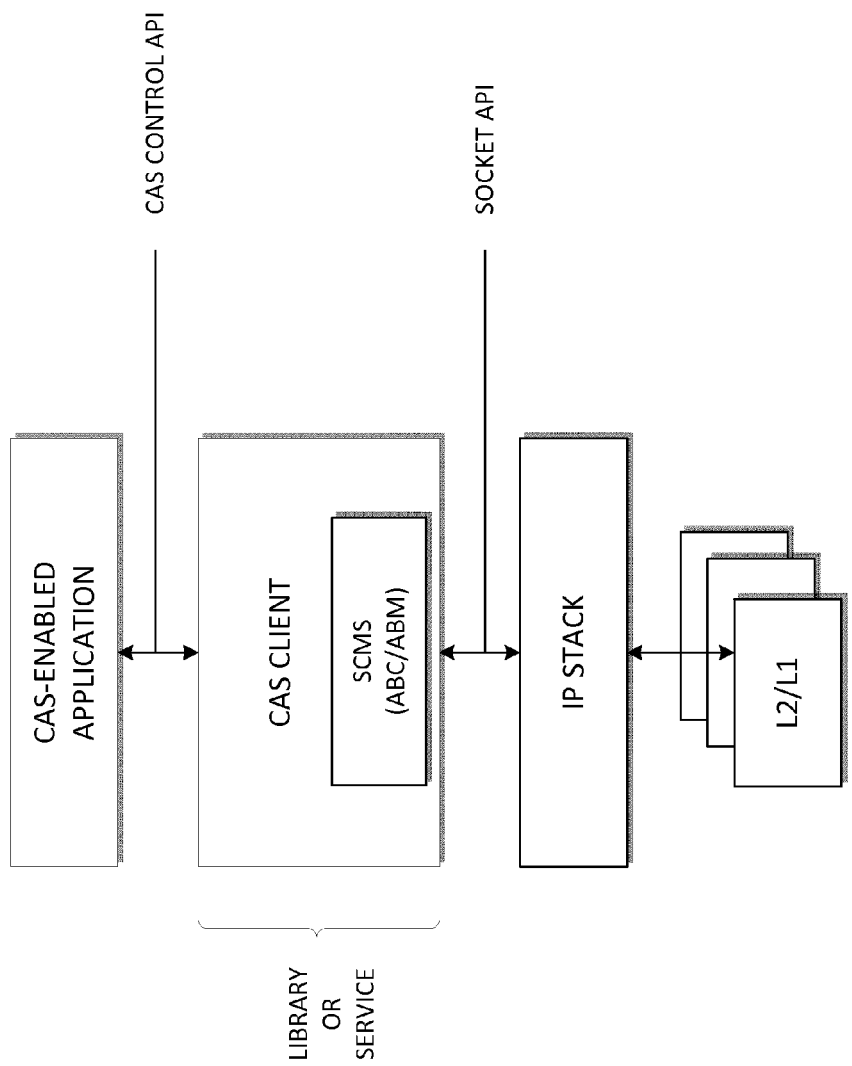
FIG. 34 is a diagram illustrating an example of internal WTRU architecture to support BWM at the application level.

FIG. 34 is a diagram illustrating an example of internal WTRU architecture to support BWM at the application level. As illustrated in FIG. 34, a CAS client running on the WTRU may support SCMS behavior. The SCMS may be used as a library. The SCMS may provide similar behavior, e.g., when SCMS is used as a service. The CAS client may perform access network discovery. The CAS client may select an access network. The access network may be selected, for example, depending on one or more of the application's needs, or policies. The CAS client may trigger the establishment of a connection for the application.

The CAS client may handle BWM. For example, the application may require additional bandwidth or the quality of the existing connection may degrade. The CAS client may trigger the access network discovery & selection and establish one or more connections (e.g., additional connections) to allow BWM to use the one or more multiple connections. The CAS client may not wait for connection degradation or the need for more bandwidth. The CAS client may trigger the establishment of multiple connections in advance in order to have the connections available when needed. An application using the connections may not be aware of the number of connections that may be established for its operation.

Figure 35:
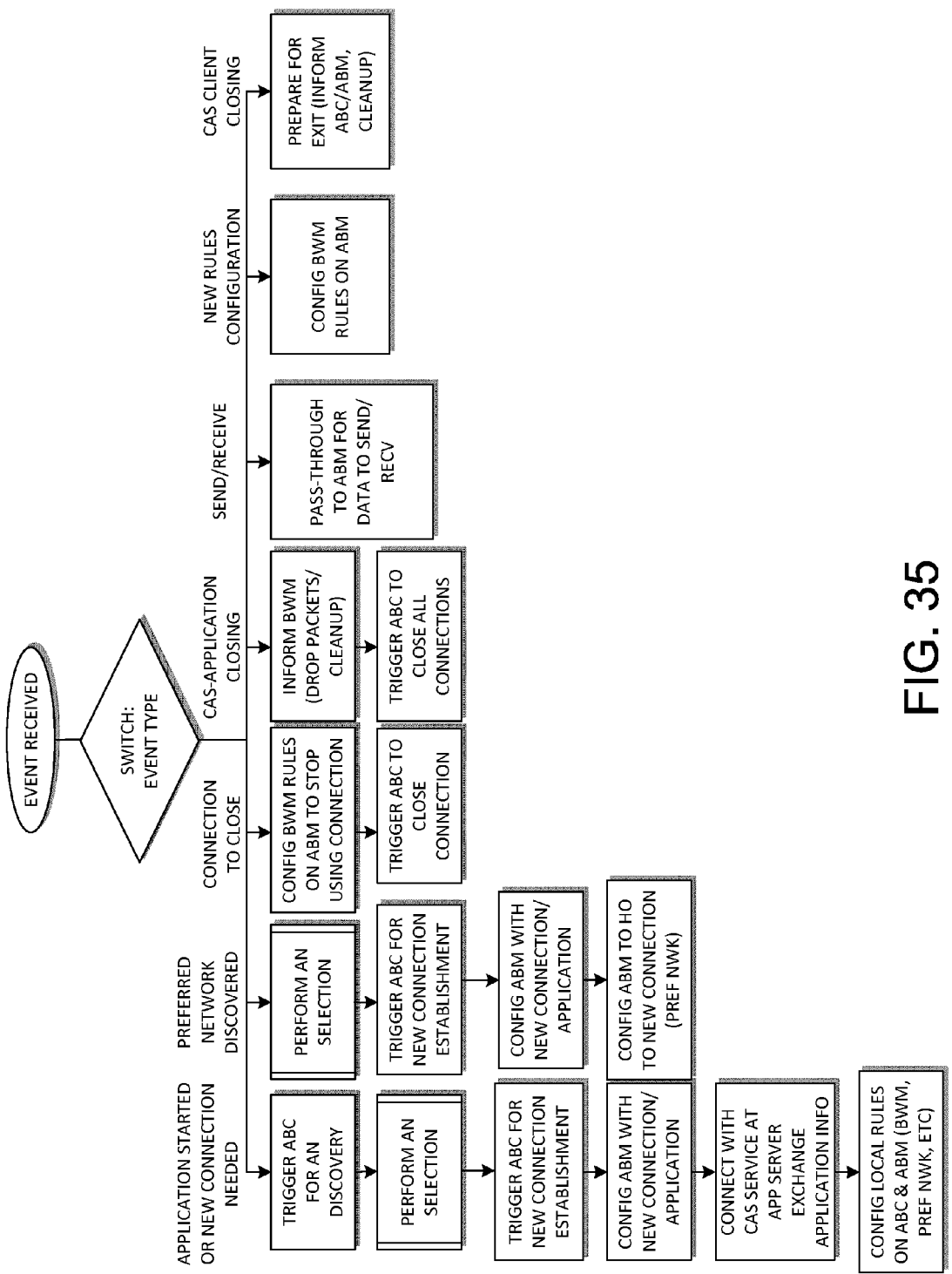
FIG. 35 is a diagram illustrating an example of the behavior of the CAS client that may be running on a WTRU.

FIG. 35 is a diagram illustrating an example of the behavior of the CAS client that may be running on a WTRU. The CAS client may interface with the CAS-enabled application running on the WTRU, e.g., to be informed when the application may start or stop. The CAS client may interface with the CAS-enabled application running on the WTRU, e.g., to report back a connection handler to be used for data transmission/reception. The CAS client may handle access network selection procedures and may be aware of the application configuration/profile. The CAS client may have access to local policies and/or rules (e.g., Universal Integrated Circuit Card (UICC), internal storage)). The CAS client may communicate with CAS service at the application provider/Server, e.g., to exchange information related to the connectivity-augmented services, For example, a CAS provider may provide an indication to the CAS client that the subscribed application usage is approaching a maximum allowed limit. The user may be prompted for a payment for the service to continue, or the service may be stopped and the application and/or the connections may be closed. The CAS provider may provide to the CAS service information including, for example, connection status (e.g., measurements), type of applications using the connection, etc. The CAS service may create BWM rules based on this information and configure the CAS client accordingly. The CAS client may implement application based connectivity (ABC) to perform access network discovery. The CAS client may use the results as an input for access network and CAS provider selection, for example, including continual scan for discovery even if a connection is already up), perform connection establishment/termination as needed, associate the application with the connection, and configure application specific rules (e.g., preferred network, required QoS, and the like). The CAS client may implement mobility (e.g., application based mobility (ABM)) to configure application specific BWM rules (e.g., BWM features, rules). The CAS client may use ABM to trigger additional connection establishment (e.g., for BWM), and/or termination (e.g., when the additional connections are not needed). The CAS client may use ABM to associate connections established for an application together and make them available for BWM handling, and/or manage data transmission/reception over the multiple interfaces to achieve the desired result (e.g., BW Aggregation, IFOM, etc.).

A server-application may provide BWM from an application provider's network side. A CAS service in the application server may provide one or more control functions, for example, to report a connection handler that may be used for data transmission/reception, to create BWM rules based on CAS client reports of connection status (e.g., measurements) to the CAS provider. CAS service may dynamically create BWM rules, create (e.g., dynamically create) BWM rules. The BWM rules may be based on connection status (e.g., measurements) obtained from the CAS client and/or on connection pricing that may be variable for each day/week, and/or other relevant variables. For example, the CAS provider may maximize the usage of the connections while minimizing the cost. If the CAS provider determines that a connection with AN1 is relatively inexpensive during part of a 24-hour period (e.g., at night), but expensive during a period (e.g., during day), and a connection with AN2 is inexpensive, the CAS service may create a rule where AN1 may be used at night and AN2 may be used during the day.

The CAS service may communicate with remote CAS client, for example, to exchange information related to connectivity-augmented services as described herein. The CAS client may be provided with an indication that the user is reaching its maximum allowed data usage. The user may be prompted with a payment to continue the service. In case no payment is received, an indication may be provided to stop application and close each of the active connections. The CAS provider may receive connections (e.g., measurements) from the CAS client. The CAS provider may use the measurement information to create BWM rules and configure the CAS client based on the BWM rules.

The CAS service may provide application based mobility (ABM). The CAS service may monitor the existing connections and/or link conditions. The CAS service may move flows and/or packets to another connection or a newly added connection, e.g., if the link conditions are degrading and/or bandwidth is not sufficient. The flows and/or packets may be distributed over the new connections, e.g., when at least one new connection is made available for the WTRU/application.

The CAS service may handle the data transmission/reception and may interface with application and IP stack to send and/or receive data. The CAS service may apply BWM rules over the available connections, per application (e.g., HO to preferred network, IFOM or BWA). The CAS service may implement algorithms to split the flows/packets over the available connections (e.g., IFOM with UL follows DL rules, BWA with 60%-40% split rule).

One or more CAS APIs may be provided, e.g., to support various functionalities on the CAS client and the CAS-enabled application on the application server. CAS client may provide one or more functions to the CAS application including, for example, CAS_AppStart (application_identifier), CAS_AppStop (application_identifier), CAS_Read (connection_identifier, buffer), CAS_Write (connection_identifier, buffer), etc.

The application_identifier in the CAS_AppStart (application_identifier) may be the number that may be used to identify (e.g., uniquely identify) the application. The CAS_AppStart (application_identifier) may be used to retrieve information application specific information provisioned on the WTRU and needed for AN and CAS provider selection and during connection establishment procedure. This API may be called by the CAS application when it starts. The CAS client may be used to obtain network access for the CAS application allowing data exchange with the application server.

The CAS_AppStop (application_identifier) may be called by the CAS application before terminating. The CAS client may be used to close each of the network connections in use by the CAS application.

CAS_Read (connection_identifier, buffer) may be called by the CAS application when the CAS application may want to read data received from the application server. The connection_identifier in CAS_Read (connection_identifier, buffer) may be used to identify (e.g., uniquely identify) the connection and may be obtained from CAS_AppStart_Rsp( ). The buffer may be a pointer to memory space where the received data may be stored.

CAS_Write (connection_identifier, buffer) may be called by the CAS application when the CAS application may want to send data to the application server. The buffer may be a pointer to memory space where the received data may be stored.

The CAS application may provide one or more APIs to the CAS client including, for example, CAS_AppStart_Rsp (status, connection_identifier). The status in the CAS_AppStart_Rsp (status, connection_identifier) function may be a number indicating whether the connection has been successfully established or not. The connection_identifier may be a number identifying (e.g., uniquely identifying) the connection, e.g., when the connection is successfully established.

The CAS provider may provide one or more APIs to the client application running on the application server. The APIs may include, for example, CAS_SrvStart (application_identifier), CAS_Read (connection_identifier, buffer), CAS_Write (connection_identifier, buffer). The CAS_SrvStart (application_identifier) function may be called by the server application when the server application may be started. The CAS SP may be responsible to prepare the IP layer for possible connection establishment and/or data exchange with client applications.

The CAS_Read (connection_identifier, buffer) function may be called by the application server when the application server may want to read the data sent by the client application.

The CAS_Write (connection_identifier, buffer) function may be called by the application server when the application server may want to send data to the client application.

The CAS application on the application server may provide one or more of the functions to the CAS provider, including, e.g., CAS_ConnEstablished (connection_identifier, user_identifier, device_identifier) function. The user_identifier in the CAS_ConnEstablished (connection_identifier, user_identifier, device_identifier) function may identify the user. The device_identifier may identify (e.g., uniquely identify) a physical device. The CAS_ConnEstablished (connection_identifier, user_identifier, device_identifier) function may be called by the CAS provider, for example, to inform the application server that a connection has been established with a client application.

As described herein, a C3 Interface may be provided for communication between the CAS client and the CAS provider. The C3 Interface is described herein and may be used for the support of BWM. One or more functions may be provided to support the C3 Interface.

CAS_BWM_Msg (request, application_identifier. list of {connection_identifier}) function may be called by the CAS SP to send a request to the CAS client. This function may be called by the CAS client to send a request to the CAS SP. The request in the CAS_BWM_Msg (request, application_identifier. list of {connection_identifier}) function may designate ADD_CONNECTION or REMOVE_CONNECTION. The list of {connection_identifier} may designate the list of connections on which the request operation is to be performed. For example, with ADD_CONNECTION request, one or more new specified connections that may be used for BWM may be established. The newly established connections may be used to increase the BWM of the specified connections and by the specified application. With REMOVE_CONNECTION request, one or more specified connections may be closed. REMOVE_CONNECTION may be used to trigger the termination of the specified connection from the CAS client. A response message may be sent by the remote side.

The CAS_BWM_Rules (BWM type, list of {connection_identifier, [rule]}) function may be used to create and/or configure CAS BWM rules. The BWM type may include, e.g., HO, IFOM, BWA, etc. For example, the connection_identifier, rule for HO may be: (from_connection, no rule), (to_connection, no rule). The connection_identifier, rule for IFOM may be: (connection, flow_id), (connection flow_id). connection_identifier, rule for BWA may be: (connection, distribution_rule), (connection distribution_rule). The flow_id may include, e.g., 5-tuples. The distribution_rule may be a percentage. For example, to configure IFOM rules for a flow_x on connection_1 and flow_y on connection_2, the CAS_BWM_Rules( ) function may be written as CAS_BWM_Rules (IFOM, {(conn1, flow_x), (conn2, flow_y)}). A response message may be sent by the CAS client to the CAS provider.

Figure 36A:
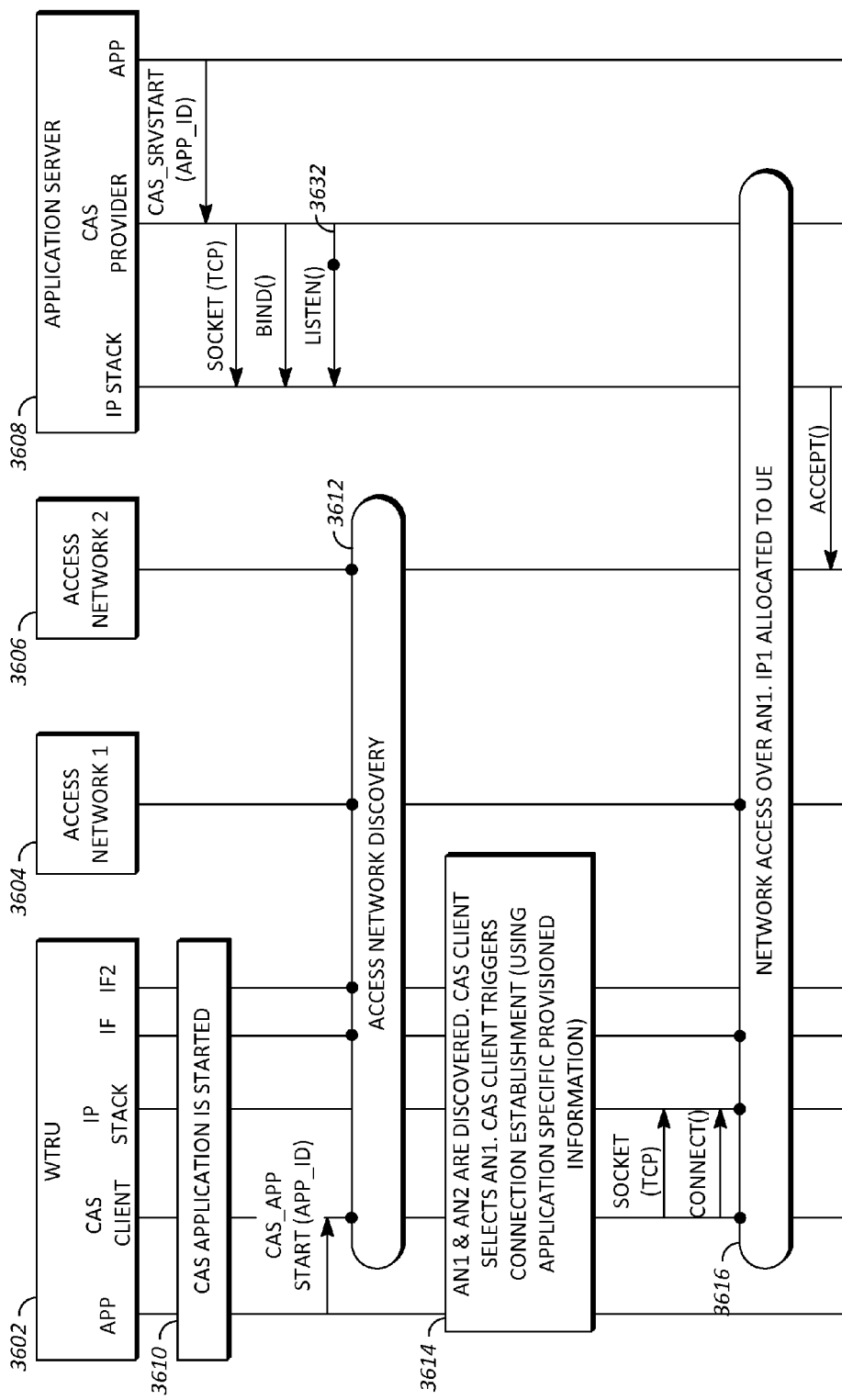
FIG. 36 (FIG. 36A, FIG. 36B, and FIG. 36C) is a diagram illustrating an example of a system for handling BWM at the application level illustrating CAS client interactions with the application.
Figure 36B:
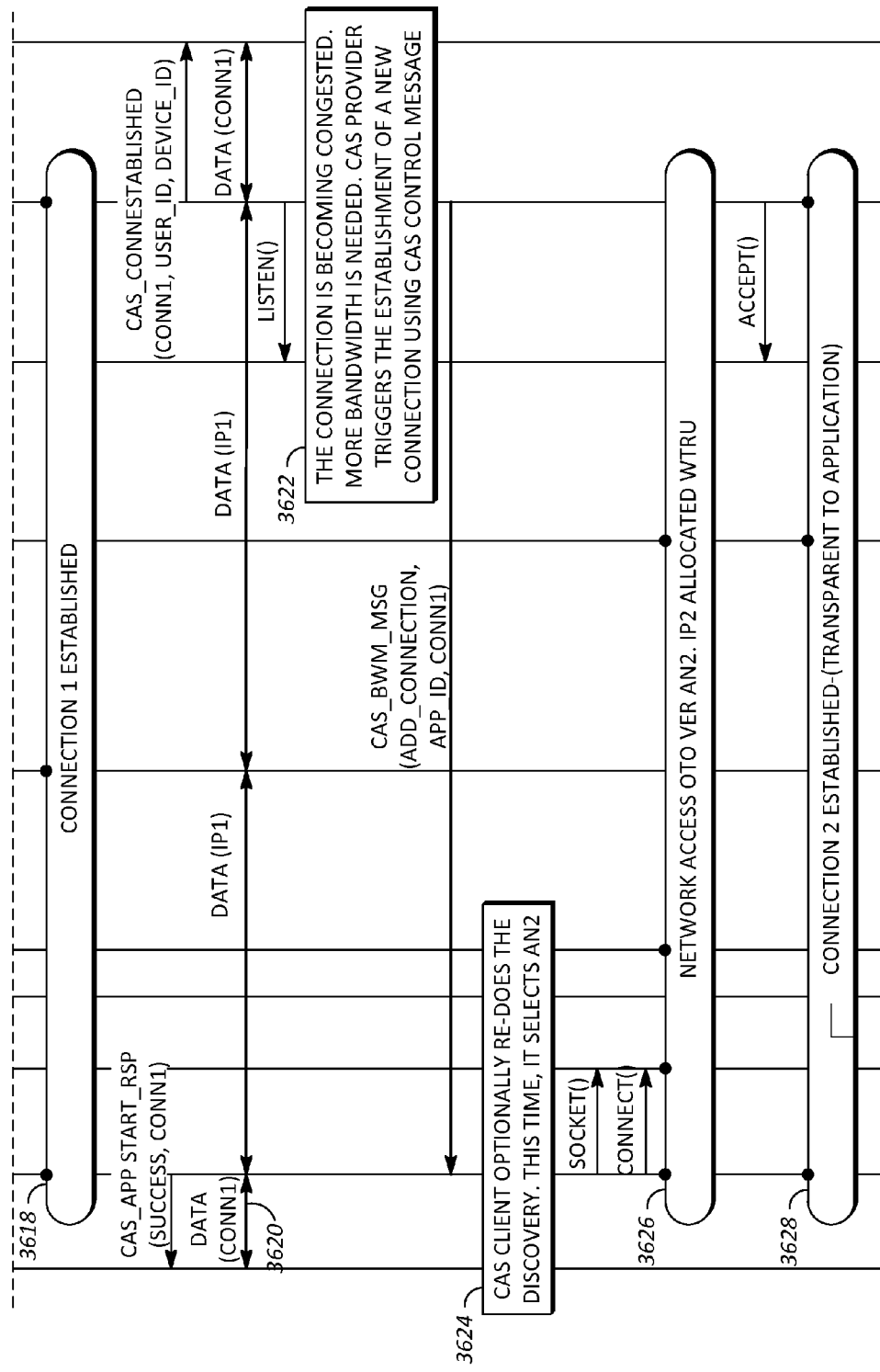
Figure 36C:
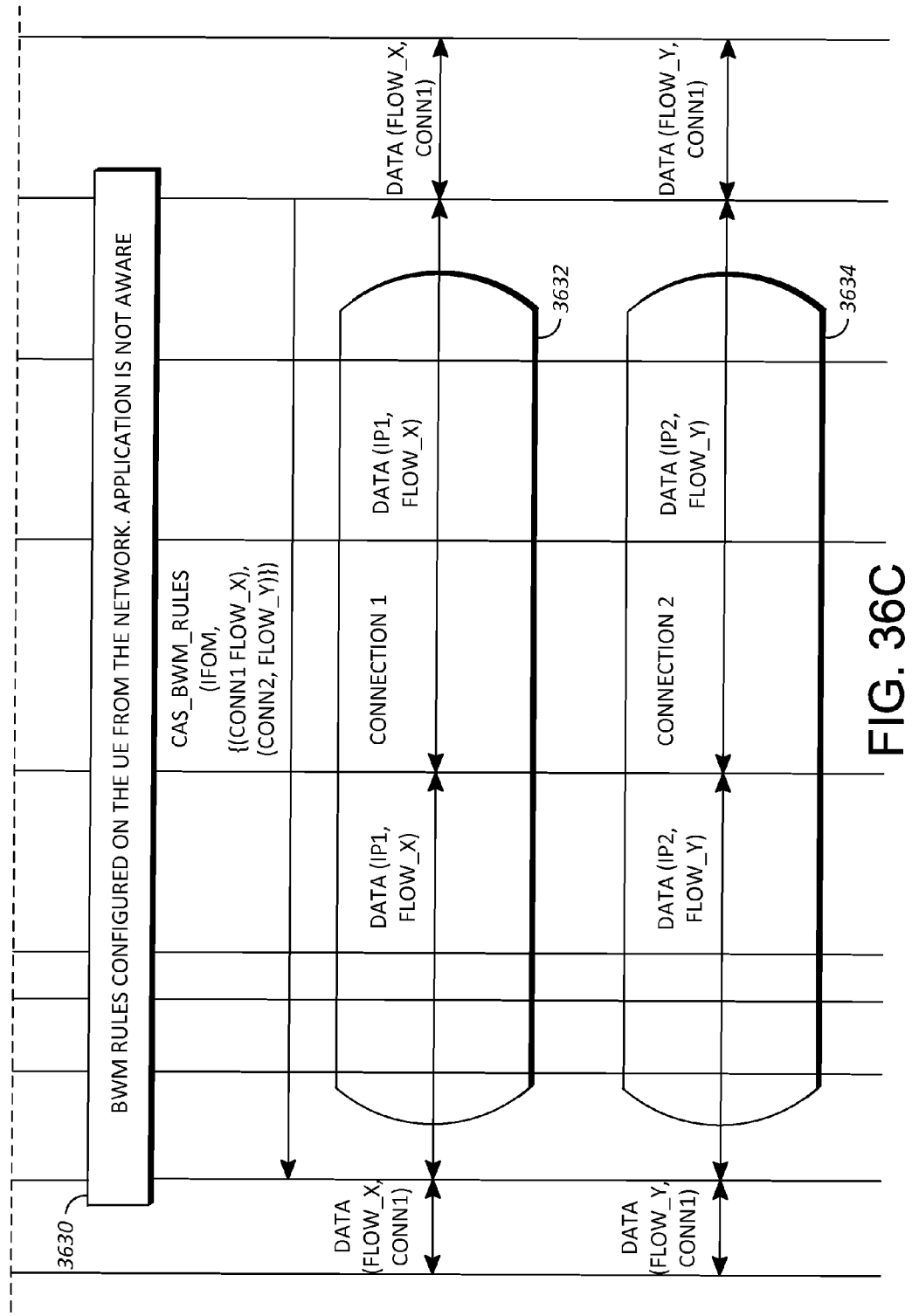

FIGS. 36A, 36B, and 36C are diagrams illustrating an example of a system for handling BWM at the application level illustrating CAS client interactions with an application. FIGS. 36A, 36B, and 36C illustrate interactions of the CAS provider and the application on the server side.

As illustrated in FIG. 36A, at 3610 a CAS application may be started on a WTRU 3602. The application may use the CAS API to inform the CAS client of its initiation. CAS client may learn the allowed access networks and/or CAS providers by looking at the provisioned information for this application (e.g., from a configuration file). An application identifier may identify (e.g., uniquely identify) the application. The application identifier may be provided by the application on the CAS-function call. The application identifier may allow the CAS client to retrieve application specific information from the configuration file. access network discovery may be triggered by the CAS client.

On the server side, the application may be started on an application server 3608. The application may wait for incoming calls. The CAS provider may issue the socket calls to be ready to match an incoming call. In this example, a TCP and/or a UDP socket may be used as well, e.g., depending of the application's need.

As illustrated in FIG. 36A, at 3612, the CAS client may discover one or more access networks (e.g., AN1, AN2, etc.). At 3614, the CAS client may select an access network (e.g., AN1 3604). For example, the CAS client may make a selection based on the provisioned information, on the discovered ANs, and/or on the user and network preferences configured on the WTRU 3602.

The CAS client may use the socket interface to trigger the connection establishment. For example, a TCP or UDP session may be established, e.g., depending on the application's requirements (e.g., based on application information provisioned on the WTRU 3602).

At 3616, the WTRU may perform network access and may be allocated an IP address IP1. Network access may be CAS-enabled. One or more of the user, an application in use, or the selected CAS provider may be specified within the network access request from the CAS client. The access network may validate with the CAS provider that the specific user is allowed to access the network. The CAS provider on its side may validate the user's credentials with the application provider to determine that the user is allowed to use this application. The validation of the user may involve one or more of the WTRU, the access network, the CAS provider, or the application provider.

As illustrated in FIG. 36B, at 3618, a connection may be established between the CAS client within WTRU 3602 and the CAS provider in the application server 3608. The application may be informed that a connection has been successfully established and data is ready to be exchanged. At 3620, data associated with the application may be exchanged between the WTRU 3602 and the application server 3608. Data may be sent and/or received by the application on the WTRU 3602 and application server 3608, e.g., using the CAS API. The CAS client and the CAS provider may use the socket interface to send/receive data to/from the remote side. At 3620, the traffic associated with the application may be communicated using the access network AN1 3604. At 3632, the CAS provider may be ready to accept other connections from client application by issuing a listen( ) socket call.

At 3622, the CAS provider may determine that a new connection is needed since congestion is experienced. CAS provider sends a request to the CAS client to establish an additional connection to increase the bandwidth available for application usage. The request may be sent using a CAS message. The CAS message may indicate the involved application and connection. The CAS provider or the CAS client may decide to establish a new connection.

As illustrated in FIG. 36B, at 3624, the CAS client may perform access network discovery and/or selection. The WTRU 3602 may select an access network (e.g., access network AN2 3606). The access network selected may be different than the first access network (e.g., AN1 3604). The CAS client may initiate the establishment of a new connection. The new connection may be established transparently to the application. At 3626, the WTRU 3602 may obtain an IP address (e.g., an additional IP address IP2) using access network AN2 3606. At 3626, a second connection may be established between the WTRU 3602 and the application server 3608 using IP address IP2.

The access network may validate with the CAS provider that the user may be allowed to access the network. The CAS provider may validate with the application provider that the user is allowed to use this application. For the second connection, e.g., with AN2 3606, CAS provider (e.g., the same CAS provider as was used for the first connection) may be contacted. The CAS Provider may be co-located with the application server. The CAS provider may be aware of the two connections established with the same CAS client application. BWM may be applied to one or more of the established connections between the CAS client and the CAS application.

As illustrated in FIG. 36C, at 3630, BWM may be applied on the WTRU side and/or network side. For example, BWM rules may be configured on the WTRU side using CAS control message (CAS_BWM_Rules( )). One or more of CAS control messages may be exchanged between the CAS client and the CAS provider. The control messages may be exchanged using one or more established connections. The CAS client may be the BWM controller. The CAS client may configure the rules on the CAS provider. BWM rules may be pre-configured or shared, e.g., via a configuration server like ANDSF server.

As requested by the CAS provider, IFOM may be performed. For example, flow_x may be sent over AN1 and/or flow_y may be sent over AN2. The flow mobility may be transparent to the application on the WTRU side and on the server side. At 3632, CAS client/ABM module may apply BWM rules and may send flow_x over connection 1, e.g., when the client application is sending flow_x (e.g., specifying conn1 as the client application may be only aware of conn 1). At 3634, the CAS client/ABM module may select connection 2 to send the data, as specified by the BWM rules. On the server side, flow_x may be received over connection 1 and flow_y over connection 2. The server application may not be aware of the underlying two connections, as both flows may appear to the application to have been received over the same connection. The same logic may be used when the application server is sending data and the client application receives it; both connections may be used for BWM transparently to the application.

Context-aware BWM may be provided. Context-aware operation (e.g., including BWM) may refer to the ability of a decision-making entity in question to take into account various external information in making its decision. The ABM function in the CAS client and CAS provider may be the decision-making entity.

Context-aware BWM may account for expected stability (e.g., likelihood that a particular AN connectivity may be maintained), and application specific information, such as user preferences. For example, the user may indicate that best quality should be preferred over lower cost. The application specific information may be available (e.g., readily available) to one or more applications.

The expected stability of a connection (e.g., the access point and AN) may be learned, e.g., over time based on past events. For example, the duration of a connection to a specific AP/AN/CAS provider triplet may be monitored. The duration may be stored (e.g., locally stored) into a stability table (e.g., when the connection was established/terminated). Using this information, the CAS client may be able to determine an expected stability period and use this information during the selection process. The CAS client may avoid selecting a AP/AN/CAS provider triplet for use with an application for an interval of time, e.g., if a connection using the AP/AN/CAS provider triplet is failing (e.g., repeatedly failing) and/or disconnecting (e.g., disconnecting within the time interval, e.g., because of the location of the user). The AP/AN/CAS provider triplet selection may be performed for an application that may use it for time less than the specified time interval. Other factors, e.g., congestion may be taken into account in order to selecting an access network. Adding the expected stability as described herein may improve the selection process.

The expected stability of a connection may be based on monitoring and history of using an AP/AN/CAS provider triplet. For example, the CAS client (and/or CAS provider) may monitor the connections using a particular AP/AN/CAS provider triplet and may store the monitoring information. The monitoring information may be stored in a stability table. The expected stability learning process may make use of a table to keep track of connectivity related information. Table 1 illustrates an example of an expected stability table. For example, the expected stability may be time-based. For example, a WTRU may move between 12:00-1:00 PM every week-day. Multiple HOs may be expected during that period. The CAS client may monitor the AP/AN/CAS provider triplet for each of the HOs.

confidence in these observations and deductions may be obtained. The CAS client may use the context information to derive dynamic rules for selection (e.g., future selections) of the AP/AN/CAS provider. These rules may be dynamically updated, e.g., based on the changes in the observations and deductions information. The CAS provider may be involved in the process of observation. The CAS provider may share information with the CAS client, e.g., using ANDSF or during connection setup.

User habits, preferences and interests may influence the AP/AN/CAS provider selection process. The context information and/or derived interests may be used during the AP selection, enabling better ads to be received by the user and better targets for the advertising entities. This may result in selecting an AP that may not be at the moment the best choice (even though a good choice) but that may be the best choice within a short period, e.g., based on information including, e.g., historical WTRU behavior, expected stability, expected application duration, etc.

To enable context-based BWM, the CAS service may maintain a list of networks. For each network, the CAS service may maintain context information. For example, a context may include network owner business type including, e.g., Access Provider (e.g., a Mobile Network Operator, Wi-Fi provider such as Boingo®, etc.), Publically Accessible Private Space (POPS) (e.g., malls, airports, stadiums, etc.), Private Enterprise with Open Network (e.g., a store, a restaurant, and the like), a closed network that the application may access, etc.

TABLE 1

Example of Expected Stability Table

| AP/AN/CAS provider triplet | Observed Stability (days) | Time (period) | Observed Stability State |
|---|---|---|---|
| Home AP/AN/CAS provider | Week days | 6:00PM-7:00AM | stable |
| List {AP/AN/CAS provider} | Week days | 7:00-8:00AM | unstable (with short stability periods) |
| AP a/AN a/CAS provider a | Week days | 7:00-7:10AM | |
| AP b/AN b/CAS provider b | Week days | 7:10-7:50AM | |
| AP c/AN c/CAS provider c | Week days | 7:50-8:00AM | |
| Work AP/AN/CAS provider | Week days | 8:00-12:00PM | stable |
| List {AP/AN/CAS provider} | Week days | 12:00-1:00PM | Unstable |
| Work AP/AN/CAS provider | Week days | 1:00-5:00PM | Stable |
| List {AP/AN/CAS provider} | Monday-Thursday | 5:00-6:00PM | unstable (with short stability periods) |
| AP c/AN c/CAS provider c | Week days | 5:00-5:10PM | |
| AP b/AN b/CAS provider b | Week days | 5:10-5:50PM | |
| AP a/AN a/CAS provider a | Week days | 5:50-6:00PM | |
| List {AP/AN/CAS provider} | Friday | 5:00-11:00PM | Unstable |
| ... | ... | ... | |

Application-specific context may be provided. Application-specific context information may be obtained at the CAS client or at the application server, e.g., by monitoring the activities of the CAS client. The context information may include, e.g., the type of activities a CAS client may perform, the time and location of performing the activities, the other applications that may be used at the same time, etc. One or more user preferences that may be provided (e.g., explicitly provided) to the user, e.g., during connection setup, may be used to control BWM. The observed context information may be saved (e.g., saved locally into an observation table). The observed context information may be used to learn the user habits and deduce the user's interests. A user interests table may be used to keep track of the user's deduced fields of interests. Information regarding level of Except in the case of Access Providers that may provide subscription-based access, additional information about the network owner may be useful to a user to select a network that may be most related to the user's interests. The information may be based on the business type (e.g., the nature of information itself may be contextual). For example with POPS, it may be relevant to learn the nature of POPS (e.g., mall vs. stadium vs. airport). In terms of context, it may be desirable to have information, for example, if the business is a stadium, what kind of sports are typically played at the stadium, operating hours, game days, and traffic patterns. It may be desirable to have information about the associated businesses in the stadium, e.g., food stands, stores of a mall, if a mall is located in the stadium. For Private Enterprises with Open Networks, it may be desirable to learn type of enterprise (i.e. restaurant/clothing store), specifics of the business (e.g., the type of food served in a restaurant, target clientele (e.g., high-end, family, budget, etc.), the type of clothing in a clothing store, operating hours, traffic patterns, etc.

Examples of context information may include, e.g., application type, usage duration, companion applications, bandwidth usage/requirements, etc. For example, a book reader usage may indicate an interest in book stores advertisements. In an example, the usage of an application that may keep track of user speed, route, calories burned, etc. for sports activities. This type of application usage may lead to an entry for sports in the interest table. Additional context information may include average time, minimum time, maximum time that the application may be used for. The application requirements may include, e.g., required/minimum QoS. The companion applications may include other applications that may be expected to be started and/or used at the same time when the first application is started and/or used. It may be desirable to know which other applications may be started and/or used when the first application is started and/or used. It may be desirable to know information about the required QoS/expected duration/mobility requirements of the companion applications, in addition to the started application requirements. This information may be used to avoid a HO when these applications may be started, e.g., if the selected AN/CAS provider may not be able to provide enough bandwidth (cumulative) or the AN/CAS provider may be expected to be unstable.

Context-dependent BWM may be provided. The CAS client may report presence of a number of potential networks the client may be able to use to the CAS service. The CAS service may compare the list of available networks against its stored list. For networks for which additional context information is known, such context information may be checked against user preferences. If the CAS service finds a good match between the user preferences and a network context, the CAS client and/or ABM function in the CAS service may be directed to connect and preferably use the context that may best match the user's preferences. A network may be selected by combining the context based match with information related to other factors including, e.g., network load, cost, etc.

The CAS service may use the location and other information (e.g., access capabilities) to provide the CAS client information about known networks (e.g., networks known in a geographical area) and context information for such known networks. The CAS client may be responsible for comparing information about the networks that are discovered with the context-enriched list provided by the CAS service and incorporating such a match in the decision making process. The network information may be provided to CAS by utilizing one of several policy frameworks. For example, the ANDSF Management Object may be extended to carry context information for each of the networks.

As described herein, the context may be one of several factors that may be utilized to determine how a CAS service or a CAS client may direct application traffic over a network. The network that may be used for connectivity may be determined as follows. For each categories used in the decision making a numerical score is used. The categories may include, e.g., Context Match, Network signal quality, Network load, Network cost, Mobility condition, etc. The scores may be added up to produce a total score. Candidate networks may be ranked in order of total score and accessed in that order. For example, if a higher-ranked network may not be available for use, the second-ranked network may be used.

The categories and/or factors may be weighted differently. A mixture of user preferences and network metrics may be used as well. The network metrics may be used to break ties using the user preferences (or vice-versa). As described herein, the user preferences may be determined through information that the user may provide during the application's subscription. The user preferences may be learned from user behavior, e.g., by performing user interest discovery.

The discovery of user interests may be performed, e.g., based on information that may be obtained (e.g., obtained directly) from the APs to which the WTRU may connect and/or by implementing discovery techniques. For example, one or more learned interests may be shared with the application provider to select the type of advertisements that may be sent to the user.

An AP may advertise a business type to WTRUs (e.g., as a part of HS2.0 ANQP/beacon, SIBs). For example, a coffee shop may advertise from its Wi-Fi network that it is a coffee shop. Users that may be interested in finding a coffee shop may look for this type of business advertisements. In an example, a number of users may be flagged as the ones that like coffee may receive coffee advertisements when they are located in vicinity of a coffee shop.

In an example a business type discovery using information obtained (e.g., obtained locally) may be provided and/or used. For example, e.g., a user visiting a theater may connect to Wi-Fi network in the theater. The CAS client on the user's WTRU may download the theater program from the local network and may discover a list of events that may be taking place in the theater. The user may have a preference for a particular show type. The show type may be saved in the user's interest table. The CAS client may transfer the location information of the user determined from a venue's network to the CAS provider that may handle the mapping to the event type and return back this information to the CAS client. The returning information to the CAS client may be sent in a batch and may include additional information, e.g., other event types, policies, etc.

In an example, a business type discovery, e.g., using geographical location may be used to select advertises. For example, a user may be visiting a sports arena to watch a football game. The arena may provide its own network, and the user may connect to a network, e.g., using a cellular network or a public Wi-Fi network. The CAS client on the user's WTRU may determine the location of the user and the location of the user may indicate to the CAS client that the user is in an arena/stadium. The arena/stadium may be associated with the local football league. This interest may be saved on the WTRU in the user's interest table. A confidence level may be maintained. For example, the confidence level for this interest may be marked as high, e.g., if the user is going to the stadium regularly to watch football games. The confidence may be set to low, e.g., if the user only goes to football games occasionally. Coupling this activity with others may increase the confidence level, e.g., if the user in addition to the football games attends basketball games and/or hockey games (e.g., at other locations), the interest in sports may be set to a high confidence level. The CAS client may transfer the location information of the user determined by using a cellular network or a public Wi-Fi network to the CAS provider that may handle the mapping to the event type and return back this information to the CAS client. The returning information to the CAS client may be sent in a batch and may include additional information, e.g., other event types, policies, etc.

An application type may be associated with an interest type, e.g., an application to listen to music may be running on a user's WTRU. The application may access music that may be stored locally on the WTRU and may not need a network connection. The user may use the application for many hours per day/week. The application usage may be monitored on the WTRU. Based on the nature of the application and the application usage, an interest for music may be saved in the interest table. This interest may be considered, e.g., when the user may connect to a local network of a music store. The interest may be used by the local network of the music store and/or advertisements related to music may be sent to the user's WTRU (e.g., websites to buy music, music critics, shows, etc.).

Figure 37:
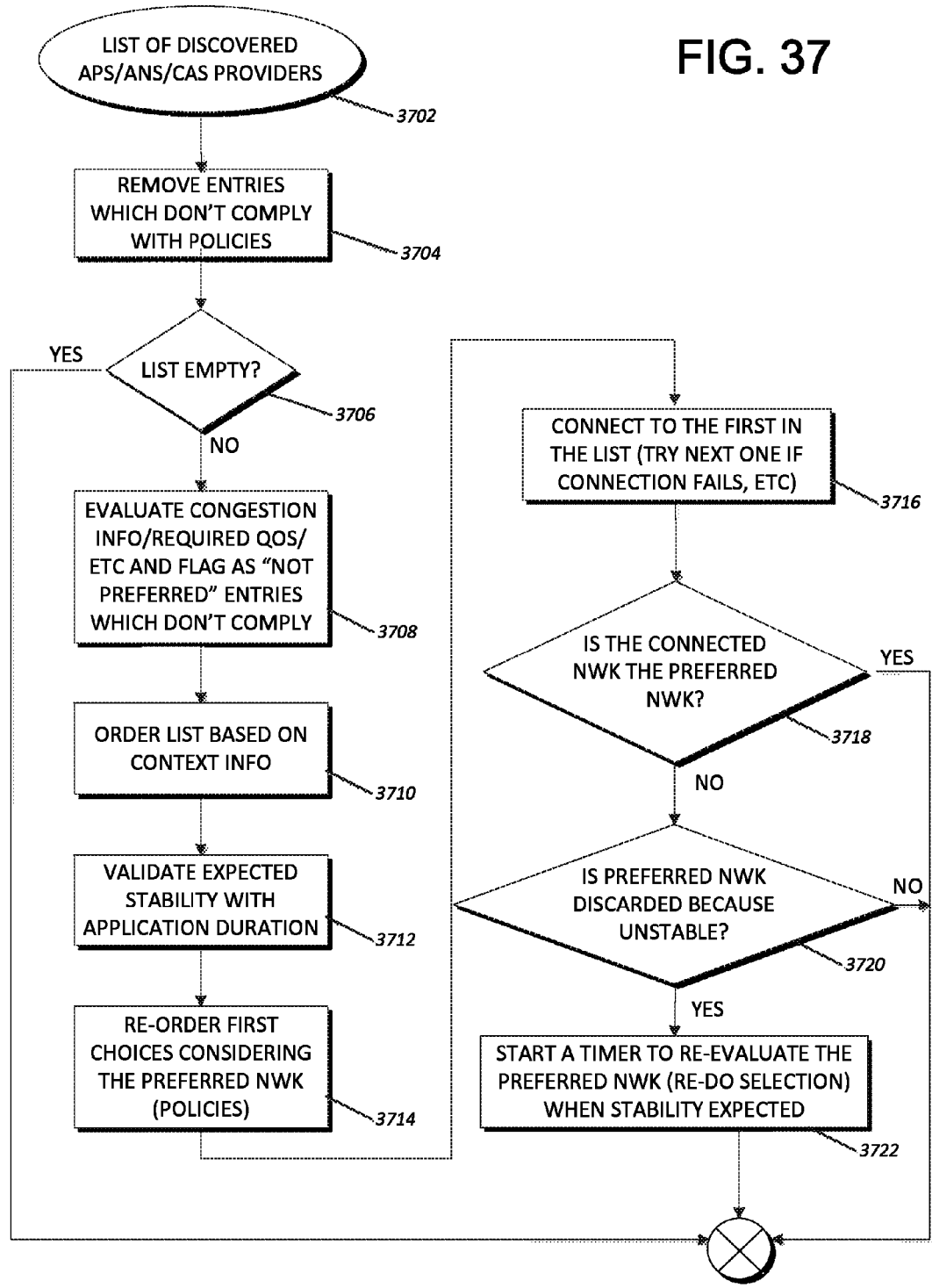
FIG. 37 is a diagram illustrating an example of an AP/AN/CAS provider selection.

FIG. 37 is a diagram illustrating an example of an AP/AN/CAS provider selection. The selection may use available information to select an AP/AN/CAS provider triplet (e.g., the best AP/AN/CAS provider triplet) for the connection to be assigned to the application. As described herein, this selection may depend on one or more factors, e.g., application needs, expected WTRU movements, expected connection stability, context information, etc.

AP/AN/CAS provider selection may be based on expected stability information. For example, a preferred network may not be selected, if the network is predicted unstable, e.g., if the application is started during the expected unstable period or if the application is started before the expected unstable period and the application is expected to be used for a certain period of time that may overlap with the unstable period. If the preferred selection is an AN/CAS provider with an expected instability period, the AN/CAS may not be selected but schedule a HO to this selection to be triggered when the stability is expected to be obtained.

An AP/AN/CAS provider selection may be based on user's interests, for example, when a user is within a shopping mall, and many Wi-Fi APs are discovered with comparable signal strength. Each of the networks may supported by the CAS provider associated with the application the user may use. The user may choose Wi-Fi from Starbucks® Coffee, e.g., based on the user interest indicated by previous history that the user likes coffee. Starbucks® Coffee may have its own network with advertisements, for its products or from other stores that may be targeting this type of user (e.g., chocolate stores, espresso machine vendors, bookstores, etc.). In an example, a user may connect to a steakhouse access point in a city more often than other steakhouses in the city. While travelling to another city, the user may be preferably connected to local steak house APs in priority (instead of selecting another AP from a different enterprise that may have comparable signal strength). The user may obtain advertisements from the steakhouse that the steakhouse may be advertising. The advertises may include, e.g., menu info, special of the day of the steakhouse, etc.

An AP/AN/CAS provider selection may be based on business type/relationship. For example, a user may connect to APs of a specific type of business. This business type may be saved into the user's interest table. If no APs associated with such a business type are discovered, when an application is started, the APs of a similar business types may be considered. Examples of related business types may be: Coffee shop/chocolate store/bookstore, or Restaurant with T.V. screens showing various types of sports/Stores specialized in sports apparel.

As illustrated in FIG. 37, at 3702, a list of discovered AP/AN/CAS providers may be obtained. At 3704, the entries of the AP/AN/CAS providers that may not comply with policies may be removed. At 3706, a check may be performed whether the list is empty. At 3708, entries may be flagged based on congestion, QoS values, etc. At 3710, the list of AP/AN/CAS providers may be re-arranged based on context information, as described herein. At 3712, each of the AP/AN/CAS providers may be validated for expected stability with application duration. At 3714, the AP/AN/CAS providers may re-ordered based on the preferred network policies. At 3716, the user's WTRU may connect with the first network in the list. If the connection fails, connection with the next network may be established. At 3718, a check may be performed whether the user's WTRU is connected to the preferred network. If the current network is not the preferred network, at 3720, a check may be performed whether the network is to be discarded because the network is unstable. If the network is unstable, at 3722, a timer may be started. At the expiry of the timer, the preferred network may be re-evaluated and the selection may be performed again when stability is expected.

Figure 38:
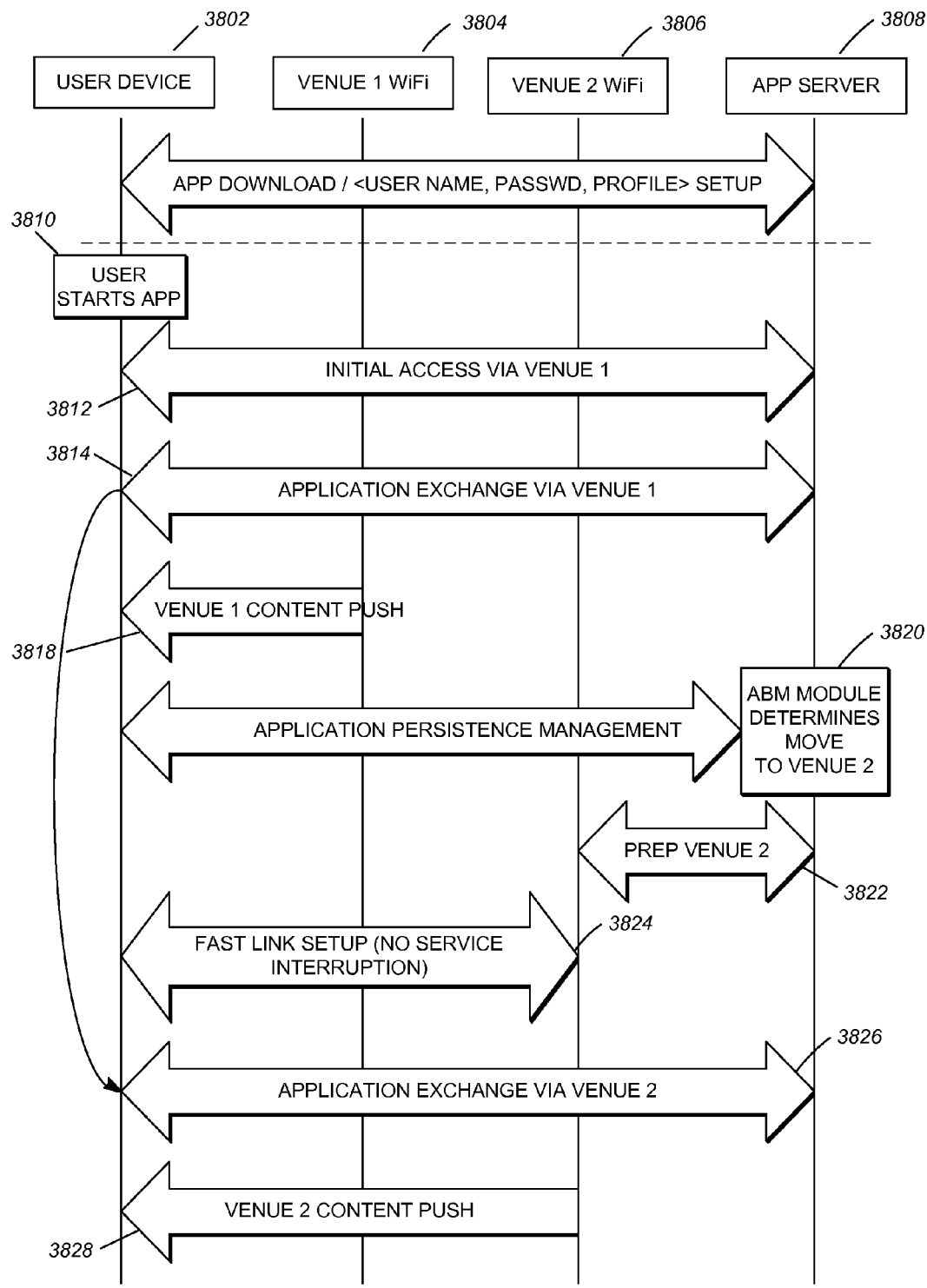
FIG. 38 is a diagram illustrating an example of a context-specific operation.

FIG. 38 is a diagram illustrating an example of a context-specific operation. For example, a city tourist may download a Virtual Tour Guide CAS application prior to commencing a tour. The tour may include, e.g., walking, taxi, bus, tram, and subway. The account setup includes payment and preference profiles to be used later for context-specific network matching.

The application provider may deliver service through a network of Small Cells (e.g., Wi-Fi APs, Femtos, and/or other type of small-cells) that may provide coverage at local merchants, museums, and other businesses. The Small Cells at the merchant sites may allow a merchant to inject content to be pushed to users connected to its SCN. This may be done by providing the merchant with the Small Cell device or by loading software onto an existing device. The ABM feature may match users that are in the vicinity of SCNs owned by merchants with users' profile context. For example, users with coffee-house preferences over pub preferences may be placed on a coffee-related business type network over a pub-related business type network when both are available. A user may be placed on the network of an art museum in the area, e.g., if the user's interest in art is determined. The users interested in exploring the area may be kept on that network and on a macro providers network, for example.

As illustrated in FIG. 38, one or more merchants (e.g., two merchants) may own Small Cells that may support Wi-Fi. For example, a Wi-Fi network Venue 1 Wi-Fi 3804 may be associated with the first merchant and a Wi-Fi network Venue 2 Wi-Fi 3806 may be associated with the second merchant. At 3810, a user may setup an account and may download an application, e.g., over an existing IP connection to the application server 3808. At 3812, the user may start the application. At 3814, an initial access via Venue 1 Wi-Fi 3804 may be selected by the ABC functionality, and application exchange may commence. At 3816, concurrently, the first merchant (associated with Venue 1 Wi-Fi 3804) may push its own content (e.g., advertisement, marketing, or other desired information to the user). During this communication, at 3818 the CAS client and CAS service communicate as described herein. For example, information about Venue 2 may be exchanged between the CAS client and CAS service. At 3820, the ABM functionality in CAS service may use this information to determine that Venue 2 should be selected. The ABM may determine to move the user to Venue 2 Wi-Fi 3806. At 3822, the AP at Venue 2 is prepared and pre-configured to minimize disruption during the handover. At the same time the CAS client on user device 3802 is directed to move to Venue 2 Wi-Fi 3806 (i.e., the second merchant (associated with Venue 2 Wi-Fi 3806)). At 3824, the move is accomplished so that the communication between the client and the server is uninterrupted and the user is not aware of the network switch (e.g., the handover is seamless and transparent to the user). At 3826, application exchange may occur between the user device 3802 and the app server 3808. Now the second merchant (e.g., associated with Venue 2 Wi-Fi 3806), at 3828 may push its own content (e.g., advertisement, marketing, or other desired information to the user). Content from the first merchant may cease to appear on the user's device.

The support of BWM at the application level may provide a transparent support of inter-unit transfer (IUT). A CAS provider may be involved in the connection establishment and in the tracking and charging of a device. The CAS provider may detect whether an application is started multiple times by the same user on different platforms. The CAS provider and/or the CAS application server may receive a command and/or take the decision to trigger the traffic redirection. To handover the traffic or a portion of the traffic from a first WTRU (e.g., WTRU 1) to a second WTRU (e.g., WTRU 2), the application may be started on WTRU 2. The CAS client running on WTRU 2 may contact the CAS provider and/or application provider to sync-up, e.g., identify the user, and verify that the transfer may be allowed. Once the transfer is setup and both WTRUs involved in the transfer agree for the transfer, the CAS provider may direct the traffic to the connection associated with WTRU 2 instead of directing it to WTRU 1. A portion of the data may be transferred to WTRU 2 (e.g., applying IFOM or BWA feature). A portion may be moved to WTRU 2 and another portions may be moved to WTRU 3, for example. This behavior may be obtained by handling the IUT specific interaction at the CAS level, e.g., by exchanging messages (e.g., over the C3 Interface) between the CAS provider and the CAS client running on WTRU 2 and/or on WTRU 1. The CAS provider may be aware of the applications running on the WTRUs and may be aware of the user identity. The CAS provider may inform the application server of any data transfer if needed, e.g., by pushing rules or exchanging messages.

Figure 39:
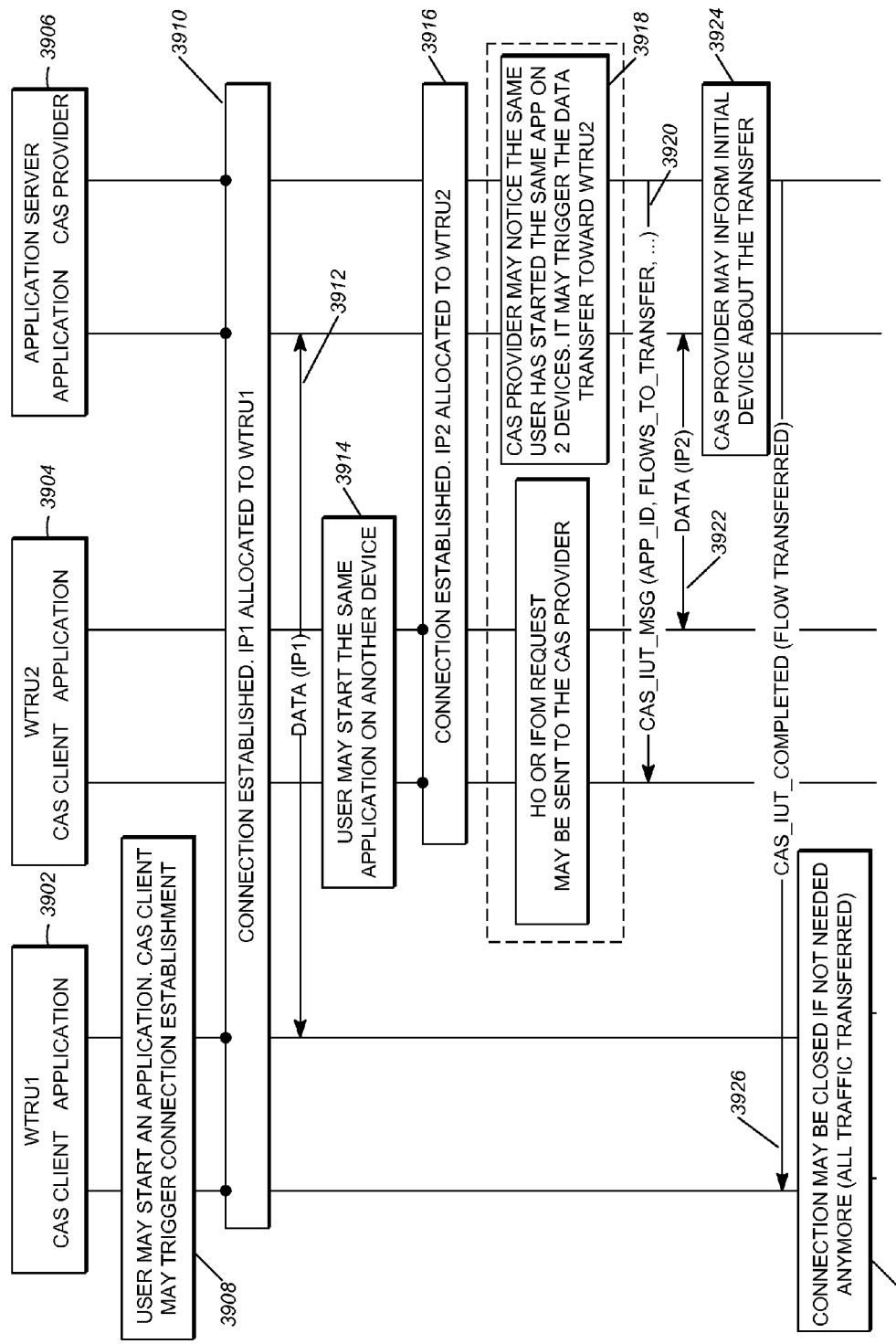
FIG. 39 is a diagram illustrating an example of inter-unit transfer (IUT) operation under the CAS architecture.

FIG. 39 is a diagram illustrating an example of IUT operation under the CAS architecture. At 3908, a user may start an application on a user device (WTRU 1 3902). At 3910, WTRU 1 3902 may establish connection with application server 3906. At 3912, a data flow may be established between the WTRU 1 3902 and the application server 3906. The user may decide to use a second device (WTRU 2 3904). At 3914, the user may start the same application on WTRU 2 3904. Since the application may have been installed on multiple devices, these devices may be known by the application server and may be allowed to run the application. For example, the user may have subscribed for the usage of the application and may have registered the two devices when downloading and/or activating the client application. At 3912 a second connection may be established between the WTRU 2 3904 and the application server 3906. At 3918, the CAS provider on application server 3906 may determine that the user has started the same app on two different devices. The CAS provider may trigger a data transfer from WTRU 1 3902 to WTRU 2 3904. The transfer may be triggered by user from the WTRU 1 3902 or WTRU 2 3904. At 3920, usage of the application may be transferred to the WTRU 2 3904. In an example, one or more of the flows associated with the application on WTRU 1 3902 may be transferred to WTRU 2 3904, e.g., using flow-based IUT. Other flows may remain on WTRU 1 3902 or be transferred to a third device). The data transfer performed at the source of the data (e.g., application server) may minimize the delay introduced in the data transfer. No modifications need to be introduced in the network for the routing of the packets since the appropriate destination IP address is selected by the application server (or mobility functionality provider by the CAS client/provider) when sending the IP packets. At 3922, the application and/or one or more flows may exchange data between WTRU 2 3904 and the application server 3906. At 3924, the application server may inform WTRU 1 3902 about the transfer. At 3926, the application server 3906 may send a CAS_IUT_Completed message to the CAS client. At 3928, the CAS client may close the connection, if the connection is not needed.

BWM may include, for example, a HO, IFOM, and/or bandwidth aggregation (BWA). As described herein, the BWM handling may depend on the example architecture, the anchor node location, and/or of the layer where the BWM may be handled.

As illustrated by the example architecture, the CAS provider may be located inside of the access network or outside. The BWM features may be supported at different layers, e.g., Layer 3 (e.g., IP layer), Layer 4 (e.g., MPTCP) or higher layers (e.g., application layer). Examples of how the BWM features may be supported at layer 3 may be described herein. Support at the application level may be provided and/or supported and layer 4 support may be handled using protocols like MPTCP.

One or more of the following may be provided as described herein. A BWM at layer 3 may be handled by an anchor node located outside of the core network. Enhancements to CAS services to support BWM at layer 3 (e.g., IP level) may be provided. A CAS provider acting as the anchor node may be used. Use of multiple CAS providers (e.g., anchor nodes) for a single application for BWM purposes may be implemented. Inter-Unit Transfer (IUT) support using CAS concept may be provided.

The CAS provider may be utilized to handle the support of BWM at the layer 3. For example, the CAS provider may be the anchor node. The CAS provider may be the entity that may have an agreement with the CAS application provider. The CAS provider may be an entity that may provide connectivity services in the network. The CAS provider may have agreement with access network providers (e.g., assuming the CAS provider may be outside of the access network as described in some of the example architectures herein). Having the CAS provider handle the BWM features may enable it to direct traffic to a specific access network or to multiple access networks, depending of various factors. For example, a CAS provider may have an agreement with an access network provider that may be charging cheaper fees at night so it may be advantageous to direct the traffic to that access network during the night. A CAS provider that may have an agreement with an access network provider specifying that bandwidth may be charged at a fixed rate and that traffic exceeding this bandwidth may be charged at a higher price. The CAS provider may move the traffic between access networks to not be charged at the higher rate. The CAS provider may pay a fixed price for the usage of an access network even if this access network may not be used. The CAS provider may try to minimize its operational costs, e.g., by using the bandwidth already paid for from this access network (and limit the usage of other access networks). The decision to move the traffic from an access network to another one may be based on one or more factors, e.g., policies, user preferences, application's requirements, network conditions, and/or the like.

With some of the architecture examples such as a separate CAS provider and/or a CAS provider being within an application provider, the IP anchor node functionality may be handled in the access network (e.g., by the P-GW) and the CAS provider may be outside of the MCN. The anchor node functionality, which may be handled by the CAS provider, may be moved outside of the MCN. Multiple RANs and MCNs may be used for BWM, for example, if the CAS provider may have agreements with them.

The anchoring functionality may include maintaining a pool of IP addresses that may be assigned to the WTRUs that may register with the anchor node. Traffic using an IP address from this pool may be routed to the anchor node (a CAS provider in an example), bypassing the MCN. The anchor node may be able to forward the traffic to the WTRU's current location using tunneling directly to the WTRU or to the access GW where the WTRU may be attached. This may imply that some tunneling protocol may be handled at the CAS provider (e.g., anchor node), e.g., PMIP/GTP or DSMIP. The access network in this case may be used as a dumb pipe. In embodiments, DMM GW (D-GW) and/or L-GW concepts to support the anchoring functionality handled outside of MCN may be re-used.

Network-based and/or mobile-based solutions or examples may be provided as described herein. For example, mobility may be mobile-based and/or network-based. Mobile-based mobility may involve the WTRU in the creation of tunnels with the anchor node (e.g., using DSMIP) while network-based mobility may be transparent to the WTRU. The tunnels may be handled within the network (e.g., using PMIP or GTP) and a logical interface concept (LIF) may be used on the WTRU to hide to the application traffic movement from one interface to another.

Different IP addresses may be obtained when using multiple connections and/or interfaces on the WTRU to connect to the CAS provider (anchor node). To be able to redirect IP packets over another interface, the CAS provider may make sure that the IP address may be known by the access gateway (GW). One or more existing Proxy Mobile IP (PMIP) messages Flow Mobility Initiate (FMI)/Flow Mobility Acknowledgement (FMA) may be used.

Mobility handling and the related tunneling usage may be used to handle the BWM features. The system behavior described herein may be described using a network-based system however, it may be understood that the same concepts may apply to a mobile-based system.

Even though PMIP/GTP and DSMIP may be known protocols for mobility handling, these may be enhanced and/or replaced by new protocols like e.g. CAS specific protocol. In this case, the CAS provider may act as the anchor node (i.e. LMA/HA) supporting CAS functionality as described herein.

CAS provider behavior may include different functionality as described herein. For example, the CAS provider may act as an anchor node for BWM handling at the IP layer. This behavior may be described herein. For example, the CAS provider may be located in different places depending of the architecture option and this specific location may impact the CAS provider behavior. For that reason, CAS provider behavior may be described for the example architectures.

For example, an architecture where a separate CAS provider may be used. The anchor node functionality may be currently handled in the MCN by e.g. the P-GW. The proposal or examples described herein may be to have this functionality handled by the CAS provider. Since the CAS provider may be outside of the MCN, the anchor node functionality may be moved outside of the MCN.

To support the anchor node handling outside of the MCN, a pool of locally anchored IP addresses may be allocated by the MCN to the CAS provider, e.g., as part of their agreement. This may be similar to D-GW and/or L-GW solutions. The CAS provider may not be located at the edge of the network, e.g., close to the access point (e.g., Wi-Fi AP or H(e)NB). The CAS provider may not be confined to, e.g., a Local Home Network (LHN) (e.g., as was case with an L-GW). In addition, this may remove the need to connect to multiple GWs when doing HOs between H(e)NBs/LHNs, thus there may be no need to create tunnels between the GWs to support mobility (e.g., as in D-GWs). The CAS provider may be associated to various access networks and/or MNOs, e.g., making it possible to have the WTRU simultaneously connected to the same CAS provider, e.g., via 3GPP and/or non-3GPP access networks.

The 3GPP attachment procedures may include the following. A WTRU may send an attach request to the H(e)NB. The H(e)NB may communicate with a mobility management entity (MME). The MME may communicate with a serving GW (S-GW). The S-GW may select the packet GW (P-GW). The P-GW may be an anchor node. An IP address may be allocated by the P-GW and sent to the S-GW, to the MME, to the H(e)NB and to the WTRU. A tunnel may be created between the P-GW and the S-GW during this procedure. The MME may create a data path between the H(e)NB and the S-GW. The data path may be as follows: downlink packets may be routed to the P-GW. The P-GW may tunnel the packets to the S-GW. The S-GW may forward the packets to the H(e)NB. The H(e)NB may forward the packets to the WTRU. The same path may be used in the reverse way for uplink packets. The same behavior may be obtained when using a non-3GPP access network. In a non-3GPP access network, the MME may be optional. The Home Subscriber Server (HSS) and Authentication, Authorization and Accounting (AAA) nodes may be used for the WTRU authentication and authorization. The P-GW selection may be done during the authorization and returned to the non-3GPP access system. A tunnel (e.g., PMIP or GTP) may be created between the access GW (ePDG or non-3GPP IP access GW) and the P-GW.

As described herein, the CAS provider may replace the S-GW and P-GW for cellular access, e.g., serving GW and anchor node functionalities. The WTRU may connect to the H(e)NB. The H(e)NB may communicate with the MME. The MME may select the CAS provider. The CAS provider may be specified in the WTRU attach request, as the serving GW and anchor node. The H(e)NB may receive the CAS provider identifier (in the WTRU attach request) and may relay it to the MME, which may create a data path between the H(e)NB and the CAS provider. The MME may be pre-configured with the supported CAS providers identifiers and IP addresses as part of the agreement between CAS providers and AN. The CAS provider may handle the WTRU IP address allocation. Downlink IP packets may be routed to the CAS provider (since it's the IP address owner), which may forward the packets to the H(e)NB. The IP packets may then be sent to the UE. The same path may be used in the reverse way for uplink packets, e.g., WTRU to H(e)NB to CAS provider. The same behavior may be obtained when using a non-3GPP access network; a tunnel may be created between the IP access GW and the CAS provider. The access GW may be pre-configured with e.g.

CAS provider identifier/IP address, as part of the agreement between CAS provider and AN. The CAS provider information may be obtained during the authorization process with the AAA server. The AAA server may be located within the operator network associated with the non-3GPP access network.

Private or local (e.g., owned by the CAS provider) IP addresses may be assigned to the WTRUs instead of using a pool of IP addresses from the MCN. A tunnel between the CAS provider and the RAN may be used to forward the IP packets. In case of private IP addresses, the CAS provider may implement NATing functionality.

Figure 40:
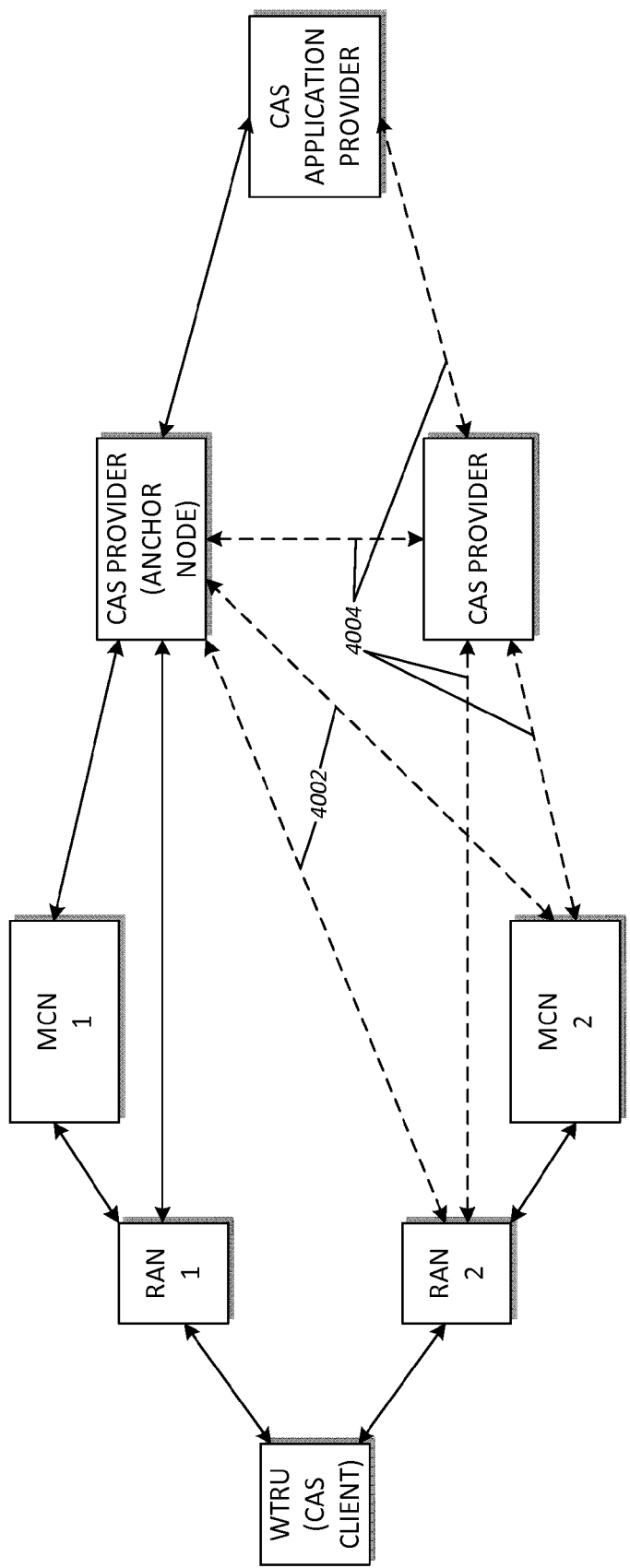
FIG. 40 is a diagram illustrating control plane of BWM at layer 3.
Figure 41:
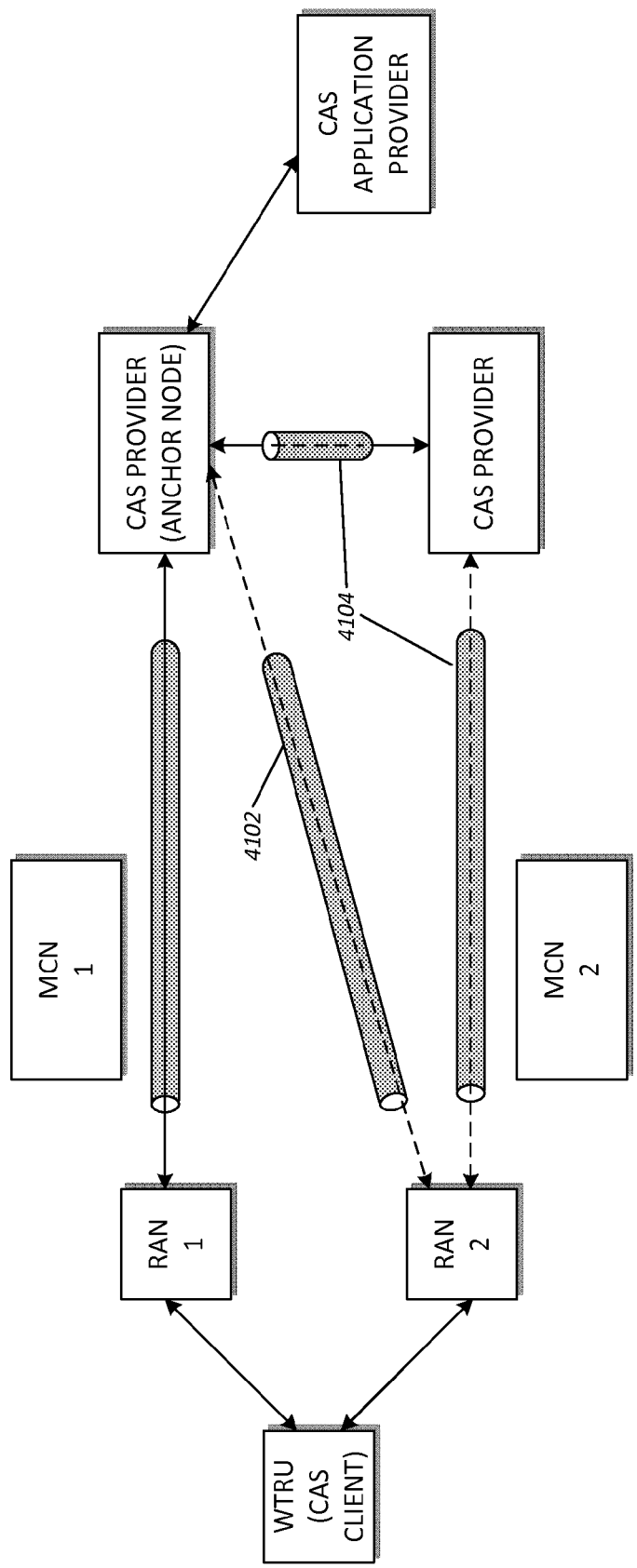
FIG. 41 is a diagram illustrating data plane of BWM at layer 3.

FIG. 40 is a diagram illustrating BWM at layer 3 using Control Plane. FIG. 41 is a diagram illustrating BWM at layer 3 using Data Plane. BWM may be obtained using different RANs (e.g., RAN 1 and RAN 2) and/or different MCNs (e.g., MCN 1 and MCN 2), as illustrated in FIG. 40.

FIG. 41 is a diagram illustrating BWM at layer 3 using Data Plane. As illustrated in FIG. 40 and FIGS. 41, 4002 and 4102 may illustrate a case where same CAS provider may have access to multiple RANs for BWM support (e.g., multiple MCNs in this example, but the same MCN with multiple RANs may also be possible).

As illustrated in FIG. 40 and FIGS. 41, 4004 and 4104 may illustrate a CAS provider handling anchor node functionality that may have access to one RAN. Another RAN may be accessible via another CAS provider, which may not be acting as anchor node in this case. A tunnel may be used between the two CAS providers for traffic handling. A CAS application provider and/or CAS client on the WTRU may configure the two CAS providers accordingly, e.g., to allow the usage of a tunnel between the two and to allow the transport of IP packets destined to foreign IP addresses. CAS application provider may have the knowledge about a WTRU that may be connected via two different CAS providers. The CAS client on the WTRU may have this knowledge. The CAS application provider and/or CAS client may configure both CAS providers. To support this example, the CAS application provider may have agreements with the involved CAS providers and there may be an agreement between the CAS providers to allow interaction between the CAS providers and routing of IP packets. Multiple CAS providers (e.g., more than two) may be involved using tunnels toward the CAS provider acting as the anchor node. The CAS providers may have agreements with one or more ANs and/or may end-up having an agreement with the same AN (e.g., this may not be precluded however). The multiple CAS providers may allow access to multiple ANs/RANs and may result in increase of the bandwidth.

Figure 42:
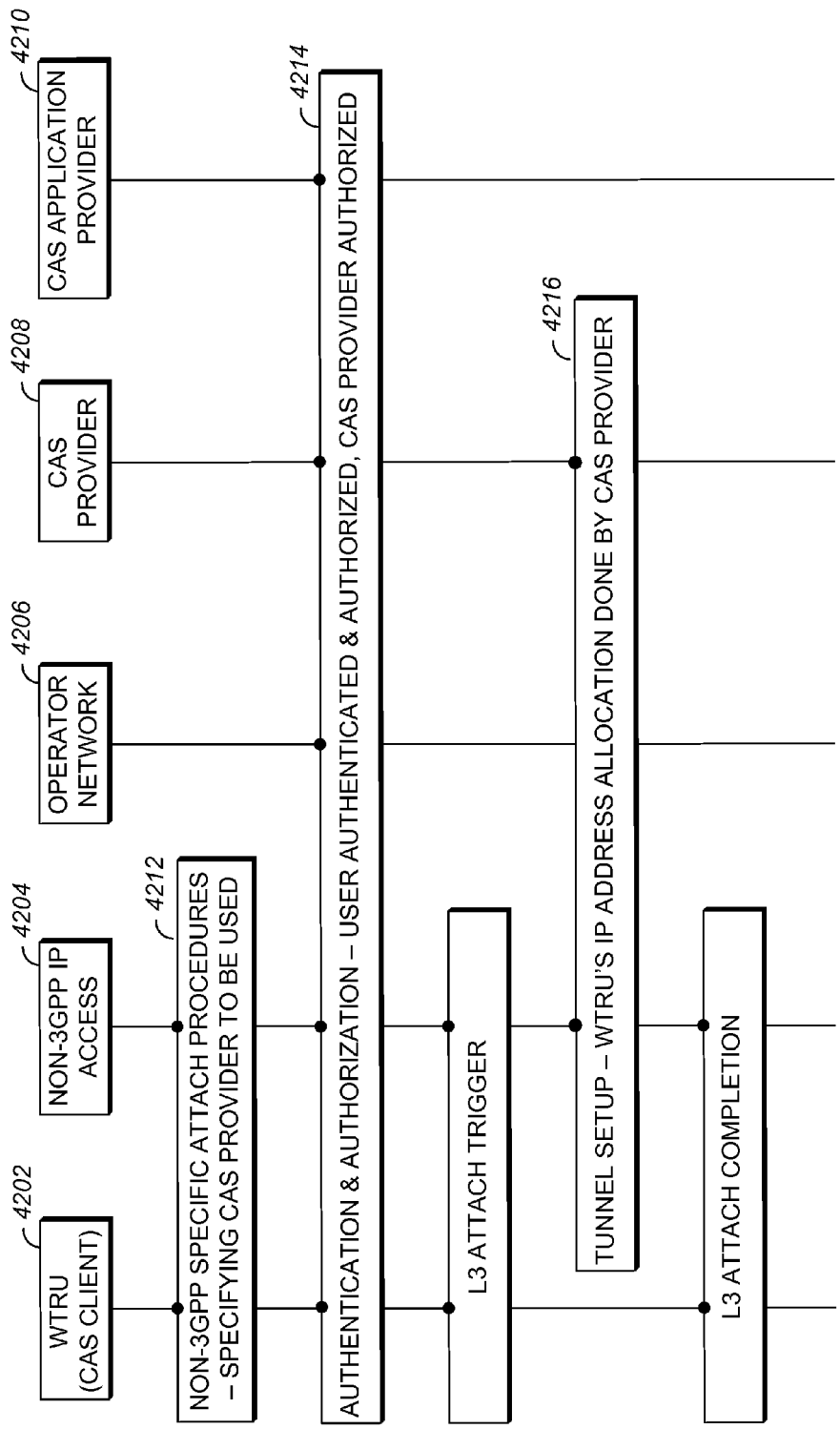
FIG. 42 is a diagram illustrating an example of an initial attachment to a non-3GPP network.
Figure 43:
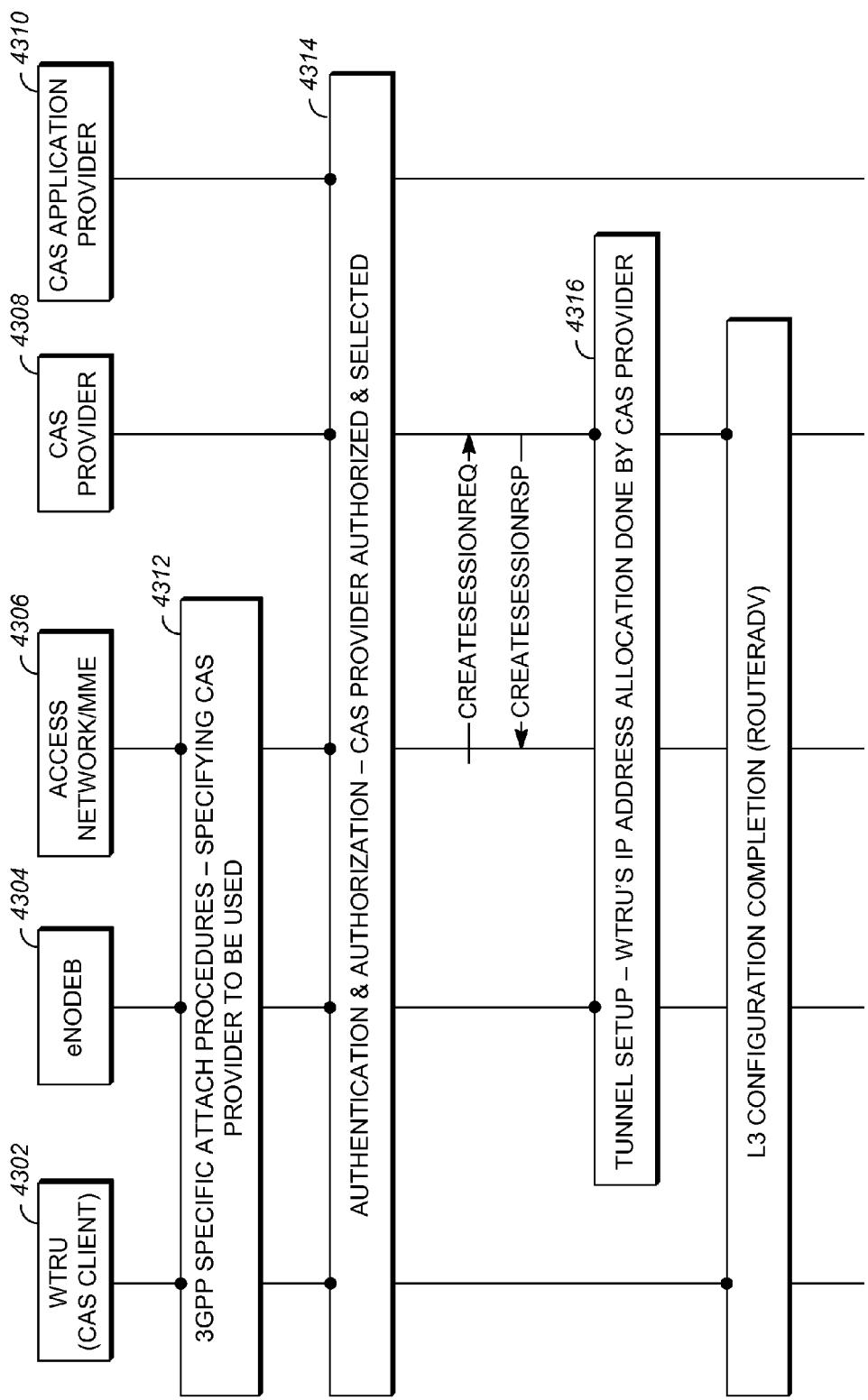
FIG. 43 is a diagram illustrating an example of an initial attachment procedure to a cellular (e.g., a 3GPP based) network.

Modified Attachment procedures and/or methods may be provided and/or used. FIG. 42 and FIG. 43 illustrate various examples for the initial attachment procedures that may enable the anchor node functionality at the CAS provider. The IP address assigned to the WTRU may be allocated by the CAS provider. The IP packets may be routed directly to the CAS provider, e.g., bypassing the MCN/P-GW. The CAS provider may apply BWM rules, e.g., if the WTRU is connected to multiple RANs that may be accessible to the CAS provider.

FIG. 42 illustrates an example of an initial attachment to a non-3GPP network. As illustrated in FIG. 42, at 4212, the access network and CAS provider discovery and selection may be performed on the WTRU 4202. The selection may be based on one or more policies. The discovery may be based on a non-3GPP IP accesses (e.g., non-3GPP IP access 4204) that may advertise their support for CAS provider (e.g., CAS provider 4208). The selected CAS provider may be specified by the WTRU 4202 during the initial attachment 4212. The non-3GPP IP access 4204 may validate that the specified CAS provider 4208 may be supported. As illustrated in FIG. 42, at 4214, authentication and/or authorization may be done by the network operator 4206, CAS provider 4208, and CAS application provider 4210. Once the user is authenticated and authorized, at 4216 a tunnel may be established between the RAN 4204 and the selected CAS provider 4208. The IP address allocation may be handled by the CAS provider, which may be acting as the anchor node. The data traffic may be routed to the CAS provider, bypassing the MCN. The non-3GPP IP access network may be operated by a cellular network operator. In this case, interactions with the MCN may be used, e.g., for service access authorization. If a non-3GPP access network is not operated by a cellular network operator, the MCN may not be involved.

FIG. 43 illustrates an example of an initial attachment procedure to a cellular network. As illustrated in FIG. 43, at 4312, the WTRU 4302 may perform 3GPP specific attach procedures. The WTRU 4302 may specify the CAS provider 4308 in its attach request. The MME 4306 may select this CAS provider 4308 as the serving GW and anchor node instead of the S-GW/P-GW. A tunnel may be setup between the CAS provider 4308 and the eNodeB 4304.

The eNodeB 4304 may interact with the MME 4306. The MME 4306 may be modified to be able to select the CAS provider as the serving GW when CAS services may be used (e.g., instead of selecting the S-GW which then selects the P-GW as the anchor node). As illustrated in FIG. 43, at 4314, the CAS provider 4308 may be authenticated and/or authorized. At 4316, a tunnel may be established between the CAS provider 4308 and the eNodeB. The IP address allocation for the WTRU 4302 may be handled by the CAS provider 4308 instead of by the P-GW (not shown in FIG. 43). The data may be routed (e.g., routed directly) to the CAS provider, bypassing the MCN/P-GW.

The tunnel between the CAS provider 4308 and the eNodeB 4304 may be setup using e.g. GTP or PMIP. An eNodeB may be used to illustrate the access point to the cellular network. It may be replaced by an HNB, HeNB, and/or the like which may connect to the MCN.

The CAS provider may be used as the anchor node while the S-GW may be used as the access GW. In this case, the MME may select the S-GW. The S-GW may select the CAS provider as the anchor node. The MME may create a data path between the eNodeB and the S-GW and a tunnel may be created between the CAS provider and the S-GW. This additional example is not shown in FIG. 43.

Figure 44:
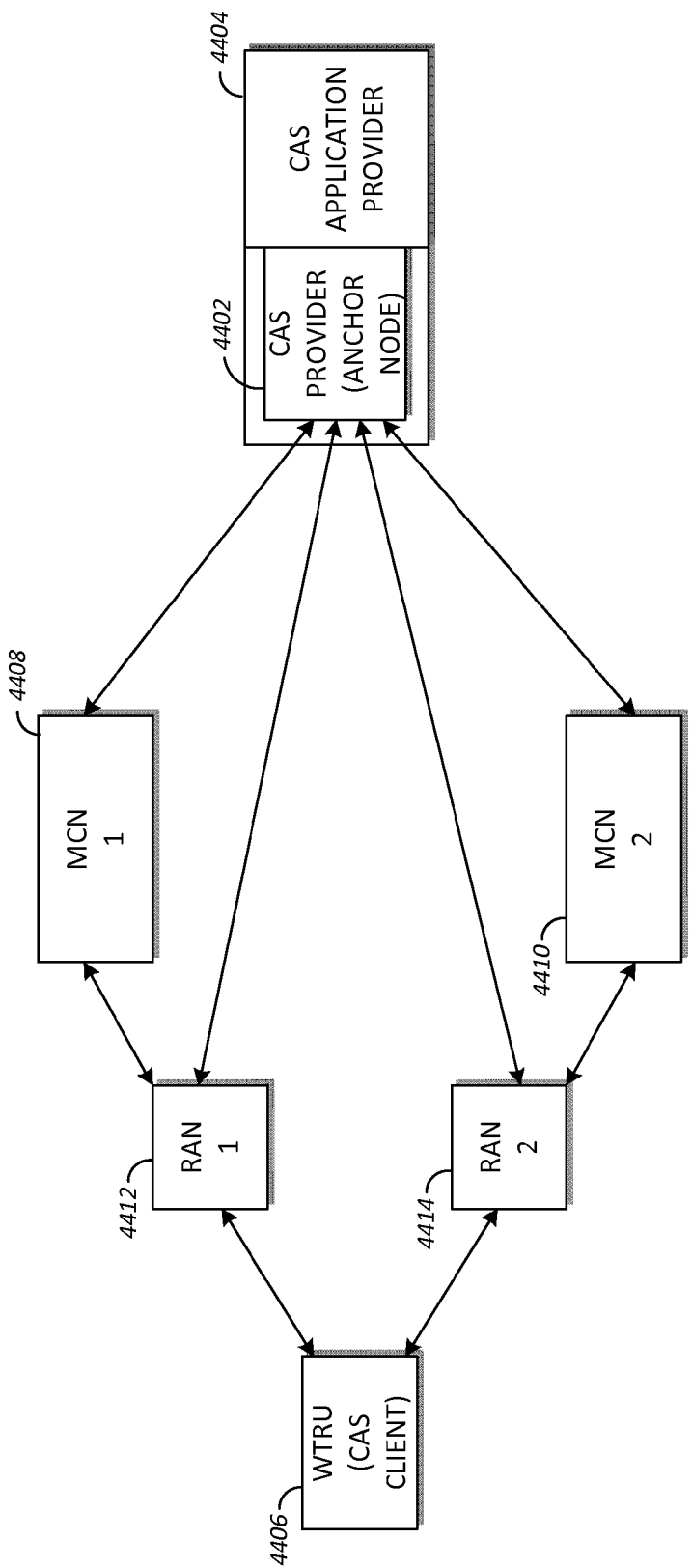
FIG. 44 is a diagram illustrating control plane of BWM at layer 3.
Figure 45:
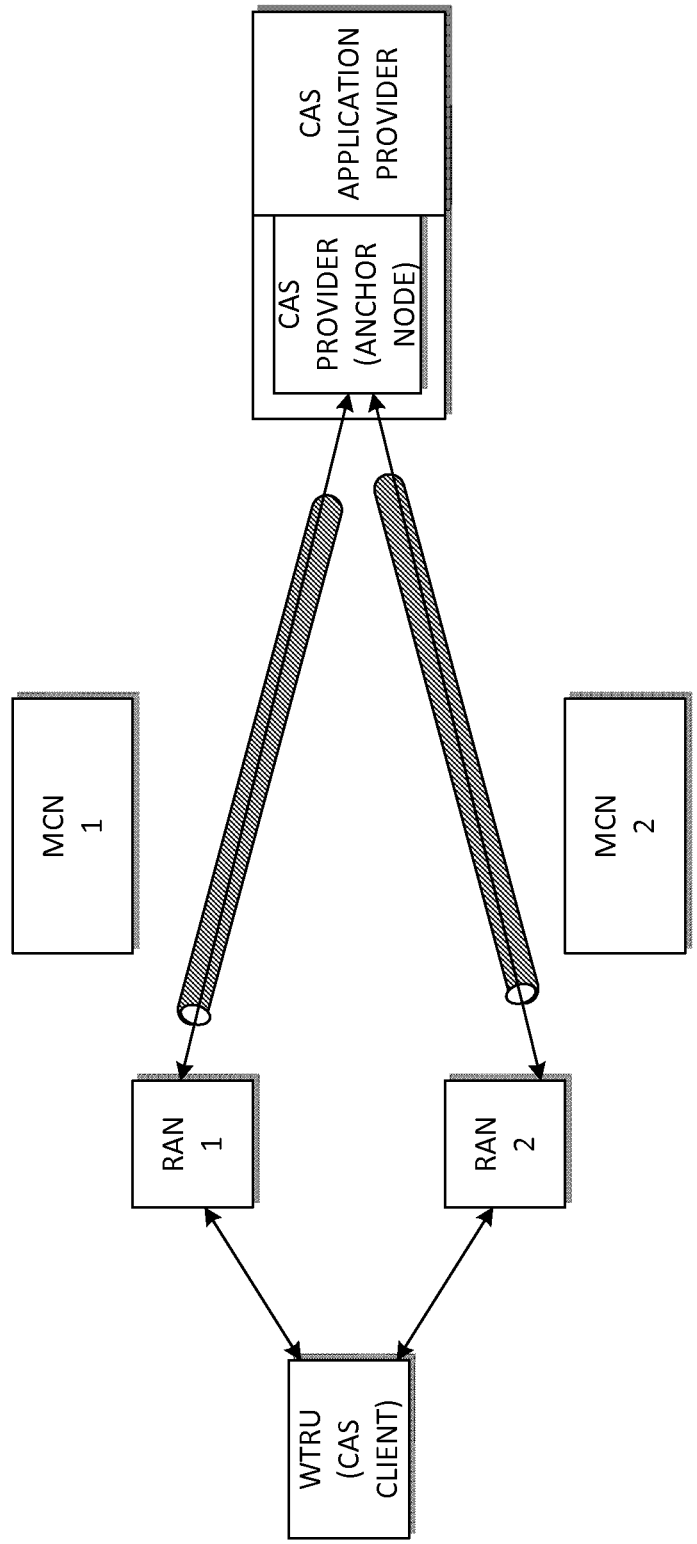
FIG. 45 is a diagram illustrating data plane of BWM at layer 3.

FIG. 44 is a diagram illustrating control plane of BWM at layer 3. FIG. 45 is a diagram illustrating data plane of BWM at layer 3. FIGS. 44 and 45 illustrate examples where a CAS provider may be co-located with the CAS application provider. The anchor node functionality may be handled by the CAS provider. A pool of IP addresses may be obtained from an MCN or from the CAS application provider that may have its own pool of IP addresses. The traffic may be routed to the CAS provider, bypassing the MCN.

As illustrated in FIGS. 44 and 45, a single CAS provider may be involved for BWM support of a specific CAS application. This CAS provider handling anchor node functionality may have access to one or more RANs and possibly one or more MCNs. The CAS provider thus may manage pools of IP addresses, e.g., one per MCN.

As illustrated in FIG. 44 (control plane) and FIG. 45 (data plane), BWM may be obtained using multiple RANs (e.g., two RANs) and multiple MCNs (e.g., two MCNs). A CAS application may be started on the WTRU. The first AN selection may have selected RAN1/MCN1. At a point when additional bandwidth is needed, a second AN selection may be performed. At this point, RAN2/MCN2 may be selected. The WTRU may have two connections (e.g., using two interfaces) with the same CAS provider. The data exchange between the CAS application server and the CAS application running on the WTRU may be done using the two connections. The CAS provider or the WTRU may act as the BWM handler. For example, the CAS provider or the WTRU may decide on which interface and/or connection each packet/IP flow may be sent.

Figure 46:
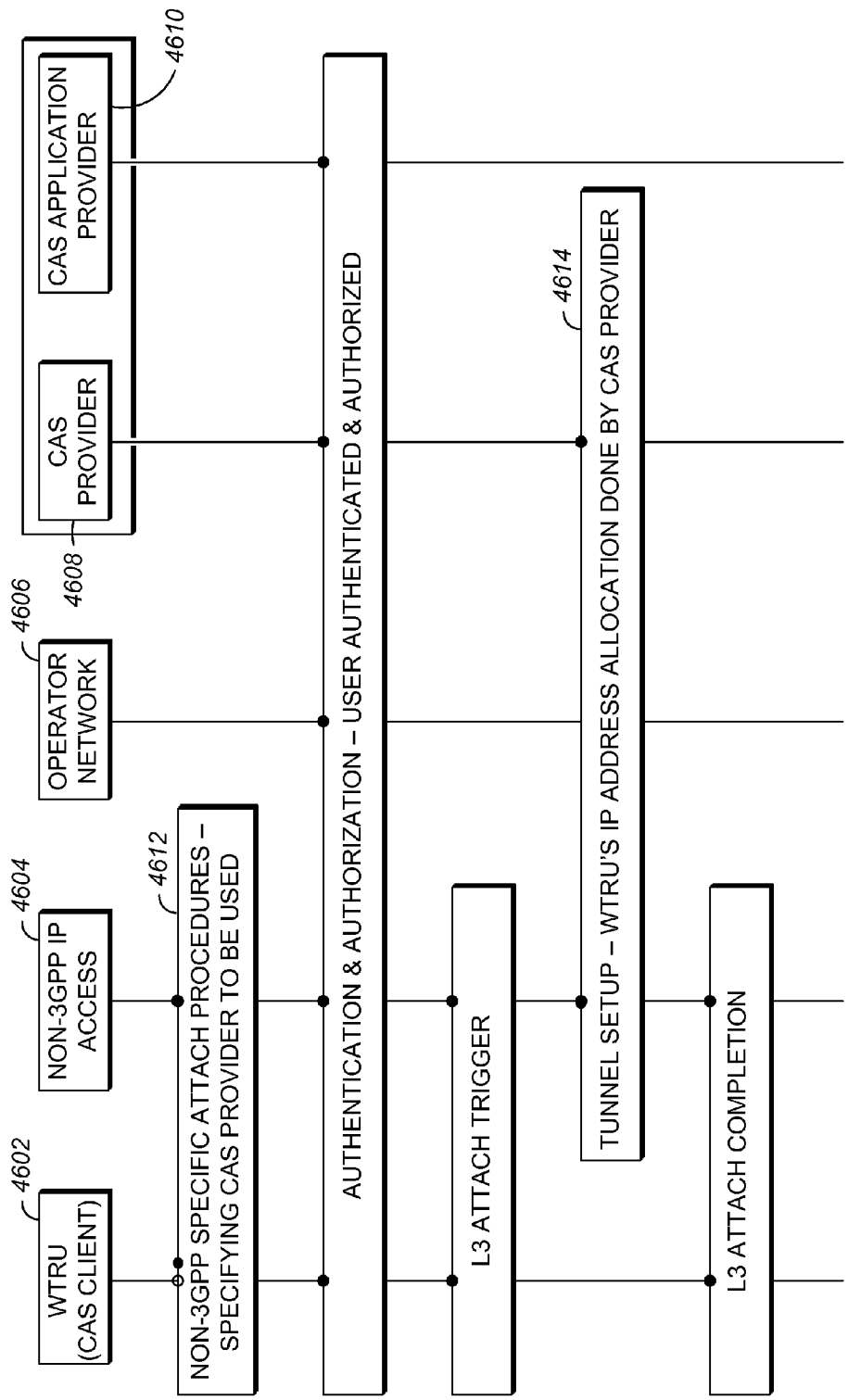
FIG. 46 is a diagram illustrating initial attachment to non-3GPP IP accesses that may be used for example architecture described in FIG. 44 and FIG. 45.

Modified attachment may be provided. FIG. 46 is a diagram illustrating the modified initial attachment to non-3GPP IP access that may be used for example architecture described in FIGS. 44 and 45. As with the case where the CAS provider is separated from the CAS application provider (FIG. 42), in this example architecture (FIG. 46), the CAS provider may handle the IP address allocation of the WTRU 4602. The modified attachment procedure and/or method as illustrated in FIG. 46 may be similar to the FIG. 42, except that the CAS provider 4608 in FIG. 46 may be located within the CAS application provider's network 4610.

As illustrated in FIG. 46, CAS provider 4608 may be specified by the WTRU 4602 during the attachment procedures 4612 (e.g., provisioned on the WTRU 4602 with the CAS application specific information). At 4614, a tunnel may be established between the RAN 4604 and the specified CAS provider 4608. The non-3GPP IP access network may be operated by a cellular network operator. In this case, interactions with the MCN may be required, e.g., for service access authorization. In the case of a non-3GPP access network that may be operated by a non-3GPP network operator, the non-3GPP network operator may be involved. The IP address allocation may be handled by the CAS provider, which may act as the anchor node.

Figure 47:
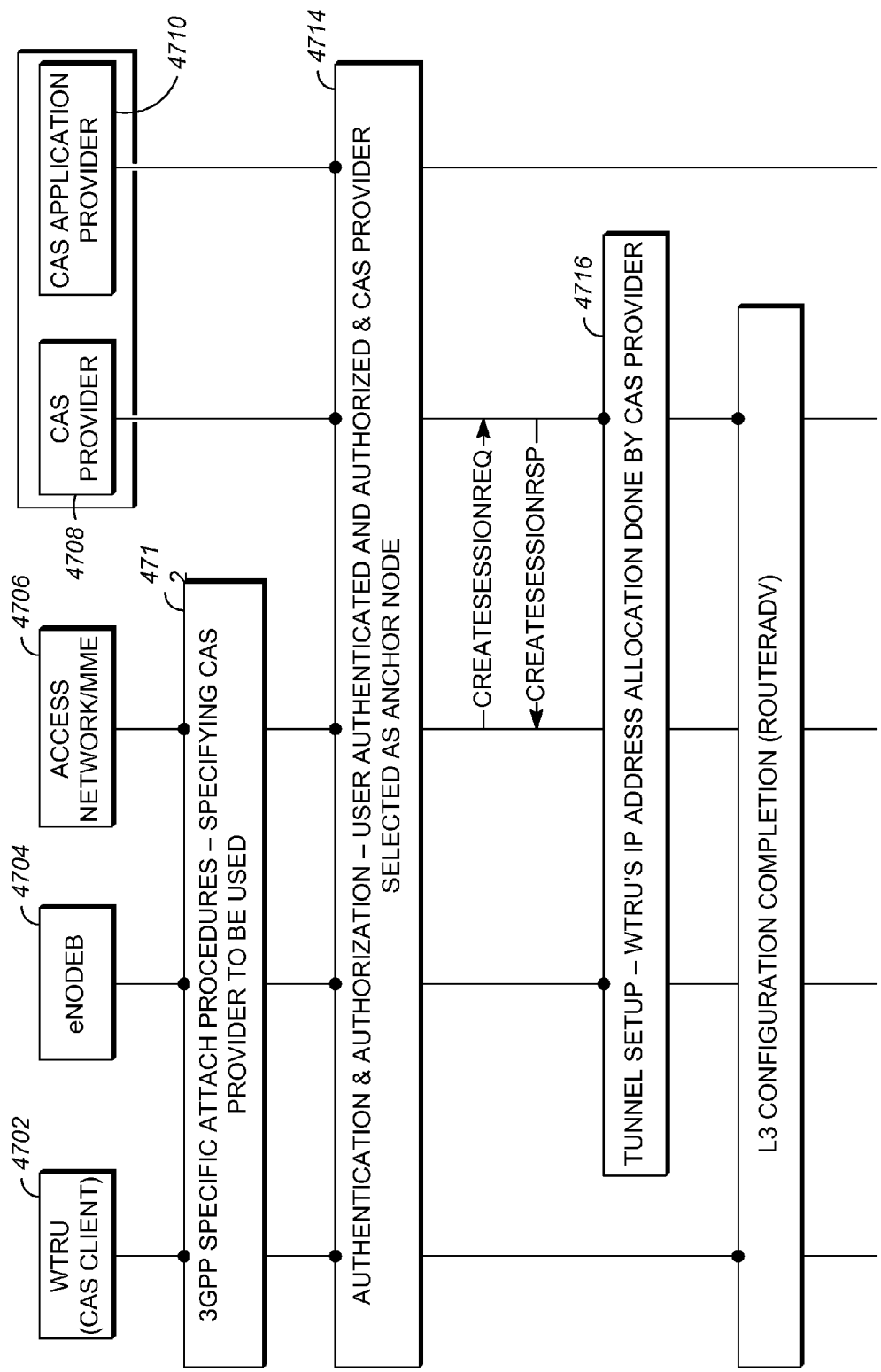
FIG. 47 is a diagram illustrating initial attachment to cellular network that may be used for example architecture described in FIG. 44 and FIG. 45.

FIG. 47 is a diagram illustrating the modified initial attachment to cellular network that may be used for example architecture described in FIGS. 44 and 45. As illustrated in FIG. 47, CAS provider 4708 may be specified by the WTRU 4702 during the attachment procedures 4712 (e.g., provisioned on the WTRU 4702 with the CAS application specific information). At 4714, the user may be authenticated and/or authorized and CAS provider 4708 may be selected as the anchor node. At 4716, a tunnel may be established between the CAS provider 4708 and the eNodeB 4704. The IP address allocation may be handled by the CAS provider, which may act as the anchor node.

Figure 48:
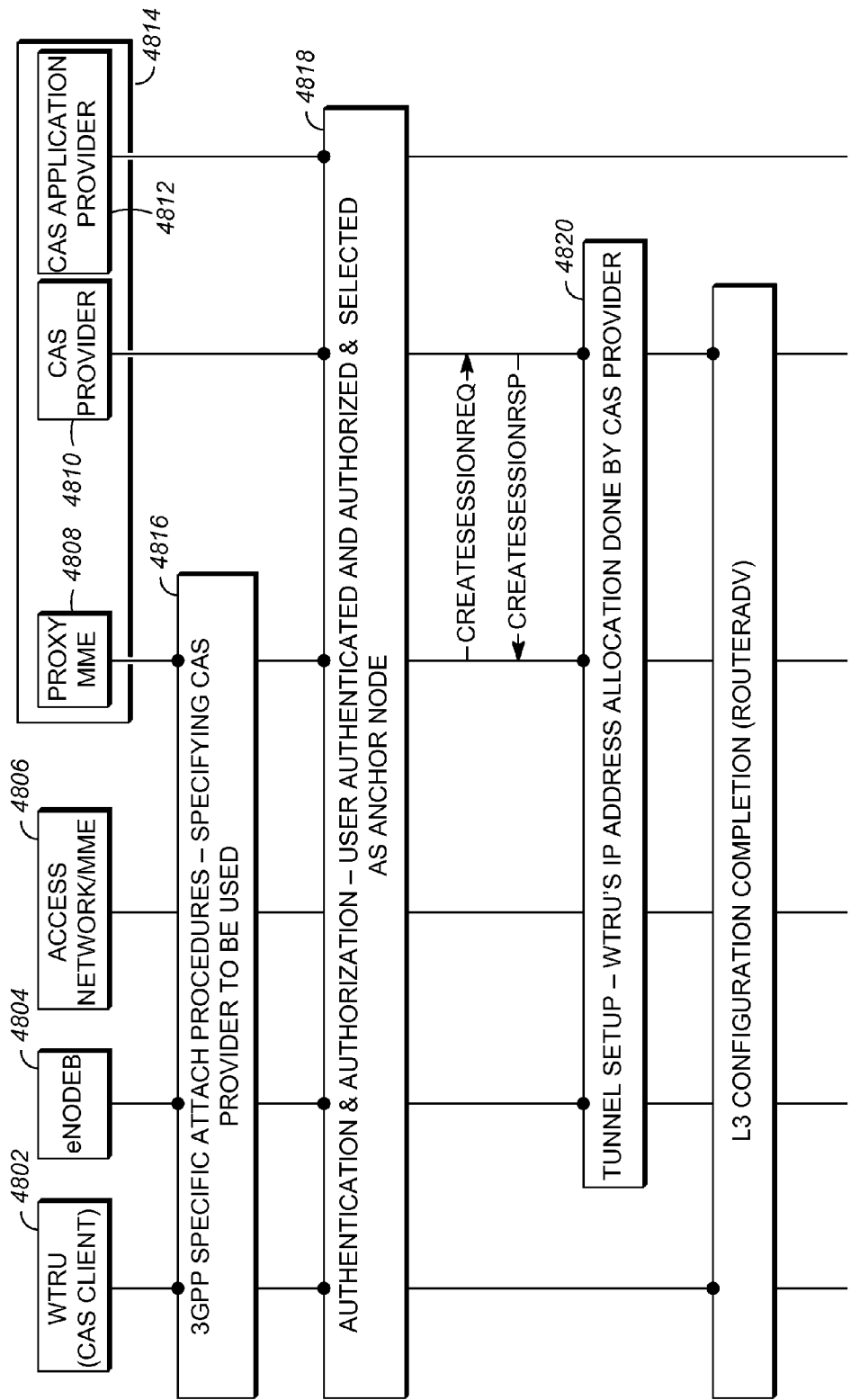
FIG. 48 illustrates the initial attachment to a cellular network/radio access network using MME Proxy.

FIG. 48 illustrates the initial attachment procedures to a cellular (e.g., 3GPP based) network using MME Proxy 4808. The proxy may be located within the CAS application provider's network 4814, with the CAS provider 4810.

As illustrated in FIG. 48, the eNodeB 4804 may select the Proxy MME associated with the specified CAS provider 4810 instead of going to the MCN-MME. The eNodeB 4804 may learn the target CAS provider/proxy MME address via, e.g., 3GPP specific attach procedures. For example, at 4816, the WTRU 4802 may attach to the eNodeB 4804 using a modified attach message which may include the selected CAS provider information. The CAS provider information may be provisioned on the WTRU 4802, e.g., when the corresponding CAS application may be installed/activated and the user may be registered with the CAS application provider. The eNodeB 4804 may be configured with allowed Proxies MME by the AN operator (e.g., eNodeB owner) when agreements may be made with the CAS providers. The Proxy MME may select the specified CAS provider as the anchor node.

Using the Proxy from the CAS application provider network 4814, the IP address may be allocated to the WTRU 4802 without involving the MCN. As illustrated in FIG. 48, CAS provider 4810 may be specified by the WTRU 4802 during the attachment procedures 4816 (e.g., provisioned on the WTRU 4802 with the CAS application specific information). At 4818, the user may be authenticated and/or authorized and CAS provider 4810 may be selected as the anchor node. At 4820, a tunnel may be established between the CAS provider 4810 and the eNodeB 4804. The IP address allocation may be handled by the CAS provider, which may act as the anchor node.

As described herein, the CAS provider may be within an access network. For example, the anchoring functionality and BWM support may be handled by the PGW with, for example, the support of PMIP. Using the CAS provider within the access network, the CAS provider may be co-located or may interact with the P-GW. The IP address management/allocation may be handled within the MCN. In this case, the traffic may be flowing through the MCN, since the CAS provider may be located in the MCN. The CAS provider may interact with other MCNs for BWM handling as described herein.

The CAS provider that may handle the anchor node functionalities may reside in the MCN, e.g., similar to the current 3GPP architecture where the P-GW may be the anchor node. The BWM handling of the CAS provider is described herein. In an example, multiple CAS providers (e.g., anchor nodes) may be utilized. Tunneling may be provided between the CAS providers and with the modified attachment procedures described herein.

Figure 49:
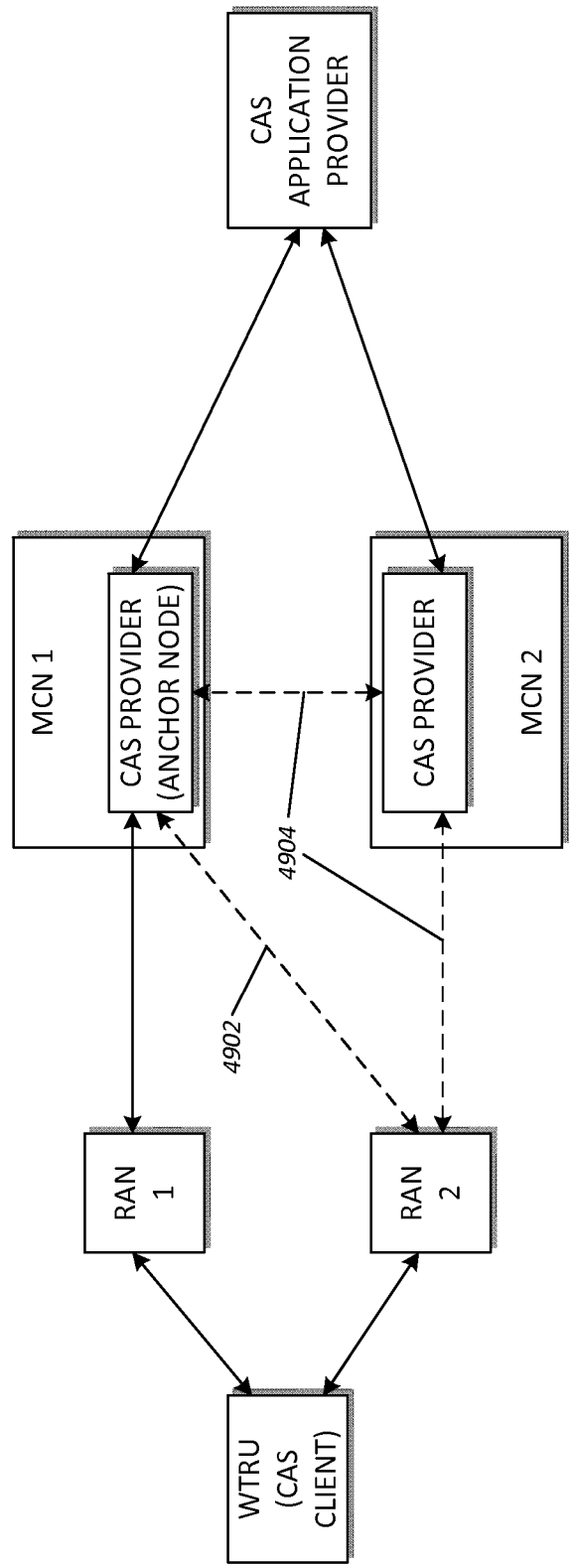
FIG. 49 is a diagram illustrating control plane of BWM at layer 3, e.g., using at least two RANs.
Figure 50:
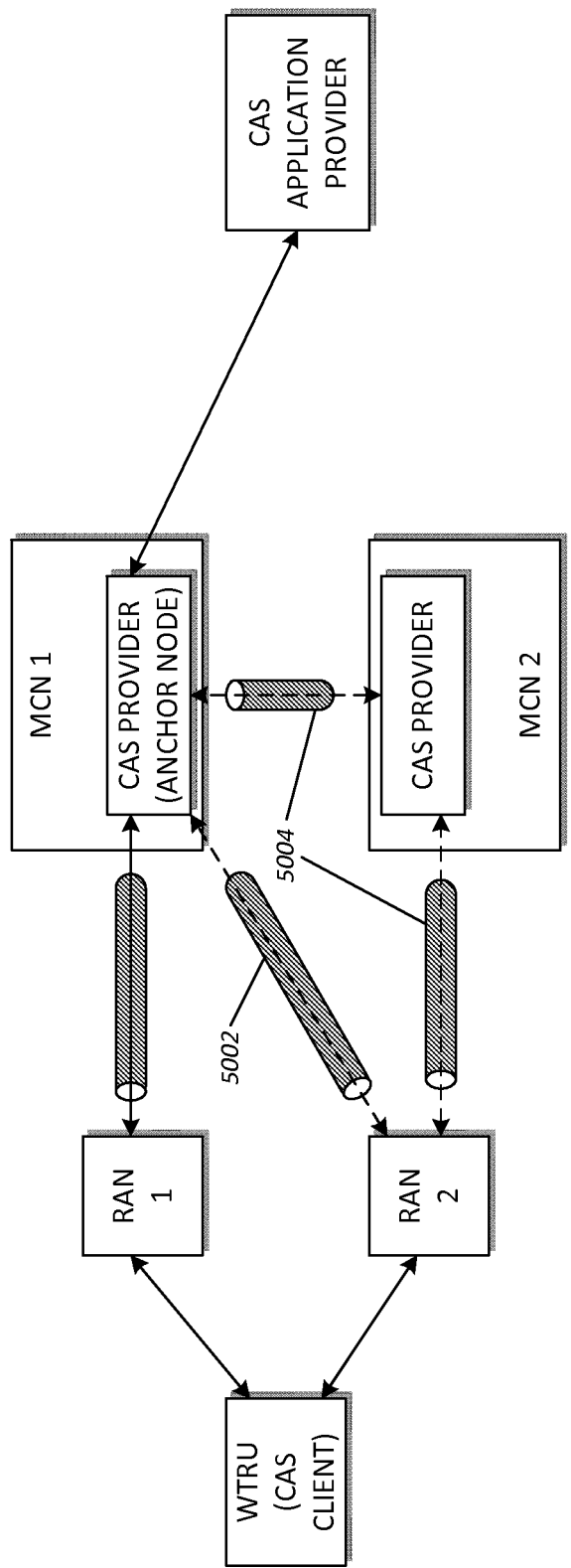
FIG. 50 is a diagram illustrating data plane of BWM at layer 3 using at least two RANs.

FIG. 49 is a diagram illustrating control plane of BWM at layer 3, e.g., using at least two RANs. FIG. 50 is a diagram illustrating data plane of BWM at layer 3 using at least two RANs. For example, as illustrated by 4902 in FIGS. 49 and 5002 in FIG. 50, the same CAS provider may have access to multiple RANs. For BWM support, the RANs may be connected to the MCN where the CAS provider may reside. This may be similar to the IP flow mobility support from the anchor node in the cellular core network (e.g., a central solution)

As illustrated by 4904 in FIG. 49 and by 5004 in FIG. 50, the CAS provider handling anchor node functionality may have access to a single RAN. A second RAN may be accessible via another CAS provider (e.g., into another MCN). The second RAN may not act as an anchor node in this case. A tunnel may be used between the two CAS providers for traffic handling. The CAS application provider or CAS client on the WTRU may configure the two CAS providers (e.g., to allow tunneling usage between the two CAS providers and transport of IP packets destined to foreign IP addresses). The CAS application provider may have the knowledge about a specific WTRU being connected via the two different CAS providers. The CAS application provider may configure both CAS providers. The CAS client on the WTRU may trigger the tunnel establishment between the two CAS providers by providing information, e.g., during the CAS connection establishment or access network attachment.

The CAS provider may behave as an access GW and/or as an anchor node (e.g., distributed anchor node functionality where anchor nodes may interact together and use tunneling between themselves to support BWM features like IP flow mobility and/or bandwidth aggregation). Multiple CAS providers (e.g., more than two) may be involved using tunnels toward the CAS provider acting as anchor node. The CAS provider may be enabled to select an AN/MCN other than the one where it may reside, via tunneling to another CAS provider. This may be similar to the IP flow mobility support from distributed anchor nodes, DMM (e.g., a distributed solution). The anchor nodes may reside in MCNs.

Figure 51:
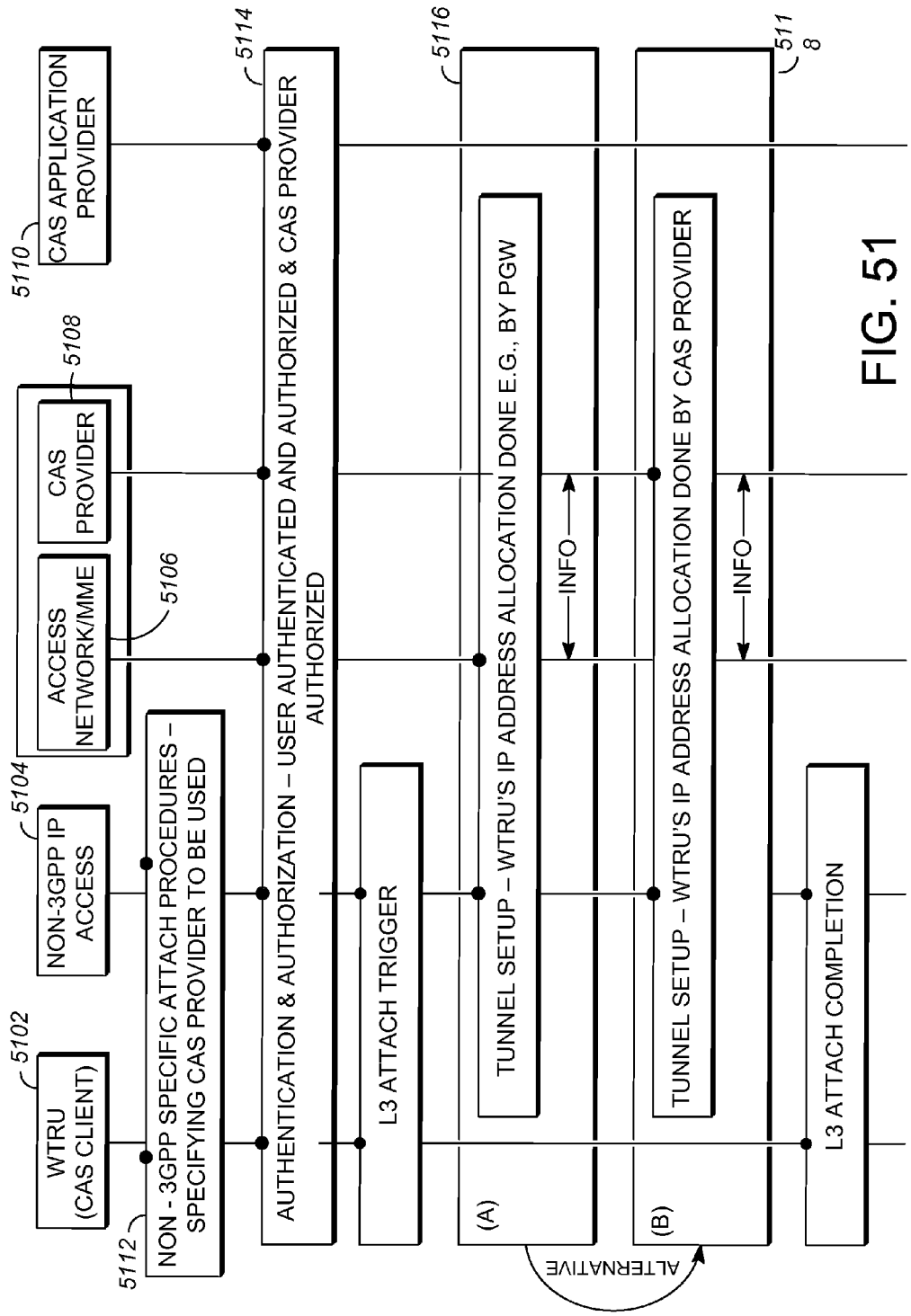
FIG. 51 is a diagram illustrating initial attachment to non-3GPP IP accesses that may be used for example architecture described in FIG. 49 and FIG. 50.
Figure 52:
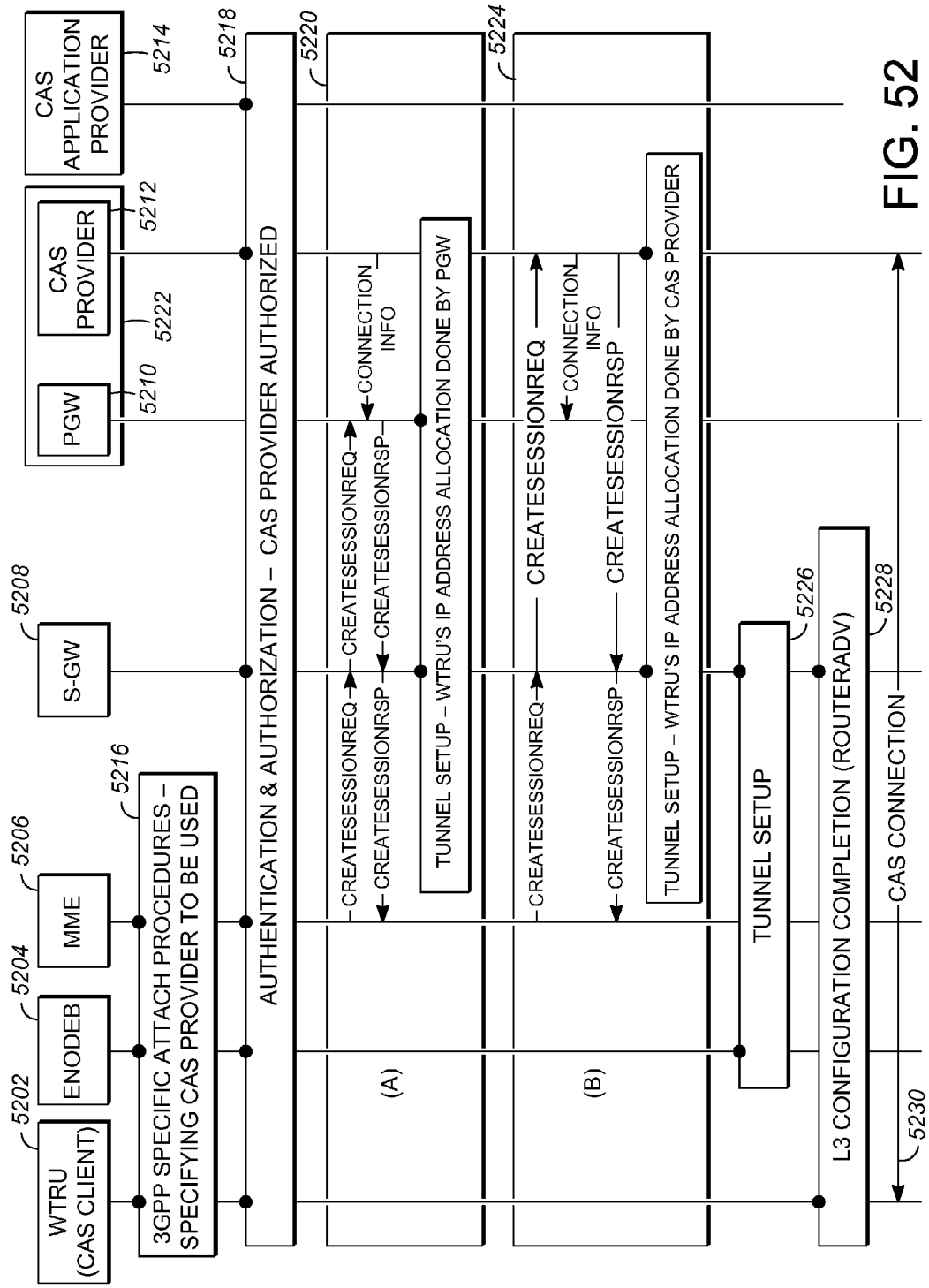
FIG. 52 is a diagram illustrating initial attachment to cellular network (e.g., 3GPP based) that may be used for example architecture described in FIG. 49 and FIG. 50.

FIG. 51 is a diagram illustrating initial attachment to non-3GPP IP accesses that may be used for example architecture described in FIGS. 49 and 50. FIG. 52 is a diagram illustrating initial attachment to cellular network (e.g., 3GPP based) that may be used for example architecture described in FIGS. 49 and 50.

FIGS. 51 and 52 illustrate an example of initial attachments to a non-3GPP access network and a 3GPP access network respectively. Modified Attachment Procedures may be provided and/or used. For example, the initial attachment procedure using this architecture example may be modified. The anchor node functionality may be handled, for example, by the P-GW or GGSN and may be located within the MCN. The CAS provider functionality may be handled, for example, by the P-GW. For example, the CAS provider and/or P-GW may be co-located.

The CAS provider may be implemented as a separate entity that may interact with the P-GW. For example, the CAS provider may be involved in the connection establishment and interaction with the CAS client while the P-GW may continue to manage the pool of IP addresses and be involved in the data plane for IP packets forwarding and tunnel management. An interface between the CAS provider and the P-GW may be needed (e.g., a C4 interface as described herein). The CAS provider may configure policies on the P-GW over this interface to handle BWM. This may be illustrated in (A) of FIGS. 51 and 52.

As illustrated in FIGS. 51 and 52, as illustrated in (B), the CAS provider may handle the IP address allocation for the CAS applications. The CAS provider may be the anchor node for these connections. The CAS provider may be selected as the anchor node by the S-GW instead of the P-GW (e.g., the WTRU may specify the selected CAS provider during the network attachment). The CAS provider may manage its own pool of IP addresses. Since the CAS provider may be located within the MCN, the attachment procedure, even though using a non-3GPP access network, may involve the MCN.

As illustrated in FIG. 51, at 5112, the CAS provider 5108 may be specified by the WTRU 5102 during the attachment procedures (e.g., provisioned on the WTRU 4802 with the CAS application specific information). A tunnel may be established. For example, at 5114, the user may be authenticated and/or authorized and CAS provider 5108 may be selected as the anchor node. At 5116, a tunnel may be established between the Non-3GPP access IP Access 5104 and the access network 5106 and the WTRU 5102 may obtain IP address, e.g., from P-GW (not shown in the figure). For example, at 5118, a tunnel may be established between the Non-3GPP access IP Access 5104 and the CAS provider 5108 and the WTRU 5102 may obtain IP address from the CAS provider 5108.

FIG. 52 illustrates the initial attachment procedures to a 3GPP network. As illustrated in FIG. 52, at 5216, the CAS provider 5212 may be specified by the WTRU 5202 during the attachment procedures (e.g., provisioned on the WTRU 5202 with the CAS application specific information). At 5218, the CAS provider 5212 may be authenticated and/or authorized. A tunnel may be established. For example, at 5220, a tunnel may be established between the S-GW 5208 and the P-GW 5210. The P-GW may be part of CAS provider's network 5222 and the WTRU 5202 may obtain IP address, e.g., from P-GW. For example, at 5224, a tunnel may be established between the S-GW 5208 and the CAS provider 5212 and the WTRU 5102 may obtain IP address from the CAS provider 5212. Since the CAS provider 5212 may be located in the MCN, the MCN may not be bypassed. Minimal changes may be done in the MCN to support the CAS provider. For example, the S-GW 5208 may be used as the serving GW and the CAS provider 5212 may be the anchor node. The CAS provider 5212 may be combined with the P-GW 5210. At 5226, the one or more 3GPP procedures may be performed, e.g. a GTP tunnel may be established between the S-GW and the eNodeB. The Layer 3 configuration (e.g., IP address allocation) may be completed 5228. The CAS connection 5230 may be established, e.g. the CAS client on the WTRU and CAS provider may exchange CAS related messages.

CAS client Behavior may be provided and/or used as described herein. CAS client behavior including, e.g., providing connectivity, mobility services to the application, etc. When CAS applications are started and/or running on the WTRU, the client behavior may be provided for the layer 3 handling of BWM features. As described herein, a CAS client may be running on the WTRU. An interface may exist between the CAS client and the CAS application running on the WTRU. The CAS client may trigger the establishment of a connection (e.g., when used, needed, or required by the application). The CAS client may select an access network/CAS provider such as the best one (e.g., depending on the application's need, policies, network conditions, and/or the like) and may handle the actions, methods, or techniques for the connection establishment, transparently to the application. The CAS client may be co-located with a connection manager or may interact with the connection manager.

For the BWM handling, the CAS client may decide if and/or when one or more connections may be established for an application. For example, additional bandwidth may be used at some point (e.g., the existing connection quality may be degrading). In this case, the CAS client may trigger the establishment of another connection to allow BWM to be used and take advantage of the available connections. Another possibility may be to have multiple connections available for the application so BWM may be applied as soon as needed. The application may not be aware of the number of connections that may be established for its operation.

The CAS client may be in charge of establishing the required connections for the application and creating the LIF/tunnels when needed. An LIF may be used with a network-based solution and/or tunnels may be used with a mobile-based solution.

For the mobile-based solution, one or more tunnels may be maintained with the anchor node or the CAS provider. For the network-based solution, the CAS client may not be involved in the tunnel creation. The CAS client may implement the interface selection for uplink traffic (e.g., based on policies or observations). For example, using the network-based solution, the WTRU may be anchored at the same CAS provider using multiple interfaces. The CAS client may be able to determine the interface on which IP packets may be sent, e.g., if the CAS provider moves an IP flow from one interface to another. The CAS client may do the same (e.g., assuming that a mirroring behavior is configured on the WTRU).

The CAS provider may act as the anchor node. The CAS client may anchor the connections used for BWM handling at the same CAS provider. The CAS providers may be partners. In such a case, a tunnel may be created between the CAS providers, allowing traffic to go through the connections. One of the CAS provider may act as the anchor node for BWM handling and the other CAS providers may act as a MAG for the traffic using the IP address allocated by the anchor CAS provider.

The CAS client registering with the CAS provider using two or more interfaces may allow the CAS provider or the anchor node to recognize that the WTRU is being registered on both connections and allow BWM usage using these connections. For example, the CAS provider may allocate an identifier to the WTRU during the first registration with the CAS provider (e.g., using C3 interface) or during network access (e.g., on the first registration/network access). The WTRU may not specify an identifier. The WTRU may specify the same identifier obtained from the CAS provider during the second registration with the CAS provider (e.g., for the second connection). The CAS provider may be able to associate the two connections together (e.g., the two connections may be with the same WTRU).

The CAS provider may associate connections pertaining to different WTRUs together, enabling traffic redirection between WTRUs. Connections which may be associated may be identified, e.g., using the WTRU identifiers (e.g., the WTRU identifiers are known to be friends). WTRU identifier associations (e.g., configured as friends) may be performed from the WTRU side via dynamic configuration (e.g., CAS client to CAS provider signaling over C3 interface). Such WTRU associations may be performed during connection establishment (e.g., list of friend WTRU identifiers specified in addition to the WTRU's specific identifier), specified in the user policies (e.g., made available to the CAS provider using a policy server, e.g., ANDSF), and/or the like. With the WTRU identifier being used to configure friends, an identifier, e.g., a group identifier, may be used. Each WTRU may be configured by the user with a group identifier. The CAS provider may learn the group identifier using a method specified herein, e.g., during connection establishment, and/or the like. The capability to associate connections from different WTRUs together may enlarge the possibilities for BWM handling, e.g., it may allow IUT support. IUT may not be a BWM feature. The mechanisms to handle IUT may be based on the ones used to handle BWM. For example, an anchor node receiving downlink packets may determine on which connection these packets may be sent based on the binding entries (e.g., rules and associated connections) thus packets/flows may be sent to same WTRU using different connections. IUT behavior may be obtained by binding connections from different WTRUs together. Packets and/or flows may be sent to different WTRUs.

As described herein, a network-based solution may be provided and/or used. With the network-based mobility solution, a logical interface (LIF) may be created when the application may be started. One or more physical interfaces underneath may be associated with the LIF. The CAS client may decide, based on policies/rules configured on the WTRU for this specific application, to establish multiple connections for BWM support. This may be transparent to the application. These connections for the same application may be associated with the same LIF.

Figure 53:
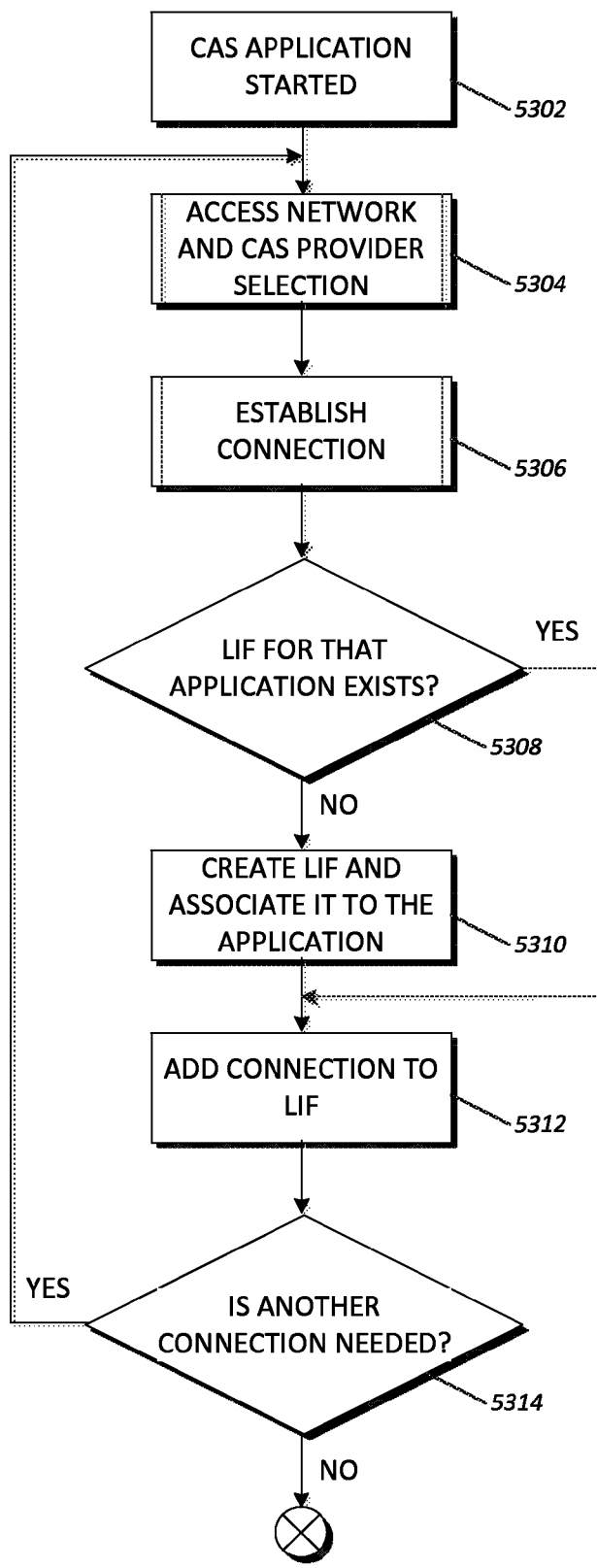
FIG. 53 illustrates the use of LIF where multiple connections may be established.

FIG. 53 illustrates the use of LIF when multiple connections may be established. A logical interface may be created and the application may be bound to it. An additional connection established for the application usage may be associated to this LIF.

As illustrated in FIG. 53, at 5302, a CAS application may be started. At 5304, the CAS application may select an access network and a CAS provider. At 5306, the CAS application may establish a connection with the CAS provider via the access network. At 5308, a determination may be made whether an LIF exists for the CAS application. If the LIF does not exist, at 5310, an LIF may be created and the LIF may be associated with the CAS application. At 5312 an additional connection may be added to the LIF. AT 5314, a determination may be made whether an additional connection may be needed. If the connection is needs, the process may start at 5304.

One or more connections associated to a LIF may go to the same CAS provider. The connections may go to different CAS providers, e.g., if these CAS providers may be partners. The partners may have an agreement to maintain connectivity by using a tunnel between them as described herein (e.g., access to a CAS provider via another CAS provider).

From the WTRU's perspective, the use of two CAS providers may be allowed, e.g., by enabling the WTRU to send specific information about the anchor CAS provider during network access procedures (e.g., PDP context activation, Wi-Fi AP association, etc.), and the C2 interface may be used to forward the information to the CAS provider. The use of two CAS providers may be allowed via the CAS registration, e.g., using C3 interface between the CAS client and the CAS providers. The use of two CAS providers may be allowed by allowing the WTRU to specify the anchor CAS provider to the partner CAS provider, e.g., when requesting the allocation of an IP address (e.g., using DHCP, RS, etc.) or during the establishment of a secured connection (e.g., establishing an IPSec tunnel).

The WTRU may connect to a second CAS provider using normal procedure, i.e. without specifying anything about the first connection to another CAS provider. The CAS application on the network side may authorize the WTRU to access the application and may detect that the WTRU may already be using the application via another CAS provider. The CAS application server may inform the new CAS provider of the existence of the first CAS provider, which may be the anchor. The CAS client in this case may configure both interfaces under the same LIF, enabling the WTRU to receive/send packets from/to both interfaces.

Once the new CAS provider may learn about the existing anchor CAS provider, it may trigger the establishment of a tunnel toward this anchor CAS provider, allowing the routing of IP packets using the IP address allocated by the anchor CAS provider to be sent via the new CAS provider over the other AN. An example of this use case may be illustrated and described herein.

A CAS application provider may decide to have agreements with multiple CAS providers for various reasons, e.g., some CAS providers may offer limited AN usage (e.g. Boingo may be offering Wi-Fi connectivity) while other CAS providers may offer a large selection of ANs but at a higher rate. Having multiple agreements may enable better services to the end users and may enable the support of various WTRUs that may have different capabilities (e.g., support of cellular, cellular+Wi-Fi, multiple cellular interfaces, other technologies, and/or the like).

A Mobile-based Solution may be provided and/or used. For the mobile-based solution, a tunnel from the WTRU to the CAS provider may be created. This tunnel may be created as usual with mobile-based solution, e.g., the CAS client may initiate the tunnel creation by sending a MIP (e.g., binding update) message to the anchor node (e.g. a CAS provider). The CAS provider may reply with another MIP message (e.g., a binding acknowledgement) and may allocate a home IP address (HoA) to the WTRU. This tunnel may provide mobility/session continuity to applications using the HoA. IP packets may be routed to the anchor node (e.g., owner of the IP address). The anchor node may tunnel the packets to the WTRU. The tunnel creation may be based on e.g. MIP protocol, which may be agnostic to the AN.

Tunnels may be created to support BWM (e.g., a tunnel may be established per interface). The CAS client and/or CAS provider may decide via which tunnel the packets may be sent on. This may be transparent to the application. Tunnels from a single application may be established toward the same CAS provider. Other CAS providers may be used. These other CAS providers may not be used as anchors but as intermediate nodes to reach the CAS provider that may act as the anchor.

A policy configuration may be provided and/or used. For example, 3GPP has defined an ANDSF server to handle policy configuration at the UE. The interface S14 may be defined for the interaction between the WTRU and the ANDSF server. Since an agreement may exist with the CAS provider and the access network provider (e.g., a cellular network operator), access to the ANDSF server from the CAS provider may be allowed. The CAS provider may use the ANDSF server to push policies to the WTRU, e.g., to be used by the CAS client. CAS specific management objects (MOs) may be allowed to be modified by the CAS provider. An interface (e.g., a new interface) may be defined for this purpose and may be called or referred to as e.g. S14'. The S14' may be a reference point between CAS provider and H ANDSF/V-ANDSF. The S14' may enable dynamic provision of information to the CAS client for connectivity and/or mobility handling per application, e.g., CAS application identifier with supporting CAS provider identifier and associated list of supported access networks. A list of partners CAS providers may be configured. This dynamic provision may be supported with Pull (CAS provider-initiated session) and/or with Push (ANDSF-initiated session). In an example, the S14' interface may be realized over IP level.

CAS-related configuration information may be sent from the CAS provider by relaying the information to the access network (e.g., using C2 interface as defined herein) and then have this one update the ANDSF server.

CAS related policies may be configured on the WTRU via the CAS connection established between the CAS client and/or CAS provider, e.g., C3 interface or between the CAS client and/or CAS application server using application specific messaging.

CAS Configuration information may include a CAS application identifier. For example, a list of CAS providers which have an agreement with the CAS application provider may be provided. For each CAS provider, a list of access networks which have an agreement with the CAS provider may be provided. For each CAS providers, a list of partners CAS provider (e.g., that may be used as access GW to reach the CAS provider behaving as an anchor) may be provided.

Inter-Unit Transfer Support may be provided and/or used. For example, the examples or solutions described herein may be used to handle HO, IFOM and BWA and may be used for other traffic redirection features, e.g., inter-unit transfer (IUT).

In an example, on the anchor node, the traffic may be sent to the WTRU via different IP address/interface (network) pairs. The traffic may be sent based on one or more policies. The anchor node may apply these policies on the various entries (e.g., pairs) associated with a single WTRU. Using the CAS concept, it may be expected that the CAS provider may know if an application may be started multiple times by the same user on different devices since the CAS provider may be involved in the connection establishment and in the tracking and/or charging functionalities.

Devices may be associated or configured as friends at the CAS provider, allowing the transfer of traffic from one device to a friend device. To be able to support such functionality, the CAS provider may obtain during the connection establishment a user identifier (e.g., generated by the CAS application server during authentication/authorization phase) and/or the device identifier. Using these two distinct identifiers, the CAS provider may transfer the traffic for a user between interfaces or from one device to another one (e.g., from a smartphone to a laptop or from the cellular interface on the laptop to the Wi-Fi interface on the same laptop). Another example using a friend device may be from a user A smartphone to a user B tablet, the two WTRUs and users may be configured as friends on the CAS provider (e.g., by the CAS application server using C1 interface).

The CAS provider may be capable of receiving a command, and may be configured with a policy or take the decision to trigger the traffic redirection or duplication.

FIG. 54 illustrates an example of a CAS provider that may be used by two WTRUs as an anchor node. It may be possible to use two different CAS providers (e.g., with the CAS being a separate entity or within an access network). Inter-CAS provider communication may be provided and/or used (e.g., using a C4 interface). The CAS provider used by WTRU 1 5402 may remain the anchor node after the IUT since it may be the owner of IP1. The second CAS provider in this case may behave as an access GW node (e.g., a MAG). A tunnel may be created between the two CAS providers to direct the traffic destined to IP1 to the second CAS provider and then to WTRU2 (e.g., similar to what may be showed in FIG. 56).

FIG. 54 illustrates an example IUT operation. At 5410, a CAS application may be started on WTRU1 5402. Looking at the configuration related to that specific application, an access network and a CAS provider may be selected. At 5412, a connection may be established from WTRU1 5402 to the application server. For example, the connection may be established for IUT support. The application server may comprise a CAS provider 5406 and/or CAS application provider 5408. An IP address (IP) may be allocated to WTRU1 by CAS provider 5406, which is the anchor node. The attachment procedure may be one of the attachment procedures described herein depending of the example architecture.

At 5416, application data may be exchanged between the application server and the client application running on WTRU1 5402. Since the CAS provider 5406 may be acting as the anchor node, the traffic may be routed to the CAS provider 5406 and may be forwarded to WTRU1 5402.

At 5418, the same application may be started on WTRU2 5404, which may be configured as a friend of WTRU 1 5402. For example, the devices themselves may configured as friends or the devices may belong to the same user. The CAS provider 5406 may configured, e.g., by the CAS application server over the C1 interface as described herein.

At 5420, a second connection may be established between WTRU2 5404 and the application server. An IP address (IP2) may be allocated to WTRU2 5404 by the CAS provider 5406, which may be the anchor node for the second connection.

At 5422 and/or 5424, a traffic redirection request to another device may be received at the CAS provider 5406. This request may have been sent from WTRU1 5402 or from WTRU2 5404 (e.g., requiring user input on one of the devices). For example, the CAS provider 5406 may detect that the same user has started the same application on two different devices. The CAS provider may contact the CAS client on one device to display a popup window on the screen and request the user to select an option to transfer traffic to other device, or run separate sessions on each device, or duplicate traffic on both devices, and/or the like. The transfer may be triggered based on policies configured on the CAS provider, e.g., preferred device. When the CAS provider 5406 detects that the preferred device may be connected, it may start using this connection/device. The CAS provider 5406 may disconnect the other device which may have been using the application.

For example, a user which may have started an application on WTRU1 (e.g., a tablet) may arrive home and may like to continue using the application without interruptions on a WTRU2 (e.g., a laptop). The user may start the same application on WTRU2. The two devices may be connected to the CAS application server. The CAS provider may detect this double usage from the same user and may issue a request to the CAS client on e.g. the tablet to get input from the user on how to handle this double usage. The user may select transfer to the other device option. The CAS provider may inform WTRU2 and possibly AN used by WTRU2 that packets using IP1 may be sent and may be destined to WTRU2. WTRU2 may configure IP1 on its interface. The CAS provider may re-routes the packets to WTRU2, still using IP1. Traffic from the application running on WTRU2 may be sent using IP1 as source IP address (e.g., transparent to the application server). The application may be closed on the tablet.

One or more example BWM use cases may be provided and/or used. For example, a BWA feature may be illustrated using the example architectures described herein (e.g., the CAS provider as a separate entity, within an access network and/or within an application provider).

An IFOM feature may enable move one or multiple flows to be moved another interface, e.g., packets of a specific flow may be moved to another interface. A HO feature may be seen as IFOM with the flows being moved, e.g., flows using a first interface may be moved to a second interface.

BWA feature may be similar to IFOM except that packets distribution may not be done per specific flow but per packet. In BWA packets of a single flow may be sent over multiple interfaces, e.g., to distribute packets equally between two interfaces (e.g., two packets may be sent on the first interface and the remaining ones on the second interface).

Figure 55A:
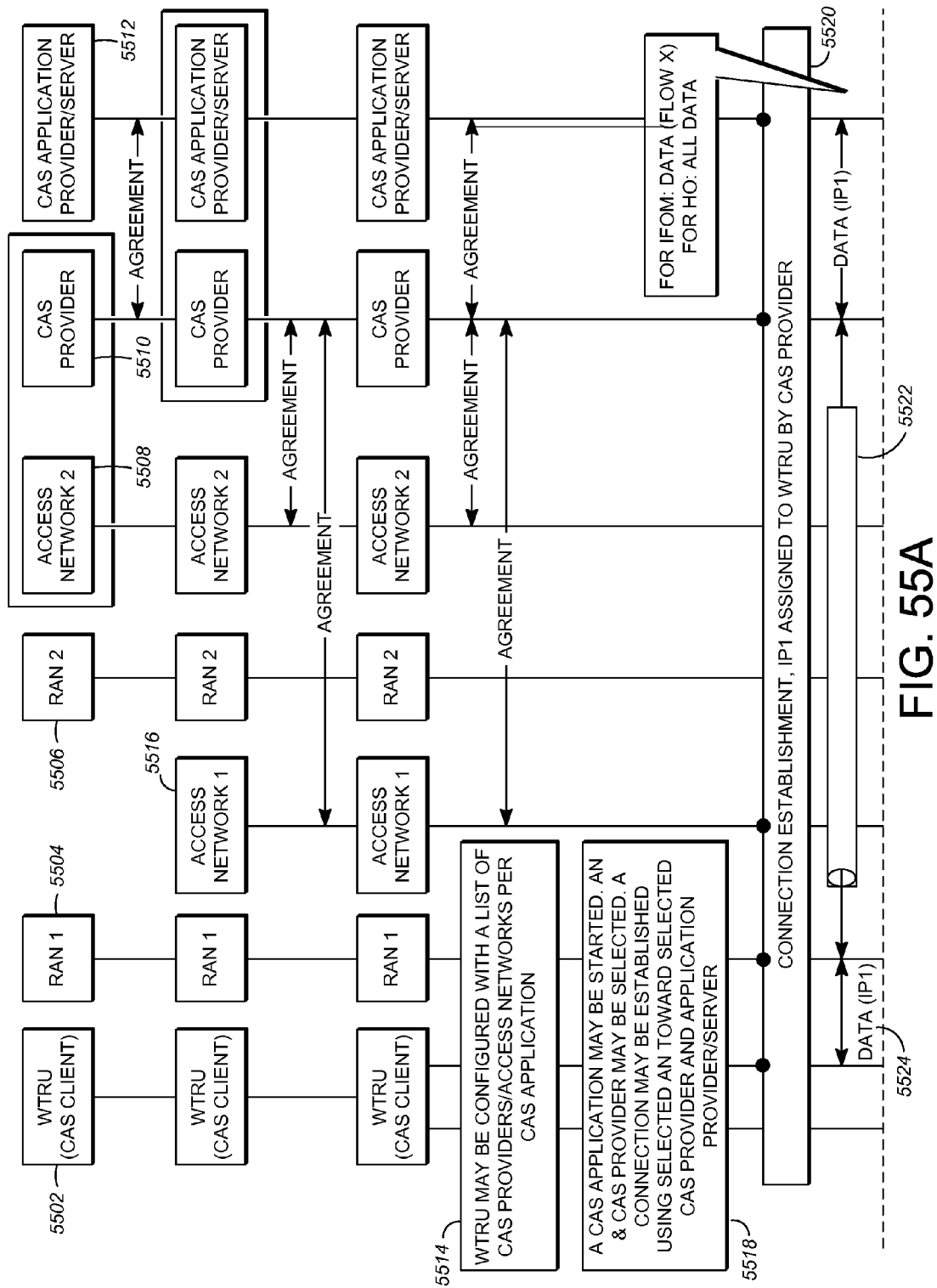
FIG. 55 (FIG. 55A and FIG. 55B)) is a diagram illustrating BWM at layer 3 with CSA provider as the anchor node.
Figure 55B:
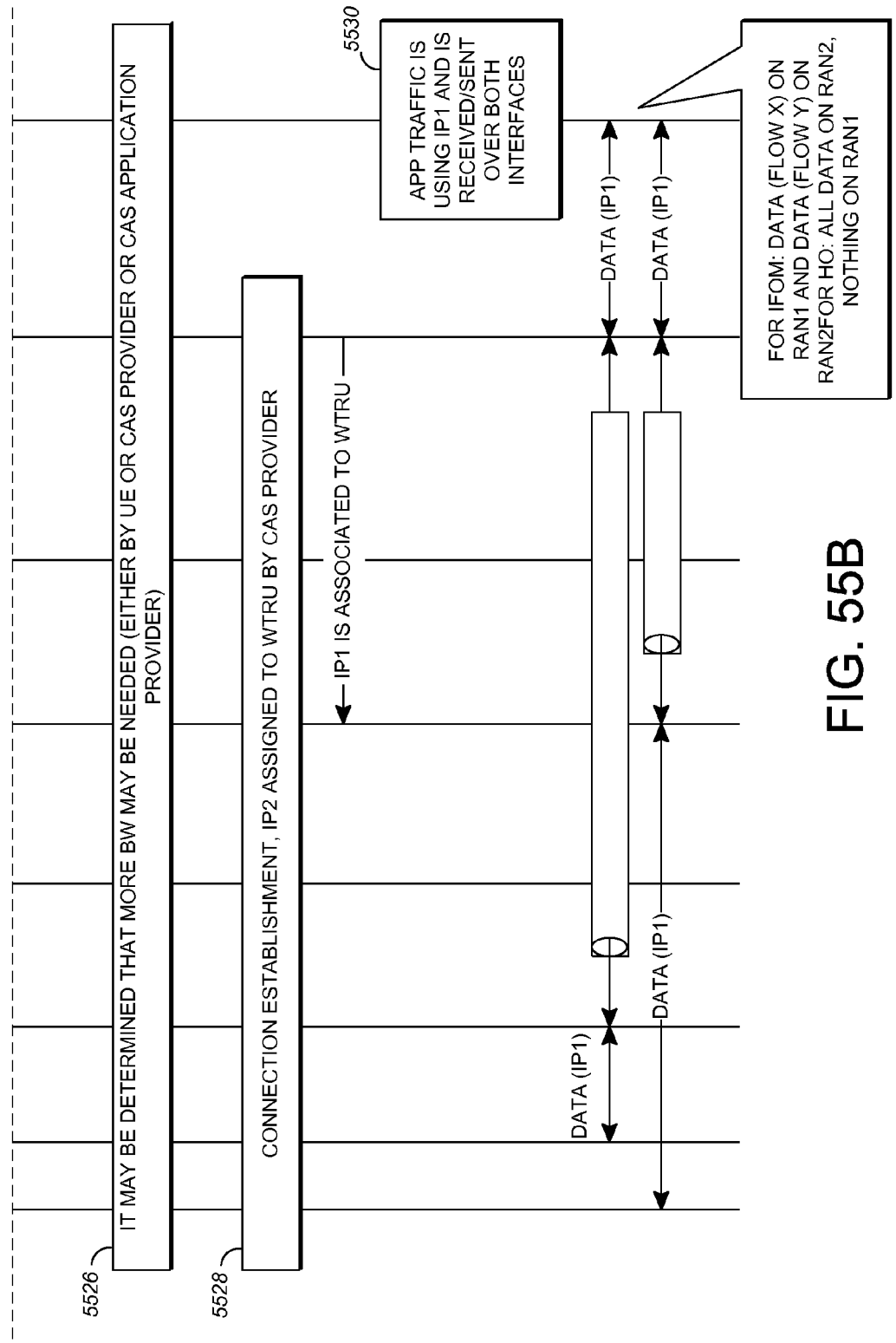

BWM at Layer 3 may be provided and/or used. FIGS. 55A and 55B illustrate BWM handling at layer 3 with CAS provider handling the anchor node functionality. FIGS. 55A and 55B illustrate BWM using the three architecture options.

FIG. 55 (FIGS. 55A, 55B, and 55C) is a diagram illustrating BWM at layer 3 with CSA provider as the anchor node. As illustrated in FIG. 55A, at 5514, a WTRU may be configured with a list of CAS providers and a list of the access networks that they may support, per application. This configuration may be pre-configured on the WTRU, e.g., received at application installation/registration, pushed by the network using a policy server like ANDSF, obtained via a query from the WTRU, etc.

For an example architecture such as the CAS being a separate entity, a configuration example may be provided. For example, a CAS application A, list {CAS provider 1, list {AN1, AN2}, CAS provider 2, list {AN3}} may be used. In this configuration example, it may be assumed that the application provider 5512 may have an agreement with CAS provider 1, which may have an agreement with two different access networks (e.g., access network 1 5516 and access network 2 5508). For each of these ANs, a radio access network (RAN) may be illustrated in FIGS. 55A and 55B. The CAS provider 2 listed in the configuration example above may not be illustrated on the figure.

For an example architecture such as a CAS provider being within an application provider, a configuration may be provided. For example, a CAS application A, list {AN1, AN2} may be used. In this configuration example, it may be assumed that the application provider may have an agreement with two different access networks. For each of these ANs, a radio access network (RAN) may be illustrated in FIGS. 55A and 55B. The CAS provider may be within the CAS application provider network thus no CAS provider selection may be needed.

For an example architecture such as a CAS provider being within an access network, a configuration may be provided. For example, CAS application A, list ((CAS provider 1, AN1), (CAS provider 2, AN2)) may be used. In this configuration example, it may be assumed that the application provider may have an agreement with CAS provider 1, which may have an agreement with AN1 and CAS provider 2, which may have an agreement with AN2. For example, a AN, which includes the CAS provider may be illustrated in FIG. 26. This AN may be associated to 2 radio access networks (RANs). The CAS provider 2 and AN1 listed in the configuration example above may not be illustrated in FIGS. 55A and 55B. Other information may be configured on the WTRU in addition to what may be described and shown herein.

As illustrated in FIG. 55A, at 5518, a CAS application may be started on the WTRU 5502. Based on the configuration related to that specific application, an access network and a CAS provider may be selected (e.g., in the example architecture with the CAS being a separate entity and/or wherein the CAS being within an access network). An access network may be selected with an example architecture such as the CAS provider being within the application provider. At 5520, a connection may be established from the WTRU 5502 to the application server 5512, e.g., using the access network 1 5516. An IP address may be allocated to the WTRU 5502 by CAS provider 5510, which may be the anchor node. At 5522, a tunnel (e.g., PMIP) may be established between the CAS provider 5508 and the access GW in the RAN 5504. One or more of the attachment procedures described herein may be used depending of the architecture option.

At 5524, application data may be exchanged between the application server and the client application running on the WTRU. Since the CAS provider 5510 may be acting as the anchor node, the traffic may be routed to the CAS provider 5510 and may be forwarded to the WTRU 5502 via tunneling to the RAN 5504 (e.g. eNodeB/access GW or non-3GPP access GW). The traffic may be bypassing the MCN/PGW (access network) for one or more architectures (e.g., the CAS being a separate entity and/or being within the application provider). For some example architectures (e.g., the CAS provider being within the access network), the CAS provider may be within the access network such that the traffic may be going through the access network.

At 5526, it may be determined that more bandwidth may be needed and/or used for the running application. This may be determined by, e.g., the CAS client on the WTRU 5502 or a CAS-enabled connection manager or it may be from the CAS application server/client or CAS provider. This decision to add more bandwidth may be based on one or more of policies, measurements on the existing connection, etc.

The CAS application client may take the decision to add more bandwidth and communicate to the CAS client running on the WTRU 5502 that an additional connection may be needed. An interface such as a new interface (e.g., C5) between the CAS client and the CAS application client may be used (CAS protocol) for that purpose. The CAS client may trigger the establishment of a connection such as a new connection.

If the decision may be from the CAS application server 5512, this one may request more BW to the CAS application client using application specific signaling. The client application may send the request to the CAS client using the C5 interface. The request may be sent from the CAS application server to the CAS provider, e.g., using the C1 interface, which may forward this request to the CAS client using the C3 interface (e.g., as defined herein). If the decision may be taken by the CAS provider/client, a request may be sent to the CAS client/Provider, e.g., using the C3 interface.

Dynamically configuring policies on the WTRU may be a way to trigger a new connection establishment. The new connection establishment may be initiated by the WTRU.

The establishment of a second connection over another RAN but toward the same CAS provider may be illustrated in FIGS. 55A and 55B. In this example, the CAS provider 5510 may assign a new IP address (IP2) to the WTRU. The CAS provider may allow the second network to transport IP packets using an IP address (IP1) which may be unknown by the IP2 network. The CAS provider 5510 may inform RAN2 5506 of the usage of IP1 by the WTRU 5502. As well, the WTRU 5502 may be configured to support the reception/transmission of packets using IP1 address over either interface. A logical interface (LIF) may be used to support that with a network-based solution. The application is bound to this LIF.

As illustrated in FIG. 55B, at 5530, once the second connection may be established, the CAS provider may start using it. The application server may continue to send traffic using IP1. The packets may be reaching the CAS provider 5510 which may decide to either forward the packets to the WTRU 5502 over RAN 1 5504 or over RAN 2 5506. CAS provider 5510 may apply rules for BWM. These rules may be deduced by the CAS provider 5510 (e.g., mirroring what the WTRU is doing or selecting interface based on congestion/costs and user preferences, and/or the like), configured on the CAS provider 5510 by the CAS application provider 5512 as part of their agreement, and/or the like.

The application running on the WTRU 5502 may receive packets. The fact that the packets may be received over two different connections/interfaces may be transparent to the application (e.g., client and/or server). This may be handled by the CAS client on the WTRU 5502 and/or the CAS provider 5510.

Figure 56:
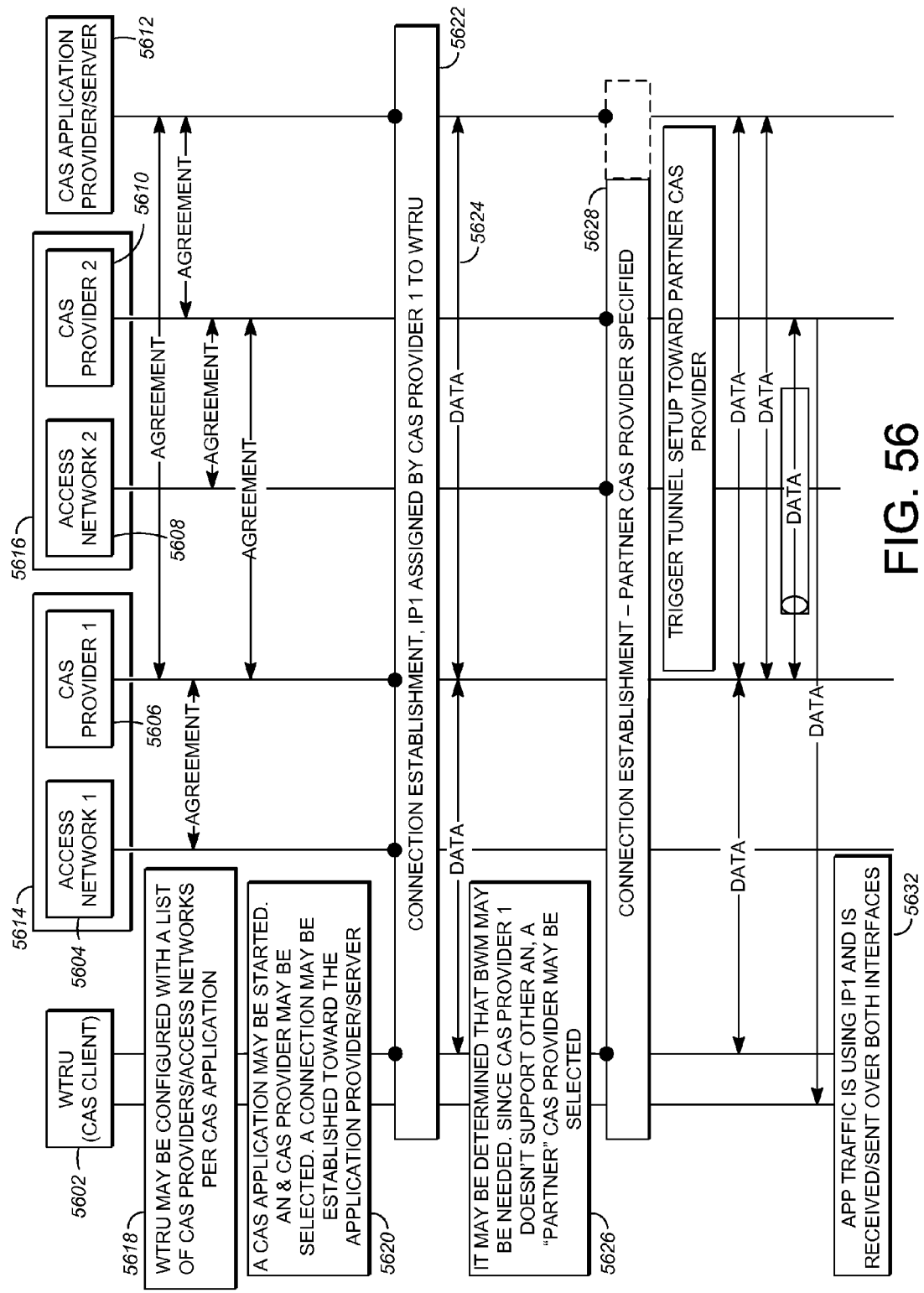
FIG. 56 illustrates an example of BWM at layer 3 using multiple (e.g., two) CAS providers.

BWM at Layer 3 using two CAS providers may be provided and/or used. Such a use case may demonstrate the use of BWM involving two CAS providers. In this example, the BWM may be handled by the CAS provider at the Layer 3 where the CAS provider may be the anchor node. FIG. 56 illustrates this use case for architecture examples such as CAS provider being a separate entity and/or within the access network as illustrated by 5614 and 5616.

As illustrated in FIG. 56, at 5618, the WTRU 5602 may be configured (e.g., pre-configured) with a list of CAS providers and/or a list of the access networks they may support, per application. This configuration may be may be configured (e.g., pre-configured) on the WTRU, e.g., when installing the application, pushed by the network, or obtained via a query from the WTRU, and/or the like (e.g., FIG. 55A at 5514 may describe configuration examples).

In this example, it may be assumed that the application provider 5612 may have an agreement with CAS provider 1 5606 and/or CAS provider 2 5610. Each of these CAS providers may have an agreement with an access network. The two CAS providers may be partners and may have an agreement to allow the transport of traffic between themselves.

At 5620, a CAS application may be started on the WTRU 5602. For example, based on the configuration related to that specific application, on the list of discovered access networks and on user policies, an access network and/or CAS provider may be selected. At 5622, a connection may be established from the WTRU 5602 to the application server 5612, using access network 1 5604 and/or CAS provider 1 5606. An IP address may be allocated to the WTRU 5602 by CAS provider 1 5606.

At 5624, application data may be exchanged between the application server 56121 and the application client on the WTRU 5602. Since CAS provider 1 5606 may be acting as the anchor node, traffic may be routed to CAS provider 1 5606 and may be forwarded to the WTRU 5602 via the access network 5604. This may be comparable to what may be done with the P-GW acting as the anchor node.

At 5626, it may be determined on the WTRU 5602 that BWM should be used for the running application. For example, this decision may be based on application's specific configuration, measurements of the existing connection, etc. The decision may be taken by, e.g., the CAS client or a CAS-enabled connection manager.

Since the current CAS provider may not support other access networks (or none are available at this point), a partner CAS provider may be selected. Partners may be, e.g., specified with the application's configuration. The WTRU 5602 may query CAS provider 1 5606.

At 5628, an additional connection may be established between the CAS client and the CAS provider 2 5610 using access network 2 5608. The establishment of the second connection toward CAS provider 2 5610 may specify that this connection may be bundled with the connection toward CAS provider 1 5606. The same IP address from CAS provider 1 (IP1) may be re-assigned to the second connection and/or a new IP address (IP2) may be assigned by CAS provider 2 5610. In the latter case, CAS providers may make sure that they may support the transport of IP packets using an IP address that may have been assigned by another CAS provider. As well, the WTRU 5602 may be configured to support the usage of the same IP address over either interfaces or the usage of two IP addresses on both interfaces. A logical interface (LIF) may be used to support that with a network-based solution. The application is bound to this LIF.

In the case where a second IP address (IP2) may be assigned to the WTRU, traffic using IP1 or IP2 may be able to be sent over this second connection.

Another possibility (e.g., as shown with dotted lines/shade of 5628) may be to have the WTRU establish a connection to a second CAS provider and to the CAS application provider again. The CAS application provider may detect that the same WTRU is connected via two different CAS providers. The CAS application provider may inform the second CAS provider (CAS provider 2 5610) that a first CAS provider (CAS provider 1 5606) may already be used by the WTRU for this application so that CAS provider 2 5610 may trigger the establishment of a tunnel toward CAS provider 1 5606. The CAS provider 2 5610 may act as a MAG for packets using the IP address allocated by the CAS provider 1 5606. The tunnel between the two CAS providers may be e.g. a PMIP or GTP tunnel.

At 5630, the CAS provider 2 5610 may identify that CAS provider 1 5606 may be a partner so it may trigger the establishment of a tunnel toward CAS provider 2 5610 (e.g., using C4 interface).

The application server 5612 may continue to send traffic to IP1. The downlink packets may be reaching CAS provider 1 5606. CAS provider 1 5606 may decide to either forward the packets directly to the WTRU 5602 over access network 1 5604 or tunnel them toward CAS provider 2 5610 and then access network 2 5608. CAS provider 1 5606 may apply rules for BWM. These may be based on different factors and may be deduce by the CAS provider itself, by a local entity or another entity or the WTRU 5602.

CAS provider 1 5606 may be able to identify that the same WTRU 5602 may be connected via access network 1 5604 and via the tunnel with CAS provider 2 5610. The same WTRU 5602 may be used for both connections. The WTRU 5602 may inform the CAS providers that it may be connected via multiple connections to different CAS providers or the CAS application provider/Server may do it when it notices that the same WTRU (or user) may be connected via two different CAS providers.

At 5632, the application running on the WTRU may be receiving packets as usual. The fact that the packets may be received over two different connections/interfaces may be transparent to the application.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

What is claimed is:

1. A method implemented by a wireless transmit/receive unit (WTRU) for obtaining application-based connectivity, the method comprising:
   in response to a request to access an application service having an associated connectivity access network, scanning for networks advertising support for application services having associated connectivity access networks;
   selecting a first access network from networks advertising support for application services having associated connectivity access networks;
   establishing, using the selected first access network, a control connection with an application connectivity coordinator;
   sending, using the control connection, an access network discovery request to the application connectivity coordinator;
   receiving, from the application connectivity coordinator, a list of access networks; and
   selecting a second access network from the list of access networks for accessing the application service having an associated connectivity access network.

2. The method of claim 1,
   wherein scanning for networks advertising support for application services having associated connectivity access networks comprises receiving one or more System Information Broadcast (SIB) messages, wherein each of the SIB messages indicates whether an associated access network supports application-based connectivity; and
   wherein selecting a first access network comprises selecting a first access network based at least in part on internal state information.

3. The method of claim 2, wherein the first access network is selected on a condition that:
   the first access network provides support for application based network, and
   the first access network matches one of an application connectivity coordinator supported list of access networks.

4. The method of claim 2, wherein the first access network is selected based on one or more of provider rules, WTRU rules, a list of application connectivity coordinators that support the connectivity-sponsored application, a list of application connectivity coordinator supported access networks, or a list of candidate providers and candidate access networks for providing control connection.

5. The method of claim 1, wherein establishing the control connection comprises:
   sending an attach request using the first access network, wherein the attach request comprises an application connectivity coordinator identifier and a device identifier;
   receiving a temporary identifier; and
   receiving an IP address associated with the temporary identifier for a control link to the application connectivity coordinator.

6. The method of claim 5, wherein the application connectivity coordinator identifier and the device identifier are pre-provisioned or received from the application connectivity coordinator.

7. The method of claim 1, wherein the access network discovery request comprises one or more of an application connectivity coordinator identifier, a device identifier, a WTRU location, or application information, wherein the application information comprises one or more of an application identifier, or an application type.

8. The method of claim 1, wherein, on a condition that the second access network is different than the first access network, disconnecting from the first access network and connecting to the second access network.

9. A wireless transmit/receive unit (WTRU) configured for obtaining application-based connectivity, the WTRU comprising:
   a processor configured to at least:
   in response to a request to access an application service having an associated connectivity access network, scan for networks advertising support for application services having associated connectivity access networks;

select a first access network from networks advertising support for application services having associated connectivity access networks;

establish, using the selected first access network, a control connection with an application connectivity coordinator;

send, using the control connection, an access network discovery request to the application connectivity coordinator;

receive, from the application connectivity coordinator, a list of access networks; and select a second access network from the list of access networks for accessing the application service having an associated connectivity access network.

10. The WTRU of claim 9, wherein scanning for networks advertising support for application services having associated connectivity access networks comprises receiving one or more System Information Broadcast (SIB) messages, wherein each of the SIB messages indicates whether the associated access network supports application-based connectivity; and wherein selecting a first access network comprises selecting a first access network based at least in part on internal state information.

11. The WTRU of claim 10, wherein the first access network is selected on a condition that:

the first access network provides support for application based network, and the first access network matches one of an application connectivity coordinator supported list of access networks.

12. The WTRU of claim 10, wherein the first access network is selected based on one or more of provider rules, WTRU rules, a list of application connectivity coordinators that support the connectivity-sponsored application, a list of application connectivity coordinator supported access networks, or a list of candidate providers and candidate access networks for providing control connection.

13. The WTRU of claim 9, wherein establishing the control connection comprises:

sending an attach request using the first access network, wherein the attach request comprises an application connectivity coordinator identifier and a device identifier;

receiving a temporary identifier; and receiving an IP address associated with the temporary identifier for a control link to the application connectivity coordinator.

14. The WTRU of claim 13, wherein the application connectivity coordinator identifier and the device identifier are pre-provisioned or received from the application connectivity coordinator.

15. The WTRU of claim 9, wherein the access network discovery request comprises one or more of an application connectivity coordinator identifier, a device identifier, a WTRU location, or application information, wherein the application information comprises one or more of an application identifier, or an application type.

16. The WTRU of claim 9, wherein the processor is further configured to, on a condition that the second access network is different than the first access network, disconnect from the first access network and connecting to the second access network.

* * * * *